United States Patent
Venn-Watson

(10) Patent No.: US 12,440,473 B2
(45) Date of Patent: Oct. 14, 2025

(54) FATTY ACID ANALOGS AND THEIR USE IN THE TREATMENT OF COGNITIVE IMPAIRMENT, BEHAVIORAL CONDITIONS, AND CHRONIC PAIN

(71) Applicant: Epitracker, Inc., San Diego, CA (US)

(72) Inventor: Stephanie Venn-Watson, San Diego, CA (US)

(73) Assignee: Epitracker, Inc., San Diego, CA (US)

(*) Notice: Subject to any disclaimer, the term of this patent is extended or adjusted under 35 U.S.C. 154(b) by 1001 days.

(21) Appl. No.: 17/461,325

(22) Filed: Aug. 30, 2021

(65) Prior Publication Data

US 2021/0386710 A1 Dec. 16, 2021

Related U.S. Application Data

(63) Continuation of application No. PCT/US2020/020697, filed on Mar. 2, 2020.

(60) Provisional application No. 62/824,247, filed on Mar. 26, 2019, provisional application No. 62/813,566, filed on Mar. 4, 2019.

(51) Int. Cl.
*A61K 31/41* (2006.01)
*A61K 31/20* (2006.01)
*A61P 3/00* (2006.01)

(52) U.S. Cl.
CPC ............ *A61K 31/41* (2013.01); *A61K 31/20* (2013.01); *A61P 3/00* (2018.01)

(58) Field of Classification Search
CPC ............ A61K 31/41; A61K 31/20; A61P 3/00
See application file for complete search history.

(56) References Cited

U.S. PATENT DOCUMENTS

| | | |
|---|---|---|
| 4,252,159 A | 2/1981 | Maki |
| 4,718,430 A | 1/1988 | Holzer |
| 4,985,015 A | 1/1991 | Obermann et al. |
| 5,318,521 A | 6/1994 | Slettenmark |
| 5,449,688 A | 9/1995 | Wahl et al. |
| 5,465,728 A | 11/1995 | Phillips |
| 5,741,816 A | 4/1998 | Tsujihara et al. |
| 6,214,875 B1 | 4/2001 | Yang |
| 6,384,252 B1 | 5/2002 | Pageat |
| 6,441,036 B1 | 8/2002 | Berge |
| 6,544,541 B1 | 4/2003 | Zahradka |
| 7,012,053 B1 | 3/2006 | Barnabas et al. |
| 7,375,135 B2 | 5/2008 | Najib-Fruchart et al. |
| 7,651,845 B2 | 1/2010 | Doyle et al. |
| 8,030,348 B2 | 10/2011 | Sampalis |
| 8,088,825 B2 | 1/2012 | Berge et al. |
| 8,106,093 B2 | 1/2012 | Roe |
| 8,251,904 B2 | 8/2012 | Zivitz et al. |
| 8,759,558 B2 | 6/2014 | Holmeide et al. |
| 8,827,957 B2 | 9/2014 | Searle et al. |
| 9,282,760 B2 | 3/2016 | Bryhn et al. |
| 9,295,637 B2 | 3/2016 | Perricone |
| 9,561,206 B2 | 2/2017 | Venn-Watson |
| 9,662,306 B2 | 5/2017 | Venn-Watson |
| 9,687,461 B2 | 6/2017 | Venn-Watson |
| 9,707,199 B2 | 7/2017 | Venn-Watson |
| 9,713,600 B2 | 7/2017 | Venn-Watson |
| 10,022,347 B2 | 7/2018 | Venn-Watson |
| 10,111,849 B2 | 10/2018 | Henderson |
| 10,238,618 B2 | 3/2019 | Venn-Watson |
| 10,307,388 B2 | 6/2019 | Venn-Watson |
| 10,449,170 B2 | 10/2019 | Venn-Watson |
| 10,449,171 B2 | 10/2019 | Venn-Watson |
| 10,792,266 B2 | 10/2020 | Venn-Watson et al. |
| 11,116,740 B2 | 9/2021 | Venn-Watson |
| 11,951,088 B2 | 4/2024 | Venn-Watson et al. |
| 11,992,473 B2 | 5/2024 | Venn-Watson |
| 2002/0156351 A1 | 10/2002 | Sagel |
| 2003/0086869 A1 | 5/2003 | Stallings |
| 2003/0203004 A1 | 10/2003 | Kelm et al. |
| 2003/0203042 A1 | 10/2003 | Cook |
| 2006/0154833 A1 | 7/2006 | Katou et al. |
| 2006/0269495 A1 | 11/2006 | Popp et al. |
| 2006/0275294 A1 | 12/2006 | Omoigui |
| 2007/0088170 A1 | 4/2007 | Bryhn et al. |
| 2009/0069331 A1 | 3/2009 | Vallance et al. |
| 2009/0318369 A1 | 12/2009 | Paige et al. |
| 2011/0077301 A1 | 3/2011 | Deminiere et al. |

(Continued)

FOREIGN PATENT DOCUMENTS

| | | |
|---|---|---|
| CA | 2337484 A1 | 8/2001 |
| CN | 1939332 A | 4/2007 |

(Continued)

OTHER PUBLICATIONS

Schafer et al. Drug Discovery Today 2008, 13 (21/22), 913-916 (Year: 2008).*
Horig et al. Journal of Translational Medicine 2004, 2(44) (Year: 2004).*
(Haast et al. / Prostaglandins, Leukotrienes and Essential Fatty Acids . 2015; 92, 3-14 (Year: 2015).*
Contreras et al. (Biomed Res Int. 2014; 2014: 492141). (Year: 2014).*
Moon et al. (Metabolism. Sep. 2014; 63(9): 1131-1140). (Year: 2014).*
Harbige et al. (British Journal of Nutrition (2007), 98, Suppl. 1, S46-S53). (Year: 2007).*
Silva et al. (Front Pharmacol. 2017; 8: 723.). (Year: 2017).*

(Continued)

*Primary Examiner* — Clinton A Brooks
*Assistant Examiner* — Jerica Katlynn Wilson
(74) *Attorney, Agent, or Firm* — Knobbe, Martens, Olson & Bear, LLP

(57) ABSTRACT

Compositions comprising fatty acid analogs are provided for treating conditions involving impaired cognition, movement disorders, chronic pain, depression, decreased appetite, addiction, seizure, and convulsion, and other conditions. Methods for the diagnosis and monitoring of impaired cognition, movement disorders, chronic pain, depression, decreased appetite, addiction, seizure, convulsion, and other conditions are also provided.

22 Claims, 2 Drawing Sheets

(56) References Cited

U.S. PATENT DOCUMENTS

| | | |
|---|---|---|
| 2011/0098358 A1 | 4/2011 | Fujimoto et al. |
| 2011/0182943 A1 | 7/2011 | Kanwar et al. |
| 2011/0190395 A1 | 8/2011 | Holmeide et al. |
| 2011/0190702 A1 | 8/2011 | Stumber |
| 2011/0201558 A1 | 8/2011 | Roe et al. |
| 2012/0071418 A1 | 3/2012 | Copeland et al. |
| 2012/0072236 A1 | 3/2012 | Atkin |
| 2012/0122940 A1 | 5/2012 | Hovland et al. |
| 2013/0053362 A1 | 2/2013 | Castro et al. |
| 2013/0303616 A1* | 11/2013 | Williams ............ A61P 31/18 514/558 |
| 2014/0303228 A1 | 10/2014 | Lawton et al. |
| 2015/0291523 A1 | 10/2015 | Ishikawa et al. |
| 2016/0045533 A1 | 2/2016 | Power et al. |
| 2016/0193170 A1 | 7/2016 | Venn-Watson et al. |
| 2016/0193171 A1 | 7/2016 | Venn-Watson |
| 2016/0193172 A1 | 7/2016 | Venn-Watson |
| 2016/0195558 A1 | 7/2016 | Venn-Watson et al. |
| 2016/0195559 A1 | 7/2016 | Venn-Watson |
| 2016/0324814 A1 | 11/2016 | Venn-Watson |
| 2017/0266144 A1 | 9/2017 | Venn-Watson |
| 2017/0319149 A1 | 11/2017 | Koehler et al. |
| 2018/0148682 A1 | 5/2018 | Ross |
| 2018/0185316 A1 | 7/2018 | Venn-Watson |
| 2018/0296518 A1 | 10/2018 | Venn-Watson et al. |
| 2018/0311303 A1 | 11/2018 | Maione et al. |
| 2019/0054052 A1 | 2/2019 | Shchepinov |
| 2019/0117607 A1 | 4/2019 | Venn-Watson |
| 2019/0240181 A1 | 8/2019 | Venn-Watson |
| 2019/0358183 A1 | 11/2019 | Venn-Watson |
| 2020/0222351 A1 | 7/2020 | Dhamane et al. |
| 2020/0345676 A1 | 11/2020 | Venn-Watson et al. |
| 2021/0046034 A1 | 2/2021 | Venn-Watson |
| 2021/0052535 A1 | 2/2021 | Venn-Watson |
| 2021/0330734 A1 | 10/2021 | Venn-Watson |
| 2021/0346419 A1 | 11/2021 | Venn-Watson |
| 2021/0386710 A1 | 12/2021 | Venn-Watson |
| 2023/0132955 A1 | 5/2023 | Venn-Watson |
| 2023/0201153 A1 | 6/2023 | Venn-Watson |
| 2023/0293491 A1 | 9/2023 | Venn-Watson |
| 2023/0381127 A1 | 11/2023 | Venn-Watson |
| 2024/0016773 A1 | 1/2024 | Venn-Watson |
| 2024/0277649 A1 | 8/2024 | Venn-Watson et al. |
| 2024/0307336 A1 | 9/2024 | Venn-Watson |

FOREIGN PATENT DOCUMENTS

| | | |
|---|---|---|
| CN | 102327368 A | 1/2012 |
| DE | 2615061 | 10/1977 |
| DE | 102010010666 A1 | 9/2011 |
| EP | 1000071 A1 | 5/2000 |
| EP | 1020179 A2 | 7/2000 |
| EP | 3301090 A1 | 4/2018 |
| JP | S60172925 | 9/1985 |
| JP | S61015809 A | 1/1986 |
| JP | S62012716 | 1/1987 |
| JP | S63099063 | 4/1988 |
| JP | H06172168 A | 6/1994 |
| JP | 2003160486 A | 6/2003 |
| JP | 2004115438 A | 4/2004 |
| JP | 2005523331 A | 8/2005 |
| JP | 2008255022 A | 10/2008 |
| JP | 2008540393 | 11/2008 |
| JP | 2010260833 A | 11/2010 |
| JP | 2011528350 A | 11/2011 |
| JP | 2014080432 A | 5/2014 |
| JP | 2015010067 A | 1/2015 |
| JP | 2016504403 | 2/2016 |
| JP | 6029668 B2 | 11/2016 |
| JP | 2017200910 A | 11/2017 |
| JP | 2017536879 A | 12/2017 |
| KR | 20170087813 A | 7/2017 |
| KR | 201701009096 A | 9/2017 |
| KR | 102087634 B1 | 3/2020 |
| WO | WO 1996/26647 | 9/1996 |
| WO | WO 1996/32850 | 10/1996 |
| WO | WO 1999/001103 | 1/1999 |
| WO | WO 1999/002485 | 1/1999 |
| WO | WO 2000/040217 | 7/2000 |
| WO | WO 2004/057982 | 7/2004 |
| WO | WO 2004/069240 | 8/2004 |
| WO | WO 2005/099483 | 10/2005 |
| WO | WO 2005/120485 | 12/2005 |
| WO | WO 2006/038063 | 4/2006 |
| WO | WO 2006/117668 | 11/2006 |
| WO | WO 2007/002365 | 1/2007 |
| WO | WO 2007/100435 | 9/2007 |
| WO | WO 2008/114732 | 9/2008 |
| WO | WO 2010/123930 | 10/2010 |
| WO | WO 2012/001336 | 1/2012 |
| WO | WO 2012/069790 | 5/2012 |
| WO | WO 2013/007700 | 1/2013 |
| WO | WO 2014/108573 | 7/2014 |
| WO | WO 2014/179341 | 11/2014 |
| WO | WO 2015/110977 | 7/2015 |
| WO | WO 2015/0140545 | 9/2015 |
| WO | WO 2015/157514 | 10/2015 |
| WO | WO 2016/111843 | 7/2016 |
| WO | WO 2017/186928 | 11/2017 |
| WO | WO 2018/157013 | 8/2018 |
| WO | WO 2019/212196 | 11/2019 |
| WO | WO 2019/222254 | 11/2019 |
| WO | WO 2019/226572 | 11/2019 |
| WO | WO 2020/146263 | 7/2020 |
| WO | WO 2020/154173 | 7/2020 |

OTHER PUBLICATIONS

Irmisch et al. (Prostaglandins Leukot Essent Fatty Acids. 2007; 76: 1-7). (Year: 2007).*

Cole et al. (Prostaglandins Leukot Essent Fatty Acids. Aug.-Sep. 2009; 81(0): 213-221). (Year: 2009).*

Priebe et al. (Alternative and Complementary Therapies 2019 25:1, 56-58). (Year: 2019).*

Borodina et al., "The biology of ergothioneine, an antioxidant nutraceutical". Nutri Res Reviews (2020) 33: 190-217.

Database WPI, "Pentadecanoic acid compound", Clarivate Analytics, AN: 2017-637713, Clarivate Analytics, dated: Jul. 2017; 2 pages.

Database WPI, "Immunosuppressive agent . . . ", AN: 1994-238645, Clarivate Analytics, dated: 1994; 2 pages.

Database WPI, "An effective Saururus chinensisrhizome part . . . ", An: 2012-B90946, Clarivate Analytics, dated: 2012; 2 pages.

Database WPI, "An anti-aging composition . . . ", AN: 2004-310751, Clarivate Analytics, dated: 2004; 2 pages.

Sotgia et al., "Hercynine content in widely consumed commercial beverages". LWT Food Science Tech. Dec. 1, 2018;98: 465-469.

Abdullah et al., "Recommended dairy product intake modulates circulating fatty acid profile in healthy adults: a multi-centre crossover study", Br J Nutr. 113(3):435-444.

Adams et al., "Hemochronatosis and iron-overload screening in a racially diverse population." New Engl J Med. 2005, 352(17):1769-1778.

Adams et al., "A diagnostic approach to hyperferritinemia with a non-elevated transferrin saturation", J Hepatol. 2011, 55(2):453-458.

Ahmad et al., "Interaction of Osteopontin with IL-18 in Obese Individuals: Implications for Insulin Resistance". PLoS One 2013, 8(5):e63944 in 9 pages.

Akbar et al., Alterations in Hepatic FGF21, Co-Regulated Genes, and Upstream Metabolic Genes in Response to Nutrition, Ketosis and Inflammation in Peripartal Holstein Cows, PLoS One 2015, 10(10):e0139963 in 16 pages.

Akhter, J. MD; Asthma-cure, 2017, https://www.scientificamerican.com/article/can-asthma-be-cured-what/ in 7 pages.

Aksenov et al., "Metabolite Content Profiling of Bottlenose Dolphin Exhaled Breath", Anal Chem 2014, 86(21):10616-10624.

Altamura et al., "Iron toxicity in diseases of aging: Alzheimer's disease, Parkinson's disease and atherosclerosis." J Alzheimer's Dis. 2009, 16(4):879-895.

(56) References Cited

OTHER PUBLICATIONS

Anderson et al., "Cholesterol and mortality: 30 years of follow-up from the Framingham Study." JAMA (1987) 257(16):2176-2180.
Angulo et al., "Liver Fibrosis, but no Other Histologic Features, Associates with Long-term Outcomes of Patients With Nonalcoholic Fatty Liver Disease". Gastroenterology. 2015, 149(2):389-397.
Ballatore et al., "Carboxylic Acid (Bio)Isosteres in Drug Design". ChemMedChem. 2013, 8(3):385-395.
Barba et al., Alzheimer's disease beyond the genomic era: nuclear magnetic resonance (NMR) spectroscopy-based metabolomics. J Cell Mol Med. 2008. 12(5a): 1477-1485.
Barcellini et al., "Clinical Applications of Hemolytic Markers in the Differential Diagnosis and Management of Hemolytic Anemia". Disease Markers (2015) Article ID 635670 in 7 pages.
Barros et al., "Prey and feeding patterns of resident bottlenose dolphins (Tursiops truncatus) in Sarasota Bay, Florida", J Mammal. 1998, 79:1045-1059.
Bartke et al., "Bioactive sphingolipids: metabolism and function". J Lipid Res. (2009) 50(Suppl):S91-S96.
Batista et al., "Structural Insights into Human Peroxisome Proliferator Activated Receptor Delta (PPAR-Delta) Selective Ligand Binding", PLoS ONE. 2012, 7(5):e33643 in 7 pages.
Beaton et al., "Treatment of Hyperferritinemia", Ann Hepatol. 2012, 11(3):294-300.
Benatar et al., "The effects of changing dairy intake on trans and saturated fatty acid levels—results from a randomized controlled study". Nutr J. 2014, 13:32 in 10 pages.
Berens-McCabe et al., "Prey selection in a resident common bottlenose dolphin (Tursiops truncatus) community in Sarasota Bay, Florida", Marine Biol. 2010, 157:931-942.
Bettcher et al., "MCP-1 and eotaxin-1 selectively and negatively associate with memory in MCI and Alzheimer's disease dementia phenotypes", Alzheimers Dement (Amst). 2016, 3:91-97.
Bhargava et al., "Metabolic alterations in multiple sclerosis and the impact of vitamin D supplementation", JCI Insight. 2017, 2(19): 1-13.
Bogdanov et al., "Metabolomic profiling to develop blood biomarkers for Parkinson's disease", Brain 2008. 131(2):389-396.
Bossù et al., "Interleukin-18 produced by peripheral blood cells is increased in Alzheimer's disease and correlates with cognitive impairment". Brain Behav Immun. 2008, 22(4):487-492.
Calder et al., "n-3 polyunsaturated fatty acids, inflammation, and inflammatory diseases." Am J Clin Nutr. 2006, 83(6 suppl):1505S-1519S.
Calder P.C., "Long-chain polyunsaturated fatty acids and inflammation", Scandinavian J Food Nutr. 2006, 50(S2):54-61.
Camaschella C., "Iron-Deficiency Anemia", New Engl J Med. (2015) 372(19):1832-1843.
Cater et al., "Behenic acid is a cholesterol-raising saturated fatty acid in humans." Am J Clin Nutr. 2001, 73(1):41-44.
Cheng et al., "Distinct Metabolomic Signatures Are Associated with Longevity in Humans.", Nat Commun. 2015, 6:6791 in 22 pages.
Choi et al., "Dairy consumption and risk of type 2 diabetes mellitus in men: a prospective study". Arch Intern Med. 2005, 165(9):997-1003.
Colegrove K., Histomorphology of the bottlenose dolphin (Tursiops truncatus) pancreas and association of increasing islet ß-cell size with chronic hypercholesterolemia. Gen Comp Endocrinol. 2015, 214:17-23.
Collino et al., "Metabolic Signatures of Extreme Longevity in Northern Italian Centenarians Reveal a Complex Remodeling of Lipids, Amino Acids, and Gut Microbiota Metabolism". PLoS ONE. 2013, 8(3):e56564.
Corso et al., Corso et al., "Serum Amino Acid Profiles in Normal Subjects and in Patients with or at Risk of Alzheimer Dementia", Dement Geriatr Cogn Disord Extra. 2017, 7(1):143-159.
Craik J., GLUT-1 mediation of rapid glucose transport in dolphin (Tursiops truncatus) red blood cells. Am J Physiol. 1998, 274(1 Pt 2):R112-R119.

Croes et al., Formation of a 2-methyl-branched fatty aldehyde during peroxisomal alpha-oxidation. FEBS Lett. 1997, 412(3):643. 645.
Cronet et al., "Structure of the PPARα and -γLigand Binding Domain in Complex with AZ 242; Ligand Selectivity and Agonist Activation in the PPAR Family", Structure. 2001, 9(8):699-706.
Cusi et al., "Long-Term Pioglitazone Treatment for Patients With Nonalcoholic Steatohepatitis and Prediabetes or Type 2 Diabetes Mellitus: A Randomized Trial". Ann Intern Med. 2016, 165(5):305-315.
Daak et al., "Effect of omega-3 (n-3) fatty acid supplementation in patients with sickle cell anemia: randomized, double-blind, placebo-controlled trial". Am J Clin Nutr. 2013, 97(1):37-44.
DAS Undurti N., "Arachidonic acid in health and disease with focus on hypertension and diabetes mellitus: A review", J Adv Res. 2018, 11:43-55.
Diehl et al., "Cause, Pathogenesis, and Treatment of Nonalcoholic Steatohepatitis". N Engl J Med. 2017, 377(21):2063-2072.
Di Paolo et al., "Linking Lipids to Alzheimer's Disease: Cholesterol and Beyond", Nat Rev Neurosci. 2011, 12(5):284-296.
Dongiovanni et al., "Iron in fatty liver and in the metabolic syndrome: a promising therapeutic target". J Hepatol. 2011, 55:920-932.
Dursun et al., 2015, The interleukin 1 alpha, interleukin 1 beta, interleukin 6 and alpha-2-macroglobulin serum levels in patients with early or late onset Alzheimer's disease, mild cognitive impairment or Parkinson's disease. J Neuroinflammunol. 2015, 283: 50-57.
Durzan D.J., Arginine, scurvy and Cartier's "tree of life". J Ethnobio Ethnomed. 2009. 5(1): 1-16.
Ekstedt et al., "Fibrosis stage is the strongest predictor for disease-specific mortality in NAFLD after up to 33 years of follow-up." Hepatology. 2015; 61(5): 1547-1554.
Ellervik et al., "Prevalence of hereditary haemochromatosis in late-onset type 1 diabetes mellitus: a retrospective study", Lancet 2001, 358(9291):1405-1409.
Evans et al., "NAD+ metabolite levels as a function of vitamins and calorie restriction: evidence for different mechanisms of longevity." BMC Chem Biol. 2010, 10:2 in 10 pages.
Fargion et al., "Hyperferritinemia, iron overload, and multiple metabolic alterations identify patients at risk for nonalcoholic steatohepatitis". Am J Gastroenterol. 2001, 96(8):2448-2455.
Favé et al., "Physicochemical properties of lipids: new strategies to manage fatty acid bioavailability". Cell Mol Biol. 2004, 50(7):815-831.
FDA Guidance for Industry. "Estimating the maximum safe starting dose in initial clinical trials for therapeutics in adult healthy volunteers." U.S. Food and Drug Administration, Jul. 2005 in 30 pages.
FDA (2017) FDA drug safety communication: FDA warns about serious liver injury with Ocaliva (obeticholic acid) for rare chronic liver disease. Accessed Dec. 5, 2017 https://www.fda.gov/Drugs/DrugSafety/ucm576656.htm in 4 pages.
Fernandes et al., "Relationship between Acute Phase Proteins and Serum Fatty Acid Composition in Morbidly Obese Patients", Dis Markers 2013, 35(2):104-112.
Forman et al., "Hypolipidemic drugs, polyunsaturated fatty acids, and eicosanoids are ligands for peroxisome proliferator-activated receptors α and δ", Proc Natl Acad Sci U.S.A., 1997, 94(9):4312-4317.
Forouhi et al., "Differences in the Prospective Association Between Individual Plasma Phospholipid Saturated Fatty Acids and Incident Type 2 Diabetes: The EPIC-InterAct Case-Cohort Study", Lancet Diabetes Endocrinal, 2014, 2:810-818.
Fujiwara et al., "Biology of Heme in mammalian Erythroid Cells and Related Disorders". BioMed Res Int'l. (2015) Article ID 278536 in 9 pages.
Gabrielsen et al., "Adipocyte iron regulates adiponectin and insulin sensitivity". J Clin Invest. 2012, 122(10):3529-3540.
Ghannadi et al., "An Investigation of the Analgesic and Anti-Inflammatory Effects of Nigella sativa Seed Polyphenols", J Med Food. 2005, 8(4): 488-493.

(56) References Cited

OTHER PUBLICATIONS

Gibson Ra., "Australian fish—An excellent source of both arachidonic acid and ω-3 polyunsaturated fatty acids", Lipids 1983, 18(11):743-752.
Giunta et al., "Inflammaging as a prodrome to Alzheimer's disease", J Neuroinflammation 2008, 5:51; 15 pages.
Glauber et al., "Adverse metabolic effect of omega-3 fatty acids in non-insulin-dependent diabetes mellitus", Ann Intern Med. 1988, 108(5):663-668.
Gonzalez-Covarrubias et al., "Lipidomics of familial longevity". Aging Cell. 2013, 12(3):426-434.
Gonzalez-Covarrubias V., "Lipidomics in longevity and healthy aging". Biogerontology. 2013, 14(6):663-672.
Ghosh et al., "PAI-1 in tissue fibrosis." J Cell Physiol. (2011) 227(2):493-507.
Grundy et al., "Definition of metabolic syndrome: Report of the National Heart, Lung, and Blood Institute/American Heart Association conference on scientific issues related to definition", Circulation. 2004, 109(3):433-438.
Gunstone et al. [Eds.], "A review of even-chain fatty acid metabolism and the role of arachidic acid (C20:0) and lignoceric acid (C24:0) in health and disease", The Lipid Handbook, Gunstone et al. [Eds.] 3rd Edition, 2008, 604-635.
Hallgren et al., "Lymphocyte phytohemagllutinin responsiveness, immunoglobulins and autoantibodies in aging humans." J Immunol. (1973) 111:1101-1107.
Hall et al., "Annual, seasonal and individual variation in hematology and clinical blood chemistry profiles in bottlenose dolphins (Tursiops truncatus) from Sarasota Bay, Florida", Comp Biochem Physiol A Mol Integr Physiol. 2007, 148(2):266-277.
Hannun et al., "Principles of bioactive lipid signalling: lessons from sphingolipids", Nat Rev Mol Cell Biol. 2008, 9(2):139-150.
Hassanali et al., "Dietary supplementation of n-3 PUFA reduces weight gain and improves postprandial lipaemia and the associated inflammatory response in the obese JCR:LA-cp rat", Diabetes Obes Metab. 2010, 12(2):139-147.
Hebbel et al., A Systems Biology Consideration of the Vasculopathy of Sickle Cell Anemia: The Need for Multi-Modality Chemo-Prophylaxis, Cardiovsc Hematol Disord Drug Targets (200() 9(4):271-291.
Heneka et al., "Neuroinflammation in Alzheimer's Disease", Lancet Neurol. 2015, 14(4):388-405.
Hodge et al., "Plasma phospholipid and dietary fatty acids as predictors of type 2 diabetes: Interpreting the role of linoleic acid." Am J Clin Nutrition (2007) 86(1): 189-197.
Hodson et al., "Fatty acid composition of adipose tissue and blood in humans and its use as a biomarker of dietary intake", Prog Lipid Res. 2008, 47:348-380.
Holmes et al., "Systemic inflammation and disease progression in Alzheimer disease". Neurology 2009, 73(10):768-774.
Hwang et al., "Inhibitory Effects of 4-Guanidinobutyric Acid against Gastric Lesions", Biomol Ther. 2012, 20(2): 239-244.
International Diabetes Federation (2006) The IDF consensus worldwide definition of the Metabolic Syndrome. Brussels, Belgium., in 24 pages.
Jaruvongvanich et al., "Outcome of phlebotomy for treating nonalcoholic fatty liver disease: a systematic review and meta-analysis". Sauid J Gastroenterol. 2016, 22(6):407-414.
Jenkins et al., "A Review of Odd-Chain Fatty Acid Metabolism and the Role of Pentadecanoic Acid (C15:0) and Heptadecanoic Acid (C17:0) in Health and Disease", Molecules (2015) 20(2):2425-2444.
Jeon et al., "S-adenosylhomocysteine treatment of adult female fibroblasts alters X-chromosomeinactivation and improves in vitro embryo development after somatic cell nuclear transfer", Reproduction, (2008) 135: 815-828.
Johnson et al., "Use of phlebotomy treatment in Atlantic bottlenose dolphins with iron overload". J Am Vet Med Assoc. 2009, 235(2):194-200.
Jové et al. Metabolomics of human brain aging and age-related neurodegenerative diseases. J Neuropathol Exp Neurol. 2014, 73(7): 640-657.
Kaddurah-Daouk, et al., Metabolomics: A global biochemical approach to the study of central nervous system diseases. Neuropsychopharmacol 2009. 34(1): 173-186.
Kanda et al., "MCP-1 contributes to macrophage infiltration into adipose tissue, insulin resistance, and hepatic steatosis in obesity", J Clin Invest. 2006, 116(6):1494-1505.
Kersten et al., "Roles of PPARs in health and disease", Nature. 2000, 405(6785):421-424.
Kiyota et al., "CCL2 Accelerates Microglia-Mediated Aβ Oligomer Formation and Progression of Neurocognitive Dysfunction". PLoS ONE. 2009, 4:e6197 in 12 pages.
Klock et al., "Sodium ascorbyl phosphate shows in vitro and in vivo efficacy in the prevention and treatment of acne vulgaris", International Journal of Cosmetic Science, 2005, 27(3):171-176.
Krachler et al., "Fatty Acid Profile of the Erythrocyte Membrane Preceding Development of Type 2 Diabetes Mellitus", Nutri Metabol Cardiovasc Diseases, (2008) 18(7):503-510.
Kratz et al., The relationship between high-fat dairy consumption and obesity, cardiovascular, and metabolic disease. Eur J Nutr. (2013) 52: 1-24.
Kratz et al., "Dairy fat intake is associated with glucose tolerance, hepatic and systemic insulin sensitivity, and liver fat but not β-cell function in humans", Am J Clin Nutr. 2014, 99(6):1385-1396.
Kriesberg et al., Cholesterol metabolism and aging, Am J Med. (1987) 82: 54-60.
Kristal et al., "Metabolomics: Opening Another Window into Aging". Sci Aging Knowledge Environ. 2005, 26:pe19 in 2 Pages.
Kühn et al., 2012, "Effect of Multipeak Spectral Modeling of Fat for Liver Iron and Fat Quantification: Correlation of Biopsy with MR Imaging Results". Radiology. 2012, 265(1):133-142.
LaBrecque et al., "World Gastroenterology Organisation global guidelines: Nonalcoholic fatty liver disease and nonalcoholic steatohepatitis". J Clin Gastroenterol. 2014, 48(6):467-473.
Lagerstedt et al., "Quantitative determination of plasma c8-c26 total fatty acids for the biochemical diagnosis of nutritional and metabolic disorders", Mol Genet Metab. 2001, 73(1):38-45.
Lai et al., "The protective effects and genetic pathways of thorn grape seeds oil against high glucose-induced apoptosis in pancreatic beta-cells", BMC Complement Altern Med. 2014, 14:10 (7 pages).
Lefebvre et al., "Antifibrotic Effects of the Dual CCR2/CCR5 Antagonist Cenicriviroc in Animal Models of Liver and Kidney Fibrosis". PLoS ONE. 2016. 11(6):e0158156 in 19 pages.
Leyton et al., "Differential oxidation of saturated and unsaturated fatty acids in vivo in the rat". Br J Nutr. 1987, 57(3):383-393.
Liao et al., "Pioglitazone and cardiovascular outcomes in patients with insulin resistance, pre-diabetes and type 2 diabetes: a systematic review and meta-analysis". BMJ Open. 2017, 7(1):e013927 in 13 pages.
Liu et al., "Serum biomarkers for nonalcoholic fatty liver disease: Are we there yet?", Hepatology. 2017, 65(1):8-11.
Livrea et al., "Oxidative stress and antioxidant status in ß-thalassemia major: iron overload and depletion of lipid-soluble antioxidants." Blood. 1996, 88(9):3608-3614.
Loomba et al., "The ASK1 inhibitor selonsertib in patients with nonalcoholic steatohepatitis: A randomized, phase 2 trial". Hepatology. 2018, 67(2):549-559; avail online Dec. 2017; in 11 pages.
Luquet et al., "Roles of PPAR δ in lipid absorption and metabolism: a new target for the treatment of type 2 diabetes", Biochim Biophys Acta. 2005, 1740:313-317.
Luzia et al., "The influence of season on the lipid profiles of five commercially important species of Brazilian fish", Food Chem. 2003, 83(1):93-97.
Ma et al., "Organization of the mammalian metabolome according to organ function, lineage specialization, and longevity". Cell Metab. 2015, 22(2):332-343.
Madsen et al., "Tetradecylthioacetic acid prevents high fat diet induced adposity and insulin resistance", J Lipid Res. 2002, 43:742-750.

(56) References Cited

OTHER PUBLICATIONS

Magnusdottir et al., "Plasma alkylresorcinols C17:0/C21:0 ratio, a biomarker of relative whole-grain rye intake, is associated to insulin sensitivity: a randomized study", Eur J Clin Nutr. 2014, 68(4):453-458.
Månsson H.L., "Fatty acids in bovine milk fat". Food Nutr Res. 2008, 52:4 in 3 pages.
Martin-Jiménez et al., Relationship between obesity, Alzheimer's disease, and Parkinson's disease: an astrocentric view. Publ. online Oct. 28, 2016; Mol Neurobiol. 2017, 54(9):7096-7115.
Maruyama et al., "Differences in Serum Phospholipid Fatty Acid Compositions and Estimated Desaturase Activities Between Japanese Men With and Without Metabolic Syndrome", J Atheroscler Thromb. 2008, 15(6):306-313.
Mayneris-Perxachs et al., "Plasma fatty acid composition, estimated desaturase activities, and their relation with the metabolic syndrome in a population at high risk of cardiovascular disease". Clinical Nutrition. 2013, HTTP://dx.doi.org/10.1016/j.clnu.2013.03.001.
Mayo Clinic, Asthma, 2017, https://www.mayoclinic.org/diseases-conditions/asthma/basics/treatment/con-20026992 in 6 pages.
Mayo Clinic, Cholesterolgallstones, 2017, https://www.mayoclinic.org/diseases-conditions/gallstones/diagnosis-treatment/drc-20354220 in 3 pages.
Mazzaro et al., "Iron indices among bottlenose dolphins (Tursiops truncatus)". Comp Med. 2012, 62(6):508-515.
McGeer et al., "Inflammation, Antiinflammatory Agents, and Alzheimer's Disease: The Last 22 Years". J Alzheimers Dis. 2016, 54(3):853-857.
McGowen M., "Dolphin genome provides evidence for adaptive evolution of nervous system genes and a molecular rate slowdown", Proc Biol Sci. 2012, 279(1743):3643-3651.
McMurchie E.J., "Dietary lipids and the regulation of membrane fluidity and function". Publisher: Alan R. Liss, Inc.; Physiol Reg Memb Fuid. 1988, 189-237.
Meikle et al., "Plasma Lipid Profiling Shows Similar Associations with Prediabetes and Type 2 Diabetes". PloS one, 2013, 8(9), e74341; 43 pages.
Mennen et al., "Possible protective effect of bread and dairy products on the risk of the metabolic syndrome", Nutrition Res. 2000, 20(3):335-347.
Mi, "Myocardial Infarction", 2017, MedlinePlus Medical Encyclopedia; URL:<https://medlineplus.gov/ency/article/000195.htm> in 7 pages.
Miyake et al., "Maternal consumption of dairy products, calcium, and vitamin D during pregnancy and infantile allergic disorders." Ann Allergy Asthma Immunol. (2014) 113(1): 82-87. (Abstract p. S224).
Montoliu et al., Serum profiling of healthy aging identifies phosphor- and sphingolipid species as markers of human longevity. Aging (Albany NY). 2014, 6(1):9-25.
Morsy et al., "Can eicosapentaenoic acid maintain the original ribavirin dose or affect the response during the treatment course of chronic hepatitis C virus (HCV) patients?", Turk J Gastroenterol. 2016, 27:55-61.
Nanji et al., "Dietary saturated fatty acids reverse inflammatory and fibrotic changes in rat liver despite continued ethanol administration." J Pharmacol Exp Ther. 2001, 299(2):638-644.
Nelson et al., "Relationship between the pattern of hepatic iron deposition and histologic severity in nonalcoholic fatty liver disease". Hepatology. 2011, 53(2):448-457.
Nestel et al., Specific plasma lipid classes and phospholipid fatty acids indicative of dairy food consumption associate with insulin sensitivity. Am J Clin Nutr., 2014, 99(1):46-53.
Nestel P., "Trans fatty acids: are its cardiovascular risks fully appreciated?". Clin Ther. 2014, 36(3):315-321.
Neuschwander-Tetri et al., "Farnesoid X nuclear receptor ligand obeticholic acid for non-cirrhotic, non-alcoholic steatohepatitis (FLINT): a multicentre, randomised, placebo-controlled trial". Lancet. 2015, 385(9972):956-965. 956-965.
Nilsson S., "Long-term treatment with methenamine hippurate in recurrent urinary tract infection", Acta Med Scand. (1975) 198(1-2): 81-85.
Novgorodtseva et al., "Composition of fatty acids in plasma and erythrocytes and eicosanoids level in patients with metabolic syndrome". Lipids Health Dis. 2011, 10:82 in 5 pages.
Novgorodtseva et al., "Modification of fatty acids composition in erythrocytes lipids in arterial hypertension associated with dyslipidemia". Lipids Health Dis. 2011, 10:18 in 5 pages.
Oberley et al., "Laboratory testing for cobalamin deficiency in megaloblastic anemia". Am J Hematol. (2013) 88(6):522-524.
Ojala et al., "Expression of interleukin-18 is increased in the brains of Alzheimer's disease patients". Neurobiol Aging. 2009, 30(2):198-209.
Otogawa et al., "Erythrophagocytosis by Liver Macrophages (Kupffer Cells) Promotes Oxidative Stress, Inflammation, and Fibrosis in a Rabbit Model of Steatohepatitis: Implications for the Pathogenesis of Human Nonalcoholic Steatohepatitis". Am J Pathol. 2007, 170(3):967-980.
Özogul et al., Fatty acid profiles and fat contents of commercially important seawater and freshwater fish species of Turkey: A comparative study. Food Chem. 2007, 103:217-223.
Panee J., "Monocyte Chemoattractant Protein 1 (MCP-1) in Obesity and Diabetes", Cytokine. (2012) 60(1):1-12.
Patel et al., "Fatty acids measured in plasma and erythrocyte-membrane phospholipids and derived by food-frequency questionnaire and the risk of new-onset type 2 diabetes: a pilot study in the European Prospective Investigation into Cancer and Nutrition (EPIC)-Norfolk cohort". Am J Clin Nutri. 2010, 92(5):1214-1222.
Penckofer et al., "Oxidative stress and cardiovascular disease in type 2 diabetes: the role of antioxidants and prooxidants". J Cardiovasc Nurs. 2002, 16(2):68-85.
Pereira et al., "Dairy consumption, obesity, and the insulin resistance syndrome in young adults: the CARDIA study", JAMA. 2002, 287(16):2081-2089.
Perry Vh., "Contribution of systemic inflammation to chronic neurodegeneration". Acta Neuropathol. 2010, 120(3):277-286.
Perry et al., "Microglia and macrophages of the central nervous system: the contribution of microglia priming and systemic inflammation to chronic neurodegeneration". Semin Immunopathol. (2013) 35:601-612.
Pfeuffer et al., "Milk and the metabolic syndrome", Obes Rev. 2007, 8(2):109-118.
Pfeuffer et al., "Pentadecanoic and Heptadecanoic Acids: Multifaceted Odd-Chain Fatty Acids", Adv Nutr. 2016, 7:730-734.
Pietrangelo A. "Iron in NASH, chronic liver diseases and HCC: how much iron is too much?", J Hepatol. 2009, 50(2):249-251.
Popp-Snijders et al., "Dietary supplementation of omega-3 polyunsaturated fatty acids improves insulin sensitivity in non-insulin-dependent diabetes", Diabetes Res 1987, 4(3):141-147.
Profenno et al., "Meta-analysis of Alzheimer's disease risk with obesity, diabetes, and related disorders", Biol Psychiatry. 2010, 67(6):505-512.
Pubchem. Cid 325395, Mar. 26, 2005; pp. 1-13; retrieved from the Internet <URL: https://pubchem.ncbi.nlm.nih.gov//compound/325395>.
Qin et al., "Peroxisome proliferator-activated receptor-δ induces insulin-induced gene-1 and suppresses hepatic lipogenesis in obese diabetic mice", Hepatology, 2008, 48(2):432-441.
Ramírez et al., "Absorption and distribution of dietary fatty acids from different sources". Early Hum Develop. 2001, 65(Suppl):S95-S101.
Ratziu V., "Novel pharmacotherapy options for NASH". Dig Dis Sci. 2016, 61(5):1398-1405.
Ratziu et al., "Elafibranor, an agonist of the peroxisome proliferator-activated receptor-α and -δ, induces resolution of nonalcoholic steatohepatitis without fibrosis worsening". Gastroenterology. 2016, 150(5):1147-1159.
Robinson et al., "N-3 polyunsaturated fatty acids: relationship to inflammation in healthy adults and adults exhibiting features of metabolic syndrome." Lipids. 2013, 48(4):319-332.

(56) References Cited

OTHER PUBLICATIONS

Ross et al., "CHF5074 reduces biomarkers of neuroinflammation in patients with mild cognitive impairment: a 12-week, double-blind, placebo-controlled study". Curr Alzheimer Res. 2013, 10(7):742-753.
Ruidavets et al., "High consumptions of grain, fish, dairy products and combinations of these are associated with a low prevalence of metabolic syndrome", J Epidemiol Community Health, 2007, 61(9):810-817.
Safadi et al., "The fatty acid-bile acid conjugate Aramchol reduces liver fat content in patients with nonalcoholic fatty liver disease". Clin Gastroenterol Hepatol. 2014, 12(12):2085-2091.
Salameh et al., "Insulin resistance, dyslipidemia, and apolipoprotein E interactions as mechanisms in cognitive impairment and Alzheimer's disease", Exp Biol Med (Maywood). 2016, 241(15):1676-1683.
Salek et al., A metabolomic study of the CRND8 transgenic mouse model of Alzheimer's disease. Neurochem Int. 2010. 56(8): 937-947.
Sanches et al., "Nonalcoholic Steatohepatitis: A Search for Factual Animal Models". Biomed Res Int. 2015, doi: [10.1155/2015/574832] in 13 pages.
Sandrou et al., "Low-fat/calorie foods: current state and perspectives", Crit Rev Food Sci Nutr. 2000, 40(5):427-447.
Sarikurkcu et al., "Screening of Possible in Vitro Neuroprotective, Skin Care, Antihyperglycemic, and Antioxidative Effects of Anchusa undulata L. subsp. hybrida (Ten.) Coutinho from Turkey and Its Fatty Acid Profile", International J Food Proper. 2015, 18(7):1491-1504.
Sarikurkcu et al., Publication date, 2019, email dated Jun. 18, 2019 in 19 pages.
Schmeda-Hirschmann et al., Anti-inflammatory activity of animal oils from the Peruvian Amazon. J Ethnopharmacol. 2014, 156:9-15.
Seki et al., "Eicosapentaenoic Acid (EPA) Attenuates the Anemia Due to Ribavirin/Interferon a Treatment in Patients with Chronic Hapatitis C", 2004, 3199 in 4 pages.
Shaw C., "Possible Modulation by Glutathione of Glutamatergic", in Glutathione in the Nervous System, CRC Press, 1998. Chapter 7, pp. 140-142.
Sindhu et al., "Obesity is a Positive Modulator of IL-6R and IL-6 Expression in the Subcutaneous Adipose Tissue: Significance for Metabolic Inflammation". PLoS ONE. 2015, 10(7):e0133494 in 17 pages.
Slifka Ka. , Comparative diet analysis of fish species commonly consumed by managed and free-ranging bottlenose dolphins (Tursiops truncatus). Int J Vet Med. (2013) 10:1.
Sobolesky et al., "Feeding a Modified Fish Diet to Bottlenose Dolphins Leads to an Increase in Serum Adiponectin and Sphingolipids", Front Endocrinol. 2016, 7:33 in 11 pages.
Sorrentino et al., "Liver iron excess in patients with hepatocellular carcinoma developed on non-alcoholic steato-hepatitis". J Hepatol. 2009, 50(2):351-357.
Spyridaki et al., (2016) Obesity, inflammation and cognition. Curr Opin Behav Sci. 2016, 9: 169-175.
Stephenson et al., "Building a Roadmap for Developing Combination Therapies for Alzheimer's Disease", Expert Rev Neurother. 2015, 15(3):327-333.
Suresh et al., "Protective action of arachidonic acid against alloxan-induced cytotoxicity and diabetes mellitus". Prostaglandins Leukot Essent Fatty Acids, 2001, 64(1):37-52.
Swaminathan et al., "The role of iron in diabetes and its complications", Diabetes Care. 2007, 30(7):1926-1933.
Targher et al., "Elevated levels of interleukin-6 in young adults with type 1 diabetes without clinical evidence of microvascular and macrovascular complications". Diabetes Care (2001) 24(5):956-957.
Targher et al., "Risk of Cardiovascular Disease in Patients with Nonalcoholic Fatty Liver Disease", N Engl J Med., 2010, 363:1341-1350.

Trushina et al., Identification of altered metabolic pathways in plasma and CSF in mild cognitive impairment and Alzheimer's disease using metabolomics. PLoS ONE 2013. 8(5): e63644 in 13 pages.
Trushina et al., Recent advances in the application of metabolomics to Alzheimer's disease. Bioch Biophy Acta. 2014.1842(8): 1232-1239.
Tucsek et al., "Obesity in Aging Exacerbates Blood-Brain Barrier Disruption, Neuroinflammation, and Oxidative Stress in the Mouse Hippocampus: Effects on Expression of Genes Involved in Beta-Amyloid Generation and Alzheimer's Disease", J Gerontol A Biol Sci Med Sci. 2014, 69(10):1212-1226; publ. online Nov. 11, 2013.
Unnikrishnan et al., "Antiinflammatory activity of methionine, methionine sulfoxide and methionine sulfone". Agents Actions. 1990, 31(1-2):110-112.
Valenti et al., "Iron depletion by phlebotomy improves insulin resistance in patients with nonalcoholic fatty liver disease and hyperferritinemia: evidence from a case-control study". Am J Gastroenterol. 2007, 102(6):1251-1258.
Valenti et al., "[769] Iron Depletion by phlebotomy improves insulin resistance in patients with nonalcoholic fatty liver disease and hyperferritinemia: evidence from a case-control study", J Hepatol. (Apr. 2007) 46:S288-S289.
Valenti et al., "A randomized trial of iron depletion in patients with nonalcoholic fatty liver disease and hyperferritinemia". World J Gastroenterol. 2014, 20(11):3002-3010.
Van Eldik et al., The roles of inflammation and immune mechanisms in Alzheimer's disease. Alzheimers Dement (N.Y.), 2016, 2(2):99-109.
Venn-Watson et al., "Big brains and blood glucose: common ground for diabetes mellitus in humans and healthy dolphins", Comp Med., 2007, 57(4):390-395.
Venn-Watson et al., "Assessment of increased serum aminotransferases in a managed Atlantic bottlenose dolphin (Tursiops truncatus) population", J Wildlf Dis. 2008, 44(2):318-330.
Venn-Watson et al., "Dolphins as animal models for type 2 diabetes: sustained, post-prandial hyperglycemia and hyperinsulinemia", Gen Comp Endocrinol. 2011, 170(1):193-199.
Venn-Watson et al., Physiology of aging among healthy, older bottlenose dolphins (Tursiops truncatus): comparisons with aging humans. J Comp Phys B. 2011, 181(15):667-680.
Venn-Watson et al., "Hemochromatosis and fatty liver disease: building evidence for insulin resistance in bottlenose dolphins (Tursiops truncatus)." J Zoo Wildl Med. 2012, 43(3 Suppl):S35-S47.
Venn-Watson et al., "Blood-Based Indicators of Insulin Resistance and Metabolic Syndrome in Bottlenose Dolphins (Tursiops truncatus)", Front Endocrinol (Lausanne) 2013, 4:136 in 8 pages.
Venn-Watson et al., Associations of ceruloplasmin and haptoglobin with inflammation and glucose in bottlenose dolphins (Tursiops truncatus) J Comp Clin Path. 2014, 23(4):1031-1036.
Venn-Watson S., "Dolphins and Diabetes: Applying One Health for breakthrough discoveries". Front Endocrinol (Lausanne); 2014, 5:227 in 2 pages.
Venn-Watson et al., "Investigation of Fish-Based Nutrients to Protect Against Metabolic Syndrome in Bottlenose Dolphins (Tursiops Truncatus)", presentation at International Association for Aquatic Animal Medicine (IAAAM), Gold Coast, Australia, May 2014.
Venn-Watson et al., "Adrenal Gland and Lung Lesions in Gulf of Mexico Common Bottlenose Dolphins (Tursiops truncatus) Found Dead following the Deepwater Horizon Oil Spill". PLoS ONE 2015 10(5):e0126538 in 23 pages.
Venn-Watson et al., "Evaluation of annual survival and mortality rates and longevity of bottlenose dolphins (Tursiops truncatus) at the United States Navy Marine Mammal Program from 2004 through 2013", J Am Vet Med. 2015, 246(8):893-898.
Venn-Watson et al., "Increased Dietary Intake of Saturated Fatty Acid Heptadecanoic Acid (C17:0) Associated with Decreasing Ferritin and Alleviated Metabolic Syndrome in Dolphins", PLoS ONE, 2016, 10(7):e0132117 in 17 pages.
Wang et al., "Obesity modifies the relations between serum markers of dairy fats and inflammation and oxidative stress among adolescents." Obesity (Silver Spring), 2011, 19(12):2404-2410.

(56) References Cited

OTHER PUBLICATIONS

Warensjö et al., "Biomarkers of milk fat and the risk of myocardial infarction in men and women: a prospective, matched case-control study." Am J Clin Nutr. (2010) 92(1):194-202.

Weiss et al., "Anemia of chronic disease." New Engl J Med. 2005, 352:1011-1023.

Wells et al., "Bottlenose dolphins as marine ecosystem sentinels: developing a health monitoring system", EcoHealth 2004, 1:246-254.

Wells et al., "Evaluation of Potential Protective Factors Against Metabolic Syndrome in Bottlenose Dolphins: Feeding and Activity Patterns of Dolphins in Sarasota Bay, Florida", Front Endocrinol (Lausanne), 2013, 4:139 in 16 pages.

Wlazlo et al., Iron metabolism is associated with adipocyte insulin resistance and plasma adiponectin. Diabetes Care, 2012, 36(2):309-315.

Wu et al., "Alterations of the Neuroinflammatory Markers IL-6 and TRAIL in Alzheimer's Disease", Dement Geriatr Cogn Dis Extra. 2015, 5(3):424-434.

Xu et al., "Molecular Recognition of Fatty Acids by Peroxisome Proliferator—Activated Receptors", Mol Cell. 1999, 3:397-403.

Yamano et al., "A long-term high-fat diet changes iron distribution in the body, increasing iron accumulation specifically in the mouse spleen.". J Nutr Sci Vitaminol. (Tokyo) 2015, 61(1):20-27.

Yin et al., "Concurrent Epstein-Barr virus associated NK/T cell lymphoma after immunosuppressive therapy for aplastic anemia: report of a case and review of literature". Int'l J Clin Exper Pathol. (2015) 8(6):7588 in 6 pages.

Zandman-Goddard et al., "Hyperferritinemia in autoimmunity". IMAJ, 2008, 10: 83-84.

Zandman-Goddard et al., "Ferritin in autoimmune diseases". Autoimmunity Rev. 2007, 6:457-463.

Zhao et al., Body iron stores and heme-iron intake in relation to type 2 diabetes: a systematic review and meta-analysis. PLoS ONE 2012, 7:e41641.

Adachi et al., "Effect of the glyceride of pentadecanoic acid on energy metabolism in hair follicles". Int J Cosmetic Sci. Jun. 1993;15(3): 125-131.

Agius et al., "The metformin mechanism on gluconeogenesis and AMPK activation: the metabolite perspective". Int J Mol Sci. May 3, 2020;21(9): 3240 in 19 pages.

Aglago et al., Association between serum phospholipid fatty acid levels and adiposity in Mexican women. J Lipid Res. Jul. 1, 2017;58(7): 1462-1470.

Ali et al., "Recent advances and limitations of mTOR inhibitors in the treatment of cancer". Cancer Cell Int. Dec. 2022;22(1): 284 in 16 pages.

Ananthakrishnan et al., Inflammatory bowel disease in the elderly is associated with worse outcomes: a national study of hospitalizations. Inflamm Bowel Dis. Feb. 1, 2009;15(2): 182-189.

Anisimov et al., "Metformin slows down aging and extends life span of female SHR mice". Cell Cycle Sep. 1, 2008;7(17): 2769-2773.

Bartzokis et al., Brain ferritin iron may influence age- and gender-related risks of neurodegeneration. Neurobiol Aging. Mar. 1, 2007;28(3): 414-423.

Barzilai et al, "Metformin as a tool to target aging". Cell Metab. Jun. 14, 2016;23(6): 1060-1065.

Baum et al., Drug utilization in the U.S.—1985: Seventh annual review. Rockville, MD: Food and Drug Administration, Center for Drugs and Biologies. Dec. 1986.; TOC in 4 pages.

Beanes et al., Down-regulation of decorin, a transforming growth factor-beta modulator, is associated with scarless fetal wound healing. J Pediatr Surg. Nov. 1, 2001;36(11): 1666-1671.

Berg E.L. Phenotypic chemical biology for predicting safety and efficacy. Drug Disc Today Technol. Mar. 1, 2017;23: 53-60.

Bettcher et al., Increases in pro-inflammatory chemokine, MCP-1, are related to decreases in memory over time. Frontiers in aging neuroscience. Feb. 13, 2019; 11:25.

Bialek et al., "Fatty acid composition and oxidative characteristics of novel edible oils in Poland". CyTA-Journal of Food. Jan. 2, 2017;15(1): 1-8; (published online Jul. 13, 2016).

Bielec et al., Homologies between human and dolphin chromosomes detected by heterologous chromosome painting. Cytogen Genome Res. 1998;81(1): 18-25.

Biong et al., Intake of milk fat, reflected in adipose tissue fatty acids and risk of myocardial infarction: a case-control study. Eur J Clin Nutr. Feb. 2006;60(2):236-244.

Bishop et al., Heptadecanoic acid is not a key mediator in the prevention of diet-induced hepatic steatosis and insulin resistance in mice. Nutrients Apr. 24, 2023;15(9):2052 in 14 pages.

Blagosklonny M.V., Aging and immortality: Quasi-programmed senescence and its pharmacologic inhibition. Cell cycle. Sep. 15, 2006;5(18): 2087-2102.

Blagosklonny M.V., Rapamycin for longevity: opinion article. Aging Oct. 15, 2019;11(19): 8048-8067.

Blagosklonny M.V., "Cell senescence, rapamycin and hyperfunction theory of aging". Cell Cycle Jul. 18, 2022;21(14): 1456-1467.

Bridle et al., "Rapamycin inhibits hepatic fibrosis in rats by attenuating multiple profibrogenic pathways". Transplantation Oct. 2009;15(10): 1315-1324.

Browner et al., "The genetics of human longevity". Am J Med. Dec. 1, 2004;117(11): 851-860.

Brydges et al., Metabolomic and inflammatory signatures of symptom dimensions in major depression. Brain, Behavior, and Immunity. May 1, 2022;102:42-52 (available Aug. 5, 2021).

Budczies et al., "Remodeling of central metabolism in invasive breast cancer compared to normal breast tissue—a GC-TOFMS based metabolomics study". BMC Genomics Dec. 2012;13(1): 334 in 11 pages.

CAS Database Accession No. 1989:205056; "Relationship between structure and anticonvulsant activities of 2-substituted 3-pyrazolidinones". DU et al., Jun. 10, 1989; 2 pages.

Chaib et al., "Cellular senescence and senolytics: the path to the clinic". Nat Med. Aug. 2022;28(8):1556-1568.

Chaudhari et al., Increased mitochondrial fusion allows the survival of older animals in diverse C. elegans longevity pathways. Nat Commun. Aug. 3, 2017;8(1): 182 in 16 pages.

Chebib et al., "Guanidino acids act as ρ1 GABAC receptor antagonists". Neurochem Res. Apr. 23, 2009; 34(10): 1704-1711.

Cheng et al., "Metformin's mechanisms in attenuating hallmarks of aging and age-related disease". Aging Dis. Jul. 7, 2022;13(4):970-986.

Coccia et al., IL-1 β mediates chronic intestinal inflammation by promoting the accumulation of IL-17A secreting innate lymphoid cells and CD4+ Th17 cells. J Exp Med. Aug. 27, 2012;209(9): 1595-1609.

Cordaro et al., "2-Pentadecyl-2-Oxazoline reduces neuroinflammatory environment in the MPTP Model of Parkinson Disease". Mol Neurobiol. Dec. 2018;55(12):9251-9266.

Crimmins E.M., "Lifespan and healthspan: past, present, and promise". The Gerontologist Dec. 1, 2015;55(6): 901-911.

Crossno et al., "Rosiglitazone Attenuates Hypoxia-induced Pulmonary Arterial Remodeling". Am J Physiol Lung Cell Mol Physiol. Apr. 2007;292(4): L885-L897.

De Martinis et al., Allergy and aging: an old/new emerging health issue. Aging and Dis. Apr. 2017;8(2):162-175.

De Mello et al., "Serum levels of plasmalogens and fatty acid metabolites associate with retinal microangiopathy in participants from the Finnish Diabetes Prevention Study". Nutrients Dec. 14, 2021;13(12): 4452 in.

Deng et al., Cross-talk between mitochondrial fusion and the hippo pathway in controlling cell proliferation during drosophila development. Genetics Aug. 1, 2016; 203(4): 1777-1788.

DeVito et al., "Extending human lifespan and longevity: a symposium report". Ann N Y Acad Sci. Jan. 2022;1507(1): 70-83 [publ. online Sep. 8, 2021}.

Djousse et al., Serum individual nonesterified fatty acids and risk of heart failure in older adults. Cardiology Feb. 25, 2021;146(3): 351-358.

(56) References Cited

OTHER PUBLICATIONS

Dornan et al., Odd chain fatty acids and odd chain phenolic lipids (alkylresorcinols) are essential for diet. J Am Chem Soc. Aug. 2021;98(8): 813-824.

Dugan et al., Inflammaging as a target for healthy ageing. Age and Ageing. Feb. 1, 2023;52(2): afac328 in 15 Pages.

Ediriweera et al., "Odd-chain fatty acids as novel histone deacetylase 6 HDAC6) inhibitors". Biochimie Jul. 11, 2021;186: 147-156.

Ehninger et al., "Longevity, aging and rapamycin". Cell Mol Life Sci. Nov. 2014;71(22): 4325-4346.

Farage et al., Characteristics of the aging skin. Adv Wound Care. Feb. 1, 2013;2(1): 5-10.

Fonteh et al., Human cerebrospinal fluid fatty acid levels differ between supernatant fluid brain-derived nanoparticle fractions, and are altered in Alzheimer's disease. PloS One. Jun. 23, 2014;9(6):e100519 in 14 pages.

Franceschi et al., Chronic Inflammation (Inflammaging) and Its Potential Contribution to Age-Associated Diseases. J Gerontol. Jun. 2014;69(suppl 1): S4-S9.

Fu et al., Oleylethanolamide regulates feeding and body weight through activation of the nuclear receptor PPAR-α. Nature. Sep. 4, 2003;425(6953): 90-93.

Fu et al., Pentadecanoic acid promotes basal and insulin-stimulated glucose uptake in C2C12 myotubes. Food Nutr Res. 2021;65: 4527 in 9 pages.

Galdiero et al., Pentadecanoic acid against Candida albicans-Klebsiella pneumoniae biofilm: Towards the development of an anti-biofilm coating to prevent polymicrobial infections. Res Microbiology. Nov. 1, 2021;172(7-8): 103880 in 11 pages.

Gao et al., "In vitro evaluation of dual agonists for PPARγ/β from the flower of Edgeworthia gardneri (wall.) Meisn". J Ethnopharma.. Mar. 13, 2015;162: 14-19.

Garay R.P., "Investigational drugs and nutrients for human longevity. Recent clinical trials registered in ClinicalTrials.gov and clinicaltrialsregister.eu". Expert Opin Investig Drugs Jul. 3, 2021;30(7): 749-758.

Gibson et al., Cooperative care. The time has come. Jona: J Nurs Admin. Mar. 1, 1987;17(3): 19-21.

Giulani A., The application of principal component analysis to drug discovery and biomedical data. Drug Disc Today. Jul. 1, 2017;22(7): 1069-1076.

Goncalves et al., "Fenofibrate prevents skeletal muscle loss in mice with lung cancer". PNAS. Jan. 23, 2018;115(4): E743-E752.

Gonzalez-Freire et al., "The road ahead for health and lifespan interventions". Ageing Res Rev. May 1, 2020;59:101037 in 46 pages.

Gosmanova et al., "Effect of metformin containing antidiabetic regimens on all-cause mortality in veterans with type 2 diabetes mellitus". Am J Med Sci. Sep. 1, 2008;336(3): 241-247.

Greenberg et al., "Omega-3 fatty acid supplementation during pregnancy". Rev Obstet Gynecol. 2008;1(4): 162-169.

Gregg et al., Trends in lifetime risk and years of life lost due to diabetes in the USA, 1985-2011: A modelling study. Lancet Diab Endocrinol. Nov. 1, 2014;2(22): 867-874.

Groarke et al., "Aging and hematopoiesis". Clin Geriatr Med. Aug. 1, 2019;35(3): 285-293.

Gunn-Moore et al., Alzheimer's disease in humans and other animals: a consequence of postreproductive life span and longevity rather than aging. Alzheimer's & Dementia. Feb. 1, 2018;14(2):195-204.

Harrison et al., "Acarbose, 17-α-estradiol, and nordihydroguaiaretic acid extend mouse lifespan preferentially in males". Aging Cell Apr. 2014;13(2): 273-282.

Hayaishi O., Molecular mechanisms of sleep-wake regulation: roles of prostaglandins D2 and E2. Faseb J. Aug. 1991;5(11): 2575-2581.

Hirose et al., Age-associated increases in heme oxygenase-1 and ferritin immunoreactivity in the autopsied brain. Legal Med. Mar. 1, 2003;5: S360-366.

Hori et al., "Serum sphingomyelin species profile is altered in hematologic malignancies". Clin Chim Acta Mar. 1, 2021;514: 29-33.

Huang et al., "Circulating saturated fatty acids and incident type 2 diabetes: A systematic review and meta-analysis". Nutrients May 1, 2019;11(5): 998 in 20 pages.

Hulbert A.J. "On the importance of fatty acid composition of membranes for aging". J Theor Biol. May 21, 2005;234(2): 277-288.

Imamura et al., "Fatty acid biomarkers of dairy fat consumption and incidence of type 2 diabetes: A pooled analysis of prospective cohort studies". PLoS Med. Oct. 10, 2018;15(10): e1002670 in 18 pages.

Iwakura et al., The roles of IL-17A in inflammatory immune responses and host defense against pathogens. Immun Rev. Dec. 2008;226(1): 57-79.

Jee et al., "Clinical relevance of glycerophospholipid, sphingomyelin and glutathione metabolism in the pathogenesis of pharyngolaryngeal cancer in smokers: the Korean Cancer Prevention Study—II". Metabolomics Nov. 2016;12: 164 in 12 Pages.

Jiao et al., Circulating fatty acids associated with advanced liver fibrosis and hepatocellular carcinoma in South Texas Hispanics. Cancer Epide., Biomark & Prev. Sep. 1, 2021;30(9): 1643-1651.

Jimenez-Cepeda et al., Dietary intake of fatty acids and its relationship with FEV1/FVC in patients with chronic obstructive pulmonary disease. Clin Nutr. ESPEN. Feb. 1, 2019;29: 92-96.

Jing et al., Metformin improves obesity-associated inflammation by altering macrophages polarization. Mol Cell Endocrin. Feb. 5, 2018;461: 256-264.

Jubie et al., "Design, synthesis and antidepressant activities of some novel fatty acid analogues". Med Chem Res. Apr. 2015;24(4): 1605-1616.

Justice et al., "Frameworks for proof-of-concept clinical trials of interventions that target fundamental aging processes". J Gerontol A Biol Sci Med Sci. Nov. 1, 2016;71(11): 1415-1423.

Justice et al., "Development of clinical trials to extend healthy lifespan". Cardiovasc Endocrinol Metab. Dec. 2018;7(4): 80-83.

Kaestner et al., "The potential of erythrocytes as cellular aging models". Cell Death Differ. Sep. 2017;24(9): 1475-1477.

Kaikkonen et al., "Associations of serum fatty acid proportions with obesity, insulin resistance, blood pressure and fatty liver: the cardiovascular risk in young Finns study". J Nutr Apr. 2021;151(4): 970-978.

Kaur et al., "Essential fatty acids as functional components of foods—a review". J Food Sci Technol. Oct. 2014;51: 2289-2303.

Khaw et al., Plasma phospholipid fatty acid concentration and incident coronary heart disease in men and women: the EPIC-Norfolk prospective study. PLoS Med. Jul. 3, 2012;9(7): e1001255 in 12 pages.

Khwaja et al., "Efficacy and Cardiovascular Safety of Alpha Glucosidase Inhibitors". Drug Safety Jul. 1, 2021;16(2): 122-128.

Kirkham T.C., Endocannabinoids in the regulation of appetite and body weight. Behav Pharmacol. Sep. 1, 2005;16(5-6): 297-313.

Kobayashi et al., New directions in cancer and aging: State of the science and recommendations to improve the quality of evidence on the intersection of aging with cancer control. Cancer. May 1, 2022;128(9): 1730-1737.

Kohnken et al., "Overview of the use of murine models in leukemia and lymphoma research", Front Oncol. Feb. 20, 2017;7:22 in 11 pages.

Kritchevsky et al., "Testing the geroscience hypothesis: early days". J Gerontol A Biol Sci Med Sci. Jan. 1, 2020;75(1): 99-101 [publ. online Dec. 13, 2019].

Kruchinina et al., "Erythrocyte membrane fatty acids as the potential biomarkers for detection of early-stage and progression of colorectal cancer". Ann Oncol. Jun. 1, 2018;29(Suppl 5): v52.

Kurotani et al., "Even- and odd-chain saturated fatty acids in serum phospholipids are differentially associated with adipokines". PLoS One May 26, 2017;12(5): e0178192 in 14 pages.

Lankinen et al., "Plasma fatty acids as predictors of glycaemia and type 2 diabetes". Diabetologia Nov. 2015;58: 2533-2544.

Larsen et al., "Sulfur-substituted and a-methylated fatty acids as peroxisome proliferator-activated receptor activators". Lipids. Jan. 2005;40(1): 49-57.

(56) References Cited

OTHER PUBLICATIONS

Lee et al., A current review of molecular mechanisms regarding osteoarthritis and pain. Gene Sep. 25, 2013;527(2): 440-447.

Li et al., Design, synthesis and antitumor activity study of a gemcitabine prodrug conjugated with a HDAC6 inhibitor. Bioorg Med Chem Lttrs. Sep. 15, 2022;72: 128881 in 6 pages.

Li et al., "Extraction, purification, and elucidation of six ginkgo homologs from Ginkgo biloba sarcotesta and evaluation of their anticancer activities". Molecules Nov. 11, 2022;27(22): 7777 in 15 pages.

Liang et al., "Biomarkers of dairy fat intake and risk of cardiovascular disease: a systematic review and meta analysis of prospective studies". Crit Rev Food Sci Nutr. May 3, 2018;58(7): 1122-1130.

Liechty K.W., Diminished interleukin-8 (IL-8) production in the fetal wound healing response. J Surg Res. Jun. 1, 1998;77(1): 80-84.

Lim et al., The global impact of hepatic fibrosis and end-stage liver disease. Clinics in Liver Dis. Nov. 1, 2008;12(4): 733-746.

Lin et al., Effects of the mTOR inhibitor Rapamycin on monocyte-secreted chemokines. BMC Immunol. Dec. 2014;15(1): 1-9.

Lin et al., Efficacy and safety of topical mechanistic target of rapamycin inhibitors for facial angiofibromas in patients with tuberous sclerosis complex: a systematic review and network meta-analysis. Biomedicines Mar. 31, 2022;10(4): 826 in 13 pages.

Lipschitz et al., The anemia of senescence. Am J Hematol. Aug. 1981;11(1): 47-54.

Longo et al., "Interventions to slow aging in humans: are we ready?" Aging Cell Aug. 2015;14(4): 497-510.

López-Ótin et al., "The Hallmarks of Aging", Cell Jun. 6, 2013;153(6):1194-1217.

Lyu et al., Association between anemia and 3-year all-cause mortality among oldest old people in longevity areas in China. Zhonghua Liuxingbingxue Zazhi. Jul. 1, 2015;36(7): 682-686.

Maeda T., Current topics on basic research for methamphetamine dependence and psychosis. J Wakayama Med. Soc., 2010, vol. 61, pp. 36-41.

Manca et al., Circulating fatty acids and endocannabinoide-related mediator profiles associated to human longevity. GeroScience. Aug. 2021;43(4): 1783-1798.

Martin-Montalvo et al., "Metformin improves healthspan and lifespan in mice". Nat Commun. Jul. 30, 2013;4(1): 2192 in 23 pages.

Matthan et al., Spillover effects of a family-based childhood weight-management intervention on parent nutrient biomarkers and cardiometabolic risk factors. Curr Dev Nutrition Feb. 2022;6(2): 152 in 41 pages.

McArtor et al., Extending multivariate distance matrix regression with an effect size measure and the asymptotic null distribution of the test statistic. Psychometrika. Dec. 2017;82: 1052-1077.

Meglasson et al., Antihyperglycemic action of guanidinoalkanoic acids: 3-Guanidinopropionic Acid Ameliorates Hyperglycemia in Diabetic KKA/\y and C57BL6J ob/ob Mice and Increases Glucose Disappearance in Rhesus Monkeys. J Pharm Exp Thera. Sep. 1, 1993;266(3): 1454-1462.

Mihalik et al., "Increased levels of plasma acylcarnitines in obesity and type 2 diabetes and identification of a marker of glucolipotoxicity". Obesity Sep. 2010;18(9): 1695-1700.

Millner et al., "Lipid players of cellular senescence". Metabolites Aug. 21, 2020;10(9): 399 in 17 pages.

Monjan et al., Incidence of chronic insomnia associated with medical and psychosocial factors: an epidemiologic study among older persons. Sleep Res. Jun. 1996;25: 108.

Moskalev et al., "Targeting aging mechanisms: pharmacological perspectives". Trends Endocrinol Metab. Apr. 1, 2022;33:266-280.

Murphy et al., The origin of human chromosome 1 and its homologs in placental mammals. Genome Res. Aug. 1, 2003;13(8): 1880-1888.

Nadon et al., "NIA interventions testing program: investigating putative aging intervention agents in a genetically heterogeneous mouse model". EBioMedicine Jul. 1, 2017;21: 3-4.

Niedernhofer et al., Molecular pathology endpoints useful for aging studies. Age Res Rev. May 1, 2017;35: 241-249.

Novelle et al., Metformin: A hopeful promise in aging research. CSH Persp Med. Mar. 1, 2016;6(3): a025932 in 13 pages.

Pamplona et al., Increased oxidation, glycoxidation, and lipoxidation of brain proteins in prion disease. Free Radical Biol Med. Oct. 15, 2008;45(8): 1159-1166.

Paolisso et al., Low insulin resistance and preserved B-cell function contribute to human longevity but are not associated with TH-INS genes. Exp Gerontol. Dec. 1, 2001; 37(1):147-156.

Patel et al., Prevalence and impact of pain among older adults in the United States: Findings from the 2011 National Health and Aging Trends Study. Pain Dec. 1, 2013;154(12): 2649-2657.

Perreault et al., PPARδ agonism for the treatment of obesity and associated disorders: Challenges and opportunities. PPAR Res. 2008;2008: Article ID125387; in 9 pages.

Perrone et al., Selective COX01 inhibition: A therapeutic target to be reconsidered. Curr Med Chem. Nov. 1, 2010;17(32): 3769-3805.

Qi et al., "High-resolution metabolomic biomarkers for lung cancer diagnosis and prognosis". Sci Rep. Jun. 3, 2021;11(1): 11805 in 10 pages.

Quintanilla et al., "Role of PPARγ in the Differentiation and Function of Neurons", Hindawi Publ. Corp. 2014; Article ID 768594 in 10 pages.

Ricciardelli et al., Pentadecanal and pentadecanoic acid coatings reduce biofilm formation of Staphylococcus epidermidis on PDMS. Patho Dis. Apr. 2020;78(3): ftaa012 in 8 pages.

Roh et al., A clinical study of pentadecanoic glyceride (LHOP) on male pattern alopecia. J Korean Soc Clin Pharma Thera. Dec. 1, 1998;6(2): 199-206.

Salive et al., "Anemia and hemoglobin levels in older persons: relationship with age, gender, and health status". J Am Geriat Soc. May 1992:40(5): 489-496.

Salvatore et al., "Metformin: an old drug against old age and associated morbidities". Diab Res Clin Prac. Feb. 1, 2020;160: 108025 in 11 pages.

Santaren et al., "Serum pentadecanoic acid (15:0), a short-term marker of dairy food intake, is inversely associated with incident type 2 diabetes and its underlying disorders". Am J Clin Nutr. Dec. 1, 2014;100(6): 1532-1540.

Sawh et al., Dairy fat iintake, plasma pentadecanoic acid, and plasma iso-heptadecanoic acid are inversely associated with liver fat in children. J Ped Gastroent Nutr. Apr. 4, 2021;72(4): e90 in 18 pages.

Schork et al., "Does modulation of an epigenetic clock define a geroprotector?" Adv Geriatr Med Res. Mar. 29, 2022;4(1): e220002 in 11 pages.

Sgnoc et al., Age-related aspects of cutaneous wound healing: a mini review. Gerontol. 2013;59(2): 159-164.

Shamburek et al., Disorders of the digestive system in the elderly. New Engl J Med. Feb. 15, 1990;322(7): 438-443.

Singh et al., MCP-1: Function, regulation and involvement in disease. Int Immunopharm. Dec. 1, 2021;101: 107598 in 9 pages.

Smedman et al., "Pentadecanoic acid in serum as a marker of intake of milk fat: relations between intake of milk fat and metabolic risk factors". Am J Clin Nutr. Jan. 1, 1999;69(1): 22-29.

Smith et al., "Changes in the gut microbiome and fermentation products concurrent with enhanced longevity in acarbose-treated mice". BMC Microbiol. Dec. 2019;19(1): 1-6.

Soboleva et al., "Fatty acids of the lipid fraction of erythrocyte membranes and intensity of lipid peroxidation in iron deficiency". Bull Exp Biol Med. Jun. 1994;117: 600-603.

Song et al., Hippocampal PPARα is a novel therapeutic target for depression and mediates the antidepressant actions of fluoxetine in mice, Br J Pharmacol. Jul. 2018;175(14): 2968-2987.

Sorrenti et al., "Immunomodulatory and antiaging mechanisms of resveratrol, rapamycin, and metformin: focus on mTOR and AMPK signaling networks". Pharmaceuticals Jul. 23, 2022;15(8): 912 in 20 pages.

Soukas et al., "Metformin as anti-aging therapy: is it for everyone?" Trends Endocrinol Metab. Oct. 1, 2019;30(10): 745-755.

Stenmark et al., "Animal models of pulmonary arterial hypertension: the hope for etiological discovery and pharmacological cure". Am J Physiol Lung Cell Mol Physiol. Dec. 2009;297(6): L1013-L1032.

(56) References Cited

OTHER PUBLICATIONS

To et al., "Pentadecanoic acid, an odd-chain fatty acid, suppresses the stemness of MCF-7/SC humanbreast cancer stem-like cells through JAK2/STAT3 signaling". Nutrients Jun. 3, 2020;12(6): 1663 in 20 pages.

To et al., "Effects of combined pentadecanoic acid and tamoxifen treatment on tamoxifen resistance in MCF-7/SC breast cancer cell". Int J Mol Sci. Sep. 26, 2022;23(19): 11340 in 20 pages.

Tsoukalas et al., Application of metabolomics Part II: Focus on fatty acids and their metabolites in healthy adults. Int J Mol Med. Jan. 1, 2019;43(1): 233-242.

Vaarhorst et al., Lipid metabolism in long-lived families: the Leiden Longevity Study. Age. Jun. 2011;33(2): 219-227.

Venn-Watson et al., "Modified fish diet shifted serum metabolome and alleviated chronic anemia in bottlenose dolphins (Tursiops truncatus): Potential role of odd-chain saturated fatty acids". PLoS One Apr. 7, 2020;15(4): e0230769 (2020).

Venn-Watson et al., Efficacy of dietary odd-chain saturated fatty acid pentadecanoic acid parallelsbroad associated health benefits in humans: could it be essential?. Scientific Rep. May 18, 2020;10(1): 1-4.

Venn-Watson et al., A 25-y longitudinal dolphin cohort supports that long-lived individuals in same environment exhibit variation in aging rates. PNAS Aug. 25, 2020;117(34): 20950-20958.

Venn-Watson et al., "Broader and safer clinically-relevant activities of pentadecanoic acid compared to omega-3: evaluation of an emerging essential fatty acid across twelve primary human cell-based disease systems". PLoS ONE May 26, 2022;17(5): e0268778 in 17 pages.

Venn-Watson et al., Pentadecanoylcarnitine is a newly discovered endocannabinoid with pleiotropic activities relevant to supporting physical and mental health. Sci Rep. Aug. 23, 2022;12(1): 13717 in 11 pages.

Vézina et al., "Rapamycin (AY-22, 989), a new antifungal antibiotic"—Part I. J Antibio. 1975;28(10): 721-726.

Vitiello M.V., Sleep disorders and aging: understanding the causes. J Gerontol. Jul. 1, 1997;52(4): M189-M191.

Wagner et al., Combined treatment with exercise training and acarbose improves metabolic control and cardiovascular risk factor profile in subjects with mild type 2 diabetes. Diabetes Care Jul. 1, 2006;29(7): 1471-1477.

Wang et al., Peroxisome-proliferator-activated receptor δ activates fat metabolism to prevent obesity. Cell. Apr. 18, 2003;113(2): 159-170.

Warensjö et al., "Estimated intake of milk fat is negatively associated with cardiovascular risk factors and does not increase the risk of a first myocardial infarction. A prospective case-control study". Br J Nutr. Apr. 2004;91(4): 635-642.

Webster et al., "Target of rapamycin inhibitors (sirolimus and everolimus) for primary immunosuppression of kidney transplant recipients: a systemic review and meta-analysis of randomized trials". Transplantation May 15, 2006;81(9): 1234-1248.

Wolf et al., "The MalR type regulator AcrC is a transcriptional repressor of acarbose biosynthetic genes in Actinoplanes sp. SE50/110". BMC Genomics Dec. 2017;18(1): 1-4.

Wu et al., "Extension of life span by acarbose: is it mediated by the gut microbiota"? Aging Dis. Jul. 7, 2022;13(4): 1005-1014.

Xu et al., "Rapamycin for lymphangioleiomyomatosis: optimal timing and optimal dosage". Thorax Apr. 1, 2018;73(4): 308-310.

Xu et al., Cross-sectional associations of adipokines and abdominal fat distribution with aging in men. The Aging Male. Dec. 4, 2020;23(5): 1576-1582.

Vasto et al., Inflammatory networks in ageing, age-related diseases, and longevity. Mech Ageing and Dev. Jan. 1, 2007;128(1): 83-91.

Ye et al., A pharmacological network for lifespan extension in Caenorhabditis elegans. Aging cell. Apr. 2014;13(2): 206-215.

Yoo et al., "An overview of rapamycin: from discovery to future perspectives". J Indus Microbiol Biotech. May 1, 2017;44(4-5): 537-553.

Yoo et al., Fatty acids in non-alcoholic steatohepatitis: : Focus on pentadecanoic acid. PloS One. Dec. 15, 2017;12(12): e0189965 in 15 pages.

Yousefzadeh et al., Circulating levels of monocyte chemoattractant protein-1 as a potential measure of biological age in mice and frailty in humans. Aging cell. Apr. 2018;17(2): e12706 in 7 pages.

Zapala et al., Multivariate regression analysis of distance matrices for testing associations between gene expression patterns and related variables. Proc Nat Acad Scie. Dec. 19, 2006;103(51): 19430-19435.

Zapala et al., Statistical properties of multivariate distance matrix regression for high-dimensional data analysis. Front Genetics. Sep. 27, 2012;3: 190 in 10 pages.

Zhai et al., Anemia status and its relevant factors among elderly people aged above 80 years old in longevity areas in China. Chinese J of Prev Med. Feb. 1, 2010;44(2):115-118.

Zheng et al., Association between plasma phospholipid saturated fatty acids and metabolic markers of lipid, hepatic, inflammation and glycaemic pathways in eight European countries: a cross-sectional analysis in the EPIC-Interact study. BMC Med. Dec. 2017;15(1): 203 in 13 pages.

Zheng et al., Changes in plasma phospholipid fatty acid profiles over 13 years and correlates of change: European Prospective Investigation into Cancer and Nutrition-Norfolk Study. Am J Clin Nutr. Jun. 1, 2019;109(6): 1527-1534.

Zhu et al., Synthesis and inhibitory activities against colon cancer cell growth and proteasome of alkylresorcinols. J Agric Food Chem. Sep. 5, 2012;60(35): 8624-8631.

Zhu et al., A prospective study and longitudinal study of plasma phospholipid saturated fatty acid profile in relation to cardiometabolic markers and the risk of gestational diabetes. Am J Clin Nutr. Jun. 1, 2018;107(6): 1017-1026.

Zhuang et al., Saturated fatty acid intake is associated with total mortality in a nationwide cohort study. J Nutr. Jan. 1, 2019;149(1): 68-77.

Extended European Search Report dated Sep. 26, 2022 for Application No. 20766436.8.

American Cancer Society [AMC], "Cancer Risk and Prevention", downloaded from https://www.cancer.org/cancer/risk-prevention.html, Dec. 13, 2023 2 pages.

Bianchi et al., "Not all cancers are created equal: Tissue specificity in cancer genes and pathways". Curr Opin Cell Biol. Apr. 1, 2020;63: 135-143.

Cleveland Clinic, "Anxiety Disorders—Types, Causes, Symptoms & Treatments", downloaded from https://my.clevelandclinic.org/health/diseases/9536-anxiety-disorders, 2020, in 18 pages.

Cusi et al., Metformin: A review of its metabolic effects. Diab Rev. Jan. 1, 1998;6(2): 89-131.

Szente et al., Fatty acid-cyclodexrin complexes: properties and applications, J Inclusion Phenomena & Molecular Recognition in Chemistry Dec. 1993;16: 339-354.

Staner L., "Sleep and anxiety disorders". Dialog Clin Neuroscience. Sep. 30, 2003;5(3): 249-258.

Aleshin et al. Peroxisome proliferator-activated receptor (PPAR)β/δ, a possible nexus of PPARα- and PPARγ-dependent molecular pathways in neurodegenerative diseases: review and novel hypotheses. Neurochem Int. (2013) 63:322-330.

Barish et al., "PPARδ: a dagger in the heart of the metabolic syndrome", J Clin Invest. (2006) 116(3): 590-597.

Bonomo et al., Iron overload potentiates diet-induced hypercholesterolemia and reduces liver PPAR-α expression in hamsters. J Biochem Mol Toxicol. (2012) 26(6): 224-229.

Chiba et al., Topical application of PPARα (but not β/δ or γ) suppresses atopic dermatitis in NC/Nga mice. Allergy (2012) 67: 936-942.

Choi et al., The nuclear receptor PPARs as important regulators of T-cell functions and autoimmune diseases. Mol Cell. (2012) 33(3): 217-222.

Hosokawa et al., Fucoxanthin induces apoptosis and enhances the antiproliferative effect of the PPARγ ligand, troglitazone, on colon cancer cells. BBA Gen Subj. (2004) 675: 113-119.

Janani et al., PPAR gamma gene—a review. Diab Metab Synd Clin Res Rev. (2015) 9: 46-50.

(56) References Cited

OTHER PUBLICATIONS

Lee et al., "PPARα and glucocorticoid receptor synergize to promote erythroid progenitor self-renewal", Nature (2005) 522: 474-477.
Leibovitz et al., PPAR activation: a new target for the treatment of hypertension. J Cardio Pharmacol. (2007) 50: 120-125.
Pubchem. CID 325395, Mar. 26, 2005; pp. 1-13; retrieved from the Internet <URL: https://pubchem.ncbl.nlm.nih.gov//compound/325395>.
Madrazo et al., The PPAR trio: Regulators of myocardial energy metabolism in health and disease. J Mol Cell Cariol. (2008) 44: 968-975.
Milam et al., PPAR-γ agonists inhibit profibrotic phenotypes in human lung fibroblasts and bleomycin-induced pulmonary fibrosis. Am J Physiol Lung Cell Mol Physiol. (2008) 94: L891-L901.
Sertznig et al., Peroxisome proliferator-activated receptors (PPARs) and the human skin. Am J Clin Dermatol. (2008) 9: 15-31.
Sokolowska et al., Peroxisome proliferator-activated receptor gamma (PPAR-gamma) and their role in immunoregulation and inflammation control. Postepy Higieny (2005) 59: 472-484; Abstract in 2 pages.
Trifilieff et al., PPAR-α and -γ but not -δ agonists inhibit airway inflammation in a murine model of asthma: in vitro evidence for an NF-Kβ-independent effect. Br J Pharmacol. (2003) 139: 163-171.
Wei et al., Peroxisome proliferator-activated receptor γ: innate protection from excessive fibrinogenesis and potential therapeutic target in systemic sclerosis. Curr Opin Rheumatol. (2010) 22(6): 671-676.

International Search Report and Written Opinion dated Jun. 15, 2020 for PCT/US2020/020697.
Ardura-Fabregat et al., "Targeting Neuroinflammation to Treat Alzheimer Disease". CNS Drugs. Dec. 2017;31: 1057-1082.
DiSabato et al., "Neuroinflammation: The devil is in the details". J Neurochem. Oct. 2016;139(suppl. 2): 136-153.
Ikwuobe O.J., The role of odd chain fatty acids on hepatocyte and monocyte function. Aston University Doctoral Thesis, Apr. 2018;273 pages.
Palacios et al., "Circulating Plasma Metabolites and Cognitive Function in a Puerto Rican Cohort". J Alzheimer's Dis. Jan. 1, 2020;76(4): 1267-1280.
Platten et al., "Treatment of Autoimmune Neuroinflammation with a Synthetic Tryptophan Metabolite". Science. Nov. 4, 2005;310(5749): 850-855.
Serhan C.N., "Treating Inflammation and Infection in the 21st Century: New Hints from Decoding Resolution Mediators and Mechanisms". The FASEB J. Apr. 2017;31(4): 1273 in 17 pages.
Venigalla et al., "Novel Promising Therapeutics Against Chronic Neuroinflammation and Neurodegeneration in Alzheimer's Disease". Neurochem International. May 1, 2016;95: 63-74.
Zhang et al., "Inflammatory Microenvironment in Gastric Premalignant Lesions: Implication and Application". Front Immunol. Nov. 15, 2023;14: 1297101 in 13 pages.
Ogita et al., "Possible Modulation by Glutathione of Glutamatergic Neurotransmission". In Glutathione in the Nervous System by Shaw C.A. [Ed.]; Feb. 27, 1998; Chapter 7, pp. 137-161.
European Office Action dated Feb. 27, 2025 for Application No. 20766436.8.

\* cited by examiner

FATTY ACID ANALOGS AND THEIR USE IN THE TREATMENT OF COGNITIVE IMPAIRMENT, BEHAVIORAL CONDITIONS, AND CHRONIC PAIN

This application is a continuation of PCT Application No. PCT/US2020/020697, filed Mar. 2, 2020, which claims benefit of U.S. Provisional Application No. 62/824,247, filed Mar. 26, 2019 and U.S. Provisional Application No. 62/813,566, filed Mar. 4, 2019. Each of the aforementioned applications is incorporated by reference herein in its entirety, and is hereby expressly made a part of this specification.

FIELD OF THE INVENTION

Compositions comprising fatty acid analogs are provided for treating conditions involving impaired cognition, movement disorders, chronic pain, depression, decreased appetite, addiction, seizure, and convulsion, and other conditions. Methods for the diagnosis and monitoring of impaired cognition, movement disorders, chronic pain, depression, decreased appetite, addiction, seizure, convulsion, and other conditions are also provided.

BACKGROUND OF THE INVENTION

Cognition is the mental action or process of acquiring knowledge and understanding through thought, experience, and the senses. Impaired cognition (also called cognitive decline) can be caused by damage to the brain from neurodegenerative conditions (for example, in Alzheimer's disease), damage to the brain from injuries, infections, substance abuse, substance withdrawal, psychiatric illness, deficiencies in vitamins and other key nutrients, problems with hormones, metabolic imbalances, or medication side-effects. Impaired cognition also occurs as the natural process of aging. Impaired cognition can be related to hallucinations, personality changes, depression symptoms, anxiety symptoms, getting lost, and confusion. Due in a large part to the rising number of older individuals globally, there is an urgent need for novel therapeutics to prevent, manage, and treat impaired cognition.

Movement disorders are neurologic conditions that cause problems with movements. Examples of movement disorders include dystonia, Chorea, Huntington's disease, Parkinson's disease, Parkinsonism, tics, Tourette syndrome, ataxia, tremors, essential tremors, myoclonus, multiple sclerosis, startle, restless leg syndrome, stiff person syndrome, gait disorders, and spasticity. Movement disorders can be caused by damage to the brain, spinal cord, or peripheral nerves, metabolic disorders, stroke and vascular diseases, toxins, infections, medicines, and genetics.

Chronic pain is defined as any pain lasting longer than 12 weeks and can persist for months or years. Causes of chronic pain include past injuries, back problems, migraines and other headaches, arthritis, nerve damage, infections, and fibromyalgia. Chronic pain can result in or be accompanied by limited movement, fatigue, sleep disturbance, decreased appetite, and mood changes. While lifestyle changes may help manage chronic pain, prescription therapeutics are often needed to help manage this condition. Some of the most effective prescription therapeutics for pain, such as opiates, are addictive and have resulted in epidemics of drug addictions and resultant deaths. As such, there is a need for novel pain management therapeutics that are effective without being addictive.

Depression is a mood disorder that impacts how an individual feels, thinks, and handles daily activities. Forms of depression include persistent depressive disorder (dysthymia), postpartum depression, psychotic depression, seasonal affective disorder, bipolar disorder, disruptive mood dysregulation disorder, and premenstrual dysphoric disorder. Causes of depression include genetic, biological, environmental, and psychological factors. Depression can occur along with and be exacerbated by chronic diseases, including diabetes, cancer, heart disease, and Parkinson's disease. Chronic pain can result in persistent sad or anxious moods, feelings of hopelessness, irritability, decreased energy, fatigue, difficulty concentrating, difficulty sleeping, appetite changes, weight changes, pains, headaches, and digestive problems. While depression can often be treated with lifestyle changes and medications, there is a need for novel therapeutics that may best target both depression and accompanying chronic diseases.

Loss of appetite is common with many chronic, life-threatening diseases, and lack of appropriate nutrition can further exacerbate chronic conditions. This cycle of chronic illness and lost appetite can result in a downward spiral of an individual's health and wellbeing. Anorexia is the lack or loss of appetite, resulting in the inability to eat, and can be common in advanced cancers. Anorexia results in weight loss. Cachexia is a state of general ill health and malnutrition, marked by weakness and emaciation from loss of fat, muscle and bone mass, and can occur with severe conditions, including advanced cancers, AIDS, and congestive heart failure. An estimated 80% of cancer patients have cachexia. Causes of anorexia/cachexia syndrome include changes with chronic, life-threatening diseases, including metabolic alterations, chronic inflammation, pain, dysgeusia, ageusia, hypersomnia, dysphagia, dyspnea, nausea, vomiting, constipation, diarrhea, medication side effects, psychological distress, advanced age, and infections of the mouth or esophagus. Current treatment for anorexia and cachexia include steroids, cannabinoids, and prokinetic agents. These treatments, however, do not help treat underlying chronic conditions that are the primary drivers of anorexia and cachexia.

A convulsion is a medical condition where body muscles contract and relax rapidly and repeatedly, resulting in an uncontrolled shaking of the body. Convulsions can be caused by seizure, medication reaction, severe infection, sepsis, very high fever, severe vomiting and/or diarrhea, diabetic crisis (extremely high or low blood sugar levels), hydration abnormalities (severe dehydration or over hydration), severe malnutrition, excessive blood loss due to trauma or internal bleeding, organ failure (e.g., acute renal failure), allergic reaction, drug overdose, drug withdrawal, or heat stroke. Because epileptic seizures typically include convulsions, the term "convulsion" is sometimes used as a synonym for "seizure". However, not all epileptic seizures lead to convulsions, and not all convulsions are caused by epileptic seizures. Non-epileptic seizures are paroxysmal events that mimic an epileptic seizure but do not involve abnormal, rhythmic discharges of cortical neurons. They are caused by either physiological or psychological conditions. Psychogenic non-epileptic seizures (PNES) are events resembling an epileptic seizure, but without the characteristic electrical discharges associated with epilepsy. They are of psychological origin, and are one type of non-epileptic seizure mimics. PNES are also known less specifically as non-epileptic attack disorder (NEAD) and functional neurological symptom disorder.

Opioids are controlled drug substances, including morphine, codeine, fentanyl, methadone, buprenorphine, that bind to opiate receptors in neuronal cell membranes and confer analgesic effects to control pain. Opiate addiction has become an epidemic, resulting in increasing opioid overdose deaths, including 49,000 deaths in the U.S. during 2017 and being the primary contributor to the leading cause of death of Americans under 50 years old. Opiate withdrawal symptoms are severe and include muscle aches, pain, agitation, anxiety, nausea, gastrointestinal upset, tachycardia, rhinorrhea and chills (Wesson D R, Ling W. The Clinical Opiate Withdrawal Scale (COWS) J Psychoactive Drugs. 2003; 35:253-259). The severity of these symptoms make it difficult for individuals to stop using opioids, and there is an urgent need for novel approaches to attenuate opioid withdrawal symptoms, as well as novel, non-addictive drugs to control pain.

SUMMARY OF THE INVENTION

Compositions and methods for treatment and prevention of impaired cognition, movement disorders, chronic pain, depression, decreased appetite, and addiction. Methods for the diagnosis and monitoring of impaired cognition, movement disorders, chronic pain, depression, decreased appetite, and addiction, and other conditions, e.g., convulsions or seizures, are also provided. These compositions comprise fatty acid compounds, and salts thereof, which may be administered alone or in combination with other medicaments or as part of various treatment regimens. The provided compositions are effective for modulating markers, including but not limited to behaviors, associated with impaired cognition, movement disorders, chronic pain, depression, decreased appetite, opiate addiction, and other related conditions. Methods are provided for administering the compositions.

Accordingly, in a generally applicable first aspect (i.e., independently combinable with any of the aspects or embodiments identified herein), a method of treatment or prophylaxis of impaired cognition, movement disorders, chronic pain, depression, decreased appetite, convulsions, seizures, and opiate addiction is provided, comprising administering to a patient in need thereof a compound of Formula (I), or a pharmaceutically acceptable salt thereof. In various embodiments, the compound of Formula (I) may be a compound of Formula (Ia), Formula (Ib), Formula (Ic), Formula (Id), Formula (Ie), Formula (If), Formula (Ig), or Formula (Ih).

Accordingly, in a generally applicable second aspect (i.e., independently combinable with any of the aspects or embodiments identified herein), a pharmaceutical composition comprising a compound, or pharmaceutically acceptable salt thereof is provided, wherein the compound is a saturated fatty acid substituted with one or more substituents selected from the group consisting of a 2-ethyl, 2,2-diethyl, 3-oxa, 2,2-dimethyl-3-oxa, 1-tetrazole, 1-oxazolone, 1-oxadiazolone, N-hydroxyamide, 2-methyl-1-tetrazole, and 2-methyl-2-ethyl; wherein the fatty acid is selected from tridecanoic acid (C13:0), myristic acid (C14:0), pentadecanoic acid (C15:0), palmitic acid (C16:0), heptadecanoic acid (C17:0) and stearic acid (C18:0), and a pharmaceutically acceptable carrier. Structures for compounds of the embodiments include, but are not limited to the following.

Stearic Acid Analogs

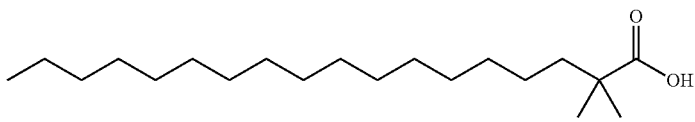

2,2-dimethyl-stearic acid

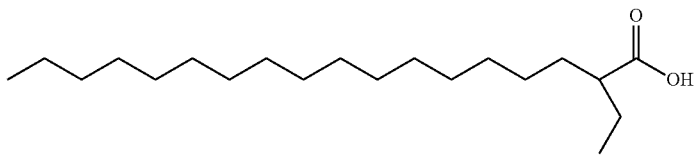

2-ethyloctadecanoic acid

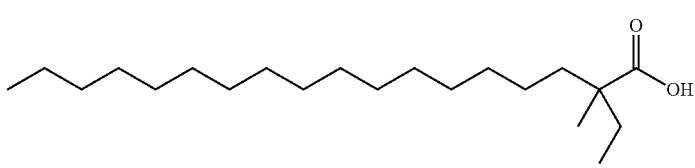

2-ethyl-2-methyloctadecanoic acid

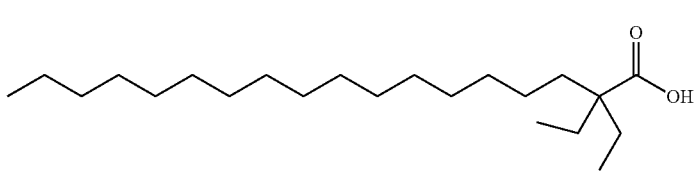

2,2-diethyloctadecanoic acid

-continued
| Stearic Acid Analogs |
|---|
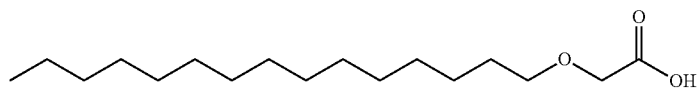
3-oxa-stearic acid
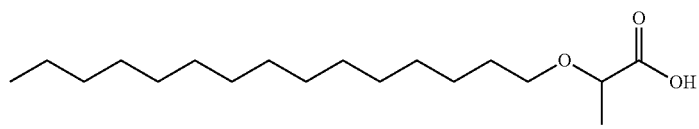
2-(pentadecyloxy)propanoic acid
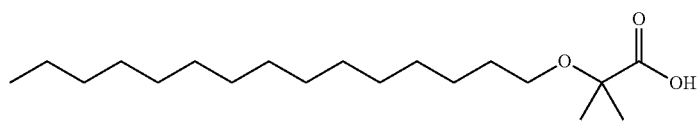
2,2-dimethyl-3-oxa-stearic acid
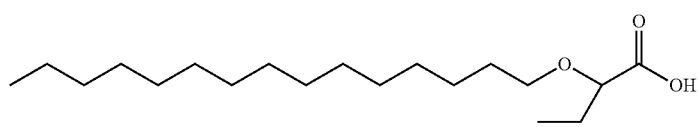
2-(pentadecyloxy)butanoic acid
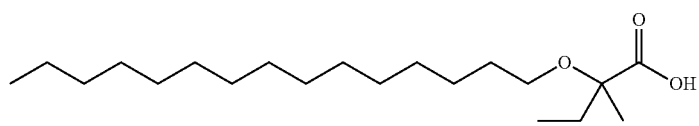
2-methyl-2-(pentadecyloxy)butanoic acid
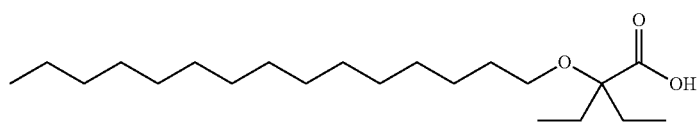
2-ethyl-2-(pentadecyloxy)butanoic acid
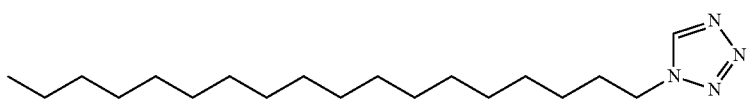
1-octadecyl-1H-tetrazole
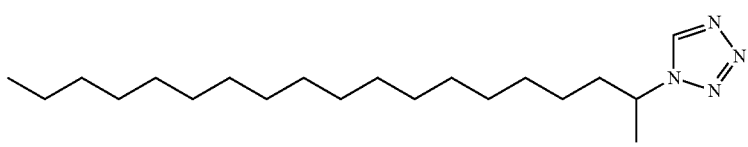
1-(nonadecan-2-yl)-1H-tetrazole Stearic Acid Analogs
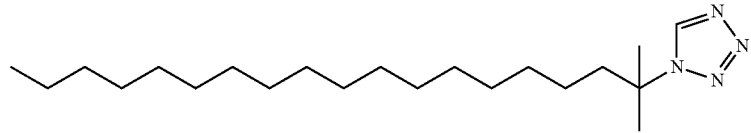
1-(2-methylnonadecan-2-yl)-1H-tetrazole
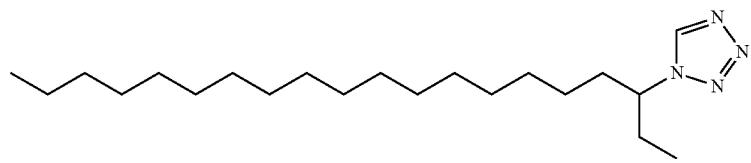
1-(icosan-3-yl)-1H-tetrazole
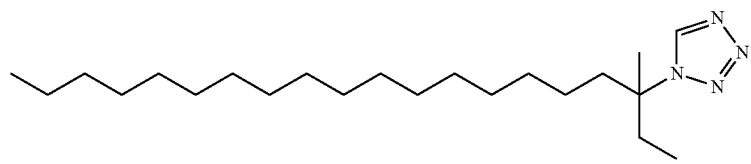
1-(3-methylicosan-3-yl)-1H-tetrazole
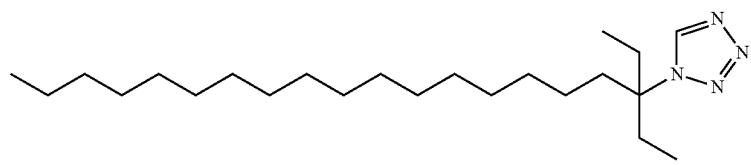
1-(3-ethylicosan-3-yl)-1H-tetrazole
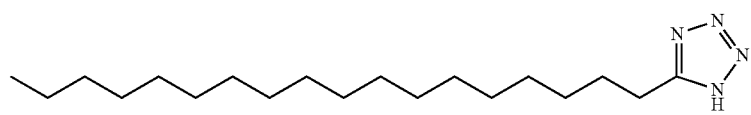
5-octadecyl-1H-tetrazole
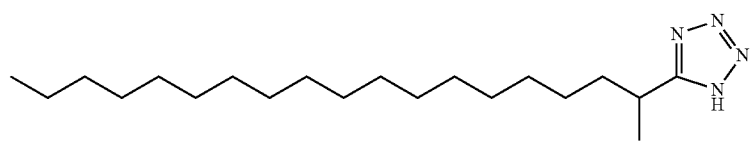
5-(nonadecan-2-yl)-1H-tetrazole
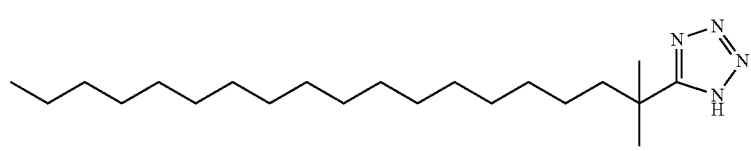
5-(2-methylnonadecan-2-yl)-1H-tetrazole Stearic Acid Analogs
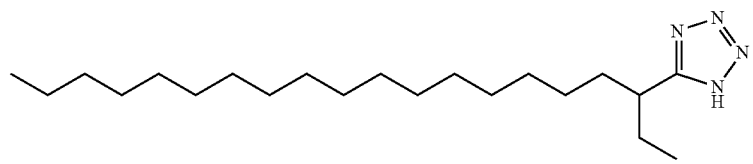
5-(icosan-3-yl)-1H-tetrazole
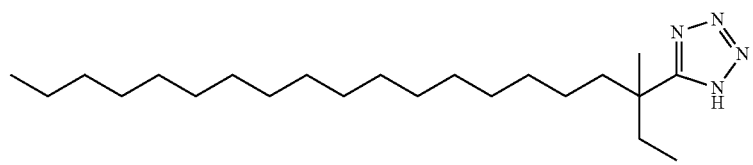
5-(3-methylicosan-3-yl)-1H-tetrazole
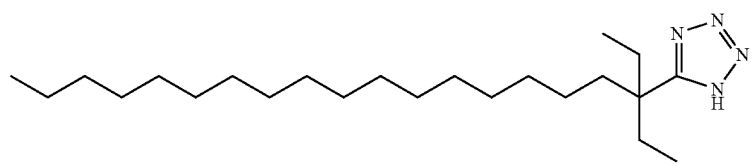
5-(3-ethylicosan-3-yl)-1H-tetrazole
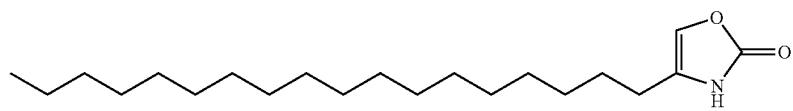
4-octadecyloxazol-2(3H)-one
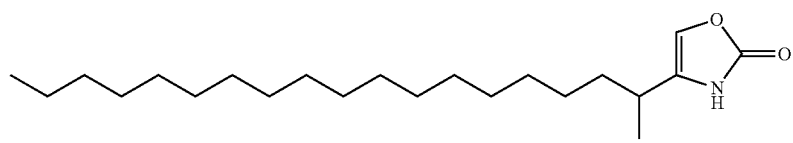
4-(nonadecan-2-yl)oxazol-2(3H)-one
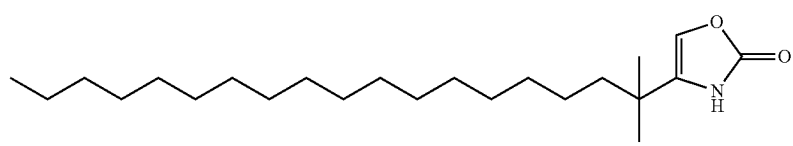
4-(2-methylnonadecan-2-yl)oxazol-2(3H)-one
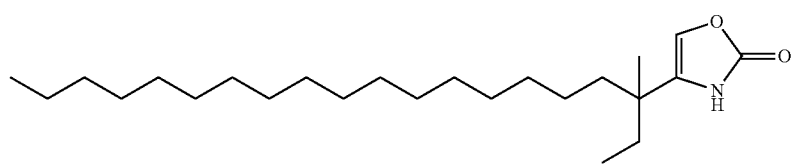
4-(3-methylicosan-3-yl)oxazol-2(3H)-one

| Stearic Acid Analogs |
|---|
| 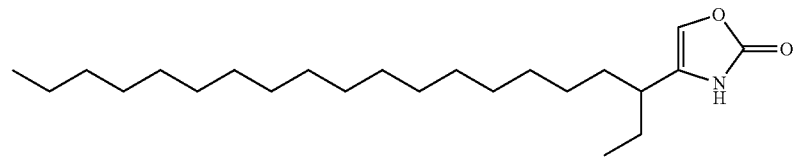 |
| 4-(icosan-3-yl)oxazol-2(3H)-one |
| 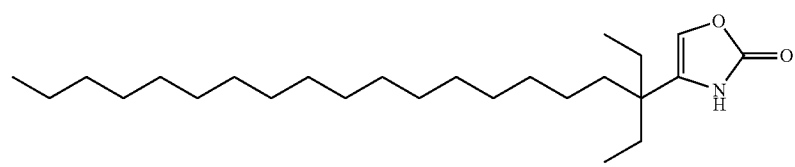 |
| 4-(3-ethylicosan-3-yl)oxazol-3(3H)-one |
| 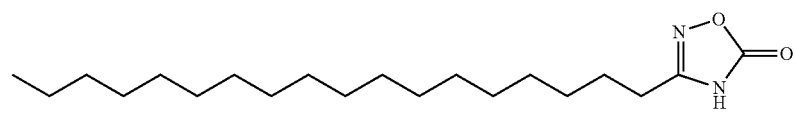 |
| 3-octadecyl-1,2,4-oxadiazol-5(4H)-one |
| 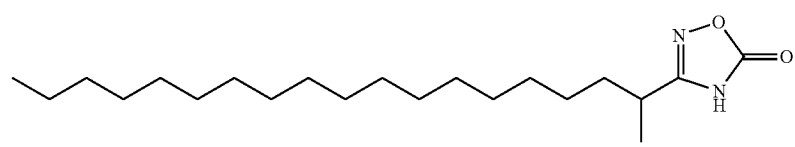 |
| 3-(nonadecan-2-yl)-1,2,4-oxadiazol-5(4H)-one |
| 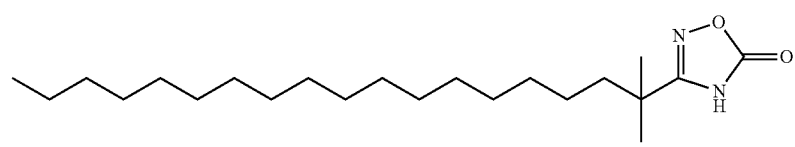 |
| 3-(2-methylnonadecan-2-yl)-1,2,4-oxadiazol-5(4H)-one |
| 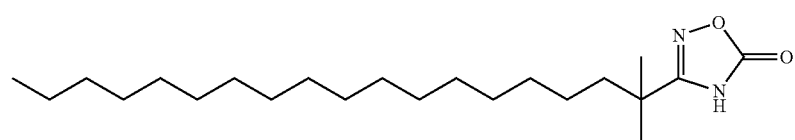 |
| 3-(3-methylicosan-3-yl)-1,2,4-oxadiazol-5(4H)-one |
| 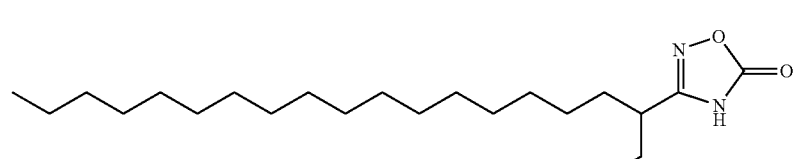 |
| 3-(icosan-3-yl)-1,2,4-oxadiazol-5(4H)-one |

| Stearic Acid Analogs |
|---|
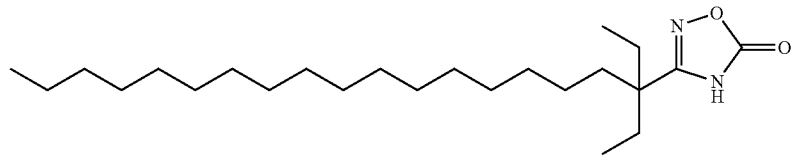
3-(3-ethylicosan-3-yl)-1,2,4-oxadiazol-5(4H)-one
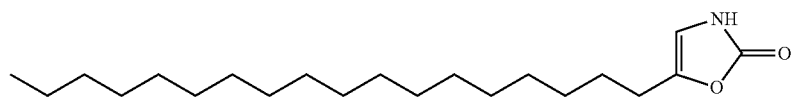
5-octadecyloxazol-2(3H)-one
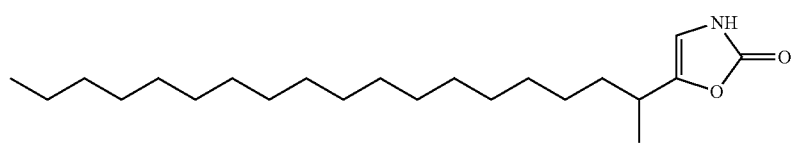
5-(nonadecan-2-yl)oxazol-2(3H)-one
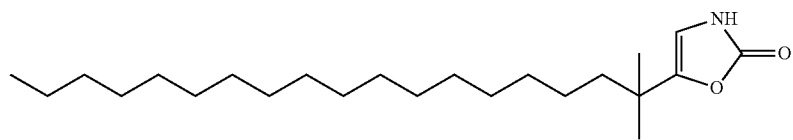
5-(2-methylnonadecan-2-yl)oxazol-2(3H)-one
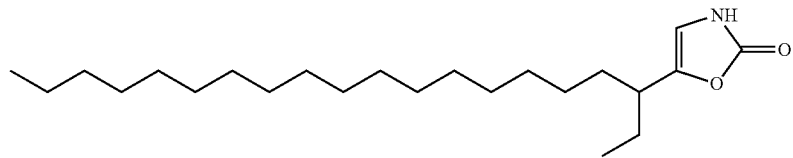
5-(icosan-3-yl)oxazol-2(3H)-one
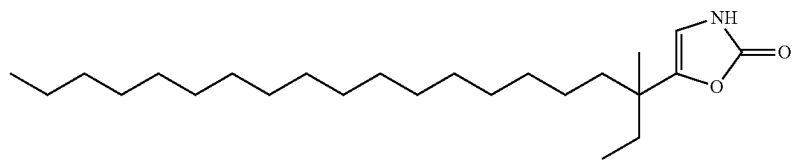
5-(3-methylicosan-3-yl)oxazol-2(3H)-one
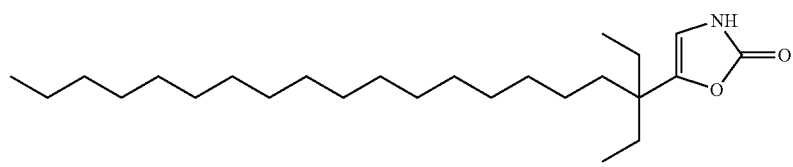
5-(3-ethylicosan-3-yl)oxazol-2(3H)-one
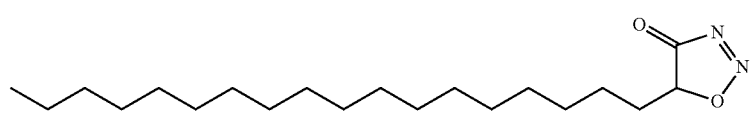
5-octadecyl-1,2,3-oxadiazol-4(5H)-one Stearic Acid Analogs
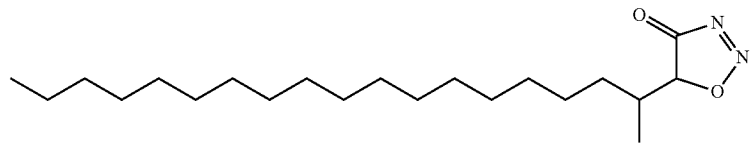
5-(nonadecan-2-yl)-1,2,3-oxadiazol-4(5H)-one
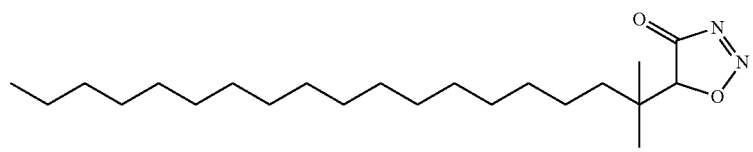
5-(2-methylnonadecan-2-yl)-1,2,3-oxadiazol-4(5H)-one
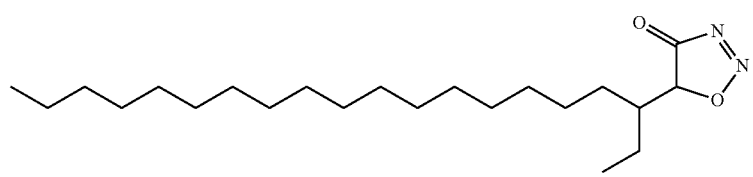
5-(icosan-3-yl)-1,2,3-oxadiazol-4(5H)-one
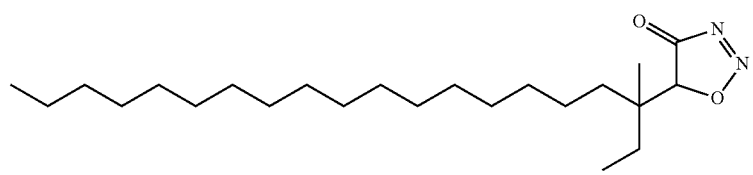
5-(3-methylicosan-3-yl)-1,2,3-oxadiazol-4(5H)-one
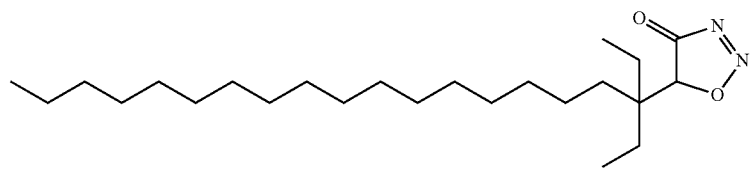
5-(3-ethylicosan-3-yl)-1,2,3-oxadiazol-4(5H)-one
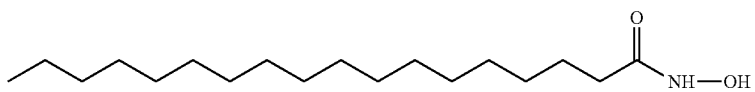
N-hydroxystearamide
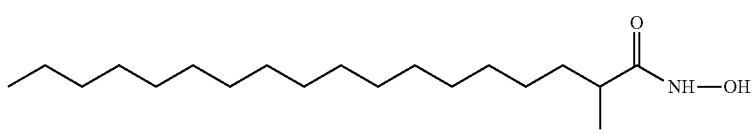
N-hydroxy-2-methyloctadecanamide

| Stearic Acid Analogs |
|---|
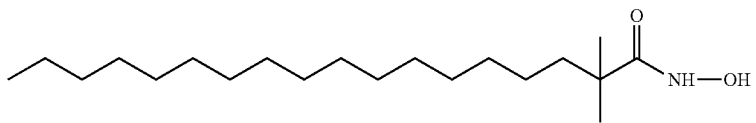
N-hydroxy-2,2-dimethyloctadecanamide
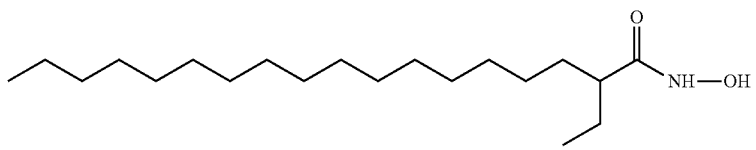
2-ethyl-N-hydroxyoctadecanamide
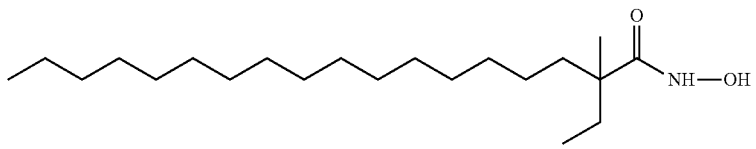
2-ethyl-N-hydroxy-2-methyloctadecanamide
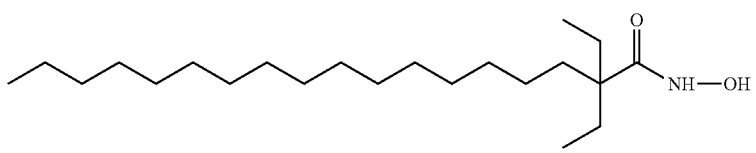
2,2-diethyl-N-hydroxyoctadecanamide
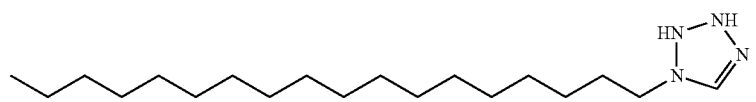
1-octadecyl-2,3-dihydro-1H-tetrazole
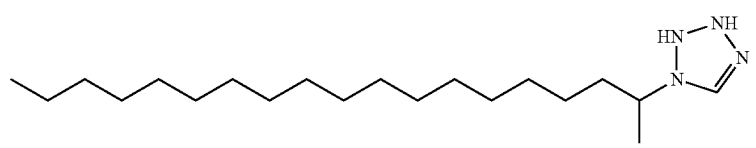
1-(nonadecan-2-yl)-2,3-dihydro-1H-tetrazole
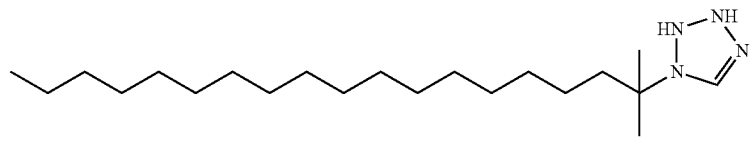
1-(2-methylnonadecan-2-yl)-2,3-dihydro-1H-tetrazole
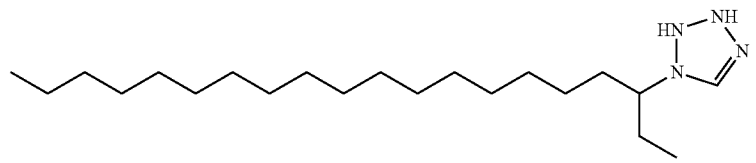
1-(icosan-3-yl)-2,3-dihydro-1H-tetrazole

| Stearic Acid Analogs |
|---|
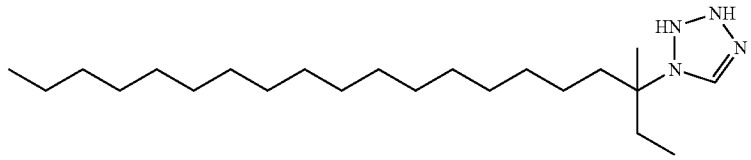
1-(3-methylicosan-3-yl)-2,3-dihydro-1H-tetrazole
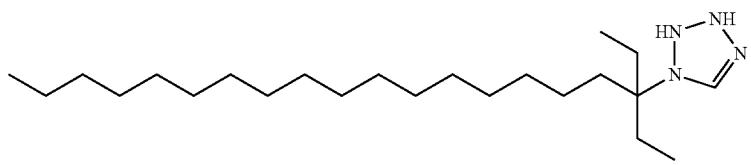
1-(3-ethylicosan-3-yl)-2,3-dihydro-1H-tetrazole
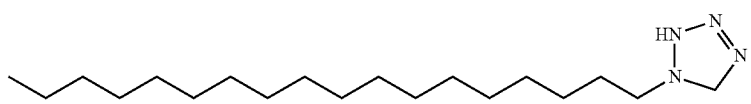
1-octadecyl-2,5-dihydro-1H-tetrazole
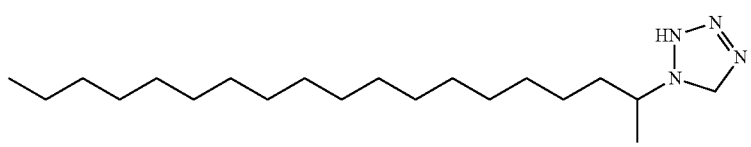
1-(nonadecan-2-yl)-2,5-dihydro-1H-tetrazole
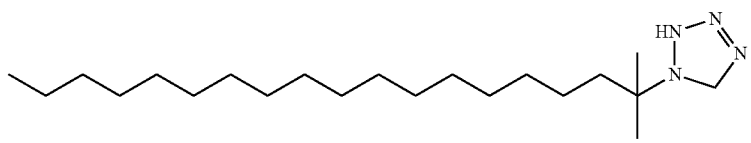
1-(2-methylnonadecan-2-yl)-2,5-dihydro-1H-tetrazole
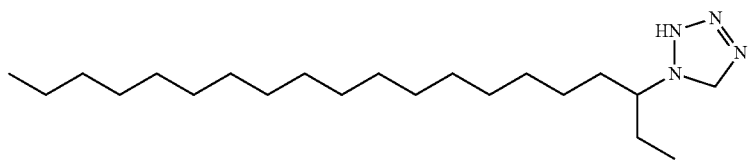
1-(icosan-3-yl)-2,5-dihydro-1H-tetrazole
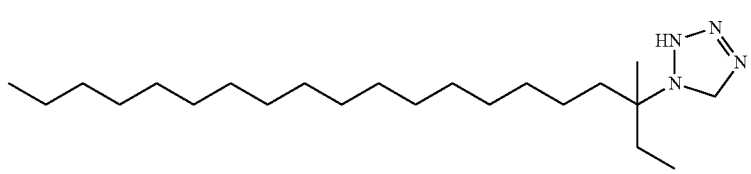
1-(3-methylicosan-3-yl)-2,5-dihydro-1H-tetrazole -continued
| Stearic Acid Analogs |
|---|
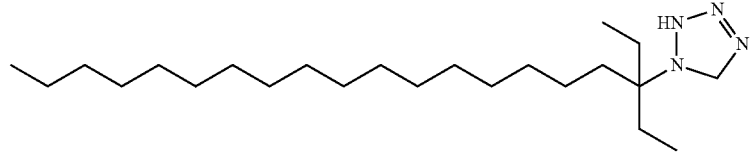
1-(3-ethylicosan-3-yl)-2,5-dihydro-1H-tetrazole
| Heptadecanoic Acid Analogs |
|---|
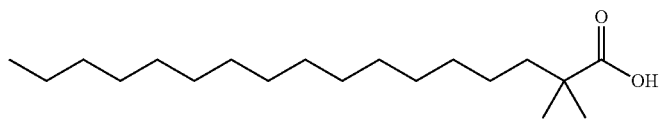 [SMILES: CCCCCCCCCCCCCCCC(C)(C)C(=O)O]
2,2-dimethylheptadecanoic acid
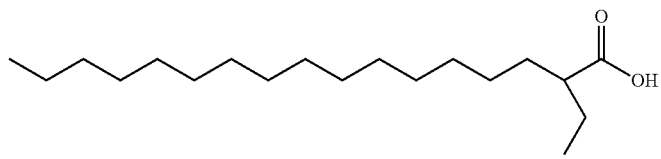 [SMILES: CCCCCCCCCCCCCCCC(CC)C(=O)O]
2-ethylheptadecanoic acid
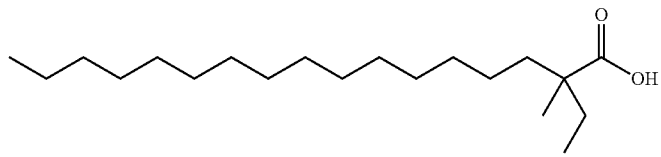 [SMILES: CCCCCCCCCCCCCCCC(C)(CC)C(=O)O]
2-ethyl-2-methylheptadecanoic acid
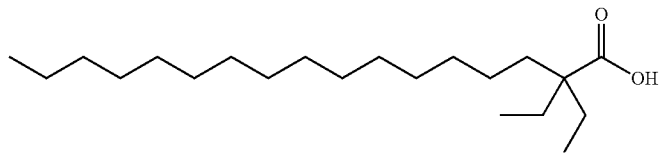 [SMILES: CCCCCCCCCCCCCCCC(CC)(CC)C(=O)O]
2,2-diethylheptadecanoic acid
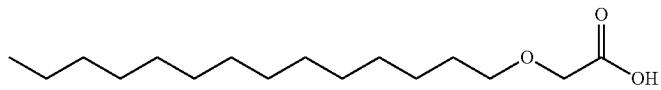 [SMILES: CCCCCCCCCCCCCCOCC(=O)O]
2-(tetradecyloxy)acetic acid
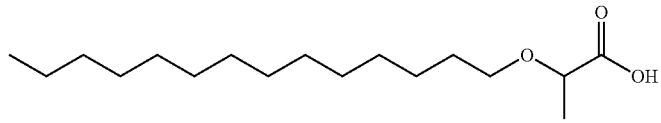 [SMILES: CCCCCCCCCCCCCCOC(C)C(=O)O]
2-(tetradecyloxy)propanoic acid

| Heptadecanoic Acid Analogs |
|---|
| 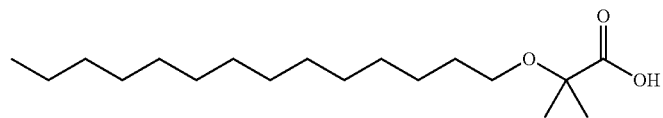 [SMILES: CCCCCCCCCCCCCCOC(C)(C)C(=O)O]
2-methyl-2-(tetradecyloxy)propanoic acid |
| 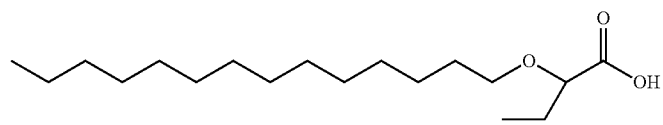 [SMILES: CCCCCCCCCCCCCCOC(CC)C(=O)O]
2-(tetradecyloxy)butanoic acid |
| 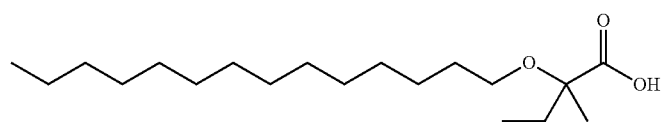 [SMILES: CCCCCCCCCCCCCCOC(C)(CC)C(=O)O]
2-methyl-2-(tetradecyloxy)butanoic acid |
| 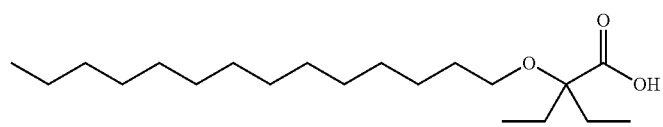
2-ethyl-2-(tetradecyloxy)butanoic acid |
| 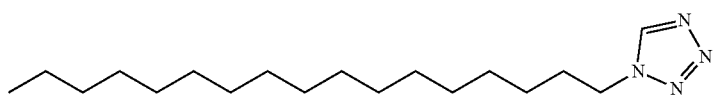 [SMILES: CCCCCCCCCCCCCCCCCn1cnnn1]
1-heptadecyl-1H-tetrazole |
| 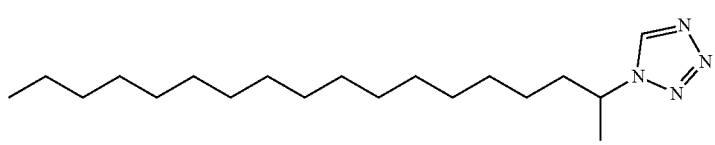 [SMILES: CCCCCCCCCCCCCCCCC(C)n1cnnn1]
1-(octadecan-2-yl)-1H-tetrazole |
| 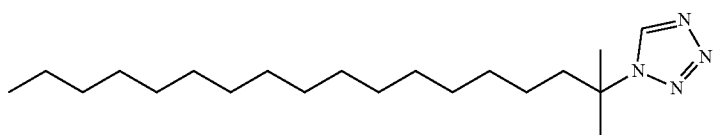 [SMILES: CCCCCCCCCCCCCCCCC(C)(C)n1cnnn1]
1-(2-methyloctadecan-2-yl)-1H-tetrazole |
| 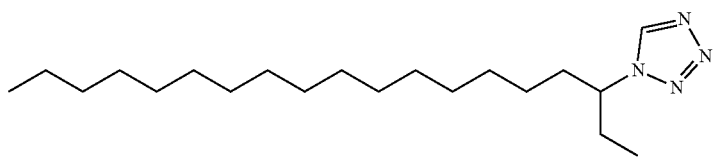 [SMILES: CCCCCCCCCCCCCCCCC(CC)n1cnnn1]
1-(nonadecan-3-yl)-1H-tetrazole |

| Heptadecanoic Acid Analogs |
|---|
| 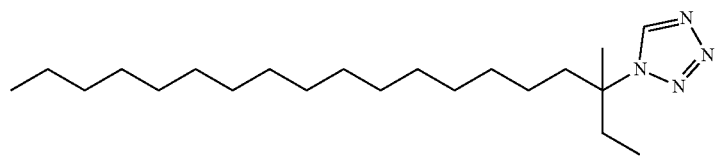 [SMILES: CCCCCCCCCCCCCCCCC(C)(CC)n1cnnn1]<br>1-(3-methylnonadecan-3-yl)-1H-tetrazole |
| 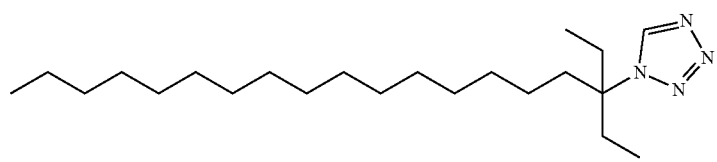 [SMILES: CCCCCCCCCCCCCCCCC(CC)(CC)n1cnnn1]<br>1-(3-ethylnonadecan-3-yl)-1H-tetrazole |
| 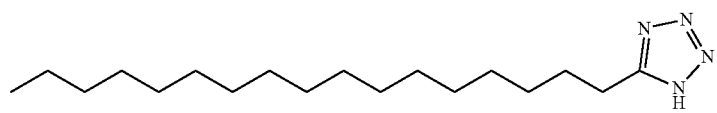 [SMILES: CCCCCCCCCCCCCCCCCc1nnn[nH]1]<br>5-heptadecyl-1H-tetrazole |
| 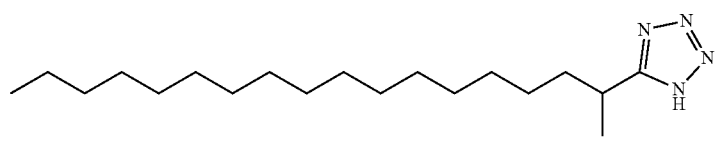 [SMILES: CCCCCCCCCCCCCCCCC(C)c1nnn[nH]1]<br>5-(octadecan-2-yl)-1H-tetrazole |
| 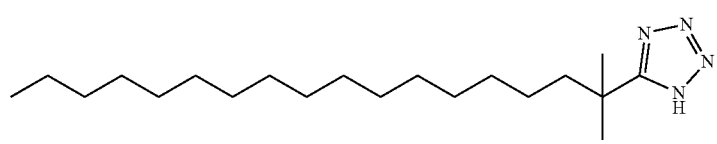 [SMILES: CCCCCCCCCCCCCCCCC(C)(C)c1nnn[nH]1]<br>5-(2-methyloctadecan-2-yl)-1H-tetrazole |
| 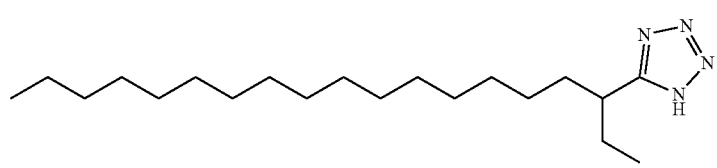 [SMILES: CCCCCCCCCCCCCCCCC(CC)c1nnn[nH]1]<br>5-(nonadecan-3-yl)-1H-tetrazole |
| 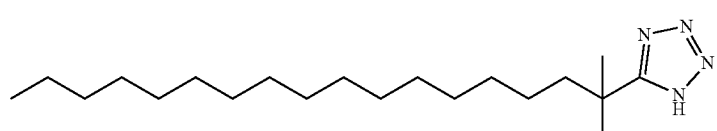<br>5-(3-methylnonadecan-3-yl)-1H-tetrazole |
| 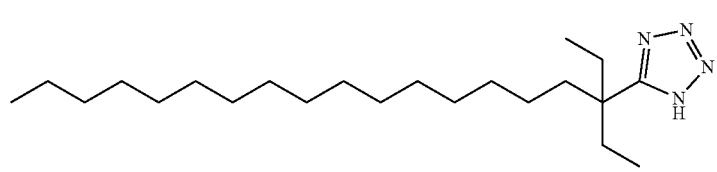 [SMILES: CCCCCCCCCCCCCCCCC(CC)(CC)c1nnn[nH]1]<br>5-(3-ethylnonadecan-3-yl)-1H-tetrazole |

| Heptadecanoic Acid Analogs |
|---|
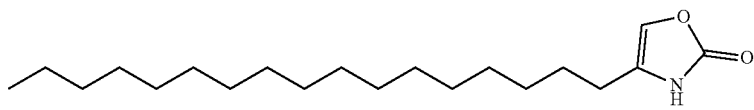 [SMILES: CCCCCCCCCCCCCCCCCc1coc(=O)[nH]1]
4-heptadecyloxazol-2(3H)-one
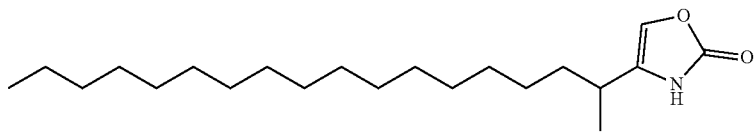 [SMILES: CCCCCCCCCCCCCCCCC(C)c1coc(=O)[nH]1]
4-(octadecan-2-yl)oxazol-2(3H)-one
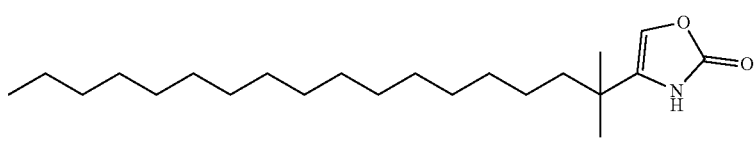 [SMILES: CCCCCCCCCCCCCCCCC(C)(C)c1coc(=O)[nH]1]
4-(2-methyloctadecan-2-yl)oxazol-2(3H)-one
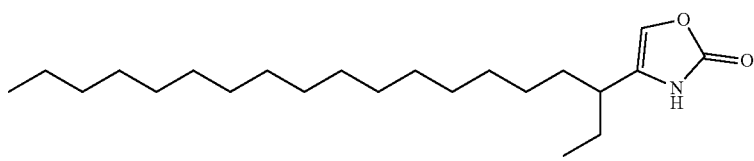 [SMILES: CCCCCCCCCCCCCCCCC(CC)c1coc(=O)[nH]1]
4-(nonadecan-3-yl)oxazol-2(3H)-one
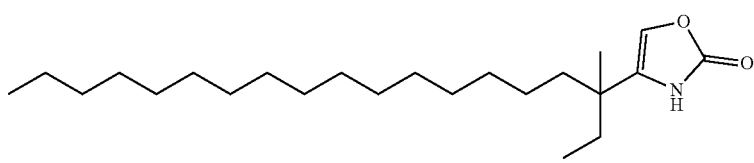 [SMILES: CCCCCCCCCCCCCCCCC(C)(CC)c1coc(=O)[nH]1]
4-(3-methylnonadecan-3-yl)oxazol-2(3H)-one
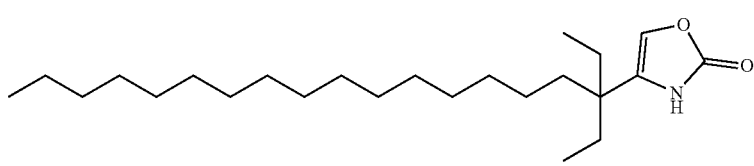 [SMILES: CCCCCCCCCCCCCCCCC(CC)(CC)c1coc(=O)[nH]1]
4-(3-ethylnonadecan-3-yl)oxazol-2(3H)-one
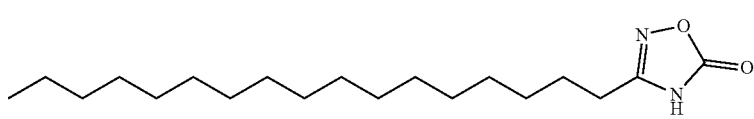 [SMILES: CCCCCCCCCCCCCCCCCc1noc(=O)[nH]1]
3-heptadecyl-1,2,4-oxadiazol-5(4H)-one
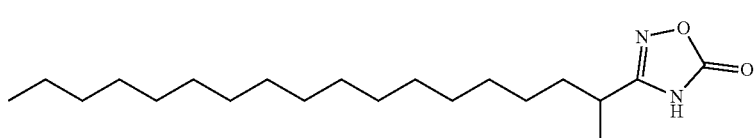
3-(octadecan-2-yl)-1,2,4-oxadiazol-5(4H)-one

| Heptadecanoic Acid Analogs |
|---|
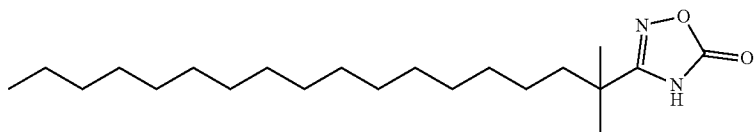 [SMILES: CCCCCCCCCCCCCCCCC(C)(C)c1noc(=O)[nH]1]
3-(2-methyloctadecan-2-yl)-1,2,4-oxadiazol-5(4H)-one
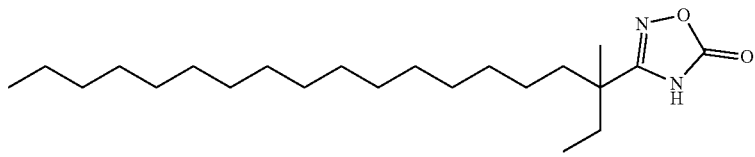 [SMILES: CCCCCCCCCCCCCCCCC(C)(CC)c1noc(=O)[nH]1]
3-(3-methylnonadecan-3-yl)-1,2,4-oxadiazol-5(4H)-one
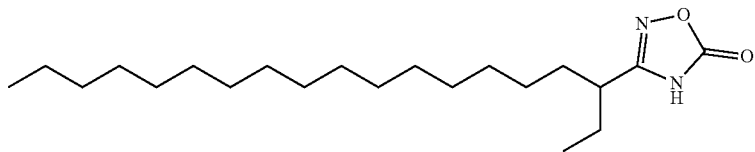 [SMILES: CCCCCCCCCCCCCCCCC(CC)c1noc(=O)[nH]1]
3-(nonadecan-3-yl)-1,2,4-oxadiazol-5(4H)-one
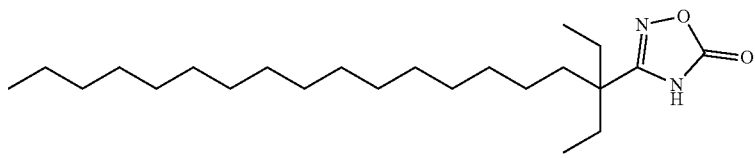 [SMILES: CCCCCCCCCCCCCCCCC(CC)(CC)c1noc(=O)[nH]1]
3-(3-ethylnonadecan-3-yl)-1,2,4-oxadiazol-5(4H)-one
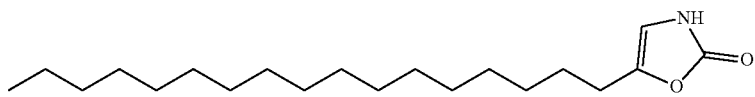 [SMILES: CCCCCCCCCCCCCCCCCc1c[nH]c(=O)o1]
5-heptadecyloxazol-2(3H)-one
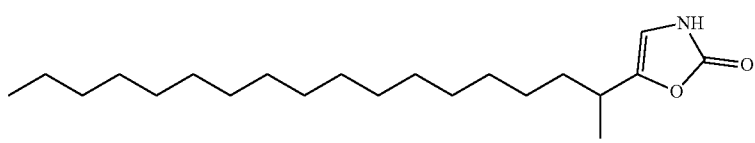 [SMILES: CCCCCCCCCCCCCCCCC(C)c1c[nH]c(=O)o1]
5-(octadecan-2-yl)oxazol-2(3H)-one
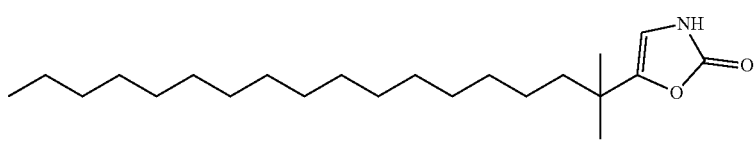
5-(2-methyloctadecan-2-yl)oxazol-2(3H)-one
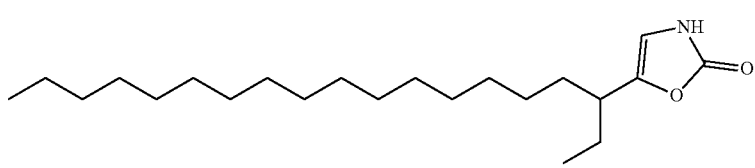 [SMILES: CCCCCCCCCCCCCCCCC(CC)c1c[nH]c(=O)o1]
5-(nonadecan-3-yl)oxazol-2(3H)-one

Heptadecanoic Acid Analogs
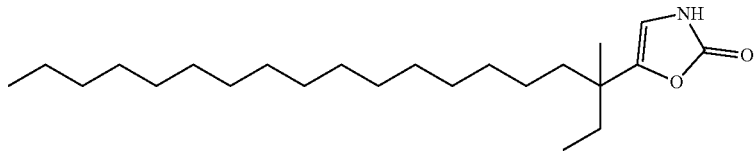 [SMILES: CCCCCCCCCCCCCCCCC(C)(CC)c1c[nH]c(=O)o1]
5-(3-methylnonadecan-3-yl)oxazol-2(3H)-one
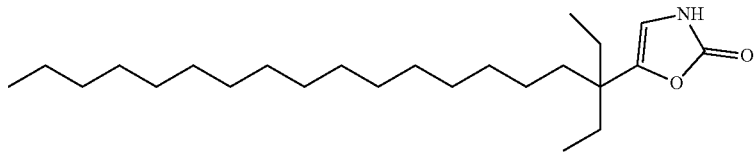 [SMILES: CCCCCCCCCCCCCCCCC(CC)(CC)c1c[nH]c(=O)o1]
5-(3-ethylnonadecan-3-yl)oxazol-2(3H)-one
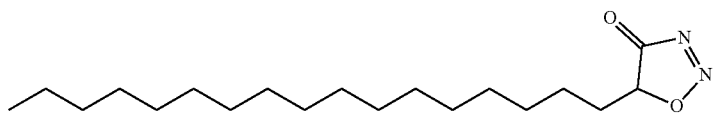 [SMILES: CCCCCCCCCCCCCCCCCC1ON=NC1=O]
5-heptadecyl-1,2,3-oxadiazol-4(5H)-one
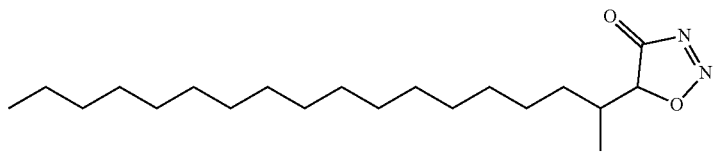 [SMILES: CCCCCCCCCCCCCCCCC(C)C1ON=NC1=O]
5-(octadecan-2-yl)-1,2,3-oxadiazol-4(5H)-one
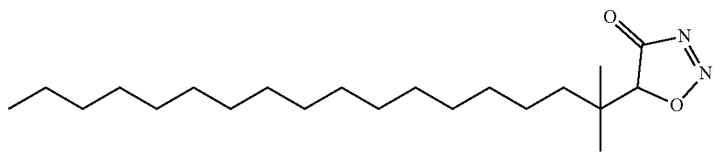 [SMILES: CCCCCCCCCCCCCCCCC(C)(C)C1ON=NC1=O]
5-(2-methyloctadecan-2-yl)-1,2,3-oxadiazol-4(5H)-one
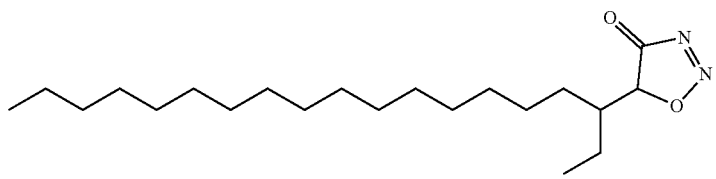 [SMILES: CCCCCCCCCCCCCCCCC(CC)C1ON=NC1=O]
5-(nonadecan-3-yl)-1,2,3-oxadiazol-4(5H)-one
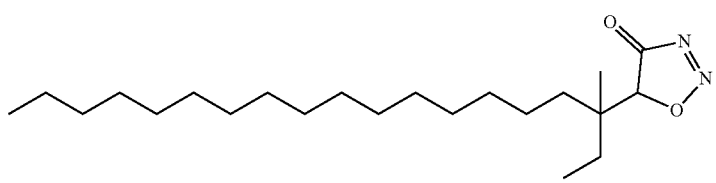 [SMILES: CCCCCCCCCCCCCCCCC(C)(CC)C1ON=NC1=O]
5-(3-methylnonadecan-3-yl)-1,2,3-oxadiazol-4(5H)-one

| Heptadecanoic Acid Analogs |
|---|
| 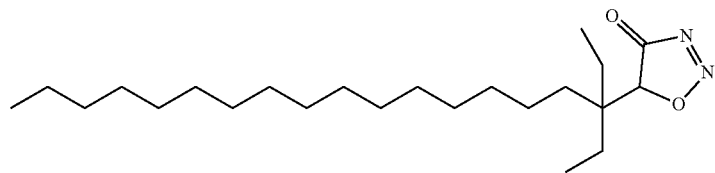 [SMILES: CCCCCCCCCCCCCCCCC(CC)(CC)C1ON=NC1=O]
5-(3-ethylnonadecan-3-yl)-1,2,3-oxadiazol-4(5H)-one |
| 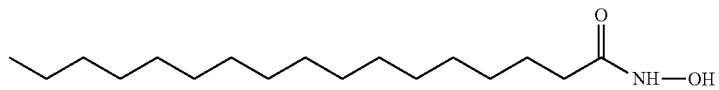 [SMILES: CCCCCCCCCCCCCCCCC(=O)NO]
N-hydroxyheptadecanamide |
| 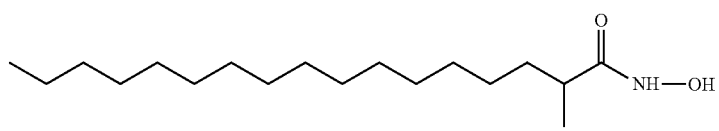 [SMILES: CCCCCCCCCCCCCCCC(C)C(=O)NO]
N-hydroxy-2-methylheptadecanamide |
| 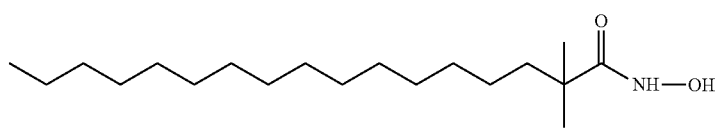 [SMILES: CCCCCCCCCCCCCCCC(C)(C)C(=O)NO]
N-hydroxy-2,2-dimethylheptadecanamide |
| 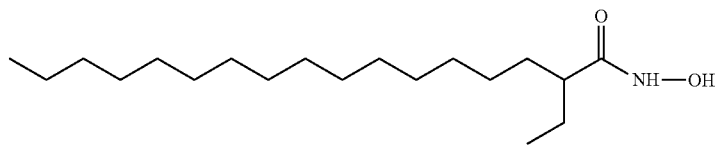 [SMILES: CCCCCCCCCCCCCCCC(CC)C(=O)NO]
2-ethyl-N-hydroxyheptadecanamide |
| 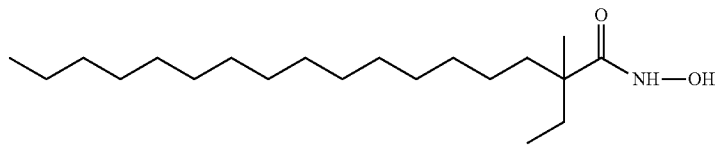 [SMILES: CCCCCCCCCCCCCCCC(C)(CC)C(=O)NO]
2-ethyl-N-hydroxy-2-methylheptadecanamide |
| 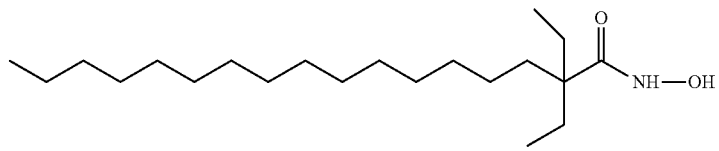 [SMILES: CCCCCCCCCCCCCCCC(CC)(CC)C(=O)NO]
2,2-diethyl-N-hydroxyheptadecanamide |
| 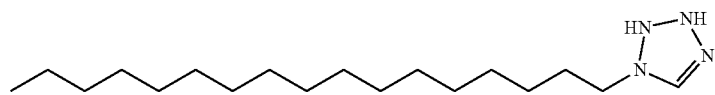 [SMILES: CCCCCCCCCCCCCCCCCN1C=NNN1]
1-heptadecyl-2,3-dihydro-1H-tetrazole |

| Heptadecanoic Acid Analogs |
|---|
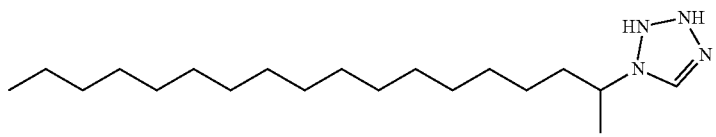 [SMILES: CCCCCCCCCCCCCCCCC(C)N1C=NNN1]
1-(octadecan-2-yl)-2,3-dihydro-1H-tetrazole
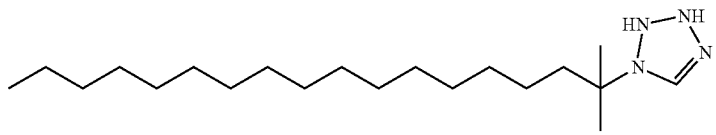 [SMILES: CCCCCCCCCCCCCCCCC(C)(C)N1C=NNN1]
1-(2-methyloctadecan-2-yl)-2,3-dihydro-1H-tetrazole
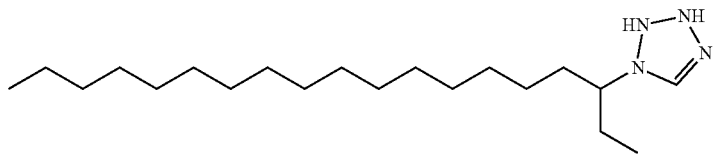 [SMILES: CCCCCCCCCCCCCCCCC(CC)N1C=NNN1]
1-(nonadecan-3-yl)-2,3-dihydro-1H-tetrazole
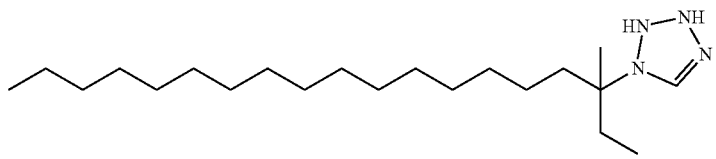 [SMILES: CCCCCCCCCCCCCCCCC(C)(CC)N1C=NNN1]
1-(3-methylnonadecan-3-yl)-2,3-dihydro-1H-tetrazole
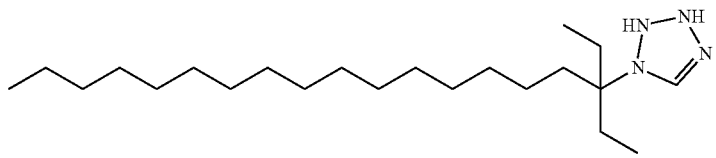 [SMILES: CCCCCCCCCCCCCCCCC(CC)(CC)N1C=NNN1]
1-(3-ethylnonadecan-3-yl)-2,3-dihydro-1H-tetrazole
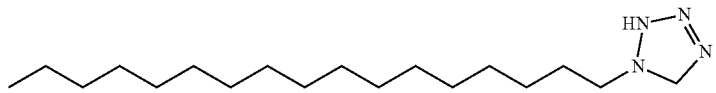 [SMILES: CCCCCCCCCCCCCCCCCN1CN=NN1]
1-heptadecyl-2,5-dihydro-1H-tetrazole
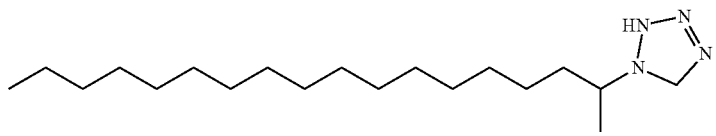 [SMILES: CCCCCCCCCCCCCCCCC(C)N1CN=NN1]
1-(octadecan-2-yl)-2,5-dihydro-1H-tetrazole
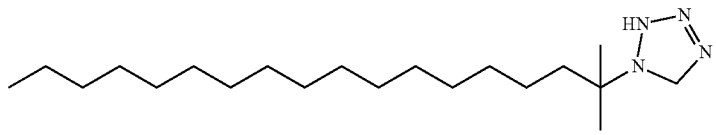 [SMILES: CCCCCCCCCCCCCCCCC(C)(C)N1CN=NN1]
1-(2-methyloctadecan-2-yl)-2,5-dihydro-1H-tetrazole

| Heptadecanoic Acid Analogs |
|---|
| 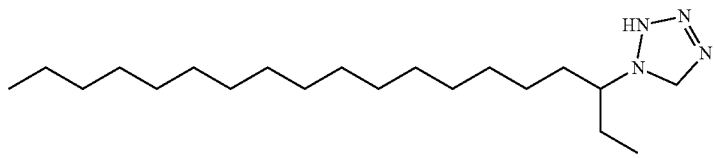 [SMILES: CCCCCCCCCCCCCCCCC(CC)N1CN=NN1] |
| 1-(nonadecan-3-yl)-2,5-dihydro-1H-tetrazole |
| 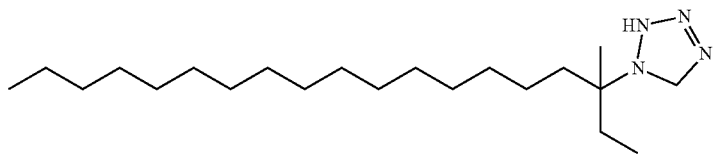 [SMILES: CCCCCCCCCCCCCCCCC(C)(CC)N1CN=NN1] |
| 1-(3-methylnonadecan-3-yl)-2,5-dihydro-1H-tetrazole |
| 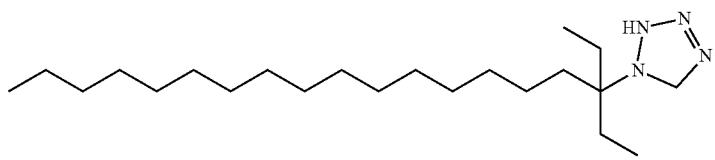 [SMILES: CCCCCCCCCCCCCCCCC(CC)(CC)N1CN=NN1] |
| 1-(3-ethylnonadecan-3-yl)-2,5-dihydro-1H-tetrazole |
| Palmitic Acid Analogs |
|---|
| 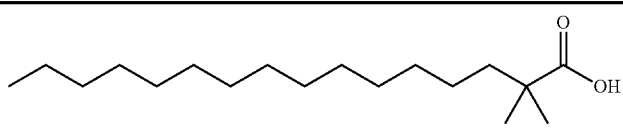 |
| 2,2-dimethylhexadecanoic acid |
| 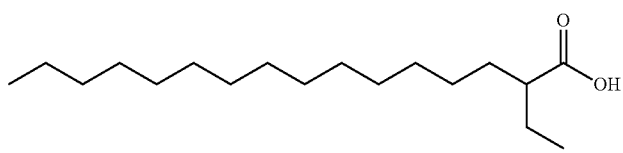 [SMILES: CCCCCCCCCCCCCCC(CC)C(=O)O] |
| 2-ethylhexadecanoic acid |
| 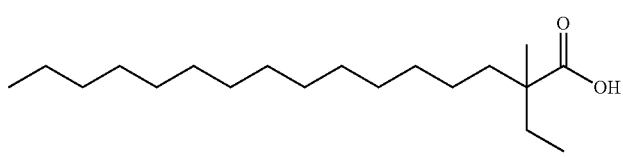 [SMILES: CCCCCCCCCCCCCCC(C)(CC)C(=O)O] |
| 2-ethyl-2-methylhexadecanoic acid |
| 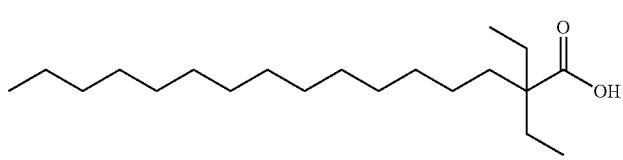 [SMILES: CCCCCCCCCCCCCCC(CC)(CC)C(=O)O] |
| 2,2-diethylhexadecanoic acid |

| Palmitic Acid Analogs |
|---|
| 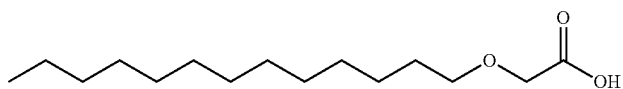 [SMILES: CCCCCCCCCCCCCOCC(=O)O]<br>2-(tridecyloxy)acetic acid |
| 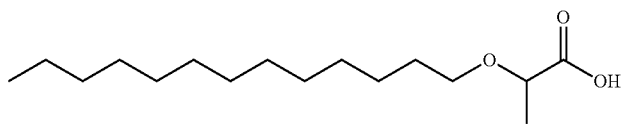 [SMILES: CCCCCCCCCCCCCOC(C)C(=O)O]<br>2-(tridecyloxy)propanoic acid |
| 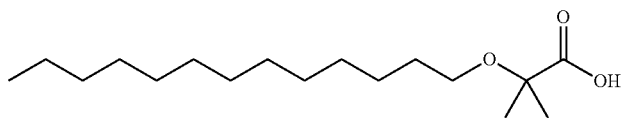 [SMILES: CCCCCCCCCCCCCOC(C)(C)C(=O)O]<br>2-methyl-2-(tridecyloxy)propanoic acid |
| 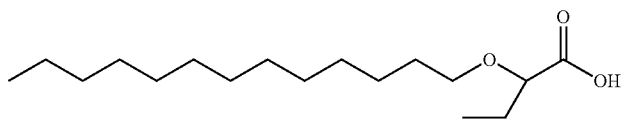 [SMILES: CCCCCCCCCCCCCOC(CC)C(=O)O]<br>2-(tridecyloxy)butanoic acid |
| 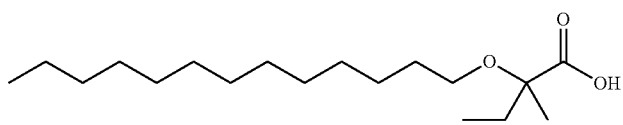 [SMILES: CCCCCCCCCCCCCOC(C)(CC)C(=O)O]<br>2-methyl-2-(tridecyloxy)butanoic acid |
| 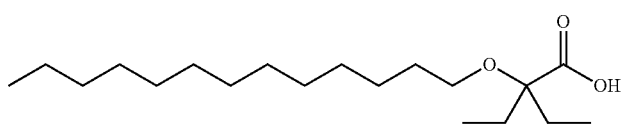 [SMILES: CCCCCCCCCCCCCOC(CC)(CC)C(=O)O]<br>2-ethyl-2-(tridecyloxy)butanoic acid |
| 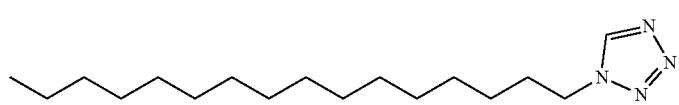 [SMILES: CCCCCCCCCCCCCCCCn1cnnn1]<br>1-hexadecyl-1H-tetrazole |
| 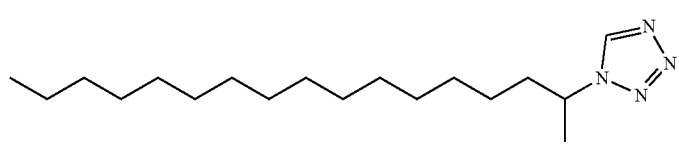 [SMILES: CCCCCCCCCCCCCCCC(C)n1cnnn1]<br>1-(heptadecan-2-yl)-1H-tetrazole |
| 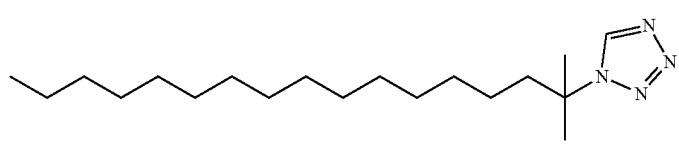 [SMILES: CCCCCCCCCCCCCCCC(C)(C)n1cnnn1]<br>1-(2-methylheptadecan-2-yl)-1H-tetrazole |

| Palmitic Acid Analogs |
|---|
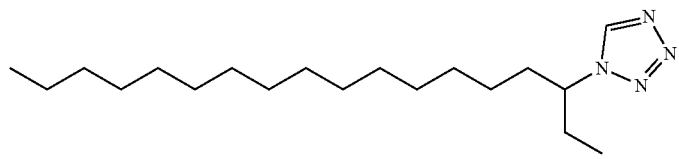 [SMILES: CCCCCCCCCCCCCCCC(CC)n1cnnn1]
1-(octadecan-3-yl)-1H-tetrazole
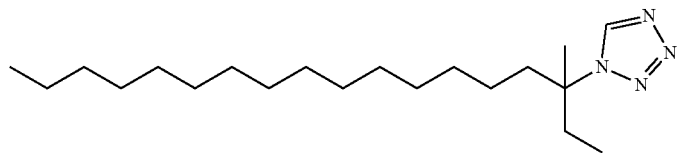 [SMILES: CCCCCCCCCCCCCCCC(C)(CC)n1cnnn1]
1-(3-methyloctadecan-3-yl)-1H-tetrazole
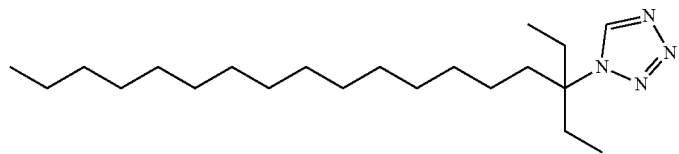 [SMILES: CCCCCCCCCCCCCCCC(CC)(CC)n1cnnn1]
1-(3-ethyloctadecan-3-yl)-1H-tetrazole
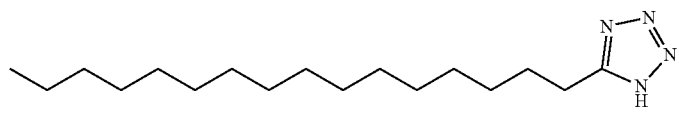 [SMILES: CCCCCCCCCCCCCCCCc1nnn[nH]1]
5-hexadecyl-1H-tetrazole
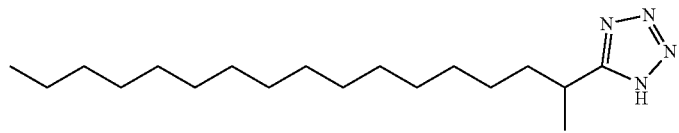 [SMILES: CCCCCCCCCCCCCCCC(C)c1nnn[nH]1]
5-(heptadecan-2-yl)-1H-tetrazole
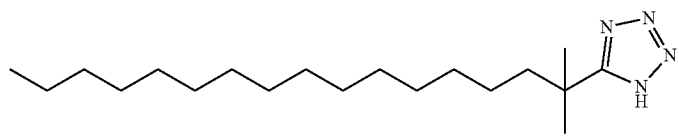 [SMILES: CCCCCCCCCCCCCCCC(C)(C)c1nnn[nH]1]
5-(2-methylheptadecan-2-yl)-1H-tetrazole
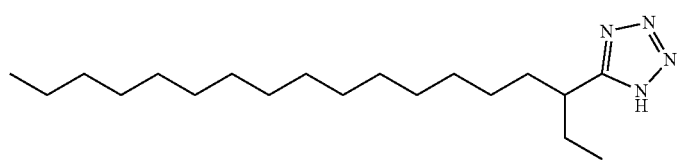 [SMILES: CCCCCCCCCCCCCCCC(CC)c1nnn[nH]1]
5-(octadecan-3-yl)-1H-tetrazole
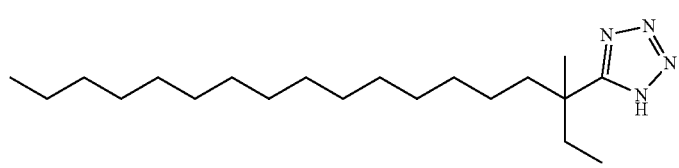 [SMILES: CCCCCCCCCCCCCCCC(C)(CC)c1nnn[nH]1]
5-(3-methyloctadecan-3-yl)-1H-tetrazole

| Palmitic Acid Analogs |
|---|
| 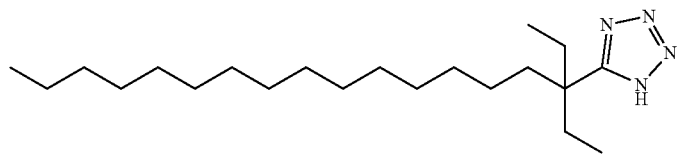 [SMILES: CCCCCCCCCCCCCCCC(CC)(CC)c1nnn[nH]1]<br>5-(3-ethyloctadecan-3-yl)-1H-tetrazole |
| 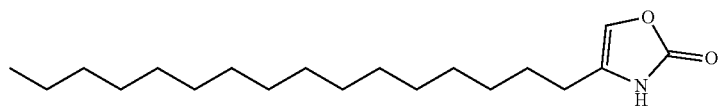 [SMILES: CCCCCCCCCCCCCCCCc1coc(=O)[nH]1]<br>4-hexadecyloxazol-2(3H)-one |
| 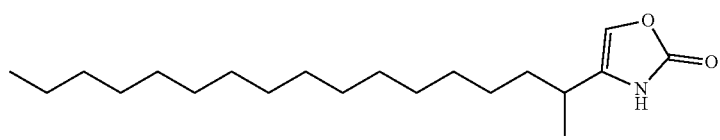 [SMILES: CCCCCCCCCCCCCCCC(C)c1coc(=O)[nH]1]<br>4-(heptadecan-2-yl)oxazol-2(3H)-one |
| 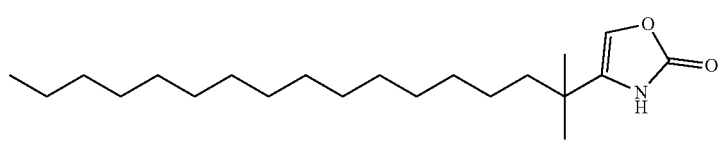 [SMILES: CCCCCCCCCCCCCCCC(C)(C)c1coc(=O)[nH]1]<br>4-(2-methylheptadecan-2-yl)oxazol-2(3H)-one |
| 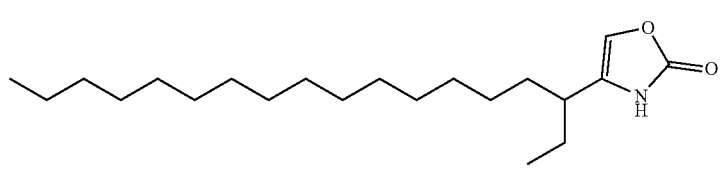 [SMILES: CCCCCCCCCCCCCCCC(CC)c1coc(=O)[nH]1]<br>4-(octadecan-3-yl)oxazol-2(3H)-one |
| 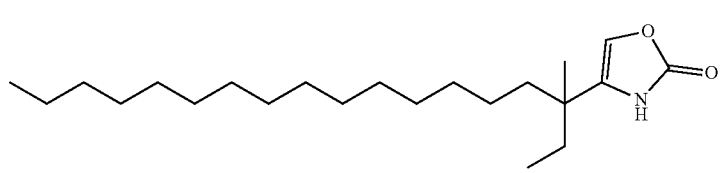 [SMILES: CCCCCCCCCCCCCCCC(C)(CC)c1coc(=O)[nH]1]<br>4-(3-methyloctadecan-3-yl)oxazol-2(3H)-one |
| 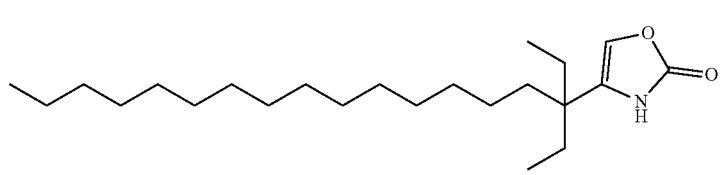 [SMILES: CCCCCCCCCCCCCCCC(CC)(CC)c1coc(=O)[nH]1]<br>4-(3-ethyloctadecan-3-yl)oxazol-2(3H)-one |
| 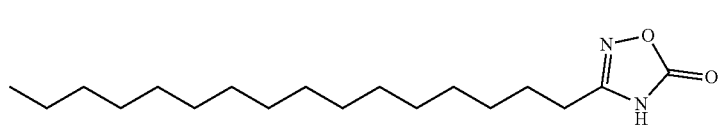 [SMILES: CCCCCCCCCCCCCCCCc1noc(=O)[nH]1]<br>3-hexadecyl-1,2,4-oxadiazol-5(4H)-one |

| Palmitic Acid Analogs |
|---|
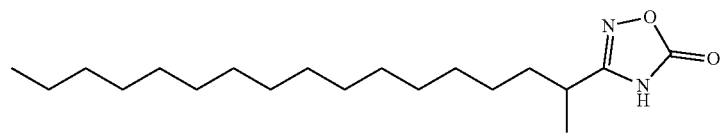 [SMILES: CCCCCCCCCCCCCCCC(C)c1noc(=O)[nH]1]
3-(heptadecan-2-yl)-1,2,4-oxadiazol-5(4H)-one
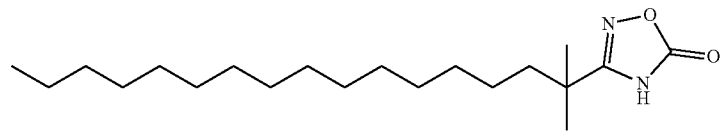 [SMILES: CCCCCCCCCCCCCCCC(C)(C)c1noc(=O)[nH]1]
3-(2-methylheptadecan-2-yl)-1,2,4-oxadiazol-5(4H)-one
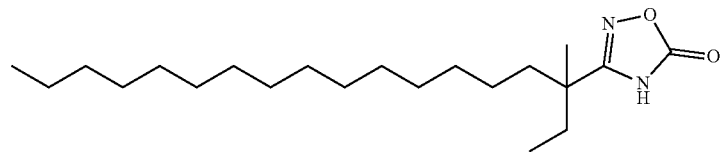 [SMILES: CCCCCCCCCCCCCCCC(C)(CC)c1noc(=O)[nH]1]
3-(3-methyloctadecan-3-yl)-1,2,4-oxadiazol-5(4H)-one
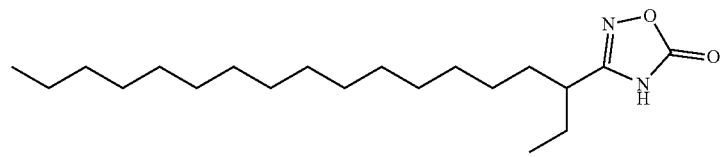 [SMILES: CCCCCCCCCCCCCCCC(CC)c1noc(=O)[nH]1]
3-(octadecan-3-yl)-1,2,4-oxadiazol-5(4H)-one
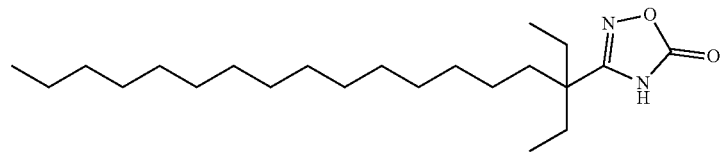 [SMILES: CCCCCCCCCCCCCCCC(CC)(CC)c1noc(=O)[nH]1]
3-(3-ethyloctadecan-3-yl)-1,2,4-oxadiazol-5(4H)-one
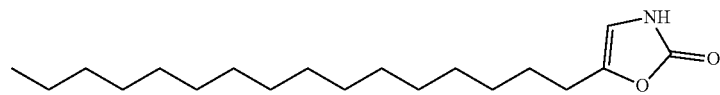 [SMILES: CCCCCCCCCCCCCCCCc1c[nH]c(=O)o1]
5-hexadecyloxazol-2(3H)-one
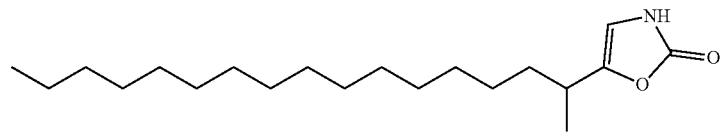 [SMILES: CCCCCCCCCCCCCCCC(C)c1c[nH]c(=O)o1]
5-(heptadecan-2-yl)oxazol-2(3H)-one
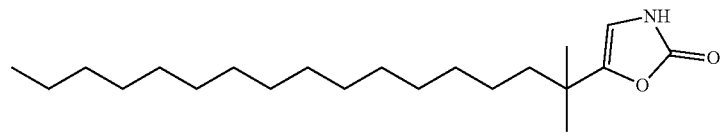 [SMILES: CCCCCCCCCCCCCCCC(C)(C)c1c[nH]c(=O)o1]
5-(2-methylheptadecan-2-yl)oxazol-2(3H)-one

| Palmitic Acid Analogs |
|---|
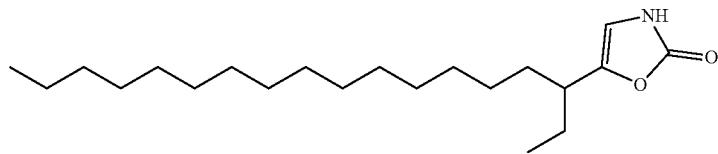 [SMILES: CCCCCCCCCCCCCCCC(CC)c1c[nH]c(=O)o1]
5-(octadecan-3-yl)oxazol-2(3H)-one
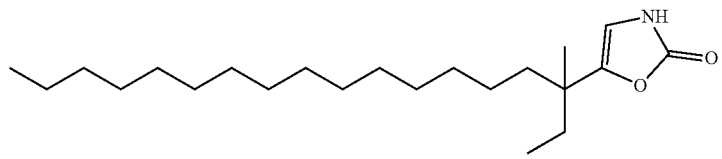 [SMILES: CCCCCCCCCCCCCCCC(C)(CC)c1c[nH]c(=O)o1]
5-(3-methyloctadecan-3-yl)oxazol-2(3H)-one
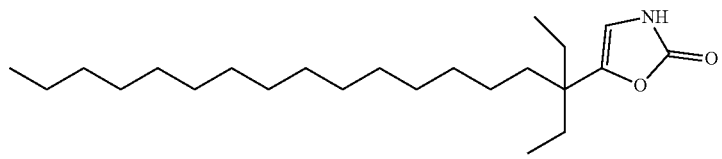 [SMILES: CCCCCCCCCCCCCCCC(CC)(CC)c1c[nH]c(=O)o1]
5-(3-ethyloctadecan-3-yl)oxazol-2(3H)-one
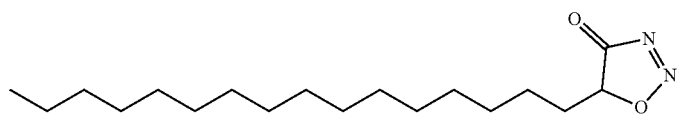 [SMILES: CCCCCCCCCCCCCCCCC1ON=NC1=O]
5-hexadecyl-1,2,3-oxadiazol-4(5H)-one
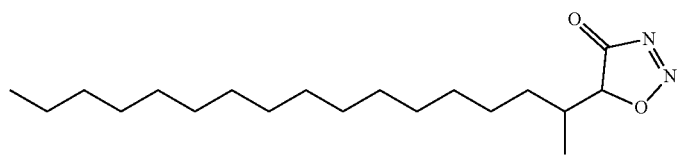 [SMILES: CCCCCCCCCCCCCCCC(C)C1ON=NC1=O]
5-(heptadecan-2-yl)-1,2,3-oxadiazol-4(5H)-one
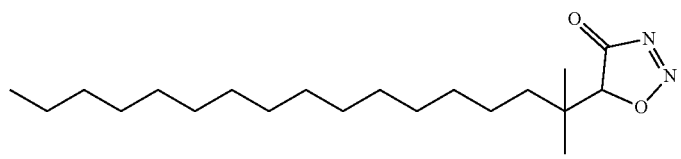 [SMILES: CCCCCCCCCCCCCCCC(C)(C)C1ON=NC1=O]
5-(2-methylheptadecan-2-yl)-1,2,3-oxadiazol-4(5H)-one
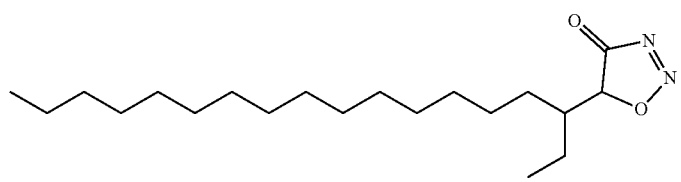 [SMILES: CCCCCCCCCCCCCCCC(CC)C1ON=NC1=O]
5-(octadecan-3-yl)-1,2,3-oxadiazol-4(5H)-one

| Palmitic Acid Analogs |
|---|
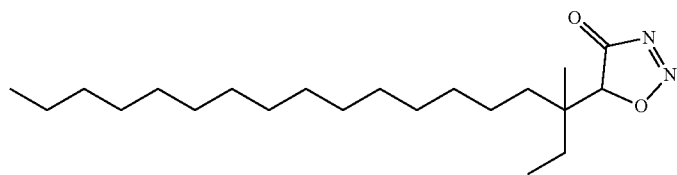 [SMILES: CCCCCCCCCCCCCCCC(C)(CC)C1ON=NC1=O]
5-(3-methyloctadecan-3-yl)-1,2,3-oxadiazol-4(5H)-one
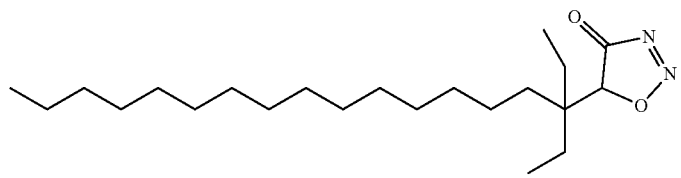 [SMILES: CCCCCCCCCCCCCCCC(CC)(CC)C1ON=NC1=O]
5-(3-ethyloctadecan-3-yl)-1,2,3-oxadiazol-4(5H)-one
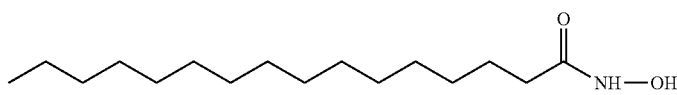 [SMILES: CCCCCCCCCCCCCCCC(=O)NO]
N-hydroxypalmitamide
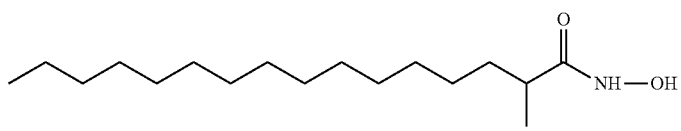 [SMILES: CCCCCCCCCCCCCCC(C)C(=O)NO]
N-hydroxy-2-methylhexadecanamide
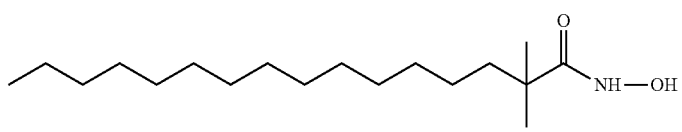 [SMILES: CCCCCCCCCCCCCCC(C)(C)C(=O)NO]
N-hydroxy-2,2-dimethylhexadecanamide
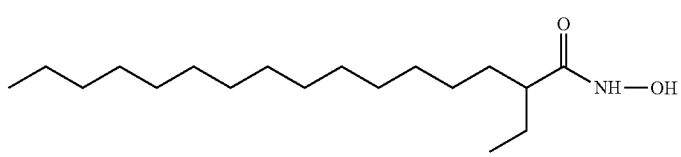 [SMILES: CCCCCCCCCCCCCCC(CC)C(=O)NO]
2-ethyl-N-hydroxyhexadecanamide
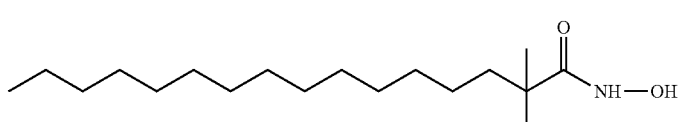
2-ethyl-N-hydroxy-2-methylhexadecanamide
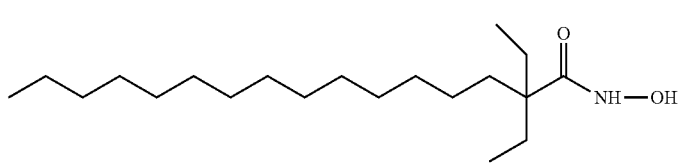 [SMILES: CCCCCCCCCCCCCCC(CC)(CC)C(=O)NO]
2,2-diethyl-N-hydroxyhexadecanamide

| Palmitic Acid Analogs |
|---|
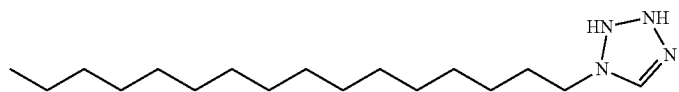 [SMILES: CCCCCCCCCCCCCCCCN1C=NNN1]
1-hexadecyl-2,3-dihydro-1H-tetrazole
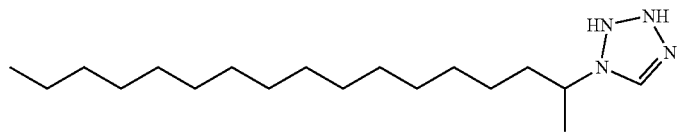 [SMILES: CCCCCCCCCCCCCCCC(C)N1C=NNN1]
1-(heptadecan-2-yl)-2,3-dihydro-1H-tetrazole
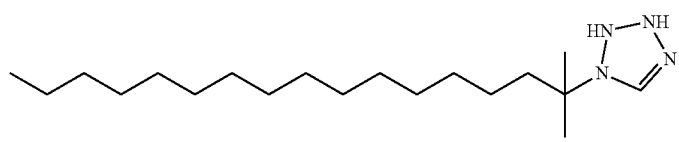 [SMILES: CCCCCCCCCCCCCCCC(C)(C)N1C=NNN1]
1-(2-methylheptadecan-2-yl)-2,3-dihydro-1H-tetrazole
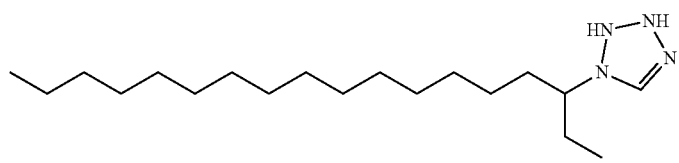 [SMILES: CCCCCCCCCCCCCCCC(CC)N1C=NNN1]
1-(octadecan-3-yl)-2,3-dihydro-1H-tetrazole
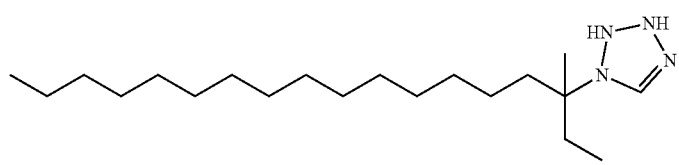 [SMILES: CCCCCCCCCCCCCCCC(C)(CC)N1C=NNN1]
1-(3-methyloctadecan-3-yl)-2,3-dihydro-1H-tetrazole
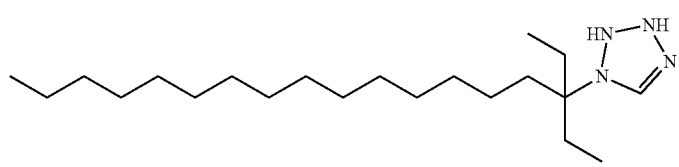 [SMILES: CCCCCCCCCCCCCCCC(CC)(CC)N1C=NNN1]
1-(3-ethyloctadecan-3-yl)-2,3-dihydro-1H-tetrazole
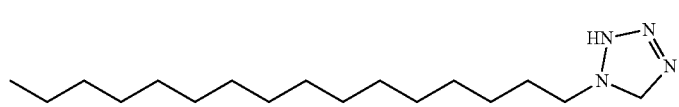 [SMILES: CCCCCCCCCCCCCCCCN1CN=NN1]
1-hexadecyl-2,5-dihydro-1H-tetrazole
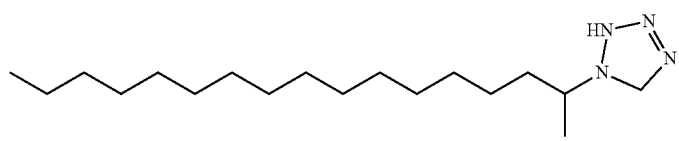 [SMILES: CCCCCCCCCCCCCCCC(C)N1CN=NN1]
1-(heptadecan-2-yl)-2,5-dihydro-1H-tetrazole

| Palmitic Acid Analogs |
|---|
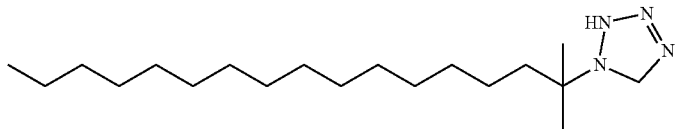 [SMILES: CCCCCCCCCCCCCCCC(C)(C)N1CN=NN1]
1-(2-methylheptadecan-2-yl)-2,5-dihydro-1H-tetrazole
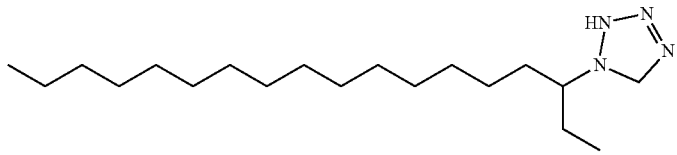 [SMILES: CCCCCCCCCCCCCCCC(CC)N1CN=NN1]
1-(octadecan-3-yl)-2,5-dihydro-1H-tetrazole
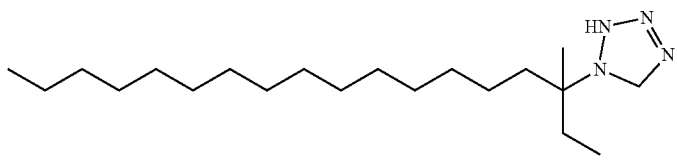 [SMILES: CCCCCCCCCCCCCCCC(C)(CC)N1CN=NN1]
1-(3-methyloctadecan-3-yl)-2,5-dihydro-1H-tetrazole
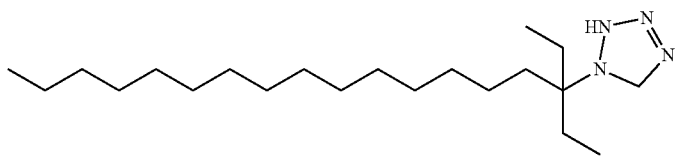 [SMILES: CCCCCCCCCCCCCCCC(CC)(CC)N1CN=NN1]
1-(3-ethyloctadecan-3-yl)-2,5-dihydro-1H-tetrazole
| Pentadecanoic Acid Analogs |
|---|
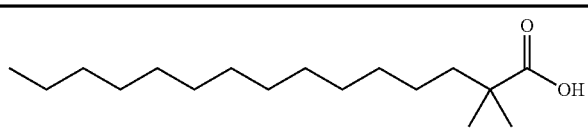
2,2-dimethylpentadecanoic acid
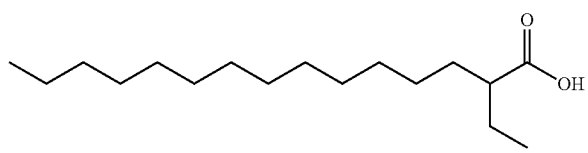 [SMILES: CCCCCCCCCCCCCC(CC)C(=O)O]
2-ethylpentadecanoic acid
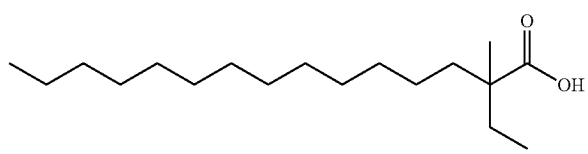 [SMILES: CCCCCCCCCCCCCC(C)(CC)C(=O)O]
2-ethyl-2-methylpentadecanoic acid

| Pentadecanoic Acid Analogs |
|---|
| 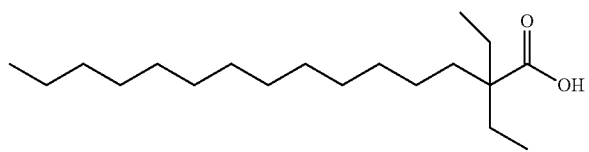 [SMILES: CCCCCCCCCCCCCC(CC)(CC)C(=O)O]
2,2-diethylpentadecanoic acid |
| 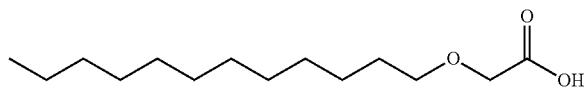 [SMILES: CCCCCCCCCCCCOCC(=O)O]
2-(dodecyloxy)acetic acid |
| 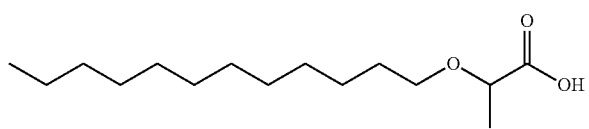 [SMILES: CCCCCCCCCCCCOC(C)C(=O)O]
2-(dodecyloxy)propanoic acid |
| 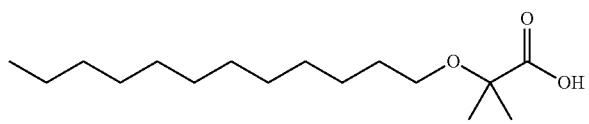 [SMILES: CCCCCCCCCCCCOC(C)(C)C(=O)O]
2-(dodecyloxy)-2-methylpropanoic acid |
| 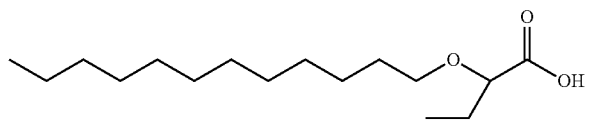 [SMILES: CCCCCCCCCCCCOC(CC)C(=O)O]
2-(dodecyloxy)butanoic acid |
| 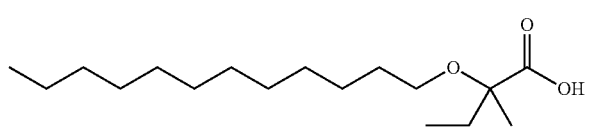 [SMILES: CCCCCCCCCCCCOC(C)(CC)C(=O)O]
2-(dodecyloxy)-2-methylbutanoic acid |
| 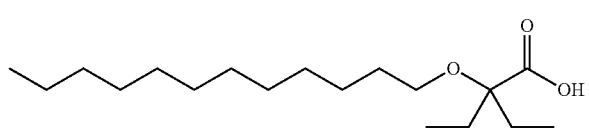 [SMILES: CCCCCCCCCCCCOC(CC)(CC)C(=O)O]
2-(dodecyloxy)-2-ethylbutanoic acid |
| 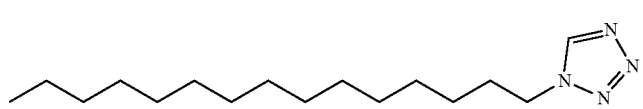 [SMILES: CCCCCCCCCCCCCCCn1cnnn1]
1-pentadecyl-1H-tetrazole |
| 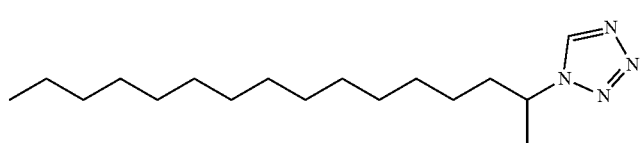 [SMILES: CCCCCCCCCCCCCCC(C)n1cnnn1]
1-(hexadecan-2-yl)-1H-tetrazole |

| Pentadecanoic Acid Analogs |
|---|
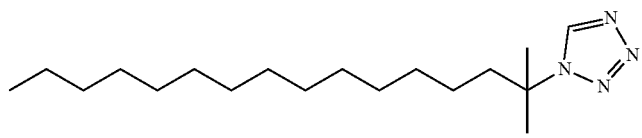 [SMILES: CCCCCCCCCCCCCCC(C)(C)n1cnnn1]
1-(2-methylhexadecan-2-yl)-1H-tetrazole
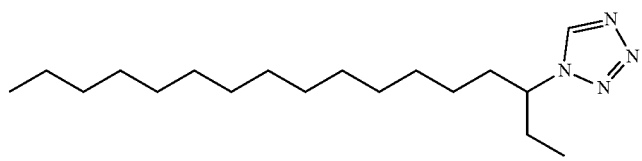 [SMILES: CCCCCCCCCCCCCCC(CC)n1cnnn1]
1-(heptadecan-3-yl)-1H-tetrazole
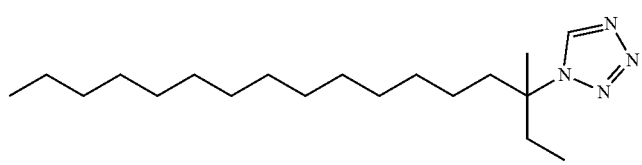 [SMILES: CCCCCCCCCCCCCCC(C)(CC)n1cnnn1]
1-(3-methylheptadecan-3-yl)-1H-tetrazole
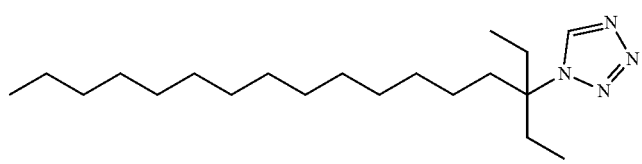 [SMILES: CCCCCCCCCCCCCCC(CC)(CC)n1cnnn1]
1-(3-ethylheptadecan-3-yl)-1H-tetrazole
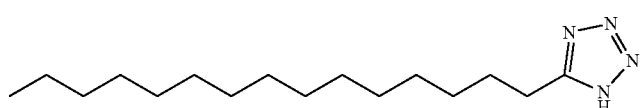
5-pentadecyl-1H-tetrazole
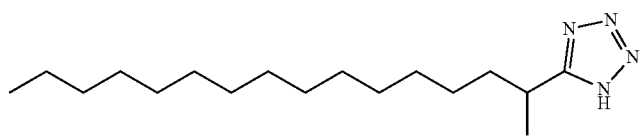 [SMILES: CCCCCCCCCCCCCCC(C)c1nnn[nH]1]
5-(hexadecan-2-yl)-1H-tetrazole
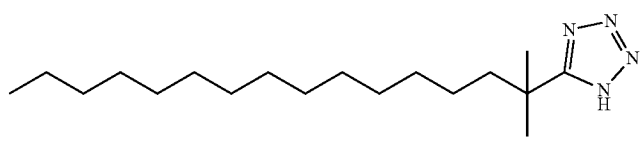 [SMILES: CCCCCCCCCCCCCCC(C)(C)c1nnn[nH]1]
5-(2-methylhexadecan-2-yl)-1H-tetrazole
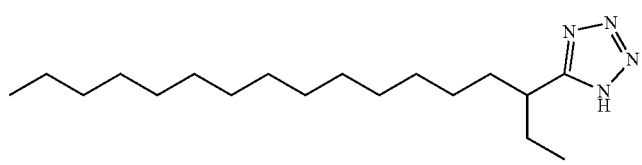 [SMILES: CCCCCCCCCCCCCCC(CC)c1nnn[nH]1]
5-(heptadecan-3-yl)-1H-tetrazole

| Pentadecanoic Acid Analogs |
|---|
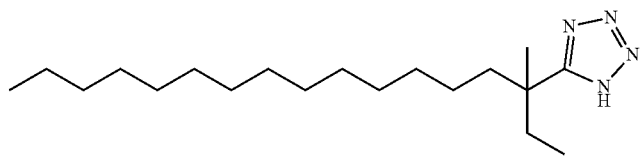 [SMILES: CCCCCCCCCCCCCCC(C)(CC)c1nnn[nH]1]
5-(3-methylheptadecan-3-yl)-1H-tetrazole
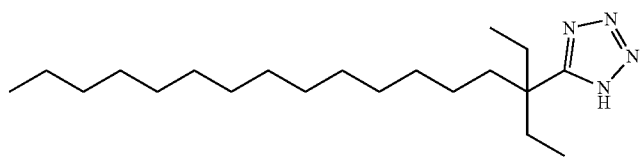 [SMILES: CCCCCCCCCCCCCCC(CC)(CC)c1nnn[nH]1]
5-(3-ethylheptadecan-3-yl)-1H-tetrazole
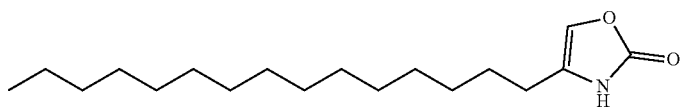 [SMILES: CCCCCCCCCCCCCCCc1coc(=O)[nH]1]
4-pentadecyloxazol-2(3H)-one
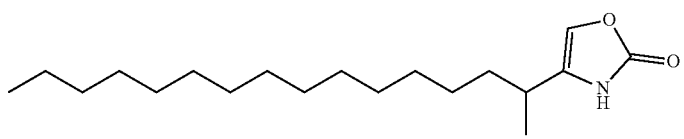 [SMILES: CCCCCCCCCCCCCCC(C)c1coc(=O)[nH]1]
4-(hexadecan-2-yl)oxazol-2(3H)-one
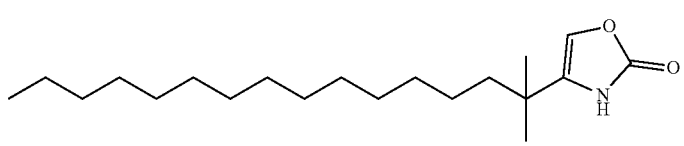 [SMILES: CCCCCCCCCCCCCCC(C)(C)c1coc(=O)[nH]1]
4-(2-methylhexadecan-2-yl)oxazol-2(3H)-one
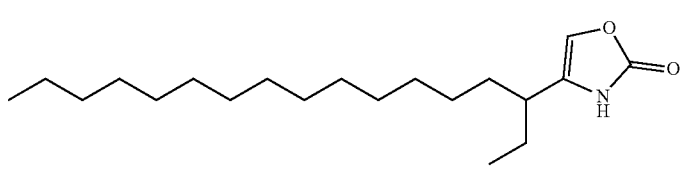 [SMILES: CCCCCCCCCCCCCCC(CC)c1coc(=O)[nH]1]
4-(heptadecan-3-yl)oxazol-2(3H)-one
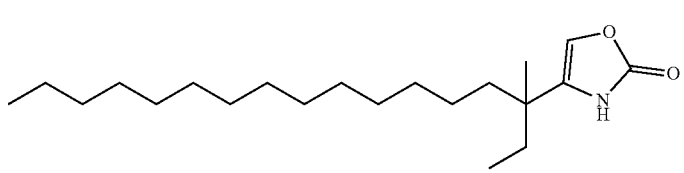 [SMILES: CCCCCCCCCCCCCCC(C)(CC)c1coc(=O)[nH]1]
4-(3-methylheptadecan-3-yl)oxazol-2(3H)-one
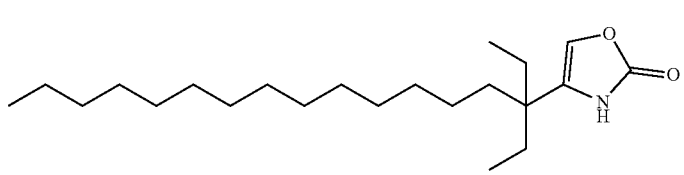
4-(3-ethylheptadecan-3-yl)oxazol-2(3H)-one

| Pentadecanoic Acid Analogs |
|---|
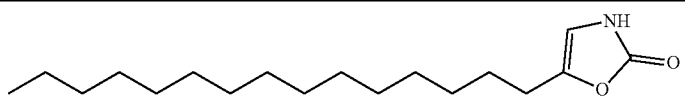
5-pentadecyloxazol-2(3H)-one
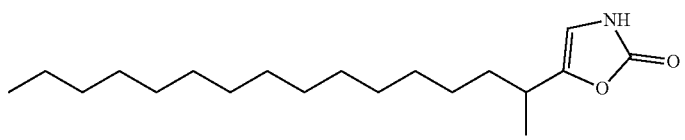 [SMILES: CCCCCCCCCCCCCCC(C)c1c[nH]c(=O)o1]
5-(hexadecan-2-yl)oxazol-2(3H)-one
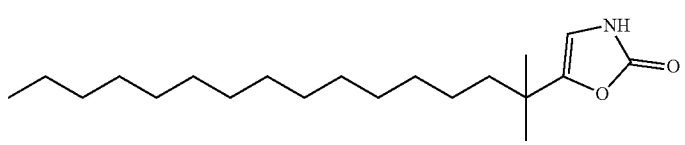 [SMILES: CCCCCCCCCCCCCCC(C)(C)c1c[nH]c(=O)o1]
5-(2-methylhexadecan-2-yl)oxazol-2(3H)-one
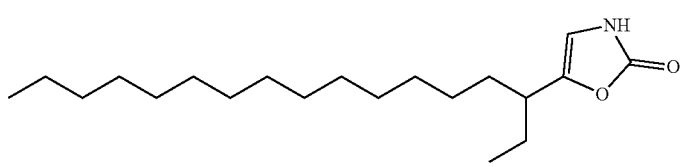
5-(heptadecan-3-yl)oxazol-2(3H)-one
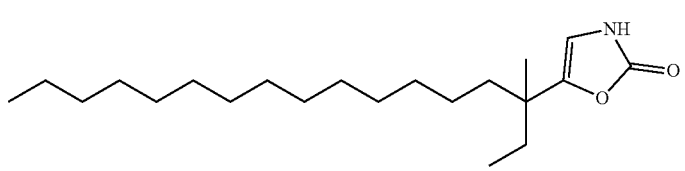 [SMILES: CCCCCCCCCCCCCCC(C)(CC)c1c[nH]c(=O)o1]
5-(3-methylheptadecan-3-yl)oxazol-2(3H)-one
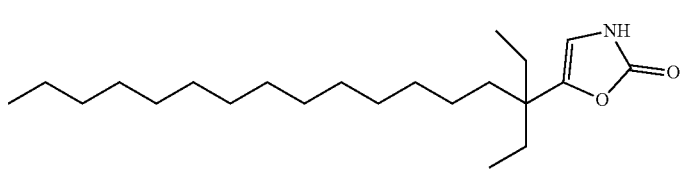 [SMILES: CCCCCCCCCCCCCCC(CC)(CC)c1c[nH]c(=O)o1]
5-(3-ethylheptadecan-3-yl)oxazol-2(3H)-one
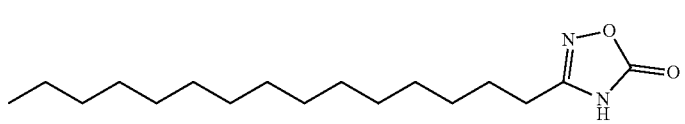 [SMILES: CCCCCCCCCCCCCCCc1noc(=O)[nH]1]
3-pentadecyl-1,2,4-oxadiazol-5(4H)-one
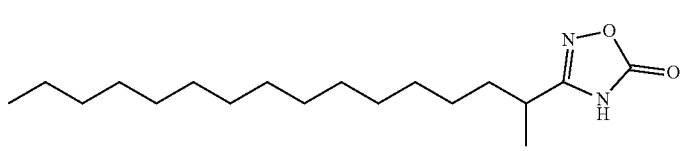 [SMILES: CCCCCCCCCCCCCCC(C)c1noc(=O)[nH]1]
3-(hexadecan-2-yl)-1,2,4-oxadiazol-5(4H)-one

| Pentadecanoic Acid Analogs |
|---|
| 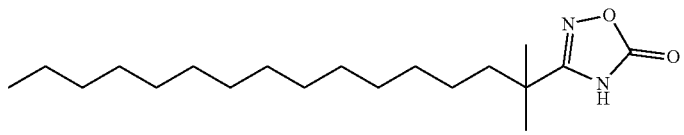
3-(2-methylhexadecan-2-yl)-1,2,4-oxadiazol-5(4H)-one |
| 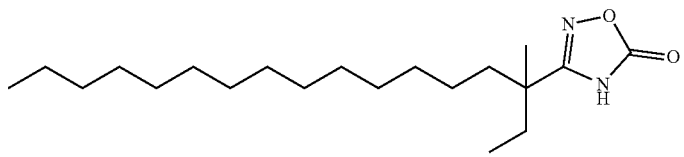
3-(3-methylheptadecan-3-yl)-1,2,4-oxadiazol-5(4H)-one |
| 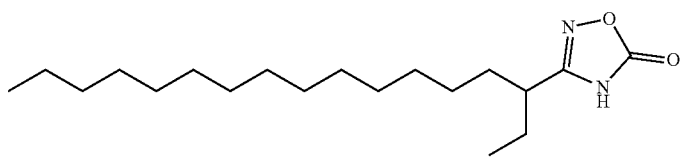 [SMILES: CCCCCCCCCCCCCCC(CC)c1noc(=O)[nH]1]
3-(heptadecan-3-yl)-1,2,4-oxadiazol-5(4H)-one |
| 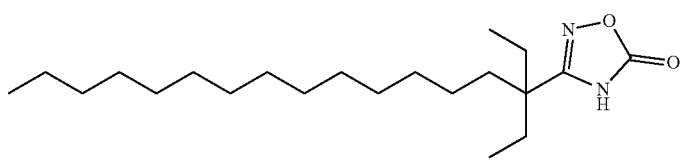 [SMILES: CCCCCCCCCCCCCCC(CC)(CC)c1noc(=O)[nH]1]
3-(3-ethylheptadecan-3-yl)-1,2,4-oxadiazol-5(4H)-one |
| 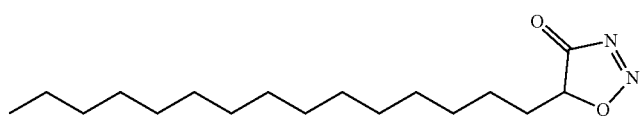 [SMILES: CCCCCCCCCCCCCCCC1ON=NC1=O]
5-pentadecyl-1,2,3-oxadiazol-4(5H)-one |
| 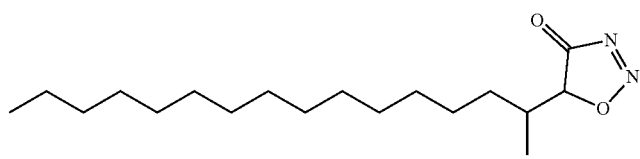 [SMILES: CCCCCCCCCCCCCCC(C)C1ON=NC1=O]
5-(hexadecan-2-yl)-1,2,3-oxadiazol-4(5H)-one |
| 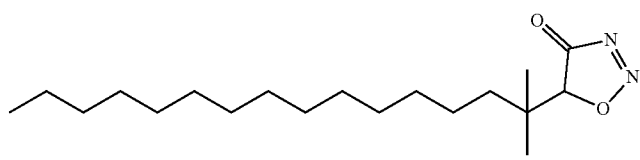 [SMILES: CCCCCCCCCCCCCCC(C)(C)C1ON=NC1=O]
5-(2-methylhexadecan-2-yl)-1,2,3-oxadiazol-4(5H)-one |
| 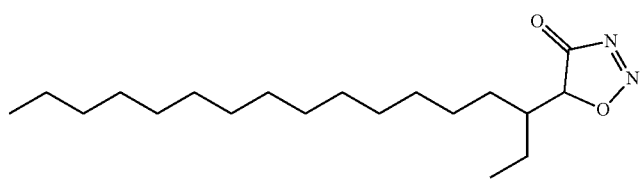 [SMILES: CCCCCCCCCCCCCCC(CC)C1ON=NC1=O]
5-(heptadecan-3-yl)-1,2,3-oxadiazol-4(5H)-one |

| Pentadecanoic Acid Analogs |
|---|
| 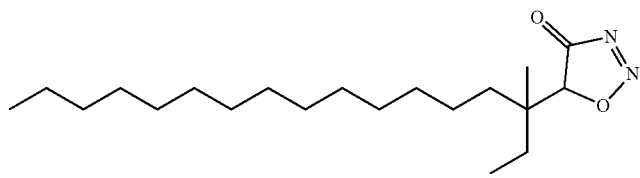 [SMILES: CCCCCCCCCCCCCCC(C)(CC)C1ON=NC1=O] 5-(3-methylheptadecan-3-yl)-1,2,3-oxadiazol-4(5H)-one |
| 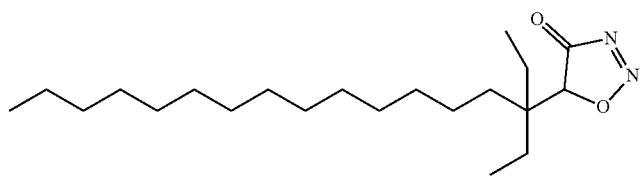 [SMILES: CCCCCCCCCCCCCCC(CC)(CC)C1ON=NC1=O] 5-(3-ethylheptadecan-3-yl)-1,2,3-oxadiazol-4(5H)-one |
| 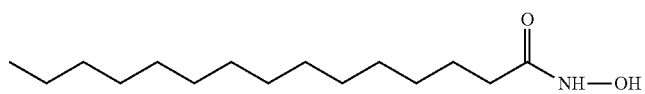 [SMILES: CCCCCCCCCCCCCCC(=O)NO] N-hydroxypentadecanamide |
| 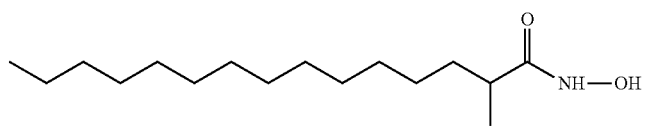 [SMILES: CCCCCCCCCCCCCC(C)C(=O)NO] N-hydroxy-2-methylpentadecanamide |
| 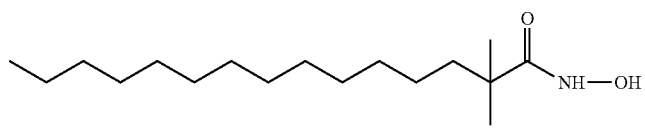 [SMILES: CCCCCCCCCCCCCC(C)(C)C(=O)NO] N-hydroxy-2,2-dimethylpentadecanamide |
| 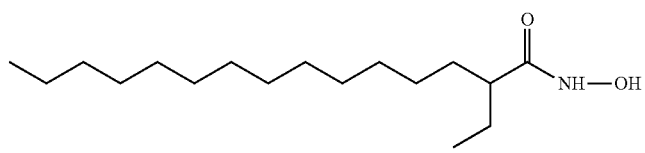 [SMILES: CCCCCCCCCCCCCC(CC)C(=O)NO] 2-ethyl-N-hydroxypentadecanamide |
| 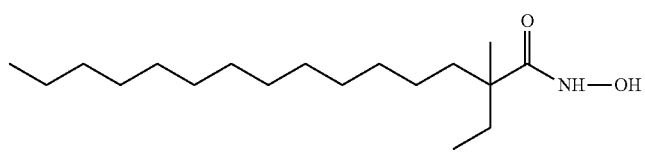 [SMILES: CCCCCCCCCCCCCC(C)(CC)C(=O)NO] 2-ethyl-N-hydroxy-2-methylpentadecanamide |
| 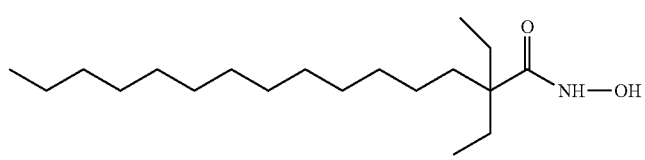 [SMILES: CCCCCCCCCCCCCC(CC)(CC)C(=O)NO] 2,2-diethyl-N-hydroxypentadecanamide |

| Pentadecanoic Acid Analogs |
|---|
| 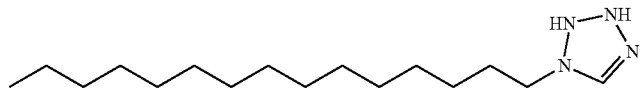 [SMILES: CCCCCCCCCCCCCCCN1C=NNN1] |
| 1-pentadecyl-2,3-dihydro-1H-tetrazole |
| 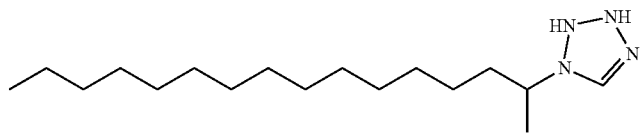 [SMILES: CCCCCCCCCCCCCCC(C)N1C=NNN1] |
| 1-(hexadecan-2-yl)-2,3-dihydro-1H-tetrazole |
| 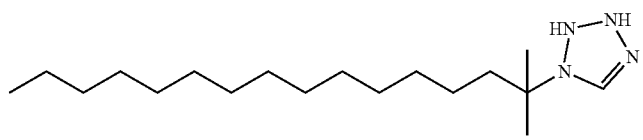 [SMILES: CCCCCCCCCCCCCCC(C)(C)N1C=NNN1] |
| 1-(2-methylhexadecan-2-yl)-2,3-dihydro-1H-tetrazole |
| 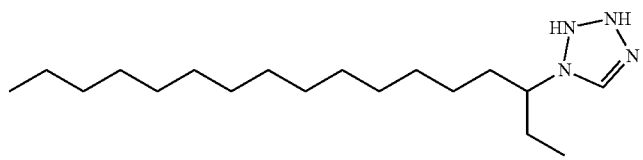 [SMILES: CCCCCCCCCCCCCCC(CC)N1C=NNN1] |
| 1-(heptadecan-3-yl)-2,3-dihydro-1H-tetrazole |
| 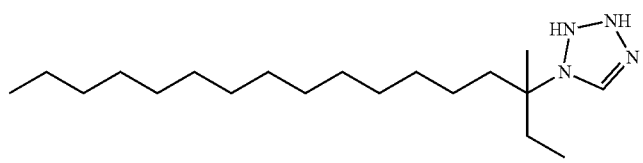 [SMILES: CCCCCCCCCCCCCCC(C)(CC)N1C=NNN1] |
| 1-(3-methylheptadecan-3-yl)-2,3-dihydro-1H-tetrazole |
| 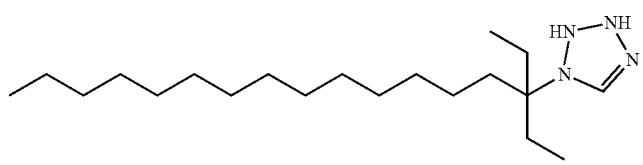 [SMILES: CCCCCCCCCCCCCCC(CC)(CC)N1C=NNN1] |
| 1-(3-ethylheptadecan-3-yl)-2,3-dihydro-1H-tetrazole |
| 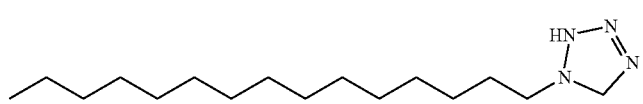 [SMILES: CCCCCCCCCCCCCCCN1CN=NN1] |
| 1-pentadecyl-2,5-dihydro-1H-tetrazole |
| 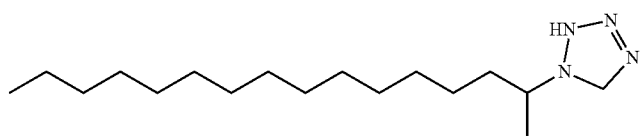 [SMILES: CCCCCCCCCCCCCCC(C)N1CN=NN1] |
| 1-(hexadecan-2-yl)-2,5-dihydro-1H-tetrazole |

| Pentadecanoic Acid Analogs |
|---|
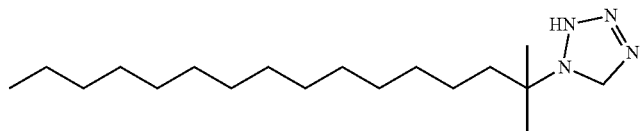 [SMILES: CCCCCCCCCCCCCCC(C)(C)N1CN=NN1]
1-(2-methylhexadecan-2-yl)-2,5-dihydro-1H-tetrazole
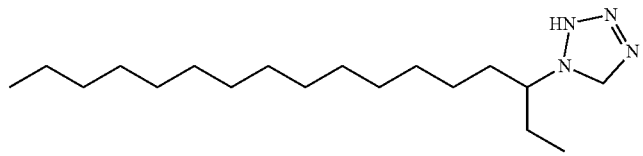 [SMILES: CCCCCCCCCCCCCCC(CC)N1CN=NN1]
1-(heptadecan-3-yl)-2,5-dihydro-1H-tetrazole
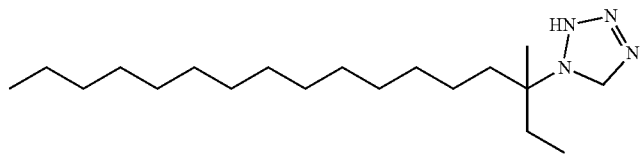 [SMILES: CCCCCCCCCCCCCCC(C)(CC)N1CN=NN1]
1-(3-methylheptadecan-3-yl)-2,5-dihydro-1H-tetrazole
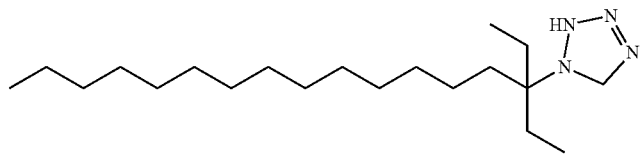 [SMILES: CCCCCCCCCCCCCCC(CC)(CC)N1CN=NN1]
1-(3-ethylheptadecan-3-yl)-2,5-dihydro-1H-tetrazole
| Myristic Acid Analogs |
|---|
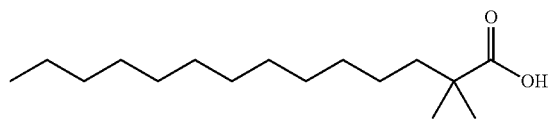 [SMILES: CCCCCCCCCCCCC(C)(C)C(=O)O]
2,2-dimethyltetradecanoic acid
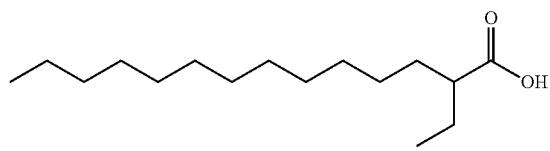 [SMILES: CCCCCCCCCCCCC(CC)C(=O)O]
2-ethyltetradecanoic acid
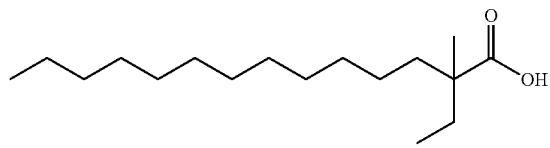 [SMILES: CCCCCCCCCCCCC(C)(CC)C(=O)O]
2-ethyl-2-methyltetradecanoic acid

| Myristic Acid Analogs |
|---|
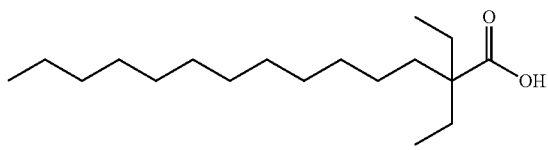 [SMILES: CCCCCCCCCCCCC(CC)(CC)C(=O)O]
2,2-diethyltetradecanoic acid
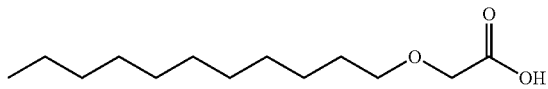 [SMILES: CCCCCCCCCCCOCC(=O)O]
2-(undecyloxy)acetic acid
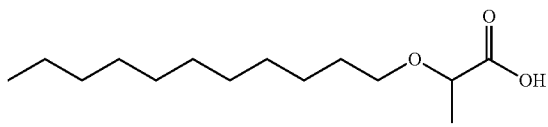 [SMILES: CCCCCCCCCCCOC(C)C(=O)O]
2-(undecyloxy)propanoic acid
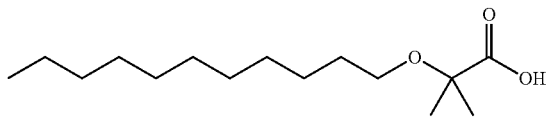 [SMILES: CCCCCCCCCCCOC(C)(C)C(=O)O]
2-methyl-2-(undecyloxy)propanoic acid
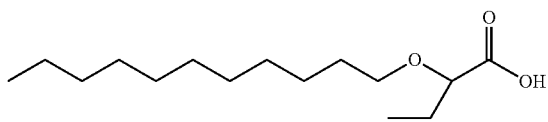 [SMILES: CCCCCCCCCCCOC(CC)C(=O)O]
2-(undecyloxy)butanoic acid
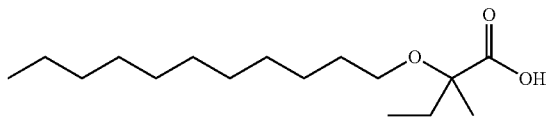 [SMILES: CCCCCCCCCCCOC(C)(CC)C(=O)O]
2-methyl-2-(undecyloxy)butanoic acid
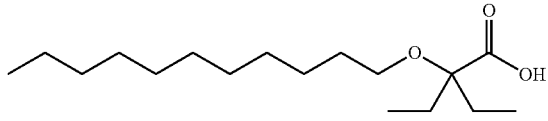 [SMILES: CCCCCCCCCCCOC(CC)(CC)C(=O)O]
2-ethyl-2-(undecyloxy)butanoic acid
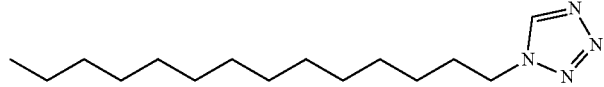 [SMILES: CCCCCCCCCCCCCCn1cnnn1]
1-tetradecyl-1H-tetrazole
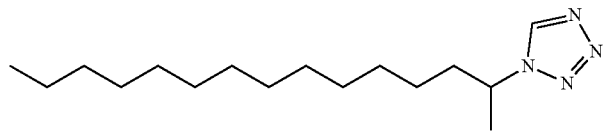 [SMILES: CCCCCCCCCCCCCC(C)n1cnnn1]
1-(pentadecan-2-yl)-1H-tetrazole

| Myristic Acid Analogs |
|---|
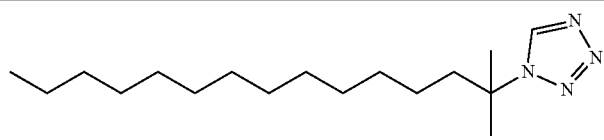 [SMILES: CCCCCCCCCCCCCC(C)(C)n1cnnn1]
1-(2-methylpentadecan-2-yl)-1H-tetrazole
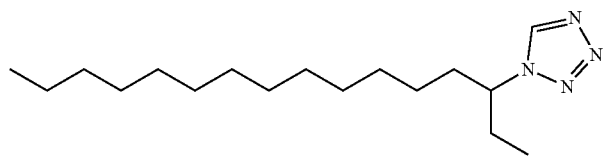 [SMILES: CCCCCCCCCCCCCC(CC)n1cnnn1]
1-(hexadecan-3-yl)-1H-tetrazole
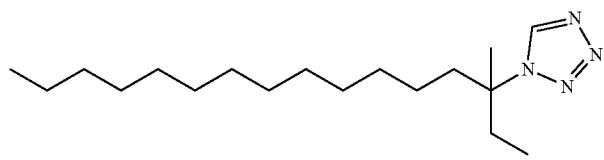
1-(3-methylhexadecan-3-yl)-1H-tetrazole
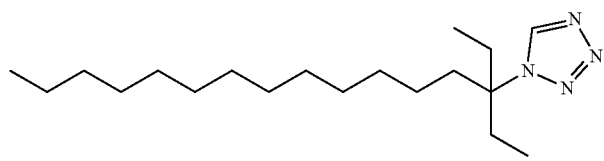 [SMILES: CCCCCCCCCCCCCC(CC)(CC)n1cnnn1]
1-(3-ethylhexadecan-3-yl)-1H-tetrazole
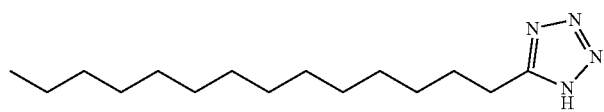 [SMILES: CCCCCCCCCCCCCCc1nnn[nH]1]
5-tetradecyl-1H-tetrazole
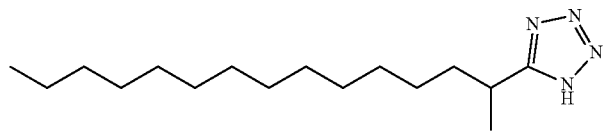 [SMILES: CCCCCCCCCCCCCC(C)c1nnn[nH]1]
5-(pentadecan-2-yl)-1H-tetrazole
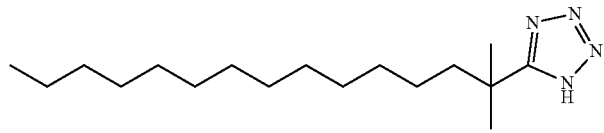 [SMILES: CCCCCCCCCCCCCC(C)(C)c1nnn[nH]1]
5-(2-methylpentadecan-2-yl)-1H-tetrazole
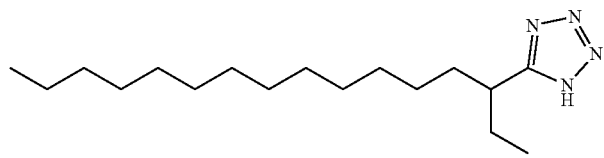 [SMILES: CCCCCCCCCCCCCC(CC)c1nnn[nH]1]
5-(hexadecan-3-yl)-1H-tetrazole

| Myristic Acid Analogs |
|---|
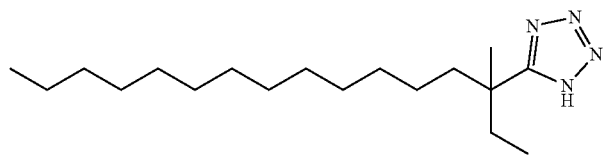 [SMILES: CCCCCCCCCCCCCC(C)(CC)c1nnn[nH]1]
5-(3-methylhexadecan-3-yl)-1H-tetrazole
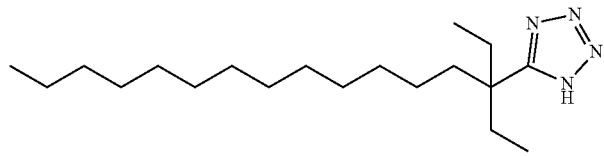 [SMILES: CCCCCCCCCCCCCC(CC)(CC)c1nnn[nH]1]
5-(3-ethylhexadecan-3-yl)-1H-tetrazole
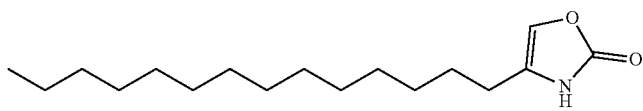 [SMILES: CCCCCCCCCCCCCCc1coc(=O)[nH]1]
4-tetradecyloxazol-2(3H)-one
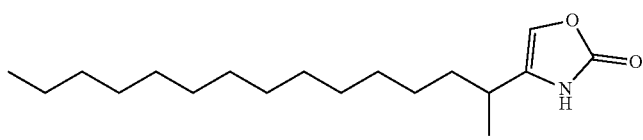 [SMILES: CCCCCCCCCCCCCC(C)c1coc(=O)[nH]1]
4-(pentadecan-2-yl)oxazol-2(3H)-one
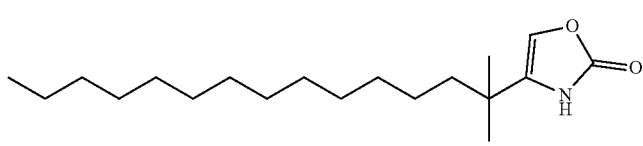 [SMILES: CCCCCCCCCCCCCC(C)(C)c1coc(=O)[nH]1]
4-(2-methylpentadecan-2-yl)oxazol-2(3H)-one
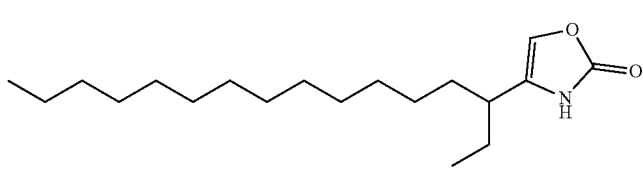 [SMILES: CCCCCCCCCCCCCC(CC)c1coc(=O)[nH]1]
4-(hexadecan-3-yl)oxazol-2(3H)-one
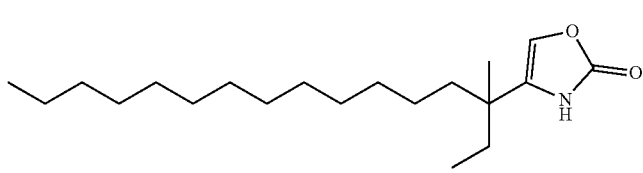 [SMILES: CCCCCCCCCCCCCC(C)(CC)c1coc(=O)[nH]1]
4-(3-methylhexadecan-3-yl)oxazol-2(3H)-one
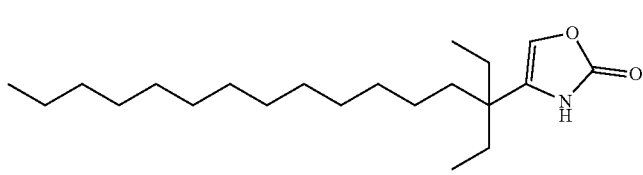 [SMILES: CCCCCCCCCCCCCC(CC)(CC)c1coc(=O)[nH]1]
4-(3-ethylhexadecan-3-yl)oxazol-2(3H)-one

| Myristic Acid Analogs |
|---|
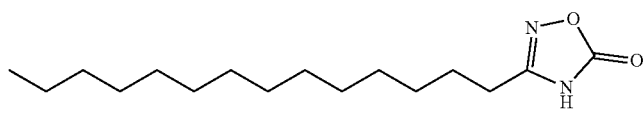 [SMILES: CCCCCCCCCCCCCCc1noc(=O)[nH]1]
3-tetradecyl-1,2,4-oxadiazol-5(4H)-one
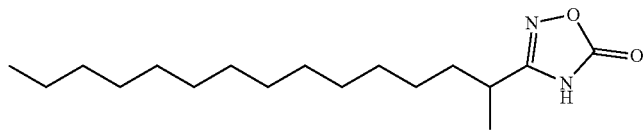 [SMILES: CCCCCCCCCCCCCC(C)c1noc(=O)[nH]1]
3-(pentadecan-2-yl)-1,2,4-oxadiazol-5(4H)-one
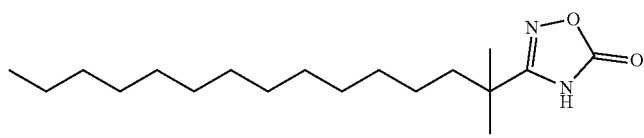 [SMILES: CCCCCCCCCCCCCC(C)(C)c1noc(=O)[nH]1]
3-(2-methylpentadecan-2-yl)-1,2,4-oxadiazol-5(4H)-one
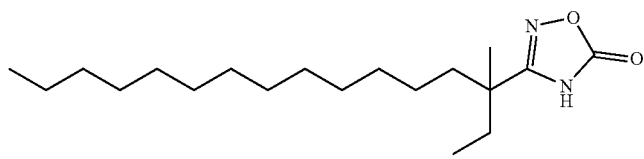 [SMILES: CCCCCCCCCCCCCC(C)(CC)c1noc(=O)[nH]1]
3-(3-methylhexadecan-3-yl)-1,2,4-oxadiazol-5(4H)-one
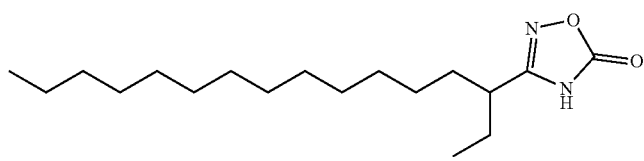 [SMILES: CCCCCCCCCCCCCC(CC)c1noc(=O)[nH]1]
3-(hexadecan-3-yl)-1,2,4-oxadiazol-5(4H)-one
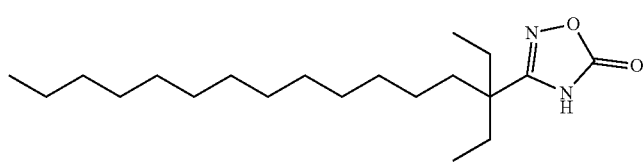 [SMILES: CCCCCCCCCCCCCC(CC)(CC)c1noc(=O)[nH]1]
3-(3-ethylhexadecan-3-yl)-1,2,4-oxadiazol-5(4H)-one
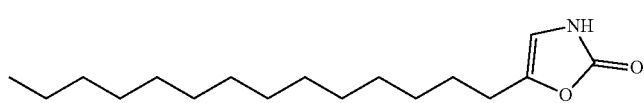 [SMILES: CCCCCCCCCCCCCCc1c[nH]c(=O)o1]
5-tetradecyloxazol-2(3H)-one
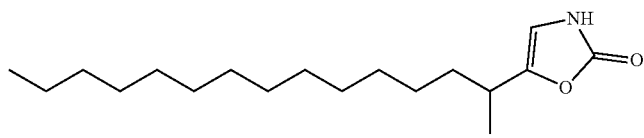 [SMILES: CCCCCCCCCCCCCC(C)c1c[nH]c(=O)o1]
5-(pentadecan-2-yl)oxazol-2(3H)-one

| Myristic Acid Analogs |
|---|
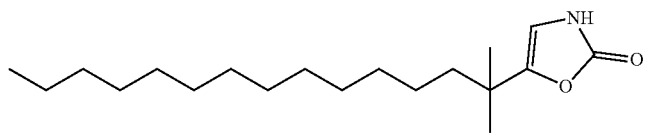 [SMILES: CCCCCCCCCCCCCC(C)(C)c1c[nH]c(=O)o1]
5-(2-methylpentadecan-2-yl)oxazol-2(3H)-one
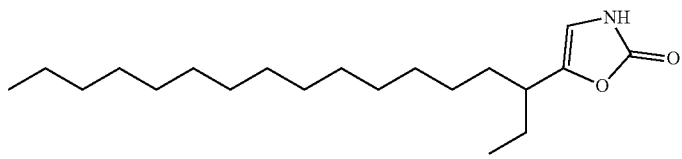
5-(heptadecan-3-yl)oxazol-2(3H)-one
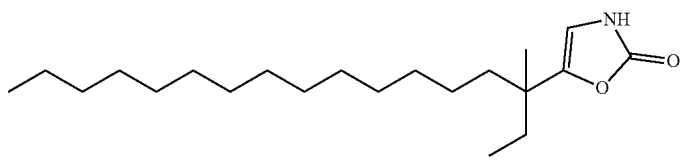
5-(3-methylheptadecan-3-yl)oxazol-2(3H)-one
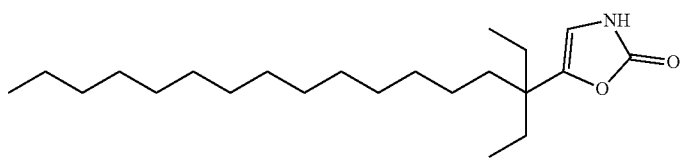 [SMILES: CCCCCCCCCCCCCCC(CC)(CC)c1c[nH]c(=O)o1]
5-(3-ethylheptadecan-3-yl)oxazol-2(3H)-one
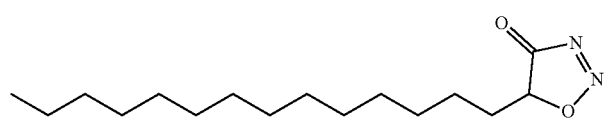 [SMILES: CCCCCCCCCCCCCCC1ON=NC1=O]
5-tetradecyl-1,2,3-oxadiazol-4(5H)-one
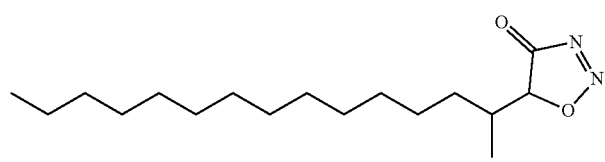 [SMILES: CCCCCCCCCCCCCC(C)C1ON=NC1=O]
5-(pentadecan-2-yl)-1,2,3-oxadiazol-4(5H)-one
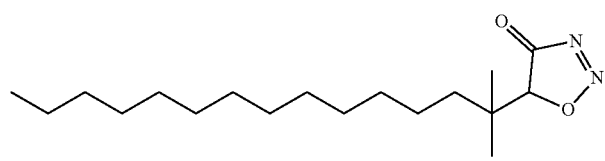 [SMILES: CCCCCCCCCCCCCC(C)(C)C1ON=NC1=O]
5-(2-methylpentadecan-2-yl)-1,2,3-oxadiazol-4(5H)-one
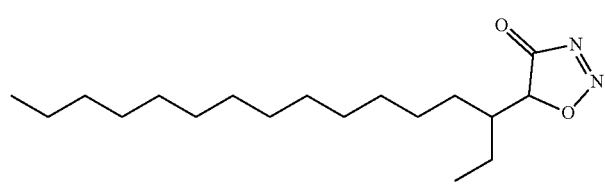 [SMILES: CCCCCCCCCCCCCC(CC)C1ON=NC1=O]
5-(hexadecan-3-yl)-1,2,3-oxadiazol-4(5H)-one

| Myristic Acid Analogs |
|---|
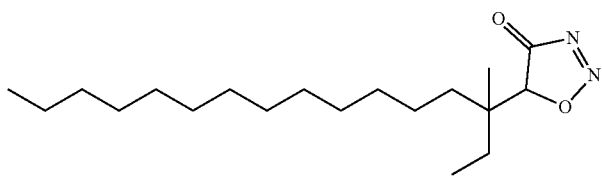 [SMILES: CCCCCCCCCCCCCC(C)(CC)C1ON=NC1=O]
5-(3-methylhexadecan-3-yl)-1,2,3-oxadiazol-4(5H)-one
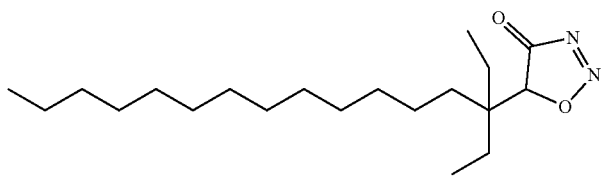 [SMILES: CCCCCCCCCCCCCC(CC)(CC)C1ON=NC1=O]
5-(3-ethylhexadecan-3-yl)-1,2,3-oxadiazol-4(5H)-one
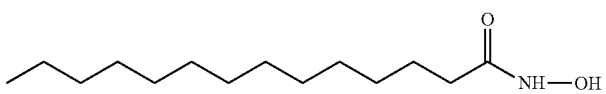 [SMILES: CCCCCCCCCCCCCC(=O)NO]
N-hydroxytetradecanamide
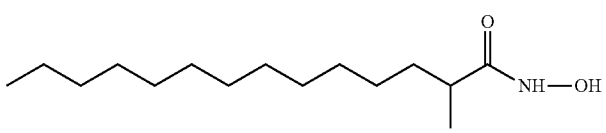 [SMILES: CCCCCCCCCCCCC(C)C(=O)NO]
N-hydroxy-2-methyltetradecanamide
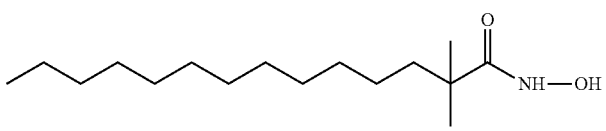 [SMILES: CCCCCCCCCCCCC(C)(C)C(=O)NO]
N-hydroxy-2,2-dimethyltetradecanamide
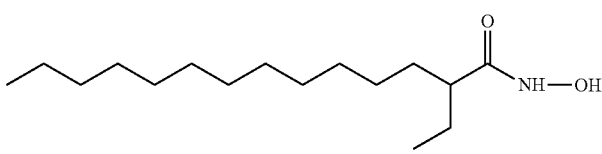 [SMILES: CCCCCCCCCCCCC(CC)C(=O)NO]
2-ethyl-N-hydroxytetradecanamide
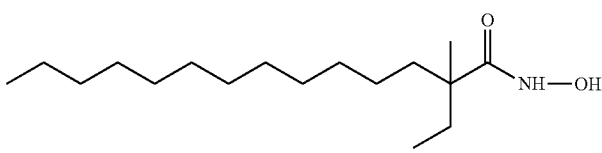 [SMILES: CCCCCCCCCCCCC(C)(CC)C(=O)NO]
2-ethyl-N-hydroxy-2-methyltetradecanamide
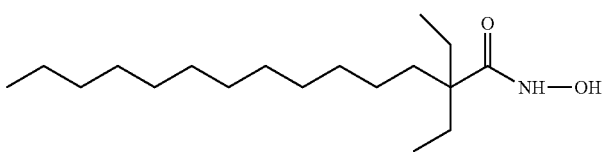 [SMILES: CCCCCCCCCCCCC(CC)(CC)C(=O)NO]
2,2-diethyl-N-hydroxytetradecanamide

| Myristic Acid Analogs |
|---|
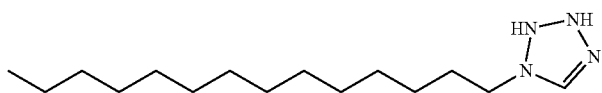 [SMILES: CCCCCCCCCCCCCCN1C=NNN1]
1-tetradecyl-2,3-dihydro-1H-tetrazole
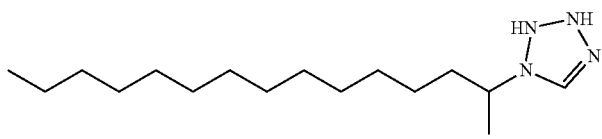 [SMILES: CCCCCCCCCCCCCC(C)N1C=NNN1]
1-(pentadecan-2-yl)-2,3-dihydro-1H-tetrazole
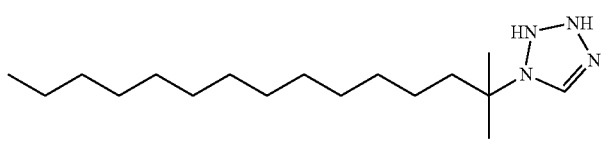 [SMILES: CCCCCCCCCCCCCC(C)(C)N1C=NNN1]
1-(2-methylpentadecan-2-yl)-2,3-dihydro-1H-tetrazole
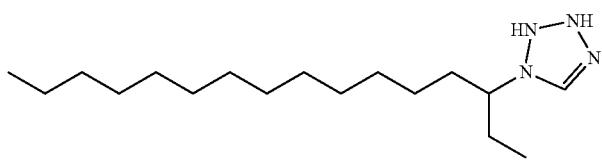 [SMILES: CCCCCCCCCCCCCC(CC)N1C=NNN1]
1-(hexadecan-3-yl)-2,3-dihydro-1H-tetrazole
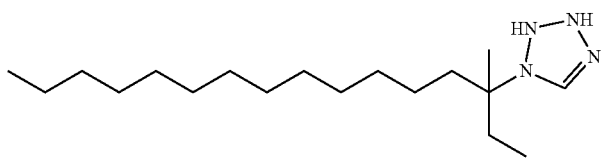 [SMILES: CCCCCCCCCCCCCC(C)(CC)N1C=NNN1]
1-(3-methylhexadecan-3-yl)-2,3-dihydro-1H-tetrazole
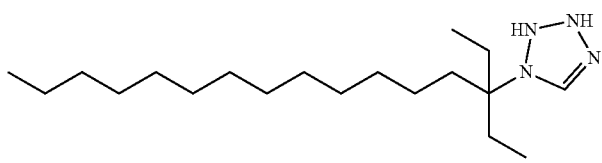 [SMILES: CCCCCCCCCCCCCC(CC)(CC)N1C=NNN1]
1-(3-ethylhexadecan-3-yl)-2,3-dihydro-1H-tetrazole
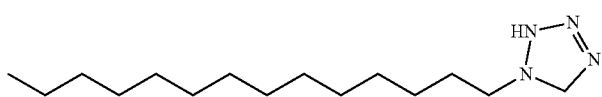 [SMILES: CCCCCCCCCCCCCCN1CN=NN1]
1-tetradecyl-2,5-dihydro-1H-tetrazole
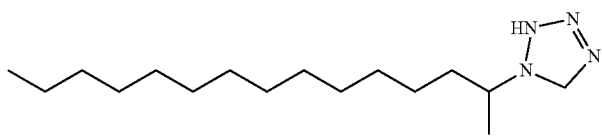 [SMILES: CCCCCCCCCCCCCC(C)N1CN=NN1]
1-(pentadecan-2-yl)-2,5-dihydro-1H-tetrazole

| Myristic Acid Analogs |
|---|
| 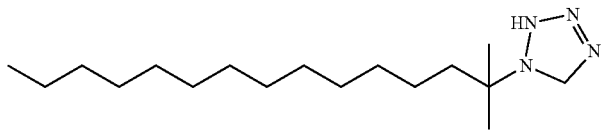 [SMILES: CCCCCCCCCCCCCC(C)(C)N1CN=NN1]<br>1-(2-methylpentadecan-2-yl)-2,5-dihydro-1H-tetrazole |
| 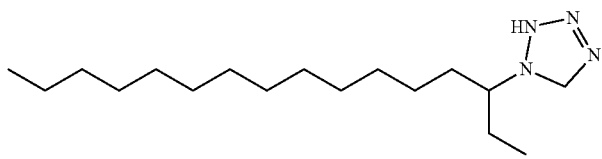 [SMILES: CCCCCCCCCCCCCC(CC)N1CN=NN1]<br>1-(hexadecan-3-yl)-2,5-dihydro-1H-tetrazole |
| 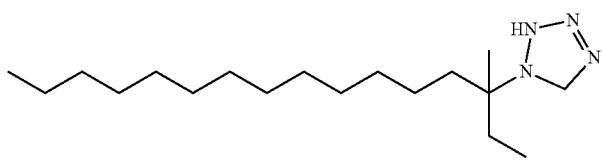 [SMILES: CCCCCCCCCCCCCC(C)(CC)N1CN=NN1]<br>1-(3-methylhexadecan-3-yl)-2,5-dihydro-1H-tetrazole |
| 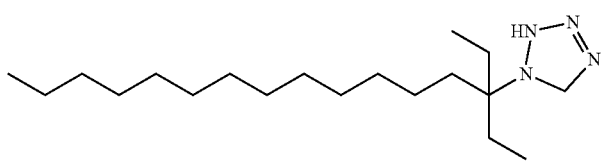 [SMILES: CCCCCCCCCCCCCC(CC)(CC)N1CN=NN1]<br>1-(3-ethylhexadecan-3-yl)-2,5-dihydro-1H-tetrazole |

| Tridecanoic Acid Analogs |
|---|
| 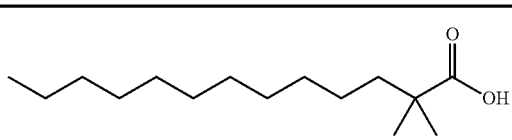<br>2,2-dimethyltridecanoic acid |
| 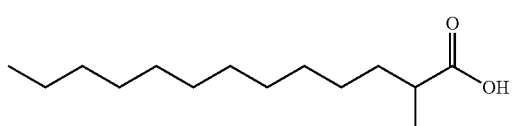 [SMILES: CCCCCCCCCCCC(C)(C)C(=O)O]<br>2-ethyltridecanoic acid |
| 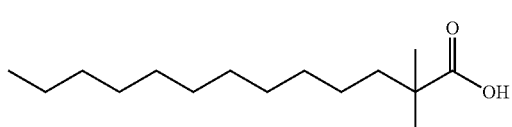<br>2-ethyl-2-methyltridecanoic acid |
| 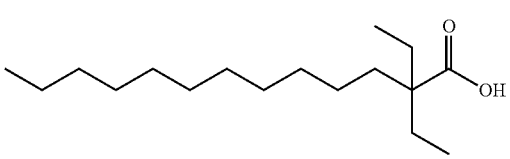 [SMILES: CCCCCCCCCCCC(CC)(CC)C(=O)O]<br>2,2-diethyltridecanoic acid |
| 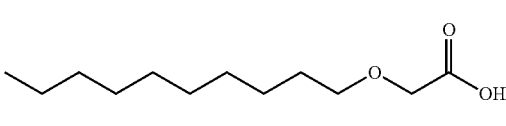<br>2-(decyloxy)acetic acid |
| 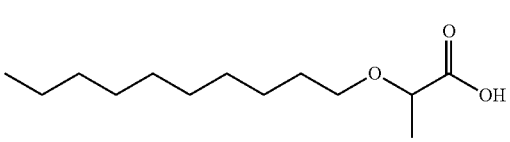 [SMILES: CCCCCCCCCCOC(C)C(=O)O]<br>2-(decyloxy)propanoic acid |

| Tridecanoic Acid Analogs |
|---|
| 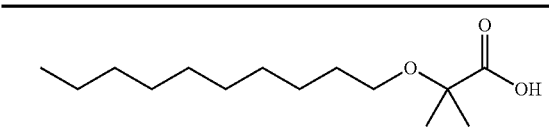
2-(decyloxy)-2-methylpropanoic acid |
| 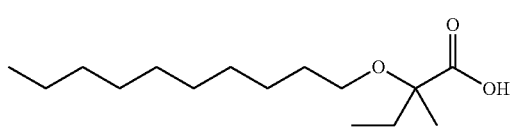 [SMILES: CCCCCCCCCCOC(C)(CC)C(=O)O]
2-(decyloxy)-2-methylbutanoic acid |
| 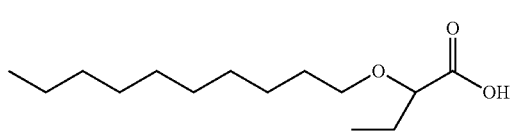 [SMILES: CCCCCCCCCCOC(CC)C(=O)O]
2-(decyloxy)butanoic acid |
| 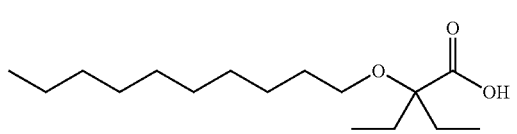 [SMILES: CCCCCCCCCCOC(CC)(CC)C(=O)O]
2-(decyloxy)-2-ethylbutanoic acid |
| 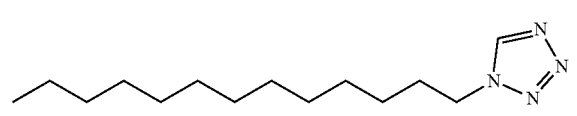 [SMILES: CCCCCCCCCCCCCn1cnnn1]
1-tridecyl-1H-tetrazole |
| 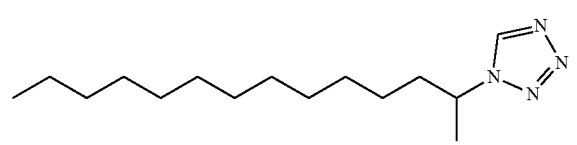 [SMILES: CCCCCCCCCCCCC(C)n1cnnn1]
1-(tetradecan-2-yl)-1H-tetrazole |
| 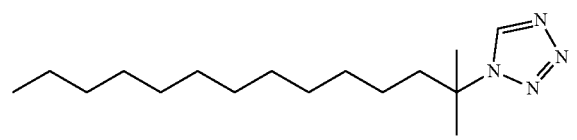 [SMILES: CCCCCCCCCCCCC(C)(C)n1cnnn1]
1-(2-methyltetradecan-2-yl)-1H-tetrazole |
| 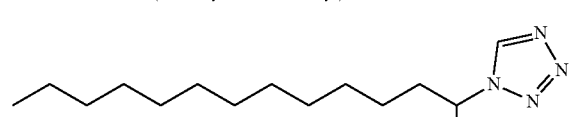
1-(pentadecan-3-yl)-1H-tetrazole |
| 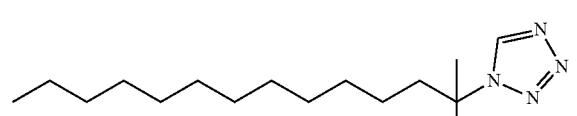
1-(3-methylpentadecan-3-yl)-1H-tetrazole |

| Tridecanoic Acid Analogs |
|---|
| 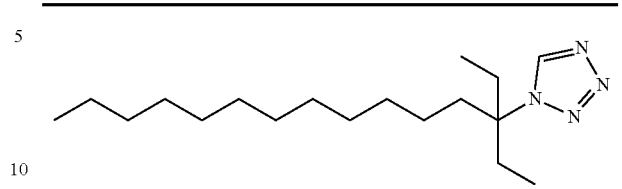
1-(3-ethylpentadecan-3-yl)-1H-tetrazole |
| 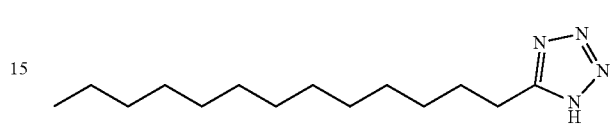
5-tridecyl-1H-tetrazole |
| 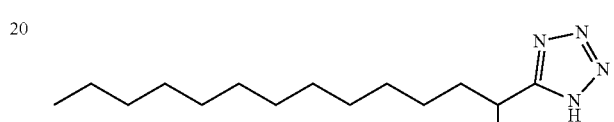
5-(tetradecan-2-yl)-1H-tetrazole |
| 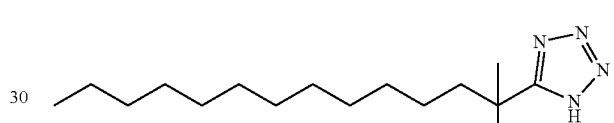
5-(2-methyltetradecan-2-yl)-1H-tetrazole |
| 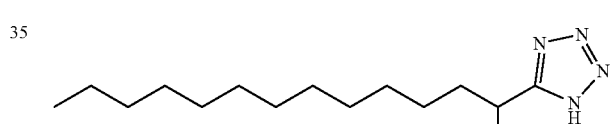
5-(pentadecan-3-yl)-1H-tetrazole |
| 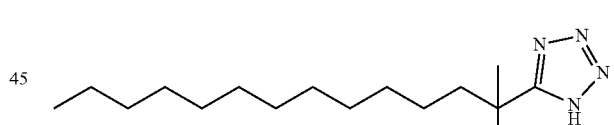
5-(3-methylpentadecan-3-yl)-1H-tetrazole |
| 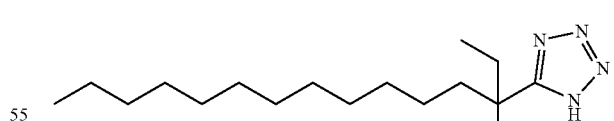
5-(3-ethylpentadecan-3-yl)-1H-tetrazole |
| 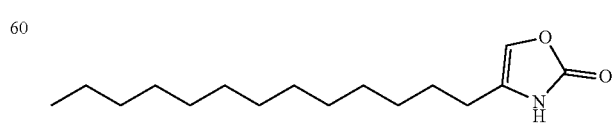
4-tridecyloxazol-2(3H)-one |

| Tridecanoic Acid Analogs |
|---|

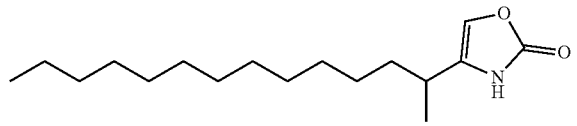 [SMILES: CCCCCCCCCCCCC(C)c1coc(=O)[nH]1]

4-(tetradecan-2-yl)oxazol-2(3H)-one

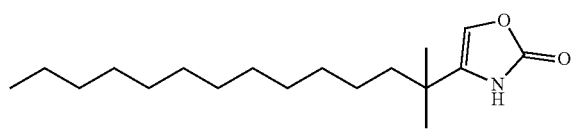 [SMILES: CCCCCCCCCCCCC(C)(C)c1coc(=O)[nH]1]

4-(2-methyltetradecan-2-yl)oxazol-2(3H)-one

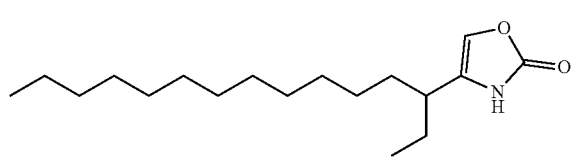 [SMILES: CCCCCCCCCCCCC(CC)c1coc(=O)[nH]1]

4-(pentadecan-3-yl)oxazol-2(3H)-one

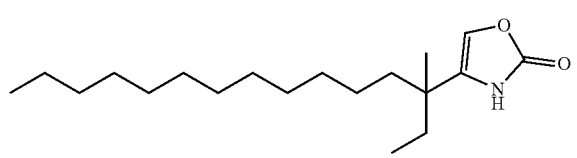 [SMILES: CCCCCCCCCCCCC(C)(CC)c1coc(=O)[nH]1]

4-(3-methylpentadecan-3-yl)oxazol-2(3H)-one

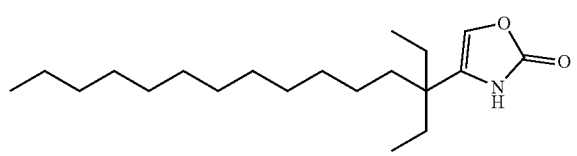 [SMILES: CCCCCCCCCCCCC(CC)(CC)c1coc(=O)[nH]1]

4-(3-ethylpentadecan-3-yl)oxazol-2(3H)-one

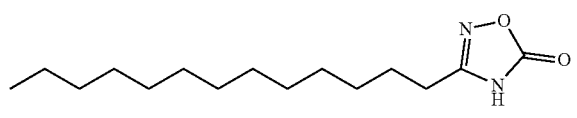 [SMILES: CCCCCCCCCCCCCc1noc(=O)[nH]1]

3-tridecyl-1,2,4-oxadiazol-5(4H)-one

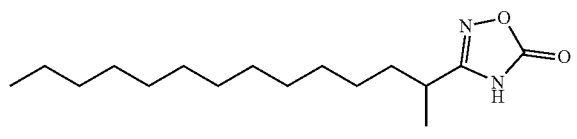

3-(tetradecan-2-yl)-1,2,4-oxadiazol-5(4H)-one

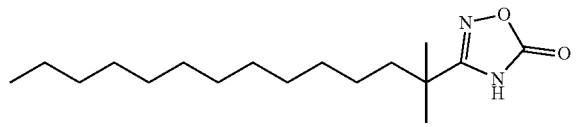 [SMILES: CCCCCCCCCCCCC(C)(C)c1noc(=O)[nH]1]

3-(2-methyltetradecan-2-yl)-1,2,4-oxadiazol-5(4H)-one

| Tridecanoic Acid Analogs |
|---|

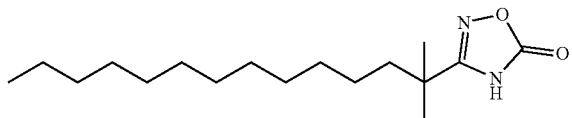

3-(3-methylpentadecan-3-yl)-1,2,4-oxadiazol-5(4H)-one

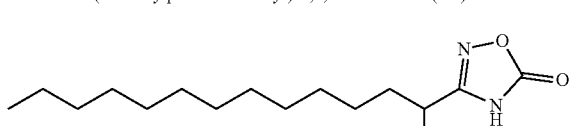

3-(pentadecan-3-yl)-1,2,4-oxadiazol-5(4H)-one

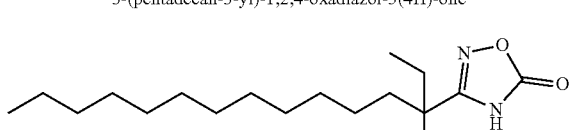

3-(3-ethylpentadecan-3-yl)-1,2,4-oxadiazol-5(4H)-one

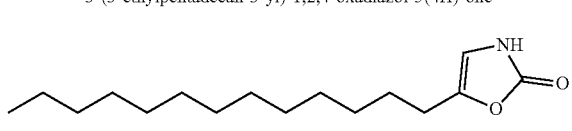

5-tridecyloxazol-2(3H)-one

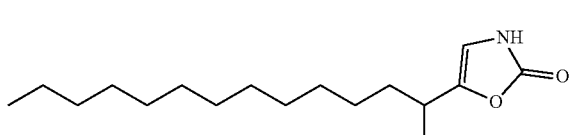

5-(tetradecan-2-yl)oxazol-2(3H)-one

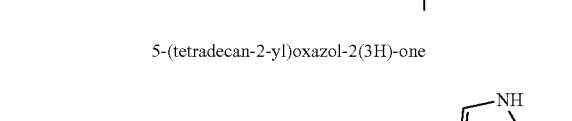

5-(2-methyltetradecan-2-yl)oxazol-2(3H)-one

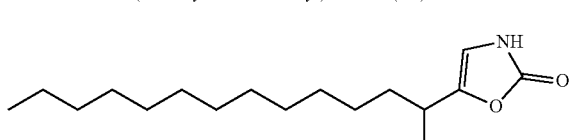

5-(pentadecan-3-yl)oxazol-2(3H)-one

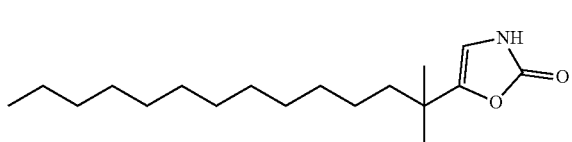

5-(3-methylpentadecan-3-yl)oxazol-2(3H)-one

| Tridecanoic Acid Analogs | Tridecanoic Acid Analogs |
|---|---|
| 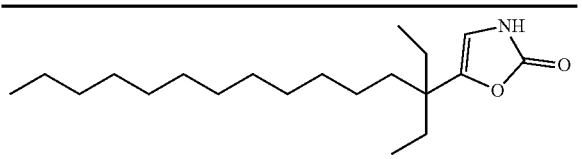<br>5-(3-ethylpentadecan-3-yl)oxazol-2(3H)-one | 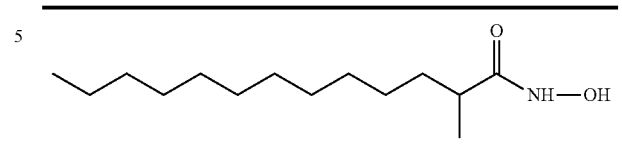<br>N-hydroxy-2-methyltridecanamide |
| 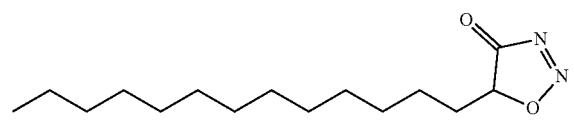 [SMILES: CCCCCCCCCCCCCC1ON=NC1=O]<br>5-tridecyl-1,2,3-oxadiazol-4(5H)-one | 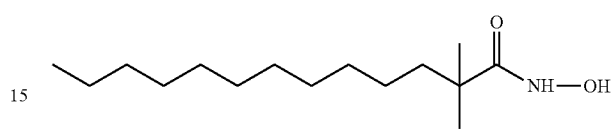<br>N-hydroxy-2,2-dimethyltridecanamide |
| 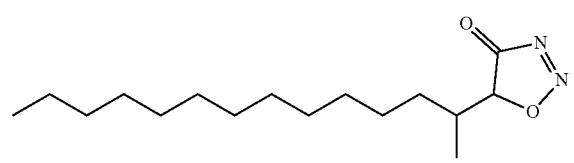 [SMILES: CCCCCCCCCCCCC(C)C1ON=NC1=O]<br>5-(tetradecan-2-yl)-1,2,3-oxadiazol-4(5H)-one | 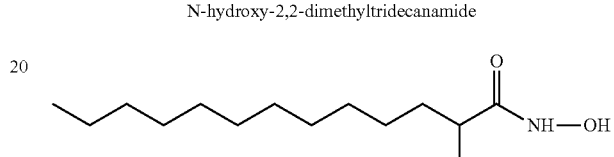<br>2-ethyl-N-hydroxytridecanamide |
| 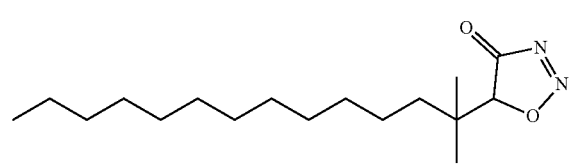 [SMILES: CCCCCCCCCCCCC(C)(C)C1ON=NC1=O]<br>5-(2-methyltetradecan-2-yl)-1,2,3-oxadiazol-4(5H)-one | 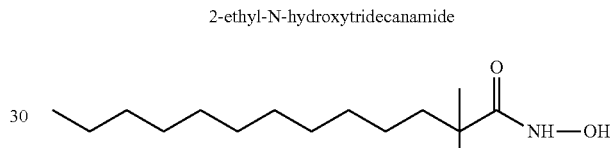<br>2-ethyl-N-hydroxy-2-methyltridecanamide |
| 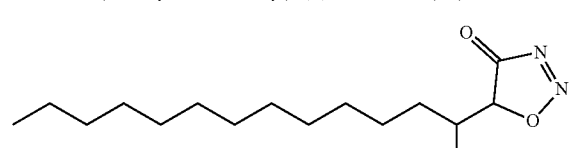<br>5-(pentadecan-3-yl)-1,2,3-oxadiazol-4(5H)-one | 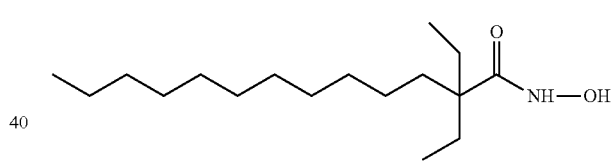<br>2,2-diethyl-N-hydroxytridecanamide |
| 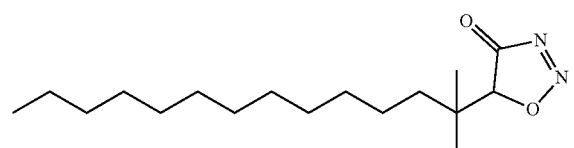<br>5-(3-methylpentadecan-3-yl)-1,2,3-oxadiazol-4(5H)-one | 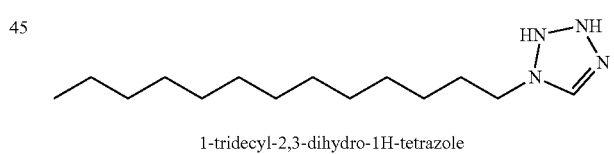<br>1-tridecyl-2,3-dihydro-1H-tetrazole |
| 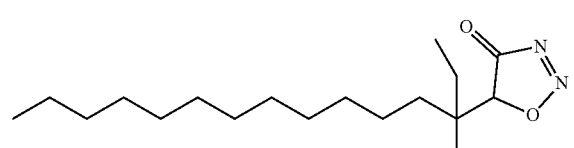<br>5-(3-ethylpentadecan-3-yl)-1,2,3-oxadiazol-4(5H)-one | 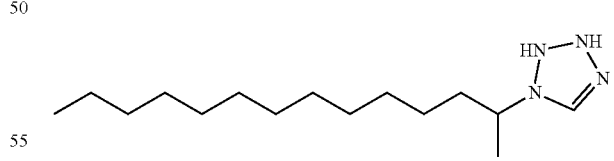<br>1-(tetradecan-2-yl)-2,3-dihydro-1H-tetrazole |
| 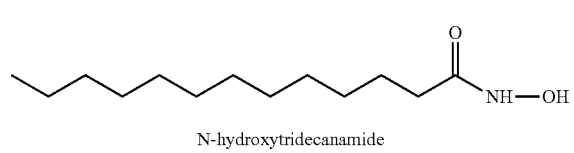<br>N-hydroxytridecanamide | 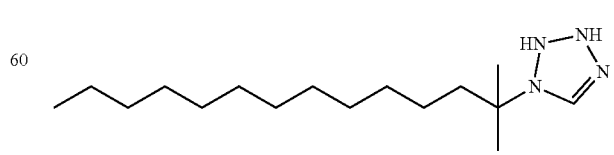<br>1-(2-methyltetradecan-2-yl)-2,3-dihydro-1H-tetrazole |

Tridecanoic Acid Analogs

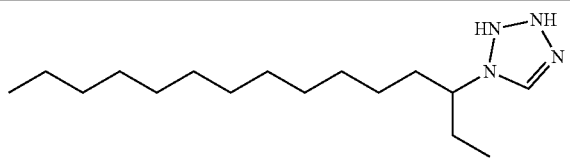 [SMILES: CCCCCCCCCCCCC(CC)N1C=NNN1]

1-(pentadecan-3-yl)-2,3-dihydro-1H-tetrazole

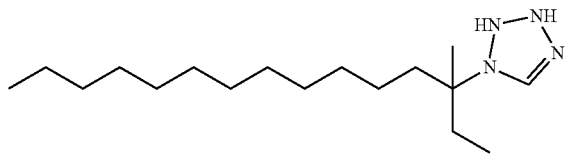 [SMILES: CCCCCCCCCCCCC(C)(CC)N1C=NNN1]

1-(3-methylpentadecan-3-yl)-2,3-dihydro-1H-tetrazole

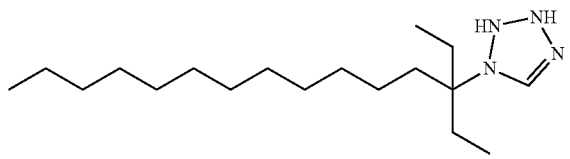 [SMILES: CCCCCCCCCCCCC(CC)(CC)N1C=NNN1]

1-(3-ethylpentadecan-3-yl)-2,3-dihydro-1H-tetrazole

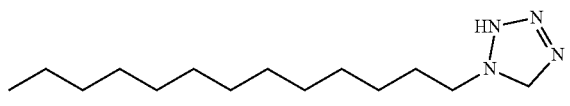 [SMILES: CCCCCCCCCCCCCN1CN=NN1]

1-tridecyl-2,5-dihydro-1H-tetrazole

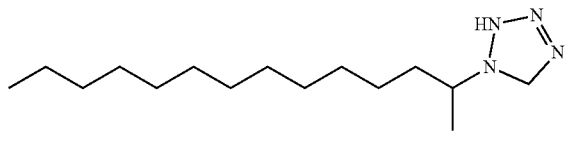 [SMILES: CCCCCCCCCCCCC(C)N1CN=NN1]

1-(tetradecan-2-yl)-2,5-dihydro-1H-tetrazole

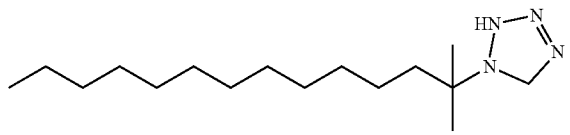 [SMILES: CCCCCCCCCCCCC(C)(C)N1CN=NN1]

1-(2-methyltetradecan-2-yl)-2,5-dihydro-1H-tetrazole

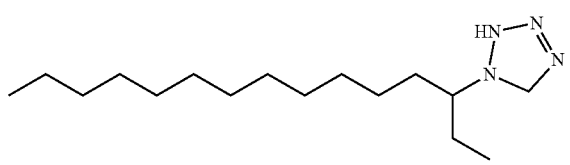 [SMILES: CCCCCCCCCCCCC(CC)N1CN=NN1]

1-(pentadecan-3-yl)-2,5-dihydro-1H-tetrazole

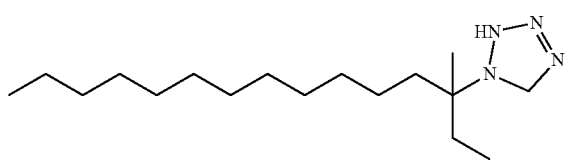 [SMILES: CCCCCCCCCCCCC(C)(CC)N1CN=NN1]

1-(3-methylpentadecan-3-yl)-2,5-dihydro-1H-tetrazole

Tridecanoic Acid Analogs

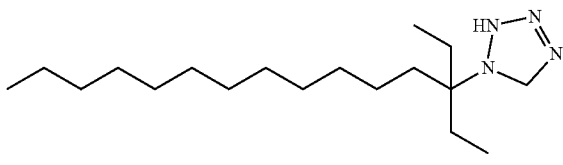 [SMILES: CCCCCCCCCCCCC(CC)(CC)N1CN=NN1]

1-(3-ethylpentadecan-3-yl)-2,5-dihydro-1H-tetrazole

Accordingly, in a generally applicable third aspect (i.e., independently combinable with any of the aspects or embodiments identified herein), a pharmaceutical composition is provided, comprising: a compound of Formula (I), or a pharmaceutically acceptable salt thereof, and a pharmaceutically acceptable carrier. In various embodiments, the compound of Formula (I) may be a compound of Formula (Ia), Formula (Ib), Formula (Ic), Formula (Id), Formula (Ie), Formula (If), Formula (Ig), or Formula (Ih).

Any of the features of an embodiment of the first through third aspects is applicable to all aspects and embodiments identified herein. Moreover, any of the features of an embodiment of the first through third aspects is independently combinable, partly or wholly with other embodiments described herein in any way, e.g., one, two, or three or more embodiments may be combinable in whole or in part. Further, any of the features of an embodiment of the first through third aspects may be made optional to other aspects or embodiments. Any aspect or embodiment of a method can be performed by a system or apparatus of another aspect or embodiment, and any aspect or embodiment of a system can be configured to perform a method of another aspect or embodiment.

DETAILED DESCRIPTION

Figure 1:
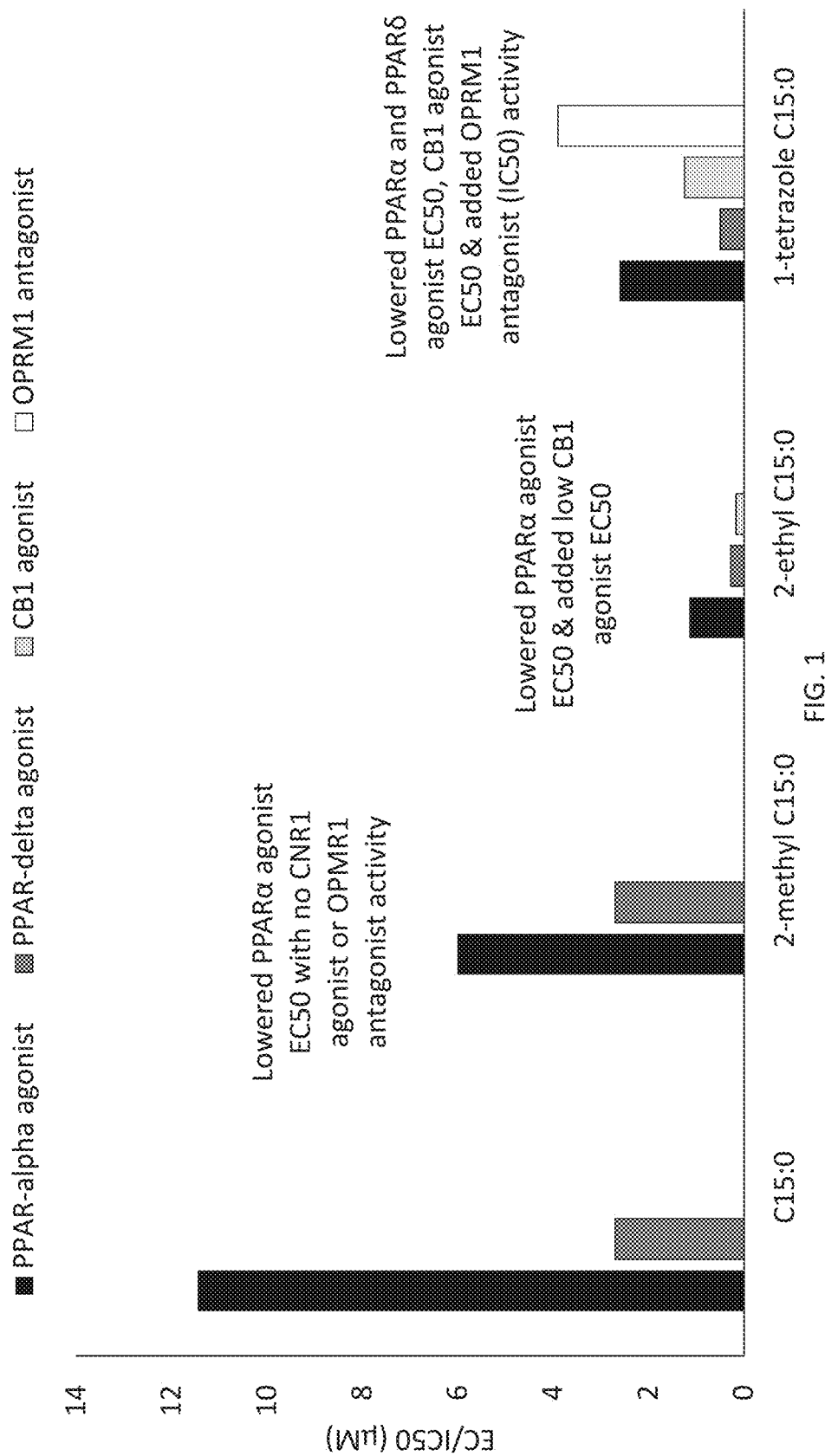
FIG. 1 provides a summary of effective concentrations (EC50 µM) for PPAR-alpha, PPAR-delta, and CB1 receptor agonist activity and inhibitory concentrations (IC50 µM) for OPRM1 antagonist activity for saturated fatty acid substituents (2-methyl-C15:0, 2-ethyl-C15:0, and 1-tetrazole-C15:0) compared to assays treated with saturated free fatty acids (C15:0).

Compositions including a compound, for example, a compound of Formula (I), or a pharmaceutically acceptable salt thereof, and associated methods for treatment of impaired cognition, movement disorders, chronic pain, depression, decreased appetite, addiction, seizure, convulsion, and related disorders are provided. In various embodiments, a compound provided herein can be a 2-alkyl or 2,2-di-alkyl substituted saturated fatty acid, or an acid isostere and/or pharmaceutically acceptable salt thereof.

Some embodiments relate to a pharmaceutical compositions, and methods of treatment using the pharmaceutical compositions, wherein the pharmaceutical composition comprises a compound of Formula (I), or a pharmaceutically acceptable salt thereof, having the structure:

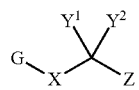

Formula (I)

wherein: G is selected from an unsubstituted or a substituted $C_{10}$-$C_{17}$ alkyl, an unsubstituted or a substituted $C_{10}$-$C_{17}$ alkenyl, or an unsubstituted or a substituted $C_{10}$-$C_{17}$ alkyl having one, two, or three oxa- and/or thia-substitutions, e.g., one or more oxygen and/or sulfur atoms replacing one or more of the carbon atoms of the alkyl or alkenyl chain; X is selected from O, and $CR^1R^2$, wherein $R^1$ and $R^2$ are each independently H or an unsubstituted or a substituted $C_1$-$C_6$ alkyl; $Y^1$ and $Y^2$ are each independently H, an unsubstituted or a substituted $C_1$-$C_6$ alkoxy, or an unsubstituted or a substituted $C_1$-$C_6$ alkyl, or $Y^1$ and $Y^2$ may be taken together to form an unsubstituted or a substituted cycloalkyl, cycloalkenyl, aryl, heteroaryl or heterocyclyl; and Z is selected from a carboxylic acid, a $C_1$-$C_6$ alkyl ester, an unsubstituted or a substituted amide, an unsubstituted or a substituted five- or six-membered heterocyclyl, and an unsubstituted or a substituted five- or six-membered heteroaryl. In Formula (I), if a group is indicated as being "substituted," that group is substituted with one or more substituents individually and independently selected from the group consisting of $C_1$-$C_6$ alkyl, $C_1$-$C_6$ alkenyl, $C_1$-$C_6$ alkynyl, $C_1$-$C_7$ cycloalkyl, $C_1$-$C_7$ cycloalkenyl, acyl($C_1$-$C_6$ alkyl), $C_1$-$C_6$ alkoxy($C_1$-$C_6$ alkyl), amino($C_1$-$C_6$ alkyl), amino acid, $C_6$-$C_{10}$ aryl, heteroaryl, heterocyclyl, $C_6$-$C_{10}$ aryl($C_1$-$C_6$ alkyl), heteroaryl($C_1$-$C_6$ alkyl), heterocyclyl($C_1$-$C_6$ alkyl), hydroxyl($C_1$-$C_6$ alkyl), acyl, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, O-carboxy, isocyanato, thiocyanato, isothiocyanato, azido, nitro, silyl, sulfenyl, sulfinyl, sulfonyl, halo($C_1$-$C_6$ alkyl), $C_1$-$C_6$ haloalkoxy, trihalomethanesulfonyl, trihalomethanesulfonamido, and amino. The pharmaceutical composition may further comprise a pharmaceutically acceptable carrier.

In some embodiments, $Y^1$ and $Y^2$ are each independently H or $C_1$-$C_6$ alkyl substituted with one or more halogens. In further embodiments, $Y^1$ and $Y^2$ are each independently selected from H, unsubstituted methyl, methyl substituted with one to three halogens, unsubstituted ethyl, and ethyl substituted with one to five halogens. In still further embodiments, each halogen is independently selected from F, Cl, Br, and I. In some embodiments, each halogen is F. In some embodiments, $Y^1$ and $Y^2$ are each independently selected from H and unsubstituted methyl.

In some embodiments, Z is an unsubstituted or a substituted five-membered heteroaryl. In some embodiments, Z is an unsubstituted five-membered heteroaryl. In one embodiment the unsubstituted five-membered heteroaryl is an unsubstituted tetrazole or an unsubstituted 1,2,4-oxadiazol-5(4H)-one. In some embodiments, Z is a carboxylic acid or a $C_1$-$C_6$ alkyl ester. In some embodiments, Z is an unsubstituted or a substituted amide. In still further embodiments, Z is an amide substituted by one or two groups selected from $C_1$-$C_6$ alkyl, hydroxy, and $C_1$-$C_6$ hydroxyalkyl.

In some embodiments, $R^1$ and $R^2$ are each independently H or $C_1$-$C_6$ alkyl substituted with one or more halogens. In some embodiments, $R^1$ and $R^2$ are each independently H.

In some embodiments, G is a $C_{10}$-$C_{15}$ alkyl substituted by one or more halogens. In some embodiments, G is an unsubstituted $C_{12}$-$C_{14}$ alkyl.

In some embodiments, the compound of Formula (I) has the structure of Formula (Ia), Formula (Ib), Formula (Ic), Formula (Id), Formula (Ie), Formula (If), Formula (Ig), or Formula (Ih), wherein in each of Formula (Ia), Formula (Ib), Formula (Ic), Formula (Id), Formula (Ie), Formula (If), Formula (Ig), and Formula (Ih), all groups including G, X, $Y^1$, $Y^2$, and Z are as indicated with respect to Formula (I).

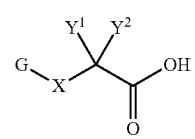

Formula (Ia)

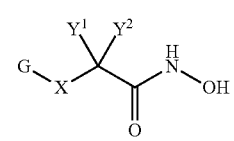

Formula (Ib)

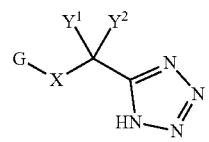

Formula (Ic)

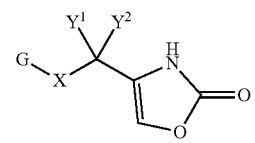

Formula (Id)

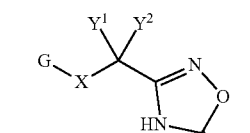

Formula (Ie)

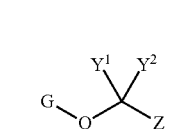

Formula (If)

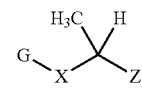

Formula (Ig)

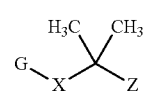

Formula (Ih)

In various embodiments, a compound of Formula (I) can be selected from the following, where in each instance G is an unsubstituted $C_{10}$-$C_{15}$ alkyl:

| X | Y¹, Y² | Z |
|---|---|---|
| CH₂ | H, H | −C(=O)OH |
| O | H, H | −C(=O)OH |
| O | CH₃, H | −C(=O)OH |
| O | CH₃, CH₃ | −C(=O)OH |
| CH₂ | H, H | −C(=O)NH−OH |
| CH₂ | H, H | tetrazole |
| CH₂ | H, H | 1,2,4-oxadiazol-5(4H)-one |
| CH₂ | H, H | oxazol-2(3H)-one |

In some embodiments, the compound of Formula (I) can be selected from:

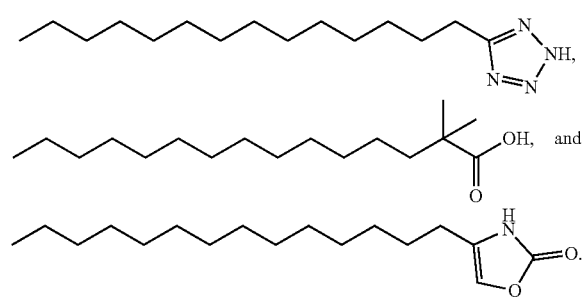

In further embodiments, the compound can be a 2,2-dimethyl, 2-ethyl, 2,2-diethyl, 3-oxa, or 3-oxa-2,2-dimethyl substituted saturated fatty acid selected from tridecanoic acid (C13:0), myristic acid (C14:0), pentadecanoic acid (C15:0), palmitic acid (C16:0), heptadecanoic acid (C17:0), or stearic acid (C18:0), or a tetrazole acid isostere, an oxazolone acid isostere, an oxadiazolone acid isostere, an amide, an N-hydroxy amide, a (2-hydroxyethyl)amide or pharmaceutically acceptable salt thereof.

In some embodiments, the compound is 2-ethyl pentadecanoic acid or 1-tetrazole pentadecanoic acid.

In some embodiments, an oxadiazolone acid isostere is an unsubstituted 1,2,4-oxadiazol-5(4H)-one acid isostere. In further embodiments, an oxazolone acid isostere is an unsubstituted oxazol-2(3H)-one acid isostere.

Increased dietary intake of the odd chain saturated fatty acid, heptadecanoic acid, has been associated with improved metabolic syndrome bottlenose dolphins (see Venn-Watson et al. Increased dietary intake of saturated fatty acid heptadecanoic acid (C17:0) associated with decreasing ferritin and alleviated metabolic syndrome in dolphins, (2016) PLOS ONE 10(7):e0132117). Accordingly, oral administration of modified odd chain saturated fatty acids may be useful in the treatment of metabolic syndrome, a condition that places people at higher risk of multiple chronic diseases, including diabetes, heart disease, stroke, neurodegenerative diseases, and depression.

Certain lipid compounds have been proposed in WO 2017/093732 for the treatment of ophthalmic disorders such as retinal degeneratative disorders and ocular inflammatory disease. However, these lipids are unsaturated fatty acid derivatives (e.g., alkyl groups containing 1 to 5 double bonds). Larson et al. in Lipids, Vol. 40, no. 1 (2005) demonstrates increased PPAR-alpha and PPAR-gamma activity with alpha-methylation of various fatty acids, including one saturated fatty acid (palmitic, or C16:0); however, the derivatives are described as poor, and nonsignificant, activators of PPARδ (delta). In contrast, it has been observed that C15:0 is a partial PPAR delta agonist and its derivatives often exhibit improved PPAR-delta EC50 and/or maximum concentrations.

Peroxisome proliferator-activated receptors (PPARs) are known orchestrators of mammalian metabolism and, as such, are targets for therapeutics across numerous diseases. There are three isotypes of PPARs: alpha, delta, and gamma. Molecules that differentially bind to and activate each of the three PPAR isotypes have been demonstrated to treat a variety of conditions related to metabolic syndrome, including inflammation, dyslipidemia, prediabetes and diabetes, fatty liver disease, nonalcoholic steatohepatitis and insulin resistance. In addition, PPAR agonists have been proposed as therapeutic targets for autoimmune diseases, asthma, anemia, cancer, cardiovascular disease, dermatitis, hypertension, pulmonary disease (including pulmonary fibrosis and systemic sclerosis), psoriasis, iron overload, and neurodegenerative diseases, including Alzheimer's disease and other forms of dementia. Saturated fatty acids are believed to be endogenous ligands for the PPAR isoforms PPAR-alpha and PPAR-delta, and it is hypothesized that structural features, such as carbon chain length, can influence PPAR agonist activity (see: Forman B M, Chen J, Evans R M (1997) Hypolipidemic drugs, polyunsaturated fatty acids, and eicosanoids are ligands for peroxisome proliferator-activated receptors α and δ. Proc Natl Acad Sci 94:4312-4317).

It can be hypothesized that the demonstrated efficacy of pentadecanoic acid (C15:0) and heptadecanoic acid (C17:0) in attenuating components of metabolic syndrome may be due, in part, to their roles as PPAR-alpha and PPAR-delta agonists. PPAR relationships to various indications are described in the following references: Aleshin S et al. (2013) Peroxisome proliferator-activated receptor (PPAR)β/δ, a possible nexus of PPARα- and PPARγ-dependent molecular pathways in neurodegenerative diseases: review and novel hypotheses. Neurochem Int 63:322-330; Barish G D et al. (2006) PPARδ: a dagger in the heart of metabolic syndrome. J Clin Invest 116:590-597; Bonomo L D F et al. (2012) Iron overload potentiates diet-induced hypercholesterolemia and reduces liver PPAR-α expression in hamsters. J Biochem Mol Toxicol 26:224-229; Chiba T et al. (2012) Topical application of PPARα (but not β/δ or γ) suppresses atopic dermatitis in NC/Nga mice. Allergy 67:936-942; Choi J M and Bothwell A L M (2012) The nuclear receptor PPARs as important regulators of T-cell functions and autoimmune diseases. Mol Cell 33:217-222; Hosokawa M et al. (2004) Fucoxanthin induces apoptosis and enhances the antiproliferative effect of the PPARγ ligand, troglitazone, on colon cancer cells. BBA Gen Subj 1675:113-119; Janani C and Kumari B D R (2015) PPAR gamma gene—a review. Diab Metab Synd Clin Res Rev 9:46-50; Leibovitz E et al. (2007) PPAR activation: a new target for the treatment of hypertension. J Cardio Pharmacol 50:120-125; Lee H Y et al. (2015) PPAR-α and glucocorticoid receptor synergize to promote erythroid progenitor self-renewal. Nature 522:474-477; Madrazo J A and Kelly D P (2008) The PPAR trio: Regulators of myocardial energy metabolism in health and disease. J Mol Cell Cariol 44:968-975; Milam J E et al. (2008) PPAR-γ agonists inhibit profibrotic phenotypes in human lung fibroblasts and bleomycin-induced pulmonary fibrosis. Am J Physiol Lung Cell Mol Physiol 294:L891-L901; Sertznig P et al. (2008) Peroxisome proliferator-activated receptors (PPARs) and the human skin. Am J Clin Dermatol 9:15-31; Sokolowska M et al. (2005) Peroxisome proliferator-activated receptor gamma (PPAR-gamma) and their role in immunoregulation and inflammation control. Postepy Higieny 59:472-484; Trifillieff A et al. (2009) PPAR-α and -γ but not -δ agonists inhibit airway inflammation in a murine model of asthma: in vitro evidence for an NF-kβ-independent effect. Br J Pharmacol 139:163-171; and Wei et al. (2010) Peroxisome proliferator-activated receptor γ: innate protection from excessive fibrinogenesis and potential therapeutic target in systemic sclerosis. Curr Opin Rhematol 22:671-676.

A modified saturated fatty acid may improve hydrophilic binding in the AF2 pocket of Arm-II. Thus, certain analogs of fatty acids might provide improved PPAR agonist activity compared to natural fatty acid forms. By improving PPAR agonist activity, it can be hypothesized that a saturated fatty acid analog such as a compound provided herein may be more effective at treating metabolic syndrome and components of metabolic syndrome compared to natural fatty acids.

Thus, the compound, for example, the compound of Formula (I), or pharmaceutically acceptable salt or metabolite thereof, may advantageously activate a PPAR.

Cannabinoid receptors are G protein-coupled receptors that bind to endocannabinoids, phytocannabinoids, and synthetic cannabinoids, resulting in cannabinoid-induced effects related to cognition, memory, mood, movement, pain sensation, and appetite and dermatologic health. As such, cannabinoid receptors are targets for therapeutics across numerous diseases. There are two subtypes of cannabinoid receptors: cannabinoid receptor 1 (referred to as CNR1 or CB1 receptor) and cannabinoid receptor 2 (referred to as CNR2 or CB2 receptor). The CB1 receptor, most concentrated in the brain and spinal cord, is the primary target of cannabinoids and has primary actions through its inhibition of glutamate- and gamma-amino butyric acid (GAB A)-mediated neurotransmission. Molecules that differentially bind to CB1 receptors have been demonstrated to treat a variety of conditions related to chronic pain, depression, decreased appetite (including anorexia and cachexia), and inflammation. In addition, CB1 receptor agonists have been proposed as therapeutic targets for cognition impairment and movement disorders. Dietary fatty acids can influence tissue levels of endocannabinoids, which can target both CB1 receptor and PPAR-α; combined CB1 receptor/PPAR-α agonist activities of endocannabinoids can have synergistic anti-inflammatory, neuroprotective, and orexigenic (appetite stimulating) effects. It is hypothesized that different structural features of fatty acids may influence their roles as direct or precursors to endocannabinoids (see: Artman A, Petersen G, Hellgren L I, Boberg J, Skonberg C, Nellermann C, Honore Hansen S, Hansen H S (2008) Influence of dietary fatty acids on endocannabinoid and N-acylethanolamine levels in the rat brain, liver and small intestine. BBA Mol Cell Biol Lipids 1781:200-212).

Opioid receptors are G protein-coupled receptors that bind to endogenous opioids, such as beta-endorphin and enkephalins, as well as exogenous opioids. There are three subtypes of opioid receptors: mu (OPRM1), delta (OPRD1), and kappa (OPRK1). OPRM1 is the most common target of opioids, including morphine, codeine, and fentanyl. While the primary treatment of opioid drug overdose is naloxone, an acute OPRM1 antagonist, naloxone cannot be used as a long-term solution to aid in the opioid withdrawal process. Long-acting OPRM1 agonists, including a full agonist, methadone, and a partial agonist, buprenorphine, are currently used to help treat people with opioid addiction caused by riskier short-acting OPRM1 agonists. These treatments, however, can still cause dangerous slowing of respiratory and heart rates, resulting in overdose and death. Because there is extensive cross-talk between the endocannabinoid and opioid-associated systems, and cannabinoids have been demonstrated to attenuate withdrawal symptoms from opioid addiction, CB1 receptor agonists have been proposed as a means to treat drug addiction, including opioid addiction (see: Scavone J L, Sterling R C, Bockstaele E J (2013) Cannabinoid and opioid interactions: implicatsions for opiate dependence and withdrawal. Neurosci 248:637-654.)

It is an object of certain of the embodiments to provide a method for detecting protective and risk factors against and for impaired cognition, movement disorders, chronic pain, depression, decreased appetite, and addiction. Methods for the diagnosis and monitoring of impaired cognition, movement disorders, chronic pain, depression, decreased appetite, and addiction in mammal subjects such as companion animals and humans. An object of certain of the embodiments is to provide a method for treating impaired cognition, movement disorders, chronic pain, depression, decreased appetite, or addiction in mammal subjects, such as companion animals and humans. An object of certain of the embodiments is to provide a method for detecting impaired cognition, movement disorders, chronic pain, depression, decreased appetite, or addiction in mammal subjects, such as for companion animals and humans that increases the level of a compound of Formula (I), or corresponding fatty acid thereof, of the subject sera. An object of certain of the embodiments is to provide a method for detecting and treating opioid addiction without resorting to use of methadone or other OPRM1 agonists. An object of certain of the embodiments is to provide a supplement for detecting and treating impaired cognition, movement disorders, chronic pain, depression, decreased appetite, or addiction. An object of certain of the embodiments is to provide a method for detecting and treating impaired cognition, movement disorders, chronic pain, depression, decreased appetite, or addiction in mammal subjects, such as companion animals and humans that is easy to accomplish in a cost-effective manner. An object of certain of the embodiments to provide a method for modulating markers or behaviors of impaired cognition, movement disorders, chronic pain, depression, decreased appetite, or addiction in a subject. An object of certain of the embodiments is to provide a method for detecting impaired cognition, movement disorders, chronic pain, depression, decreased appetite, or addiction in a subject. An object of certain of the embodiments is to provide a method for treatment of impaired cognition, movement disorders, chronic pain, depression, decreased appetite, or addiction in a subject. An object of certain of the embodiments is to provide a method for prophylaxis of impaired cognition, movement disorders, chronic pain, depression, decreased appetite, or addiction in a subject. An object of certain of the embodiments is to provide a method for increasing a compound of Formula (I), or corresponding fatty acid thereof, in the sera of a subject. An object of certain of the embodiments is to provide a method treating opioid addiction.

One or more than one of the aforementioned objects is provided by or achieved by the various compositions, methods, and uses as described herein.

Definitions

The term "alcohol" as used herein is a broad term, and is to be given its ordinary and customary meaning to a person of ordinary skill in the art (and is not to be limited to a special or customized meaning), and refers without limitation to any compound as described herein incorporating one or more hydroxy groups, or being substituted by or functionalized to include one or more hydroxy groups.

The term "derivative" as used herein is a broad term, and is to be given its ordinary and customary meaning to a person of ordinary skill in the art (and is not to be limited to a special or customized meaning), and refers without limitation to any compound as described herein incorporating one or more derivative groups, or being substituted by or functionalized to include one or more derivative groups. Derivatives include but are not limited to esters, amides, anhydrides, acid halides, thioesters, and phosphates.

The term "hydrocarbon" as used herein is a broad term, and is to be given its ordinary and customary meaning to a person of ordinary skill in the art (and is not to be limited to a special or customized meaning), and refers without limitation to any moiety comprising only carbon and hydrogen atoms. A functionalized or substituted hydrocarbon moiety has one or more substituents as described elsewhere herein.

The term "lipid" as used herein is a broad term, and is to be given its ordinary and customary meaning to a person of ordinary skill in the art (and is not to be limited to a special or customized meaning), and refers without limitation to saturated and unsaturated oils and waxes, derivatives, amides, glycerides, fatty acids, fatty alcohols, sterol and sterol derivatives, tocopherols, carotenoids, among others.

The terms "pharmaceutically acceptable" as used herein is a broad term, and is to be given its ordinary and customary meaning to a person of ordinary skill in the art (and is not to be limited to a special or customized meaning), and refers without limitation to those compounds, materials, compositions, and/or dosage forms which are, within the scope of sound medical judgment, suitable for contact with the tissues of and/or for consumption by human beings and animals without excessive toxicity, irritation, allergic response, or other problem complications commensurate with a reasonable risk/benefit ratio.

The terms "pharmaceutically acceptable salts" and "a pharmaceutically acceptable salt thereof" as used herein are broad terms, and are to be given their ordinary and customary meaning to a person of ordinary skill in the art (and is not to be limited to a special or customized meaning), and refer without limitation to salts prepared from pharmaceutically acceptable, non-toxic acids or bases. Suitable pharmaceutically acceptable salts include metallic salts, e.g., salts of aluminum, zinc, alkali metal salts such as lithium, sodium, and potassium salts, alkaline earth metal salts such as calcium and magnesium salts; organic salts, e.g., salts of lysine, N,N'-dibenzylethylenediamine, chloroprocaine, choline, diethanolamine, ethylenediamine, meglumine (N-methylglucamine), procaine, and tris; salts of free acids and bases; inorganic salts, e.g., sulfate, hydrochloride, and hydrobromide; and other salts which are currently in widespread pharmaceutical use and are listed in sources well known to those of skill in the art, such as, for example, The Merck Index. Any suitable constituent can be selected to make a salt of the therapeutic agents discussed herein, provided that it is non-toxic and does not substantially interfere with the desired activity. In addition to salts, pharmaceutically acceptable precursors and derivatives of the compounds can be employed. Pharmaceutically acceptable amides, lower alkyl derivatives, and protected derivatives can also be suitable for use in compositions and methods of preferred embodiments. While it may be possible to administer the compounds of the preferred embodiments in the form of pharmaceutically acceptable salts, it is generally preferred to administer the compounds in neutral form.

The term "pharmaceutical composition" as used herein is a broad term, and is to be given its ordinary and customary meaning to a person of ordinary skill in the art (and is not to be limited to a special or customized meaning), and refers without limitation to a mixture of one or more compounds disclosed herein with other chemical components, such as diluents or carriers. The pharmaceutical composition facilitates administration of the compound to an organism. Pharmaceutical compositions can also be obtained by reacting compounds with inorganic or organic acids or bases. Pharmaceutical compositions will generally be tailored to the specific intended route of administration.

As used herein, a "carrier" as used herein is a broad term, and is to be given its ordinary and customary meaning to a person of ordinary skill in the art (and is not to be limited to a special or customized meaning), and refers without limitation to a compound that facilitates the incorporation of a compound into cells or tissues. For example, without limitation, dimethyl sulfoxide (DMSO) is a commonly utilized carrier that facilitates the uptake of many organic compounds into cells or tissues of a subject. Water, saline solution, ethanol, and mineral oil are also carriers employed in certain pharmaceutical compositions.

As used herein, a "diluent" as used herein is a broad term, and is to be given its ordinary and customary meaning to a person of ordinary skill in the art (and is not to be limited to a special or customized meaning), and refers without limitation to an ingredient in a pharmaceutical composition that lacks pharmacological activity but may be pharmaceutically necessary or desirable. For example, a diluent may be used to increase the bulk of a potent drug whose mass is too small for manufacture and/or administration. It may also be a liquid for the dissolution of a drug to be administered by injection, ingestion or inhalation. A common form of diluent in the art is a buffered aqueous solution such as, without limitation, phosphate buffered saline that mimics the composition of human blood.

As used herein, an "excipient" as used herein is a broad term, and is to be given its ordinary and customary meaning to a person of ordinary skill in the art (and is not to be limited to a special or customized meaning), and refers without limitation to a substance that is added to a pharmaceutical composition to provide, without limitation, bulk, consistency, stability, binding ability, lubrication, disintegrating ability etc., to the composition. A "diluent" is a type of excipient.

As used herein, a "subject" as used herein is a broad term, and is to be given its ordinary and customary meaning to a person of ordinary skill in the art (and is not to be limited to a special or customized meaning), and refers without limitation to an animal that is the object of treatment, observation or experiment. "Animal" includes cold- and warm-blooded vertebrates and invertebrates such as fish, shellfish, reptiles, and, in particular, mammals. "Mammal" includes, without limitation, dolphins, mice, rats, rabbits, guinea pigs, dogs, cats, sheep, goats, cows, horses, primates, such as monkeys, chimpanzees, and apes, and, in particular, humans. In some embodiments, the subject is human.

As used herein, the terms "treating," "treatment," "therapeutic," or "therapy" are broad terms, and are to be given their ordinary and customary meaning (and are not to be limited to a special or customized meaning) and, without limitation, do not necessarily mean total cure or abolition of the disease or condition. Any alleviation of any undesired markers, signs or symptoms of a disease or condition, to any extent, can be considered treatment and/or therapy. Furthermore, treatment may include acts that may worsen the patient's overall feeling of well-being or appearance.

The terms "therapeutically effective amount" and "effective amount" as used herein are broad terms, and are to be given its ordinary and customary meaning to a person of ordinary skill in the art (and are not to be limited to a special or customized meaning), and are used without limitation to indicate an amount of an active compound, or pharmaceutical agent, that elicits the biological or medicinal response indicated. For example, a therapeutically effective amount of compound can be the amount needed to prevent, alleviate or ameliorate markers or symptoms of a condition or prolong the survival of the subject being treated. This response may occur in a tissue, system, animal or human and includes alleviation of the signs or symptoms of the disease being treated. Determination of a therapeutically effective amount is well within the capability of those skilled in the art, in view of the disclosure provided herein. The therapeutically effective amount of the compounds disclosed herein required as a dose will depend on the route of administration, the type of animal, including human, being treated, and the physical characteristics of the specific animal under consideration. The dose can be tailored to achieve a desired effect, but will depend on such factors as weight, diet, concurrent medication and other factors which those skilled in the medical arts will recognize.

The term "solvents" as used herein is a broad term, and is to be given its ordinary and customary meaning to a person of ordinary skill in the art (and is not to be limited to a special or customized meaning), and refers without limitation to compounds with some characteristics of solvency for other compounds or means, that can be polar or nonpolar, linear or branched, cyclic or aliphatic, aromatic, naphthenic and that includes but is not limited to: alcohols, derivatives, diesters, ketones, acetates, terpenes, sulfoxides, glycols, paraffins, hydrocarbons, anhydrides, heterocyclics, among others.

The term "fatty acid" as used herein is a broad term, and is to be given its ordinary and customary meaning to a person of ordinary skill in the art (and is not to be limited to a special or customized meaning), and refers without limitation to non-natural fatty acids. Without limitation, the non-natural fatty acids may be derived from hydrolysis or metabolic cleavage of an acid isostere of a compound of Formula (I).

As used herein, any group(s) such as, without limitation, $R^1$, $R^2$, $Y^1$, and $Y^2$ represent substituents that can be attached to the indicated atom. If two groups are described as being "taken together" the groups and the atoms they are attached to can form a cycloalkyl, cycloalkenyl, aryl, heteroaryl or heterocycle. For example, without limitation, if $Y^1$ and $Y^2$ are indicated to be "taken together," it means that they are covalently bonded to one another through 0 to 5 intervening atoms to form a ring. In addition, if two groups are described as being "taken together" with the atom(s) to which they are attached to form a ring as an alternative, the groups are not limited to the variables or substituents defined previously.

As provided herein, an "oxa-" or "thia-" fatty acid is a fatty acid in which a methylene group in the indicated position is replaced (such that the number of chained atoms in the fatty acid chain is unchanged) by an oxygen or sulfur atom. As a non-limiting example, 3-oxapentadecanoic acid refers to 2-(dodecyloxy)acetic acid having the structure:

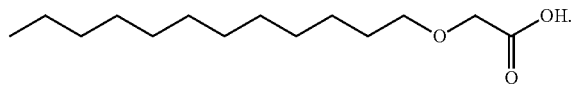 [SMILES: CCCCCCCCCCCCOCC(=O)O]

The sulfur atom may be oxidized, for example, as a sulfenyl, sulfinyl, or sulfonyl group. In some embodiments, the sulfur atom is part of a sulfenyl moiety.

The term "optionally substituted" as used herein indicates that the chemical group, for example, G, X, $Y^1$, $Y^2$, or Z, may be unsubstituted, or may be substituted with one or more of the indicated substituents. If no substituents are named, the indicated "optionally substituted" or "substituted" group may be substituted with one or more substituent(s) individually and independently selected from $C_1$-$C_6$ alkyl, $C_1$-$C_6$ alkenyl, $C_1$-$C_6$ alkynyl, $C_3$-$C_8$ cycloalkyl, $C_3$-$C_8$ cycloalkenyl, acyl($C_1$-$C_6$ alkyl), $C_1$-$C_6$ alkoxy($C_1$-$C_6$ alkyl), amino($C_1$-$C_6$ alkyl), amino acid, $C_6$-$C_{10}$ aryl, heteroaryl, heterocyclyl, $C_6$-$C_{10}$ aryl($C_1$-$C_6$ alkyl), heteroaryl ($C_1$-$C_6$ alkyl), heterocyclyl($C_1$-$C_6$ alkyl), hydroxyl($C_1$-$C_6$ alkyl), acyl, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, O-carboxy, isocyanato, thiocyanato, isothiocyanato, azido, nitro, silyl, sulfenyl, sulfinyl, sulfonyl, halo($C_1$-$C_6$ alkyl), $C_1$-$C_6$ haloalkoxy, trihalomethanesulfonyl, trihalomethane-sulfonamido, or amino.

As used herein, "$C_a$ to $C_b$" in which "a" and "b" are integers refer to the range of carbon atoms in an alkyl, alkenyl or alkynyl group, or the number of carbon atoms in the ring of a cycloalkyl, cycloalkenyl, aryl, heteroaryl or heterocyclyl group. Thus, for example, a "$C_1$ to $C_4$ alkyl" group refers to all alkyl groups having from 1 to 4 carbons, that is, $CH_3$—, $CH_3CH_2$—, $CH_3CH_2CH_2$—, $(CH_3)_2CH$—, $CH_3CH_2CH_2CH_2$—, $CH_3CH_2CH(CH_3)$— and $(CH_3)_3C$—.

If no "a" and "b" are designated with regard to an alkyl, alkenyl, alkynyl, cycloalkyl cycloalkenyl, aryl, heteroaryl or heteroalicyclyl group, the broadest range described in these definitions is to be assumed.

The term "alkyl" as used herein is a broad term, and is to be given its ordinary and customary meaning to a person of ordinary skill in the art (and is not to be limited to a special or customized meaning), and refers to a straight or branched hydrocarbon chain that comprises a fully saturated (no double or triple bonds) hydrocarbon group. The alkyl group may be a lower alkyl group having 1 to 6 carbon atoms. Typical alkyl groups include, but are in no way limited to, methyl, ethyl, propyl, isopropyl, butyl, isobutyl, tertiary butyl, pentyl and hexyl. The alkyl group may be a medium alkyl group having 7 to 14 carbon atoms. The alkyl group may be a higher alkyl group having 15 or more carbon atoms, e.g., 15-30 carbon atoms, or 15 to 25 carbon atoms. The alkyl group may be an odd chain alkyl group, e.g., having 1, 3, 5, 7, 9, 11, 13, 15, 17, 19, 21, 23, or 25 carbon atoms, e.g., 15 or 17 carbon atoms.

As used herein, "alkenyl" is a broad term, and is to be given its ordinary and customary meaning to a person of ordinary skill in the art (and is not to be limited to a special or customized meaning), and refers to a straight or branched, unsubstituted or substituted hydrocarbon chain that contains in the chain one or more carbon-carbon double bonds. Non-limiting examples of alkenyl groups include allenyl, vinyl, and isoprenyl.

As used herein, "alkynyl" is a broad term, and is to be given its ordinary and customary meaning to a person of ordinary skill in the art (and is not to be limited to a special or customized meaning), and refers to a straight or branched, unsubstituted or substituted hydrocarbon chain that contains in the chain one or more carbon-carbon triple bonds. Non-limiting examples of alkynyls include ethynyl and propynyl.

As used herein, "heteroaryl" is a broad term, and is to be given its ordinary and customary meaning to a person of ordinary skill in the art (and is not to be limited to a special or customized meaning), and refers to a monocyclic or fused multicyclic ring system that includes an aromatic ring having one or more heteroatoms in the aromatic ring. The heteroatom can be, but is not limited to, nitrogen, oxygen or sulfur. An "n-membered heteroaryl" refers to a ring or ring system having n total atoms forming the ring(s) of the ring or ring system. Heteroaryls include oxo-substituted heterocyclic aromatic rings and ring systems, and hydroxy-tautomers thereof. Examples of heteroaryl rings include, but are not limited to, those described herein and the following: 1,2,4-oxadiazol-5(4H)-one, tetrazole, furan, furazan, thiophene, pyrrole, oxazole, 1,2,3-oxadiazole, 1,2,4-oxadiazole, thiazole, 1,2,3-thiadiazole, 1,2,4-thiadiazole, imidazole, benzimidazole, indole, indazole, pyrazole, benzopyrazole, isoxazole, benzoisoxazole, isothiazole, triazole, benzotriazole, thiadiazole, tetrazole, pyridine, pyridazine, pyrimidine, pyrazine, purine, quinoline, isoquinoline, quinazoline, quinoxaline, cinnoline, and triazine.

As used herein, "heterocyclyl" is a broad term, and is to be given its ordinary and customary meaning to a person of ordinary skill in the art (and is not to be limited to a special or customized meaning), and refers to a monocyclic, spirocyclic, and/or fused multicyclic ring system that does not include any aromatic rings, and has one or more heteroatoms in the ring or ring system. The heteroatom can be, but is not limited to, nitrogen, oxygen or sulfur. An "n-membered heterocyclyl" refers to a ring or ring system having n total atoms forming the ring(s) of the ring or ring system. Heterocyclyls include oxo-substituted heterocyclic rings and ring systems, and hydroxy-tautomers thereof. Examples of heteroaryl rings include, but are not limited to, those described herein and the following: groups include, but are not limited to, those described herein and the following: oxazolidinone, 1,3-dioxin, 1,4-dioxane, 1,2-dioxolane, 1,3-oxathiane, 1,3-oxathiolane, 1,3-dithiole, 1,3-dithiolane, 1,4-oxathiane, tetrahydro-1,4-thiazine, 1,3-thiazinane, 2H-1,2-oxazine, maleimide, succinimide, barbituric acid, thiobarbituric acid, dioxopiperazine, hydantoin, dihydrouracil, trioxane, imidazoline, imidazolidine, isoxazoline, isoxazolidine, oxazoline, oxazolidine, oxazolidinone, thiazoline, thiazolidine, morpholine, oxirane, piperidine N-oxide, piperidine, piperazine, pyrrolidine, pyrrolidone, pyrrolidione, 4-piperidone, pyrazoline, pyrazolidine, 2-oxopyrrolidine, tetrahydropyran, 4H-pyran, tetrahydrothiopyran, thiamorpholine, thiamorpholine sulfoxide, thiamorpholine sulfone, and their benzo-fused analogs (e.g., benzimidazolidinone, tetrahydroquinoline, and 3,4-methylenedioxyphenyl).

As used herein, "cycloalkyl" refers to a completely saturated (no double or triple bonds) mono- or multi-cyclic hydrocarbon ring system. When composed of two or more rings, the rings may be joined together in a fused fashion. Cycloalkyl groups can contain 3 to 10 atoms in the ring(s) or 3 to 8 atoms in the ring(s). A cycloalkyl group may be unsubstituted or substituted. Typical cycloalkyl groups include, but are in no way limited to, cyclopropyl, cyclobutyl, cyclopentyl, cyclohexyl, cycloheptyl and cyclooctyl.

As used herein, "cycloalkenyl" refers to a mono- or multi-cyclic hydrocarbon ring system that contains one or more double bonds in at least one ring; although, if there is more than one, the double bonds cannot form a fully delocalized pi-electron system throughout all the rings (otherwise the group would be "aryl," as defined herein). When composed of two or more rings, the rings may be connected together in a fused fashion. A cycloalkenyl group may be unsubstituted or substituted.

As used herein, "aryl" refers to a carbocyclic (all carbon) monocyclic or multicyclic aromatic ring system (including fused ring systems where two carbocyclic rings share a chemical bond) that has a fully delocalized pi-electron system throughout all the rings. The number of carbon atoms in an aryl group can vary. For example, the aryl group can be a $C_6$-$C_{14}$ aryl group, a $C_6$-$C_{10}$ aryl group, or a $C_6$ aryl group. Examples of aryl groups include, but are not limited to, benzene, naphthalene and azulene. An aryl group may be substituted or unsubstituted.

As used herein, "aralkyl" and "aryl(alkyl)" refer to an aryl group connected, as a substituent, via a lower alkylene group. The lower alkylene and aryl group of an aralkyl may be substituted or unsubstituted. Examples include but are not limited to benzyl, 2-phenylalkyl, 3-phenylalkyl, and naphthylalkyl.

As used herein, "heteroaralkyl" and "heteroaryl(alkyl)" refer to a heteroaryl group connected, as a substituent, via a lower alkylene group having 1 to 6 carbon atoms. The lower alkylene and heteroaryl group of heteroaralkyl may be substituted or unsubstituted. Examples include but are not limited to 2-thienylalkyl, 3-thienylalkyl, furylalkyl, thienylalkyl, pyrrolylalkyl, pyridylalkyl, isoxazolylalkyl, imidazolylalkyl, and their benzo-fused analogs.

A "heteroalicyclyl(alkyl)" and "heterocyclyl(alkyl)" refer to a heterocyclic or a heteroalicyclylic group connected, as a substituent, via a lower alkylene group. The lower alkylene and heterocyclyl of a heteroalicyclyl(alkyl) may be substituted or unsubstituted. Examples include but are not limited tetrahydro-2H-pyran-4-yl(methyl), piperidin-4-yl(ethyl), piperidin-4-yl(propyl), tetrahydro-2H-thiopyran-4-yl (methyl), and 1,3-thiazinan-4-yl(methyl).

"Lower alkylene groups" are straight-chained —$CH_2$— tethering groups, forming bonds to connect molecular fragments via their terminal carbon atoms, and having 1 to 6 carbon atoms. Examples include but are not limited to methylene (—$CH_2$—), ethylene (—$CH_2CH_2$—), propylene (—$CH_2CH_2CH_2$—), and butylene (—$CH_2CH_2CH_2CH_2$—). A lower alkylene group can be substituted by replacing one or more hydrogen of the lower alkylene group with a substituent(s) listed under the definition of "substituted."

As used herein, "alkoxy" refers to the formula —OR wherein R is an alkyl, an alkenyl, an alkynyl, a cycloalkyl, a cycloalkenyl, aryl, heteroaryl, heterocyclyl, cycloalkyl (alkyl), aryl(alkyl), heteroaryl(alkyl) or heterocyclyl(alkyl) is defined herein. A non-limiting list of alkoxys include methoxy, ethoxy, n-propoxy, 1-methylethoxy (isopropoxy), n-butoxy, iso-butoxy, sec-butoxy, tert-butoxy, phenoxy and benzoxy. An alkoxy may be substituted or unsubstituted.

As used herein, "acyl" refers to a hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl) connected, as substituents, via a carbonyl group. Examples include formyl, acetyl, propanoyl, benzoyl, and acryl. An acyl may be substituted or unsubstituted.

As used herein, "acylalkyl" refers to an acyl connected, as a substituent, via a lower alkylene group. Examples include aryl-C(=O)—$(CH_2)_n$— and heteroaryl-C(=O)—$(CH_2)_n$—, where n is an integer in the range of 1 to 6.

As used herein, "alkoxyalkyl" refers to an alkoxy group connected, as a substituent, via a lower alkylene group. Examples include $C_{1-4}$ alkyl-O—$(CH_2)_n$—, wherein n is an integer in the range of 1 to 6.

As used herein, "aminoalkyl" refers to an unsubstituted or a substituted amino group connected, as a substituent, via a lower alkylene group. Examples include $H_2N(CH_2)_n$—, wherein n is an integer in the range of 1 to 6.

As used herein, "amino" refers to an unsubstituted nitrogen or a nitrogen substituted by one or two optionally substituted $C_1$-$C_6$ alkyl groups. Examples of amino groups include, but are not limited to, —$NH_2$, —$NHCH_3$, —$N(CH_3)_2$, and —$N(CH_3)(CH_2CH_3)$.

As used herein, "hydroxyalkyl" refers to an alkyl group in which one or more of the hydrogen atoms are replaced by a hydroxy group. Exemplary hydroxyalkyl groups include but are not limited to, 2-hydroxyethyl, 3-hydroxypropyl, 2-hydroxypropyl, and 2,2-dihydroxyethyl. A hydroxyalkyl may be substituted or unsubstituted.

As used herein, "haloalkyl" refers to an alkyl group in which one or more of the hydrogen atoms are replaced by a halogen (e.g., mono-haloalkyl, di-haloalkyl and tri-haloalkyl). Such groups include but are not limited to, chloromethyl, fluoromethyl, difluoromethyl, trifluoromethyl, chlorofluoroalkyl, chloro-difluoroalkyl, and 2-fluoroisobutyl. A haloalkyl may be substituted or unsubstituted.

As used herein, "haloalkoxy" refers to an alkoxy group in which one or more of the hydrogen atoms are replaced by a halogen (e.g., mono-haloalkoxy, di-haloalkoxy and tri-haloalkoxy). Such groups include but are not limited to, chloromethoxy, fluoromethoxy, difluoromethoxy, trifluoromethoxy, chloro-fluoroalkyl, chloro-difluoroalkoxy and 2-fluoroisobutoxy. A haloalkoxy may be substituted or unsubstituted.

A "sulfenyl" group refers to an "—SR" group in which R can be hydrogen, an alkyl, an alkenyl, an alkynyl, a cycloalkyl, a cycloalkenyl, aryl, heteroaryl, heterocyclyl, cycloalkyl (alkyl), aryl(alkyl), heteroaryl(alkyl) or heterocyclyl(alkyl). A sulfenyl may be substituted or unsubstituted.

A "sulfinyl" group refers to an "—S(=O)—R" group in which R can be the same as defined with respect to sulfenyl. A sulfinyl may be substituted or unsubstituted.

A "sulfonyl" group refers to an "$SO_2R$" group in which R can be the same as defined with respect to sulfenyl. A sulfonyl may be substituted or unsubstituted.

An "O-carboxy" group refers to a "RC(=O)O—" group in which R can be hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl), as defined herein. An O-carboxy may be substituted or unsubstituted.

The terms "ester" and "C-carboxy" refer to a "—C(=O)OR" group in which R can be the same as defined with respect to O-carboxy. An ester and C-carboxy may be substituted or unsubstituted.

A "thiocarbonyl" group refers to a "—C(=S)R" group in which R can be the same as defined with respect to O-carboxy. A thiocarbonyl may be substituted or unsubstituted.

A "trihalomethanesulfonyl" group refers to an "$X_3CSO_2$—" group wherein each X is a halogen.

A "trihalomethanesulfonamido" group refers to an "$X_3CS(O)_2N(R_A)$—" group wherein each X is a halogen, and $R_A$ hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl).

As used herein, the term "hydroxy" refers to a —OH group.

A "cyano" group refers to a "—CN" group.

The term "azido" as used herein refers to a —$N_3$ group.

An "isocyanato" group refers to a "—NCO" group.

A "thiocyanato" group refers to a "—CNS" group.

An "isothiocyanato" group refers to an "—NCS" group.

A "carbonyl" group refers to a C=O group.

An "S-sulfonamido" group refers to a "—$SO_2N(R_AR_B)$" group in which $R_A$ and $R_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An S-sulfonamido may be substituted or unsubstituted.

An "N-sulfonamido" group refers to a "$RSO_2N(R_A)$—" group in which R and $R_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-sulfonamido may be substituted or unsubstituted.

An "O-carbamyl" group refers to a "—OC(=O)N$(R_AR_B)$" group in which $R_A$ and $R_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An O-carbamyl may be substituted or unsubstituted.

An "N-carbamyl" group refers to an "ROC(=O)N$(R_A)$—" group in which R and $R_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-carbamyl may be substituted or unsubstituted.

An "O-thiocarbamyl" group refers to a "—OC(=S)—N$(R_AR_B)$" group in which $R_A$ and $R_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An O-thiocarbamyl may be substituted or unsubstituted.

An "N-thiocarbamyl" group refers to an "ROC(=S)N($R_A$)—" group in which R and $R_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-thiocarbamyl may be substituted or unsubstituted.

A "C-amido" group refers to a "—C(=O)N($R_A R_B$)" group in which $R_A$ and $R_B$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). A C-amido may be substituted or unsubstituted.

An "N-amido" group refers to a "RC(=O)N($R_A$)—" group in which R and $R_A$ can be independently hydrogen, an alkyl, an alkenyl, an alkynyl, a cycloalkyl, a cycloalkenyl, aryl, heteroaryl, heterocyclyl, cycloalkyl(alkyl), aryl(alkyl), heteroaryl(alkyl) or heterocyclyl(alkyl). An N-amido may be substituted or unsubstituted.

The term "halogen atom" or "halogen" as used herein, means any one of the radio-stable atoms of column 7 of the Periodic Table of the Elements, such as, fluorine, chlorine, bromine and iodine.

As used herein, "═══" indicates a single or double bond, unless stated otherwise.

Where the numbers of substituents is not specified (e.g. haloalkyl), there may be one or more substituents present. For example "haloalkyl" may include one or more of the same or different halogens. As another example, "$C_1$-$C_3$ alkoxyphenyl" may include one or more of the same or different alkoxy groups containing one, two or three atoms.

As used herein, the abbreviations for any protective groups, amino acids and other compounds, are, unless indicated otherwise, in accord with their common usage, recognized abbreviations, or the IUPAC-IUB Commission on Biochemical Nomenclature (See, Biochem. 11:942-944 (1972)).

As used herein, the term "amino acid" refers to any amino acid (both natural and non-natural amino acids), including, but not limited to, α-amino acids. Examples of suitable amino acids include, but are not limited to, alanine, asparagine, aspartate, cysteine, glutamate, glutamine, glycine, proline, serine, tyrosine, arginine, histidine, isoleucine, leucine, lysine, methionine, phenylalanine, threonine, tryptophan and valine. Additional examples of suitable amino acids include, but are not limited to, ornithine, hypusine, 2-aminoisobutyric acid, dehydrpoalanine, gamma-aminobutyric acid, citrulline, beta-alanine, alpha-ethyl-glycine, alpha-propyl-glycine and norleucine. As used herein, "amino acid" also includes amino acids wherein the main-chain carboxylic acid group has been converted to an ester group.

The terms "protecting group" and "protecting groups" as used herein refer to any atom or group of atoms that is added to a molecule in order to prevent existing groups in the molecule from undergoing unwanted chemical reactions. Examples of protecting group moieties are described in T. W. Greene and P. G. M. Wuts, *Protective Groups in Organic Synthesis*, 3. Ed. John Wiley & Sons, 1999, and in J. F. W. McOmie, *Protective Groups in Organic Chemistry* Plenum Press, 1973, both of which are hereby incorporated by reference for the limited purpose of disclosing suitable protecting groups. The protecting group moiety may be chosen in such a way, that they are stable to certain reaction conditions and readily removed at a convenient stage using methodology known from the art. A non-limiting list of protecting groups include benzyl; substituted benzyl; alkylcarbonyls and alkoxycarbonyls (e.g., t-butoxycarbonyl (BOC), acetyl, or isobutyryl); arylalkylcarbonyls and aryl- alkoxycarbonyls (e.g., benzyloxycarbonyl); substituted methyl ether (e.g. methoxymethyl ether); substituted ethyl ether; a substituted benzyl ether; tetrahydropyranyl ether; silyls (e.g., trimethylsilyl, triethylsilyl, triisopropylsilyl, t-butyldimethylsilyl, tri-iso-propylsilyloxymethyl, [2-(trimethylsilyl)ethoxy]methyl or t-butyldiphenylsilyl); esters (e.g. benzoate ester); carbonates (e.g. methoxymethylcarbonate); sulfonates (e.g. tosylate or mesylate); acyclic ketal (e.g. dimethyl acetal); cyclic ketals (e.g., 1,3-dioxane, 1,3-dioxolanes, and those described herein); acyclic acetal; cyclic acetal (e.g., those described herein); acyclic hemiacetal; cyclic hemiacetal; cyclic dithioketals (e.g., 1,3-dithiane or 1,3-dithiolane); orthoesters (e.g., those described herein) and triarylmethyl groups (e.g., trityl; monomethoxytrityl (MMTr); 4,4'-dimethoxytrityl (DMTr); 4,4',4"-trimethoxytrityl (TMTr); and those described herein).

Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; and use of terms like 'preferably,' 'preferred,' 'desired,' or 'desirable,' and words of similar meaning should not be understood as implying that certain features are critical, essential, or even important to the structure or function, but instead as merely intended to highlight alternative or additional features that may or may not be utilized in a particular embodiment. In addition, the term "comprising" is to be interpreted synonymously with the phrases "having at least" or "including at least". When used in the context of a process, the term "comprising" means that the process includes at least the recited steps, but may include additional steps. When used in the context of a compound, composition or device, the term "comprising" means that the compound, composition or device includes at least the recited features or components, but may also include additional features or components. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It is understood that, in any compound described herein having one or more chiral centers, if an absolute stereochemistry is not expressly indicated, then each center may independently be of R-configuration or S-configuration or a mixture thereof. Thus, the compounds provided herein may be enantiomerically pure, enantiomerically enriched, racemic mixture, diastereomerically pure, diastereomerically enriched, or a stereoisomeric mixture. In addition it is understood that, in any compound described herein having one or more double bond(s) generating geometrical isomers that can be defined as E or Z, each double bond may independently be E or Z a mixture thereof.

Likewise, it is understood that, in any compound described, all tautomeric forms are also intended to be included.

It is to be understood that where compounds disclosed herein have unfilled valencies, then the valencies are to be filled with hydrogens or isotopes thereof, e.g., hydrogen-1 (protium) and hydrogen-2 (deuterium).

It is understood that the compounds described herein can be labeled isotopically. Substitution with isotopes such as deuterium may afford certain therapeutic advantages resulting from greater metabolic stability, such as, for example, increased in vivo half-life or reduced dosage requirements. Each chemical element as represented in a compound structure may include any isotope of said element. For example, in a compound structure a hydrogen atom may be explicitly disclosed or understood to be present in the compound. At any position of the compound that a hydrogen atom may be present, the hydrogen atom can be any isotope of hydrogen, including but not limited to hydrogen-1 (protium) and hydrogen-2 (deuterium). Thus, reference herein to a compound encompasses all potential isotopic forms unless the context clearly dictates otherwise.

It is understood that the methods and combinations described herein include crystalline forms (also known as polymorphs, which include the different crystal packing arrangements of the same elemental composition of a compound), amorphous phases, salts, solvates, and hydrates. In some embodiments, the compounds described herein exist in solvated forms with pharmaceutically acceptable solvents such as water, ethanol, or the like. In other embodiments, the compounds described herein exist in unsolvated form. Solvates contain either stoichiometric or non-stoichiometric amounts of a solvent, and may be formed during the process of crystallization with pharmaceutically acceptable solvents such as water, ethanol, or the like. Hydrates are formed when the solvent is water, or alcoholates are formed when the solvent is alcohol. In addition, the compounds provided herein can exist in unsolvated as well as solvated forms. In general, the solvated forms are considered equivalent to the unsolvated forms for the purposes of the compounds and methods provided herein.

Where a range of values is provided, it is understood that the upper and lower limit, and any intervening value between the upper and lower limit of the range is included.

Any percentages, ratios or other quantities referred to herein are on a weight basis, unless otherwise indicated.

Saturated Fatty Acids

Saturated and unsaturated fatty acids are known to be present in the body (see, e.g., Jenkins B, West J, Koulman A (2015), A review of odd-chain fatty acid metabolism and the role of pentadecanoic acid (C15:0) and heptadecanoic acid (C17:0) in health and disease, Molecules 20:2425-44). As provided herein, fatty acids are referred to and described using conventional nomenclature as is employed by one of skill in the art. A saturated fatty acid includes no carbon-carbon double bonds. An unsaturated fatty acid includes at least one carbon-carbon double bond. A monounsaturated fatty acid includes only one carbon-carbon double bond. A polyunsaturated fatty acid includes two or more carbon-carbon double bonds. Double bonds in fatty acids are generally cis; however, trans double bonds are also possible. The position of double bonds can be indicated by $\Delta n$, where n indicates the lower numbered carbon of each pair of double-bonded carbon atoms. A shorthand notation specifying total #carbons:#double bonds, $\Delta_{double\ bond\ positions}$ can be employed. For example, $20:4\Delta_{5,8,11,14}$ refers to a fatty acid having 20 carbon atoms and four double bonds, with the double bonds situated between the 5 and 6 carbon atom, the 8 and 9 carbon atom, the 11 and 12 carbon atom, and the 14 and 15 carbon atom, with carbon atom 1 being the carbon of the carboxylic acid group. Stearate (octadecanoate) is a saturated fatty acid. Oleate (cis-$\Delta$9-octadecenoate) is a monounsaturated fatty acid, linolenate (all-cis-$\Delta$9,12,15-octadecatrienoate) is a polyunsaturated fatty acid.

A saturated fatty acid may be referred to by various names, for example, heptadecanoic acid may be referred to as heptadecylic acid and n-heptadecylic acid, or C17:0. A saturated or unsaturated fatty acid may be referred to by lipid numbers, as known in the art. Examples of odd chain fatty acids are margaric acid (heptadecanoic acid, C17:0), pelargonate (nonanoic acid, C9:0), undecanoic acid (C11:0), nonadecanoic acid (C19:0), arachidonate ((5Z,8Z,11Z,14Z)-icosa-5,8,11,14-tetraenoic acid), adrenate (all-cis-7,10,13,16-docosatetraenoic acid), and osbond acid (all-cis-4,7,10,13,16-docosapentaenoic acid). Generally, the one or more saturated fatty acids have from 9 carbon atoms to 31 carbon atoms in the longest alkyl chain (9, 11, 13, 15, 17, 19, 21, 23, 25, 27, 29, or 31 carbon atoms), for example, from 15 to 21 carbon atoms, for example 17 carbon atoms; however, in certain embodiments higher or lower odd numbers of carbon atoms can be acceptable. In some embodiments, the saturated fatty acids can be odd chain fatty acids or even chain fatty acids. In some embodiments, the saturated fatty acid can be an odd chain fatty acid. As described herein, an odd chain fatty acid is a fatty acid having an odd number of carbon atoms in the longest alkyl chain. As described herein, an even chain fatty acid is a fatty acid having an even number of carbon atoms in the longest alkyl chain.

A saturated fatty acid may be present as a salt, for example, at a carboxylic group. In some embodiments, one compound of Formula (I), or pharmaceutically acceptable salt thereof, may be present, for example, in a composition, two compounds of Formula (I) or pharmaceutically acceptable salts thereof may be present, three compounds of Formula (I), or pharmaceutically acceptable salts thereof, may be present, or more. In some embodiments, saturated fatty acids in a mixture including a plurality of compounds of Formula (I) fatty acids, or pharmaceutically acceptable salts thereof, may be distinguished by the amount of unsaturation, the length of the hydrocarbon chain, varying states of derivativeification, the number of alkyl substitutions, the identity of the acid isostere, the identity of the salt, or by other structural features. In further embodiments, a compound of Formula (I), or pharmaceutically acceptable salt thereof, may be present, for example, in a composition, with a naturally occurring fatty acid, or a naturally occurring unsaturated fatty acid.

Odd chain fatty acids are found in trace amounts in some dairy products, including butter, and is a component of some fish oils (see, e.g., Mansson H L (2008), Fatty acids in bovine milk fat, Food Nutr. Res. 52:4, Luzia L A, Sampaio G R, Castellucci C M N, Tones E A F S (2013) The influence of season on the lipid profiles of five commercially important species of Brazilian fish. Food Chem. 83:93-97). Studies have demonstrated that increasing daily dietary intake of foods with odd chain fatty acids successfully increases serum levels (see, e.g., Benatar J. R., Stewart R. A. H. (2014), The effects of changing dairy intake on trans and saturated fatty acid levels—results from a randomized controlled study. Nutr. J. 13:32).

The prevalence of various fatty acids in the diet has been correlated to the occurrence of metabolic syndrome in subjects (see, e.g., Forouhi N, Koulman A, Sharp S, Imamura F, Kroger J, Schulze M, et al. (2014), Differences in the prospective association between individual plasma phospholipid saturated fatty acids and incident type 2 diabetes: the EPIC-InterAct case-cohort study. Lancet Diabetes Endocrinol. 2:810-8). Indeed, whole-fat dairy consumption has been correlated with a decreased risk of metabolic syndrome markers (see, e.g., Kratz M, Marcovina S, Nelson J E, Yeh M M, Kowdley K V, Callahan H S, et al. (2014), Dairy fat intake is associated with glucose tolerance, hepatic and systemic insulin sensitivity, and liver fat but not beta-cell function in humans, Am. J. Clin. Nutr., 99:1385-96).

A pure or purified odd chain fatty acid may exist in various physical states. For example, heptadecanoic acid exists as an off-white powder that is stable at room temperature; this compound can be purchased in forms suitable for research purposes in small amounts from some commercial suppliers (for example, from Sigma-Aldrich corp., of St. Louis, MO). Other odd chain fatty acids, or salts or derivatives thereof, may exist as oils, solids, crystalline solids, or gases.

A compound of Formula (I), or pharmaceutically acceptable salt thereof, may be provided in a purity (e.g., a percentage of the compound of Formula (I), or pharmaceutically acceptable salt thereof, in a bulk form) of at least about 10%, at least about 20%, at least about 30%, at least about 40%, at least about 50%, at least about 60%, at least about 70%, at least about 80%, at least about 90%, at least about 95%, at least about 98%, at least about 99%, at least about 99.9%, at least about 99.99%, or substantially pure, wherein substantially pure may include, but not be limited to, a product with impurities at a level such that no physiological effect from the presence of the impurities is detectable. A mixture of compounds of Formula (I), or pharmaceutically acceptable salts thereof, may be present in a purity of at least about 10%, at least about 20%, at least about 30%, at least about 40%, at least about 50%, at least about 60%, at least about 70%, at least about 80%, at least about 90%, at least about 95%, at least about 98%, at least about 99%, at least about 99.9%, at least about 99.99%, or substantially pure. A compound of Formula (I), or pharmaceutically acceptable salt thereof, may be free from naturally occurring fatty acids or fatty acid derivatives, may be free from triglycerides, or may be free from phospholipids. Without limitation, a compound of Formula (I), or pharmaceutically acceptable salt thereof, may be substantially free from even chain fatty acids, singly or taken as a group; even chain fatty acids include, for example, myristic acid (C14:0), palmitic acid (C16:0), stearic acid (C18:0), or arachidic acid (C20:0). In further embodiments, and without limitation, a compound of Formula (I), or pharmaceutically acceptable salt thereof, may be substantially free from naturally occurring even chain fatty acids. In some embodiments, a compound of Formula (I), or pharmaceutically acceptable salt thereof, may be substantially free from short-chain fatty acids (SCFA), medium-chain fatty acids (MCFA), long-chain fatty acids (LCFA), or very long chain fatty acids (VLCFA). In some embodiments, "substantially free" can mean that the composition contains less than 5 wt. % of an impurity, e.g., naturally occurring even chain fatty acid(s), or less than 1 wt. % of an impurity, or has a level of impurity that is not detectable, e.g., using conventional GC/MS detection methods.

A compound of Formula (I), or pharmaceutically acceptable salt thereof, may be synthesized by any method including methods known to persons of skill in the art or those methods provided herein. In some embodiments, a compound of Formula (I), or pharmaceutically acceptable salt thereof, may be present in natural sources, may be isolated from natural sources, may be semi-synthetic, may be synthetic, or may be a mixture of one or more of these. A compound of Formula (I), or pharmaceutically acceptable salt thereof, may be produced in a laboratory, may be produced in nature, may be produced by enzymatic processes, may be produced by wild microbes, may be produced by genetically modified microbes, may be isolated from animal tissues, may be produced by chemical synthesis, or may be produced by a plurality of these processes.

A compound of Formula (I), or pharmaceutically acceptable salt thereof, may be derived from natural sources, e.g., fish oils, or can be synthesized by methods as are known in the art. In some embodiments, a compound of Formula (I), or pharmaceutically acceptable salt thereof, may be contaminated with even chain fatty acids, or other components present in unrefined or unpurified natural products. In such situations, it can be desirable to remove undesired components, or to increase the concentration of desired components using known separation or purification techniques.

In any compound described, all tautomeric forms are also intended to be included. Without limitation, all tautomers of carbon-carbon double bonds and carboxylic groups, and heterocycles, for example, tetrazoles, are intended to be included. An example tautomer provided herein is that of a tetrazole substituent:

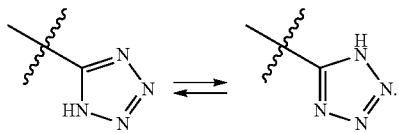 [SMILES: *c1nnn[nH]1 ; *c1nnn[nH]1]

In any compound described herein having one or more double bond(s) generating geometrical isomers that can be defined as E or Z, each double bond may independently be E or Z, or a mixture thereof.

Where compounds disclosed herein have unfilled valencies, then the valencies are to be filled with hydrogens or isotopes thereof, e.g., hydrogen-1 (protium) and hydrogen-2 (deuterium).

A compound of Formula (I), or a pharmaceutically acceptable salt thereof, includes crystalline forms (also known as polymorphs, which include the different crystal packing arrangements of the same elemental composition of a compound), amorphous phases, salts, solvates, and hydrates. In some embodiments, the compounds described herein exist in solvated forms with pharmaceutically acceptable solvents such as water, ethanol, or the like. In other embodiments, the compounds described herein exist in unsolvated form. Solvates contain either stoichiometric or non-stoichiometric amounts of a solvent, and may be formed during the process of crystallization with pharmaceutically acceptable solvents such as water, ethanol, or the like. Hydrates are formed when the solvent is water, or alcoholates are formed when the solvent is alcohol. In addition, the compounds provided herein can exist in unsolvated as well as solvated forms. In general, the solvated forms are considered equivalent to the unsolvated forms for the purposes of the compounds and methods provided herein.

The compounds described herein can be labeled isotopically. In some circumstances, substitution with isotopes such as deuterium may afford certain therapeutic advantages resulting from greater metabolic stability, such as, for example, increased in vivo half-life or reduced dosage requirements. Isotopic substitution may be beneficial in monitoring subject response to administration of a compound, for example, by providing opportunity for monitoring of the fate of an atom in a compound. Each chemical element as represented in a compound structure may include any isotope of said element. For example, in a compound structure a hydrogen atom may be explicitly disclosed or understood to be present in the compound. At any position of the compound that a hydrogen atom may be present, the hydrogen atom can be any isotope of hydrogen, including but not limited to hydrogen-1 (protium) and hydrogen-2 (deuterium). Thus, reference herein to a compound encompasses all potential isotopic forms unless the context clearly dictates otherwise.

Preparation of Compounds

Compounds of Formula (I) can be prepared by any suitable method known to those in the art. For representative methods, see, for example, Francis A. Carey et al., Advanced Organic Chemistry: Part B: Reaction and Synthesis ($5^{th}$ Ed. 2005).

Pharmaceutical Compositions Including a Compound of Formula (I)

Formulations including an odd chain fatty acid, or a salt or derivative thereof, and at least one excipient are provided. It is generally preferred to administer the compounds of the embodiments in oral formulations; however, other routes of administration are also contemplated.

The pharmaceutical compositions described herein can be administered by themselves to a subject, or in compositions where they are mixed with other active agents, as in combination therapy, or with carriers, diluents, excipients or combinations thereof. Formulation is dependent upon the route of administration chosen. Techniques for formulation and administration of the compounds described herein are known to those skilled in the art (see, e.g., "Remington: The Science and Practice of Pharmacy", Lippincott Williams & Wilkins; 20th edition (Jun. 1, 2003) and "Remington's Pharmaceutical Sciences," Mack Pub. Co.; 18th and 19th editions (December 1985, and June 1990, respectively).

The pharmaceutical compositions disclosed herein may be manufactured by a process that is itself known, e.g., by means of conventional mixing, dissolving, granulating, dragee-making, levigating, emulsifying, encapsulating, entrapping, tableting, or extracting processes. Many of the compounds used in the pharmaceutical combinations disclosed herein may be provided as salts with pharmaceutically acceptable counterions.

Multiple techniques of administering a compound exist in the art including, but not limited to, oral, rectal, topical, aerosol, injection and parenteral delivery, including intramuscular, subcutaneous, intravenous, intramedullary injections, intrathecal, direct intraventricular, intraperitoneal, intranasal and intraocular injections. Contemplated herein is any combination of the forgoing, or other methods as would be known to one of ordinary skill in the art (see, e.g., "Remington: The Science and Practice of Pharmacy", Lippincott Williams & Wilkins; 20th edition (Jun. 1, 2003) and "Remington's Pharmaceutical Sciences," Mack Pub. Co.; 18th and 19th editions (December 1985, and June 1990, respectively).

In practice, a compound of Formula (I), or a pharmaceutically acceptable salt thereof, may be combined as the active ingredient in intimate admixture with a pharmaceutical carrier according to conventional pharmaceutical compounding techniques. The carrier can take a wide variety of forms depending on the form of preparation desired for administration. Thus, the pharmaceutical compositions provided herein can be presented as discrete units suitable for oral administration such as capsules, cachets or tablets each containing a predetermined amount of the active ingredient. Further, the compositions can be presented as an oil, a powder, as granules, as a solution, as a suspension in an aqueous liquid, as a non-aqueous liquid, as an oil-in-water emulsion, or as a water-in-oil liquid emulsion. In addition to the common dosage forms set out above, the compounds provided herein, or pharmaceutically acceptable salts or derivatives thereof, can also be administered by controlled release means and/or delivery devices. The compositions can be prepared by any of the methods of pharmacy. In general, such methods include a step of bringing into association the active ingredient with the carrier that constitutes one or more necessary ingredients. In general, the compositions are prepared by uniformly and intimately admixing the active ingredient with liquid carriers or finely divided solid carriers or both. The product can then be conveniently shaped into the desired presentation.

A formulation may also be administered in a local rather than systemic manner, for example, via injection of the compound directly into the infected area, often in a depot or sustained release formulation. Furthermore, a targeted drug delivery system might be used, for example, in a liposome coated with a tissue specific antibody.

The pharmaceutical compositions may contain a compound of Formula (I), or a pharmaceutically acceptable salt thereof, in an amount effective for the desired therapeutic effect. In some embodiments, the pharmaceutical compositions are in a unit dosage form and comprise from about 0.1 mg or less to about 5000 mg or more per unit dosage form. In further embodiments, the pharmaceutical compositions comprise from about 1 to about 500 mg per unit dosage form or from about 500 to 5000 mg per unit dosage form. Such dosage forms may be solid, semisolid, liquid, an emulsion, or adapted for delivery via aerosol or the like for inhalation administration.

The pharmaceutical carrier employed can be, for example, a solid, liquid, or gas. Examples of solid carriers include lactose, terra alba, sucrose, talc, gelatin, agar, pectin, acacia, magnesium stearate, and stearic acid. Examples of liquid carriers are sugar syrup, peanut oil, olive oil, lower alcohols, and water. Examples of gaseous carriers include carbon dioxide and nitrogen.

Pharmaceutical compositions provided herein can be prepared as solutions or suspensions of the active compound(s) in water. A suitable surfactant can be included such as, for example, hydroxypropylcellulose. Dispersions can also be prepared in glycerol, liquid polyethylene glycols, and mixtures thereof in oils. Further, a preservative can be included to, for example, prevent the detrimental growth of microorganisms.

Pharmaceutical compositions provided herein suitable for injectable use include sterile aqueous solutions or dispersions. Furthermore, the compositions can be in the form of sterile powders for the extemporaneous preparation of such sterile injectable solutions or dispersions. The pharmaceutical compositions must be stable under the conditions of manufacture and storage; thus, preferably should be preserved against the contaminating action of microorganisms such as bacteria and fungi. The carrier can be a solvent or dispersion medium containing, for example, water, ethanol, polyol (e.g., glycerol, propylene glycol and liquid polyethylene glycol), vegetable oils, and suitable mixtures thereof.

In addition to the aforementioned carrier ingredients, the pharmaceutical formulations described above can include, as appropriate, one or more additional carrier ingredients such as diluents, buffers, flavoring agents, binders, surface-active agents, thickeners, lubricants, preservatives (including anti-oxidants) and the like. Furthermore, other adjuvants can be included to render the formulation isotonic with the blood of the intended recipient. Compositions containing a compound provided herein, or pharmaceutically acceptable salt or derivative thereof, can also be prepared in powder or liquid concentrate form for dilution.

Contemplated herein are compositions including a compound of Formula (I), or a pharmaceutically acceptable salt thereof, in combination with at least one additional active agent. A compound of Formula (I), or a pharmaceutically acceptable salt thereof, and the at least one additional active agent(s) may be present in a single formulation or in multiple formulations provided together, or may be unformulated. In some embodiments, a compound of Formula (I), or a pharmaceutically acceptable salt thereof, can be administered with one or more additional agents together in a single composition. For example, a compound of Formula (I), or a pharmaceutically acceptable salt thereof, can be administered in one composition, and at least one of the additional agents can be administered in a second composition. In a further embodiment, a compound of Formula (I), or a pharmaceutically acceptable salt thereof, and the at least one additional active agent(s) are co-packaged in a kit. For example, a drug manufacturer, a drug reseller, a physician, a compounding shop, or a pharmacist can provide a kit comprising a disclosed compound or product and another component for delivery to a patient.

Some embodiments described herein relate to a pharmaceutical composition, which can include a therapeutically effective amount of one or more compounds described herein (e.g., a compound of Formula (I), or a pharmaceutically acceptable salt thereof) and a pharmaceutically acceptable carrier, diluent, excipient or combination thereof. The pharmaceutical composition can include a compound of Formula (I), or a pharmaceutically acceptable salt thereof, in, for example, $>1\%$, $\geq 2\%$, $\geq 3\%$, $\geq 4\%$, $\geq 5\%$, $\geq 6\%$, $\geq 7\%$, $\geq 8\%$, $\geq 9\%$, $\geq 10\%$, $\geq 20\%$, $\geq 30\%$, $\geq 40\%$, $\geq 50\%$, $\geq 60\%$, $\geq 70\%$, $\geq 80\%$, $\geq 90\%$, $\geq 95\%$, or $\geq 98\%$ of the composition. In some embodiments, the pharmaceutical composition can include a plurality of compounds of Formula (I), or pharmaceutically acceptable salts thereof, in, for example, $>1\%$, $\geq 2\%$, $\geq 3\%$, $\geq 4\%$, $\geq 5\%$, $\geq 6\%$, $\geq 7\%$, $\geq 8\%$, $\geq 9\%$, $\geq 10\%$, $\geq 20\%$, $\geq 30\%$, $\geq 40\%$, $\geq 50\%$, $\geq 60\%$, $\geq 70\%$, $\geq 80\%$, $\geq 90\%$, $\geq 95\%$, or $\geq 98\%$ of the composition.

Foodstuffs

Foodstuffs and other comestibles including a compound of Formula (I), or a pharmaceutically acceptable salt thereof, are provided, wherein an amount of the compound of Formula (I), or pharmaceutically acceptable salt thereof, in the foodstuff has been fortified (e.g., enriched or concentrated). A compound of Formula (I), or a pharmaceutically acceptable salt thereof, provided herein may be added to foodstuffs for consumption by a subject. The compound of Formula (I), or a pharmaceutically acceptable salt thereof, may be integrated into one or more ingredients of a foodstuff. The compound of Formula (I), or pharmaceutically acceptable salt thereof, may be prepared as an ingredient, or may be unprepared. The compound, or preparation including the compound, may be added prior to preparation, during preparation, or following preparation. Preparation may without limitation include cooking, mixing, flavoring, seasoning, blending, boiling, frying, baking, or other processes known in the art. Fortification is preferably at a level so as to provide a therapeutic daily dosage of the compound of Formula (I), or pharmaceutically acceptable salt thereof, as described elsewhere herein; however, beneficial effects may also be obtained at amounts below such dosages.

A compound of Formula (I), or a pharmaceutically acceptable salt thereof, may be present as a constituency in foodstuffs by operation of processes known in nature, for example, by altering the metabolic processes of a plant, animal, bacteria, or fungus. Genetic alteration of a plant, animal, bacteria, or fungus to increase the concentration of an odd chain fatty acid, or a salt or derivative thereof, is contemplated. By way of example, the compound of Formula (I), or pharmaceutically acceptable salt thereof, can be present in the foodstuff in a concentration of at least about 1%, at least about 2%, at least about 3%, at least about 4%, at least about 5%, at least about 6%, at least about 7%, at least about 8%, at least about 9%, at least about 10%, at least about 20%, at least about 30%, at least about 40%, at least about 50%, or higher, for example, 1% to 2% or 3% or 4% or 5% or 6% or 7% or 8% or 9% or 10% or 20% or 30% or 40% or 50%.

Indications

Provided herein are compositions and methods for treating conditions including but not limited to impaired cognition (including impaired cognition due to damage to the brain from neurodegenerative conditions, damage to the brain from injuries, infections, substance abuse, substance withdrawal, psychiatric illness, deficiencies in vitamins and other key nutrients, problems with hormones, metabolic imbalances, or medication side-effects, and other related conditions), movement disorders (including movement disorders associated with dystonia, Chorea, Huntington's disease, Parkinson's disease, Parkinsonism, tics, Tourette syndrome, ataxia, tremors, essential tremors, myoclonus, multiple sclerosis, startle, restless leg syndrome, stiff person syndrome, gait disorders, and spasticity), chronic pain (including chronic pain due to past injuries, back problems, migraines and other headaches, arthritis, nerve damage, infections, and fibromyalgia), depression (including persistent depressive disorder (dysthymia), postpartum depression, psychotic depression, seasonal affective disorder, bipolar disorder, disruptive mood dysregulation disorder, and premenstrual dysphoric disorder), loss of appetite (including anorexia and cachexia associated with AIDS, cancer, cancer treatments, chronic heart disease, metabolic alterations, chronic inflammation, pain, dysgeusia, ageusia, hypersomnia, dysphagia, dyspnea, nausea, vomiting, constipation, diarrhea, medication side effects, psychological distress, and infections of the mouth or esophagus), convulsions, seizures (including non-epileptic seizures, epileptic seizures, and psychogenic non-epileptic seizures), and addiction (including addiction to opioids, cocaine, alcohol, and other drugs).

In some embodiments, the compositions and methods provided herein are indicated for treatment, prophylaxis, prevention or management of impaired cognition.

Cognition is the mental action or process of acquiring knowledge and understanding through thought, experience, and the senses. Impaired cognition (also called cognitive decline) can be caused by damage to the brain from neurodegenerative conditions, damage to the brain from injuries, infections, substance abuse, substance withdrawal, psychiatric illness, deficiencies in vitamins and other key nutrients, problems with hormones, metabolic imbalances, or medication side-effects. Impaired cognition also occurs as the natural process of aging. Impaired cognition can be related to hallucinations, personality changes, depression symptoms, anxiety symptoms, getting lost, and confusion. CB1 agonists have been demonstrated to protect against cognitive impairment in mouse models of Alzheimer's disease (see: Aso E, Palomer E, Juves S, Maldonado R, Munoz F J, Ferrer I (2012) CB1 agonist ACEA protects neurons and reduces the cognitive impairment of AβPP/PS1 mice. J Alz Dis 30:439-459), and paired PPAR and CB1 agonists have been proposed as novel treatments for cognitive impairment (Panillo L V, Justinova Z, Goldberg S R (2013) Inhibition of FAAH and activation of PPAR: New approaches to the treatment of cognitive dysfunction and drug addiction. Pharmacol Ther 138:84-102). Drugs to treat cognitive impairment include donepezil, gotu kola, cholinesterase inhibitors, rivastigmine, galantamine, and memantine.

In some embodiments, the compositions and methods provided herein are indicated for treatment, prophylaxis, prevention or management of movement disorders.

Movement disorders are neurologic conditions that cause problems with movements. Examples of movement disorders include dystonia, Chorea, Huntington's disease, Parkinson's disease, Parkinsonism, tics, Tourette syndrome, ataxia, tremors, essential tremors, myoclonus, multiple sclerosis, startle, restless leg syndrome, stiff person syndrome, gait disorders, and spasticity. Movement disorders can be caused by damage to the brain, spinal cord, or peripheral nerves, metabolic disorders, stroke and vascular diseases, toxins, infections, medicines, and genetics. Endocannabinoids can modulate neurotransmission involved in motor function, and targeted CB1 agonists beyond cannabis have been proposed to manage or treat multiple movement disorders (see: Kluger B, Triolo P, Jones W, Jankovic J (2015) The therapeutic potential of cannabinoids for movement disorders. Movement Disorders 30:313-327). Further, PPAR alpha agonists may help manage and treat other components of movement disorders such as Parkinson's disease (see: Kreisler A, Duhamel A, Vanbesien-Maillot C, Destee A, Bordet R (2010) Differing short-term neuroprotective effects of the fibrates fenofibrate and bezafibrate in MPTP and 6-OHDA experimental models of Parkinson's disease. Behav Pharmacol 21:194-205). Drugs for treating movement disorders include levodopa, dopamine agonists, MAO-B antagonists, COMT-inhibitors, anticholingergics, amantadine and antidepressants.

In some embodiments, the compositions and methods provided herein are indicated for treatment, prophylaxis, prevention or management of chronic pain.

Chronic pain is defined as any pain lasting longer than 12 weeks and can persist for months or years. Causes of chronic pain include past injuries, back problems, migraines and other headaches, arthritis, nerve damage, infections, and fibromyalgia. Chronic pain can result in or be accompanied by limited movement, fatigue, sleep disturbance, decreased appetite, and mood changes. While lifestyle changes may help manage chronic pain, prescription therapeutics are often needed to help manage this condition. Some of the most effective prescription therapeutics for pain, such as opiates, are addictive and have resulted in epidemics of drug addictions and resultant deaths. As such, there is a need for novel pain management therapeutics that are effective without being addictive. CB1 receptor agonists have emerged as promising and non-addictive drugs to control pain (see: Talwar R, Kumar Potluri V (2011) Cannabinoid 1 (CB1) receptor—pharmacology, role in pain and recent developments in emerging CB1 agonists. CNS and Neurol Dis—Drug Targets 10:536-544). Behavioral markers of chronic pain include fatigue, sleep disturbance, decreased appetite, and mood changes. Medications for chronic pain include opiates, oxycodone, tramadol, morphine, Non-steroidal Anti-inflammatory Drugs (NSAIDs), aspirin, acetaminophen, ibuprofen, COX-2 inhibitors, celecoxib, meloxicam, tricyclic anti-depressants (TCAs), serotonin and norepinephrine reuptake inhibitors (SNRIs), and selective serotonin reuptake inhibitors (SSRIs), anti-seizure medications (pregabalin and gabapentin), corticosteroids, muscle relaxants, and lidoderm.

In some embodiments, the compositions and methods provided herein are indicated for treatment, prophylaxis, prevention or management of depression.

Depression is a mood disorder that impacts how an individual feels, thinks, and handles daily activities. Forms of depression include persistent depressive disorder (dysthymia), postpartum depression, psychotic depression, seasonal affective disorder, bipolar disorder, disruptive mood dysregulation disorder, and premenstrual dysphoric disorder. Causes of depression include genetic, biological, environmental, and psychological factors. Depression can occur along with and be exacerbated by chronic diseases, including diabetes, cancer, heart disease, and Parkinson's disease. Depressions can result in persistent sad or anxious moods, feelings of hopelessness, irritability, decreased energy, fatigue, difficulty concentrating, difficulty sleeping, appetite changes, weight changes, pains, headaches, and digestive problems. Because mice deficient in CB1 receptors exhibit signs of depression, CB1 agonists can result in effects similar to other antidepressants, and CB1 agonists may increase the efficacy of CB1 as an antidepressant, paired CB1 receptor and PPAR-agonists have been proposed as promising therapeutic targets for depression (see: Hillard, C J, Lui Q S (2014) Endocannabinoid signaling in the etiology and treatment of major depressive illness. Curr Pharm Design 20:3795-3811). Behavioral markers or signs of depression can be monitored, e.g., irritability and restlessness, Increasing preoccupation with depressive feelings, decreased ability to make decisions, trouble recalling details, decreased ability to concentrate, slowed thinking and speaking, angry outbursts, spending increasing amounts of time sleeping, withdrawing from once-pleasurable activities, increasing challenges in meeting demands of work, home, social, and scholastic life, self-harm, suicide attempts, worthlessness, feeling critical of oneself, overwhelming sadness, anxiety, feeling "empty" inside, feelings of guilt, helplessness, low self-esteem, poor self-image, or preoccupation with death, dying, and suicide. Drugs for treating depression include aripiprazole, doxepin, clomipramine, bupropion, amoxapine, nortriptyline, citalopram, duloxetine, trazodone, venlafaxine, selegiline, perphenazine, amitriptyline, levomilnacipram, desvenlafaxine, lurasidone, lamotrigine, escitalopram, isocarboxazid, phenelzine, desipramine, tranylcpromine, paroxetine, fluoxetine, mirtazapine, quetiapine, nefazodone, imipramine, perphenazine, vortioxetine, vilazodone, protriptyline, sertraline, and olanzapine.

In some embodiments, the compositions and methods provided herein are indicated for treatment, prophylaxis, prevention or management of appetite loss, including anorexia and cachexia. Drugs for treatment of anorexia include fluoxetine or other SSRIs, or olanzapine.

Loss of appetite is common with many chronic, life-threatening diseases, and lack of appropriate nutrition can further exacerbate chronic conditions. This cycle of chronic illness and lost appetite can result in a downward spiral of an individual's health and wellbeing. Anorexia is the lack or loss of appetite, resulting in the inability to eat, and can be common in advanced cancers. Anorexia results in weight loss. Cachexia is a state of general ill health and malnutrition, marked by weakness and emaciation from loss of fat, muscle and bone mass, and can occur with severe conditions, including advanced cancers, AIDS, congestive heart failure, and chronic anorexia nervosa. An estimated 80% of cancer patients have cachexia. Causes of anorexia/cachexia syndrome include changes with chronic, life-threatening diseases, including cancer, AIDS, heart disease, metabolic alterations, chronic inflammation, pain, dysgeusia, ageusia, hypersomnia, dysphagia, dyspnea, nausea, vomiting, constipation, diarrhea, medication side effects, psychological distress, anorexia nervosa, and infections of the mouth or esophagus. Current treatments for anorexia and cachexia include steroids, cannabinoids, and prokinetic agents. These treatments, however, do not help treat underlying chronic conditions that are the primary drivers of anorexia and cachexia. Cannabinoids have long been known to stimulate appetite, and CB1 receptor agonists may be used to increase food intake and weight gain in people suffering from anorexia or cachexia (Kirkham T C (2009) Cannabinoids and appetite: Food craving and food pleasure. Int Rev Psychiatry 21:163-171). Emotional and behavioral markers or signs of anorexia can be monitored, including dramatic weight loss, dressing in layers to high weight loss to stay warm, preoccupation with weight/food/calories/fat grams/dieting, refuse to eat certain foods, comments about feeling "fat" despite weightloss, complaints of constipation/abdominal pain/cold intolerance/lethargy/excess energy, denies feeling hungry, food rituals, cooks meals for others without eating, excuse to avoid mealtimes, expresses need to "burn off" calories, maintas a rigid exercise regimen, withdraws from friends, limited social spontaneity, unable to maintain an appropriate body weight, and has a strong need for control.

Treatments for convulsions include stabilizing and treatment of the underlying medical condition (medication reaction, severe infection, sepsis, very high fever, severe vomiting and/or diarrhea, diabetic crisis (extremely high or low blood sugar levels), hydration abnormalities (severe dehydration or over hydration), severe malnutrition, excessive blood loss due to trauma or internal bleeding, organ failure (e.g., acute renal failure), allergic reaction, drug overdose, drug withdrawal, or heat stroke). Anticonvulsant/anti-seizure medications include acetazolamide, carbamazepine, clonazepam, diazepam, ethosuximide, gabapentin, lacosamide, lamotrigine, levetiracetam, lorazepam, methsuximide, nitrazepam, oxcarbazepine, paraldehyde, phenobarbital, phenytoin, pregavalin, primidone, rufinamide, stiripentol, topiramate, valproic acid, vigabatrin, felbamate, tiagabine hydrochloride, and zonisamide.

In some embodiments, the compositions and methods provided herein are indicated for treatment, prophylaxis, prevention or management of addiction.

Opioids are controlled drug substances, including morphine, codeine, fentanyl, methadone, buprenorphine, that bind to opiate receptors in neuronal cell membranes and confer analgesic effects to control pain. Opiate addiction has become an epidemic, resulting in increasing opioid overdose deaths, including 49,000 deaths in the U.S. during 2017 and being the primary contributor to the leading cause of death of Americans under 50 years old. Opiate withdrawal symptoms are severe and include muscle aches, pain, agitation, anxiety, nausea, gastrointestinal upset, tachycardia, rhinorrhea and chills (Wesson D R, Ling W. The Clinical Opiate Withdrawal Scale (COWS) J Psychoactive Drugs. 2003;35: 253-259). The severity of these symptoms make it difficult for individuals to stop using opioids, and there is an urgent need for novel approaches to attenuate opioid withdrawal symptoms, as well as novel, non-addictive drugs to control pain. Opioids, including heroin, morphine, codeine, and fentanyl, target the mu opioid receptor (OPRM1), and OPRM1 antagonists, primarily naloxone, are used as acute, emergency treatments of opioid overdoses. Because there is extensive cross-talk between the endocannabinoid and opioid-associated systems, and cannabinoids have been demonstrated to attenuate withdrawal symptoms from opioid addiction, CB1 receptor agonists have been proposed as a means to treat drug addiction, including opioid addiction (see: Scavone J L, Sterling R C, Bockstaele E J (2013) Cannabinoid and opioid interactions: implications for opiate dependence and withdrawal. Neurosci 248:637-654). Beyond opioid addiction, OPRM1 agonists appear to play a role in addiction to other substances, including alcohol and cocaine, and OPRM1 antagonists have been proposed to help treat alcohol and cocaine addiction (see: Kranzler H R, Gelernter J, O'Malley S, Hernandez-Avila C A, Kaufman D (2006) Association of the alcohol or other drug dependence with alleles of the µ opioid receptor gene (OPRM1). Alcoholism Clin Exp Res 22:1359-1362). Additionally, paired PPAR and CB1 agonists have been proposed as novel treatments for drug addiction (Panillo L V, Justinova Z, Goldberg S R (2013) Inhibition of FAAH and activation of PPAR: New approaches to the treatment of cognitive dysfunction and drug addiction. Pharmacol Ther 138:84-102). Behavioral markers of drug addiction or abuse include difficulties in one's relationships due to using, engaging in secretive or suspicious behaviors, frequently getting into legal trouble, including fights, accidents, illegal activities, and driving under the influence, neglecting responsibilities at work, school, or home, including neglecting one's children, sudden change in friends, favorite hangouts, and hobbies, unexplained need for money or financial problems (borrow or steal money), using drugs under dangerous conditions (driving while using drugs, using dirty needles, having unprotected sex), increased drug tolerance (the need to use more of the drug to experience the same effects one used to achieve with smaller amounts), using drugs to avoid or relieve withdrawal symptoms (nausea, restlessness, insomnia, depression, sweating, shaking, anxiety), loss of control over drug use (using more than intended, unable to stop), life revolves around drug use (always thinking of using, figuring how to get more, or recovering from use), abandoning enjoyable activities (hobbies, sports, and socializing) to use drugs, continuing to use regardless of negative consequences (blackouts, infections, mood swings, depression, paranoia), appearing fearful, anxious, or paranoid, with no reason, lack of motivation; appearing tired or "spaced out", periods of unusual increased energy, nervousness, or instability, sudden mood swings, increased irritability, or angry outbursts, and unexplained change in personality or attitude. Drugs to treat opiod use disorders include buprenorphine, methadone, and naltrexone. Drugs to treat alcohol use disorders include acamprosate, disulfiram, and naltrexone. Drugs to treat nicotine use disorders include bupropion, nicotine replacement therapies, and varenicline.

Conditions described herein, namely impaired cognition, movement disorders, chronic pain, depression, decreased appetite, and addiction, can be inter-related. In some embodiments, one of these conditions is accompanied by other conditions described herein.

The compositions of the embodiments can optionally be administered in conjunction with a conventional therapy for the condition being treated, e.g., before, during, or after, and in a same or different unit dosage form.

While a cluster of signs and symptoms may coexist in an individual subject, in many cases only one or a few symptoms may dominate, due to individual differences in vulnerability of the many physiological systems affected.

In some embodiments provided herein, the subject to be treated may be an animal, for example, a domestic animal such as a dog or cat; however, it is generally contemplated that the methods, uses, and compositions of the embodiments are applied to humans. Like human subjects, animal subjects including dog and cat subjects can also be susceptible to impaired cognition, movement disorders, chronic pain, depression, decreased and appetite.

In some embodiments, the condition treated is impaired cognition, including but not limited to impaired cognition that occurs with Alzheimer's disease.

In some embodiments, the condition treated is impaired cognition as indicated by the markers provided herein.

In some embodiments, the methods provided herein modulate markers of impaired cognition when the markers provide a clinical indication.

In some embodiments, the markers are behavioral markers.

In some embodiments, the methods provided herein alleviate symptoms of impaired cognition.

In some embodiments, the methods provided herein reduce risk of impaired cognition.

In some embodiments, the condition treated is a movement disorder, including but not limited to movement disorders that occur with multiple sclerosis or Parkinson's disease.

In some embodiments, the condition treated is a movement disorder as indicated by the markers provided herein.

In some embodiments, the methods provided herein modulate markers of a movement disorder when the markers provide a clinical indication.

In some embodiments, the markers are behavioral markers.

In some embodiments, the methods provided herein alleviate symptoms of a movement disorder.

In some embodiments, the methods provided herein reduce risk of a movement disorder.

In some embodiments, the methods provided herein treat convulsions.

In some embodiments, the methods provided herein treat seizures.

In some embodiments, the condition treated is chronic pain.

In some embodiments, the condition treated is chronic pain as indicated by the markers provided herein.

In some embodiments, the methods provided herein modulate markers of chronic pain when the markers provide a clinical indication.

In some embodiments, the markers are behavioral markers.

In some embodiments, the methods provided herein alleviate symptoms of chronic pain.

In some embodiments, the methods provided herein reduce risk of chronic pain.

In some embodiments, the condition treated is depression.

In some embodiments, the condition treated is depression as indicated by the markers provided herein.

In some embodiments, the methods provided herein modulate markers of depression when the markers provide a clinical indication.

In some embodiments, the markers are behavioral markers.

In some embodiments, the methods provided herein alleviate symptoms of depression.

In some embodiments, the methods provided herein reduce risk of depression.

In some embodiments, the condition treated is anorexia or cachexia.

In some embodiments, the condition treated is anorexia or cachexia as indicated by the markers provided herein.

In some embodiments, the methods provided herein modulate markers of anorexia or cachexia when the markers provide a clinical indication.

In some embodiments, the markers are behavioral markers.

In some embodiments, the methods provided herein alleviate symptoms of anorexia or cachexia.

In some embodiments, the methods provided herein reduce risk of anorexia or cachexia.

In some embodiments, the condition treated is addiction.

In some embodiments, the condition treated is addiction as indicated by the markers provided herein.

In some embodiments, the markers are behavioral markers.

In some embodiments, the methods provided herein modulate markers of addiction when the markers provide a clinical indication.

In some embodiments, the methods provided herein alleviate symptoms of addiction.

In some embodiments, the methods provided herein reduce risk of addiction.

In some embodiments, the methods provided herein increase serum levels of certain fatty acids.

In some embodiments, the compositions and methods provided herein modulate a marker of cognitive impairment, movement disorders or depression. In certain embodiments, the marker is serum or red blood cell membrane odd chain fatty acid percentage, serum or red blood cell membrane percentage of a compound of Formula (I), or a salt or metabolite thereof, serum concentration of an odd chain fatty acid, serum concentration of a compound of Formula (I), or a salt or metabolite thereof, serum total odd chain fatty acid, serum ferritin, serum iron, transferritin saturation, serum glucose (for example fasting glucose), serum triglycerides, blood pressure, HDL cholesterol, microalbuminuria (i.e., elevated albumin excretion in the urine), CRP (C reactive protein), IL-6 and TNFα (and other cytokines associated with insulin resistance), c-Jun N-terminal kinase (JNK), ATM (Ataxia Telangiectasia Mutated) or monocyte-chemoattractant protein-1. In some embodiments, the odd chain fatty acid, or the compound of Formula (I), or salt or metabolite thereof, is measured as a constituent of glycolipids. In further embodiments, the odd chain fatty acid, or the compound of Formula (I), or salt or metabolite thereof, is measured as a constituent of phospholipids.

In some embodiment, behavioral markers of cognitive impairment include confusion, poor motor coordination, loss of short-term or long-term memory, identity confusion, impaired judgment, hallucinations, delusions, personality changes, apathy, depression, anxiety, navigation, and confusion about visual-spatial tasks. Cognitive tests as known in the art can be conducted to assess cognitive status, e.g., the Mini-Cog, which involves a three-item recall and a clock draw, the MOCA test (Montreal Cognitive Assessment Test), the SLUMS (St. Louis University Mental Status Examination), and the Mini-Mental State Exam.

In some embodiments, the methods provided herein include the step of measuring the concentration of a marker of cognitive impairment, movement disorders or depression. One of skill in the art will be able to perform suitable methods for such measurements, including but not limited to those described herein.

Behavioral markers of any of the conditions described herein can be monitored, e.g., for increase, steady state, or reduction, or rate of increas, rate of reduction, or any other change in extent or nature. For some markers, an effective therapy may maintain a level of a marker where without treatment a reduction would be observed, or may otherwise slow a rate of reduction below that observed without treatment. An effective therapy may maintain a level of a marker where without treatment an increase would be observed, or may otherwise slow a rate of increase below that observed without treatment. An effective therapy may increase a level of a marker where without treatment no change or a reduction in level would be observed. An effective therapy may reduce a level of a marker where without treatment no change or an increase in level would be observed. An effective therapy main change the rate of a marker, either up or down, versus what is expected to be observed for no treatment.

Provided herein are methods for treating including the step of administering a dose of a compound of Formula (I), or pharmaceutically acceptable salt thereof, at a predetermined interval, or at an interval left to the discretion of the subject.

A compound of Formula (I), or pharmaceutically acceptable salt thereof, may be treated as, for example compared or measured, with respect to naturally occurring fatty acid in a tissue or tissues of the subject. A compound of Formula (I), or pharmaceutically acceptable salt thereof, may be incorporated into the body as if it were a naturally occurring dietary fatty acid. A compound of Formula (I), or pharmaceutically acceptable salt thereof, may undergo one or more metabolic processes in the body, and the concentration of the metabolite(s) may be indicative of the condition of the subject.

In some embodiments, the compounds and methods provided herein may provide a threshold serum or red blood cell membrane percentage of a compound of Formula (I), or a salt or metabolite thereof, relative to all serum or red blood cell membrane fatty acids, respectively. For example, the threshold value may be a value of about 0.05% or lower to 90% or higher, e.g., a value of at least about 0.05%, at least about 0.1%, at least about 0.2%, at least about 0.3%, at least about 0.4%, at least about 0.5%, at least about 0.6%, at least about 0.7%, at least about 0.8%, at least about 0.9%, at least about 1.0%, at least about 1.1%, at least about 1.2%, at least about 1.3%, at least about 1.4%, at least about 1.5%, at least about 1.6%, at least about 1.7%, at least about 1.8%, at least about 1.9%, at least about 2.1%, at least about 2.2%, at least about 2.3%, at least about 2.4%, at least about 2.5%, at least about 2.6%, at least about 2.7%, at least about 2.8%, at least about 2.9%, at least about 3.0%, at least about 3.5%, at least about 4.0%, at least about 4.5%, at least about 5%, at least about 6%, at least about 7%, at least about 8%, at least about 9%, at least about 10%, at least about 15%, at least about 20%, at least about 25%, at least about 30%, at least about 35%, at least about 40%, at least about 45%, at least about 50%, at least about 60%, at least about 70%, at least about 80%, at least about 90%, or more than 90%.

In some embodiments, the compounds and methods provided herein may provide an increase above a baseline value (e.g., pretreatment value in a patient being treated, or general value observed in a particular patient population) in a serum concentration of a compound of Formula (I), or a salt or metabolite thereof, or red blood cell membrane concentration of a compound of Formula (I), or a salt or metabolite thereof. For example, a serum compound of Formula (I), or salt or metabolite thereof, or red blood cell membrane concentration of a compound of Formula (I), or a salt or metabolite thereof, may be increased by at least about 1 µg/ml, at least about 2 µg/ml, at least about 3 µg/ml, at least about 4 µg/ml, at least about 5 µg/ml, at least about 6 µg/ml, at least about 7 µg/ml, at least about 8 µg/ml, at least about 9 µg/ml, at least about 10 µg/ml, at least about 15 µg/ml, at least about 20 µg/ml, at least about 25 µg/ml, at least about 30 µg/ml, at least about 35 µg/ml, at least about 40 µg/ml, at least about 45 µg/ml, at least about 50 µg/ml, or more than 50 µg/ml. In some embodiments, the serum concentration of a compound of Formula (I), or a salt or metabolite thereof, or red blood cell membrane concentration of a compound of Formula (I), or a salt or metabolite thereof, may increase above a baseline value (e.g., pretreatment value in a patient being treated, or general value observed in a particular patient population) by at least about $0.01 \times 10^{-4}$ M, at least about $0.05 \times 10^{-4}$ M, at least about $0.1 \times 10^{-4}$ M, at least about $0.2 \times 10^{-4}$ M, at least about $0.3 \times 10^{-4}$ M, at least about $0.4 \times 10^{-4}$ M, at least about $0.5 \times 10^{-4}$ M, at least about $0.6 \times 10^{-4}$ M, at least about $0.7 \times 10^{-4}$ M, at least about $0.8 \times 10^{-4}$ M, at least about $0.9 \times 10^{-4}$ M, at least about $1 \times 10^{-4}$ M, at least about $2 \times 10^{-4}$ M, or at least about $3 \times 10^{-4}$ M.

In some embodiments, the compounds and methods provided herein may provide an increase in serum total odd chain fatty acids, or red blood cell membrane total odd chain fatty acids. For example, serum total odd chain fatty acids, or red blood cell membrane total odd chain fatty acids, may be increased above a baseline value (e.g., pretreatment value in a patient being treated, or general value observed in a particular patient population) by at least about 5 µg/ml, at least about 6 µg/ml, at least about 7 µg/ml, at least about 8 µg/ml, at least about 9 µg/ml, at least about 10 µg/ml, at least about 15 µg/ml, at least about 20 µg/ml, at least about 25 µg/ml, at least about 30 µg/ml, at least about 35 µg/ml, at least about 40 µg/ml, at least about 45 µg/ml, at least about 50 µg/ml, at least about 60 µg/ml, at least about 70 µg/ml, at least about 80 µg/ml, at least about 90 µg/ml, at least about 100 µg/ml, at least about 150 µg/ml, at least about 200 µg/ml, at least about 250 µg/ml, at least about 300 µg/ml, at least about 350 µg/ml, at least about 400 µg/ml, at least about 450 µg/ml, at least about 500 µg/ml, or more than 500 µg/ml.

In some embodiments, the compounds and methods provided herein may provide an increase above a baseline value (e.g., pretreatment value in a patient being treated, or general value observed in a particular patient population) in a serum or red blood cell membrane odd chain fatty acids relative to all serum or red blood cell membrane fatty acids, respectively. For example, a serum or red blood cell membrane concentration of a compound of Formula (I), or a salt or metabolite thereof, may be increased above a baseline value (e.g., pretreatment value in a patient being treated, or general value observed in a particular patient population) by at least about 0.01%, at least about 0.05%, at least about 0.1%, at least about 0.2%, at least about 0.3%, at least about 0.4%, at least about 0.5%, at least about 0.6%, at least about 0.7%, at least about 0.8%, at least about 0.9%, at least about 1%, at least about 1.1%, at least about 1.2%, at least about 1.3%, at least about 1.4%, at least about 1.5%, at least about 1.6%, at least about 1.7%, at least about 1.8%, at least about 1.9%, at least about 2%, at least about 2.1%, at least about 2.2%, at least about 2.3%, at least about 2.4%, at least about 2.5%, at least about 2.6%, at least about 2.7%, at least about 2.8%, at least about 2.9%, at least about 3%, at least about 3.5%, at least about 4%, at least about 4.5%, at least about 5%, or more than 5%.

In some embodiments, the compounds and methods provided herein may provide a reduction in serum insulin. For example, serum insulin may be reduced below a baseline value (e.g., pretreatment value in a patient being treated, or general value observed in a particular patient population) by at least about 0.1 µIU/ml, at least about 0.2 µIU/ml, at least about 0.3 µIU/ml, at least about 0.4 µIU/ml, at least about 0.5 µIU/ml, at least about 0.6 µIU/ml, at least about 0.7 µIU/ml, at least about 0.8 µIU/ml, at least about 0.9 µIU/ml, at least about 1.0 µIU/ml, at least about 1.1 µIU/ml, at least about 1.2 µIU/ml, at least about 1.3 µIU/ml, at least about 1.4 µIU/ml, at least about 1.5 µIU/ml, at least about 2 µIU/ml, at least about 2.5 µIU/ml, at least about 3.0 µIU/ml, at least about 3.5 µIU/ml, at least about 4 µIU/ml, at least about 5 µIU/ml, at least about 6 µIU/ml, at least about 7 µIU/ml, at least about 8 µIU/ml, at least about 9 µIU/ml, at least about 10 µIU/ml, at least about 11 µIU/ml, at least about 12 µIU/ml, at least about 13 µIU/ml, at least about 14 µIU/ml, at least about 15 µIU/ml, at least about 16 µIU/ml, at least about 17 µIU/ml, at least about 18 µIU/ml, at least about 19 µIU/ml, at least about 20 µIU/ml, at least about 25 µIU/ml, at least about 30 µIU/ml, or more than 30 µIU/ml.

In some embodiments, a compound of Formula (I), or a pharmaceutically acceptable salt thereof, is administered to maintain serum phospholipid or endocannabinoid metabolite percent of the compound of Formula (I), or salt or metabolite thereof, above a predetermined threshold value. In further variations, the compound of Formula (I), or pharmaceutically acceptable salt thereof, is administered to maintain serum phospholipid percent of the compound of Formula (I), or a salt or metabolite thereof, above about 0.1%, about 0.2%, about 0.3%, about 0.4%, about 0.5%, about 0.6%, about 0.7%, about 0.8%, about 0.9%, about 1%, about 1.2%, about 1.4%, about 1.6%, about 1.8%, about 2%, about 2.2%, about 2.4%, or about 2.6%.

Combination Therapies

In some embodiments, the compounds disclosed herein, such as a compound of Formula (I), or a pharmaceutically acceptable salt thereof, or a pharmaceutical composition that includes a compound described herein, or a salt thereof, may be used in combination with one or more additional active agents. Examples of additional active agents that can be used in combination with a compound of Formula (I), or a pharmaceutically acceptable salt thereof, or a composition that includes a compound of Formula (I), or a pharmaceutically acceptable salt thereof, include, but are not limited to, agents currently used for treating impaired cognition, movement disorders, chronic pain, depression, decreased appetite, addiction, seizure, convulsion, and related conditions, as described herein and as otherwise known to medical science.

In some embodiments, a compound of Formula (I), or a pharmaceutically acceptable salt thereof, or a composition that includes a compound of Formula (I), or a pharmaceutically acceptable salt thereof, can be used with one, two, three or more additional active agents described herein. Such agents include, but are not limited to, a second compound of Formula (I), or a pharmaceutically acceptable salt thereof, or a naturally occurring fatty acid, or a salt or derivative thereof.

In some embodiments, a compound of Formula (I), or a pharmaceutically acceptable salt thereof, or a composition that includes a compound of Formula (I), or a pharmaceutically acceptable salt thereof, can be used (for example, administered or ingested) in combination with another agent or agents for treatment, prevention, maintenance, or prophylaxis of impaired cognition, movement disorders, pain management, depression, addiction, appetite stimulation, convulsion, or other conditions as disclosed herein, or for modulation of markers, e.g., biological markers or behavioral markers, of the condition. Conventional or known drugs or medications for treatment of such conditions are listed above. For example, a compound of Formula (I), or a pharmaceutically acceptable salt thereof, can be used in combination with one or more agents selected from donepezil, gotu kola, cholinesterase inhibitors, rivastigmine, galantamine, memantine, levodopa, dopamine agonists, MAO-B antagonists, COMT-inhibitors, anticholingergics, amantadine, antidepressants, opiates, oxycodone, tramadol, morphine, Non-steroidal Anti-inflammatory Drugs (NSAIDs), aspirin, acetaminophen, ibuprofen, COX-2 inhibitors, celecoxib, meloxicam, tricyclic anti-depressants (TCAs), serotonin and norepinephrine reuptake inhibitors (SNRIs), selective serotonin reuptake inhibitors (SSRIs), anti-seizure medications (pregabalin and gabapentin), corticosteroids, muscle relaxants, lidoderm, aripiprazole, doxepin, clomipramine, bupropion, amoxapine, nortriptyline, citalopram, duloxetine, trazodone, venlafaxine, selegiline, perphenazine, amitriptyline, levomilnacipram, desvenlafaxine, lurasidone, lamotrigine, escitalopram, isocarboxazid, phenelzine, desipramine, tranylcpromine, paroxetine, fluoxetine, mirtazapine, quetiapine, nefazodone, imipramine, perphenazine, vortioxetine, vilazodone, protriptyline, sertraline, olanzapine, acetazolamide, carbamazepine, clonazepam, diazepam, ethosuximide, gabapentin, lacosamide, lamotrigine, levetiracetam, lorazepam, methsuximide, nitrazepam, oxcarbazepine, paraldehyde, phenobarbital, phenytoin, pregavalin, primidone, rufinamide, stiripentol, topiramate, valproic acid, vigabatrin, felbamate, tiagabine hydrochloride, zonisamide, buprenorphine, methadone, naltrexone, acamprosate, disulfiram, bupropion, nicotine replacement therapies, and varenicline.

Dosing

As will be readily apparent to one skilled in the art, the useful in vivo dosage to be administered and the particular mode of administration will vary depending upon the age, weight, the severity of the condition, and mammalian species treated, the particular forms of the compounds employed, and the specific use for which these compounds are employed. The determination of effective dosage levels, that is the dosage levels necessary to achieve the desired result, can be accomplished by one skilled in the art using routine methods, for example, in vivo studies. Reference may be made to, for example, "Estimating the Maximum Safe Starting Dose in Initial Clinical Trials for Therapeutics in Adult Healthy Volunteers," U.S. Food and Drug Administration, July 2005.

In some embodiments, a method provided herein may comprise administering a therapeutically effective amount of a composition provided herein. In some embodiments, a therapeutically effective amount may be determined by reference to the modulation of a marker of impaired cognition, movement disorders, chronic pain, depression, decreased appetite, and addiction. In some embodiments, a therapeutically effective amount may be determined by reference to the modulation of a symptom of impaired cognition, movement disorders, chronic pain, depression, decreased appetite, and addiction. In still other embodiments, reference may be made to established guidelines for the conditions described herein, including, but not limited to, guidelines for the treatment of diabetes.

The dosage may vary broadly, depending upon the desired effects and the therapeutic indication, such as marker values. Alternatively, dosages may be based and calculated upon the surface area or weight of the patient, as understood by those of skill in the art. The exact dosage will be determined on a case-by-case basis, or, in some cases, will be left to the informed discretion of the subject. The daily dosage regimen for an adult human patient may be, for example, an oral dose of a compound of Formula (I), or a pharmaceutically acceptable salt thereof, or a mixture of a plurality of compounds of Formula (I), or pharmaceutically acceptable salts thereof, or a mixture of a compound of Formula (I), or a pharmaceutically acceptable salt thereof, with a naturally occurring fatty acid, or a salt or derivative thereof, from about 0.01 mg to about 10000 mg, from about 1 mg to about 5000 mg, from about 5 mg to about 2000 mg, from about 10 mg to about 1000 mg, or from about 50 mg to about 500 mg. A single dose may include an odd chain fatty acid, or a salt or derivative thereof, in about 0.01 mg, about 0.1 mg, about 1 mg, about 5 mg, about 10 mg, about 20 mg, about 50 mg, about 100 mg, about 200 mg, about 300 mg, about 400 mg, about 500 mg, about 600 mg, about 800 mg, about 900 mg, about 1000 mg, about 2000 mg, about 5000 mg, or more. The dosage may be adjusted according to the body mass of the subject, for example, the dosage may be about 0.001 mg/kg, about 0.01 mg/kg, about 0.1 mg/kg, about 0.5 mg/kg, about 1 mg/kg, about 2 mg/kg, about 3 mg/kg, about 4 mg/kg, about 5 mg/kg, about 6 mg/kg, about 7 mg/kg, about 8 mg/kg, about 9 mg/kg, about 10 mg/kg, about 15 mg/kg, about 20 mg/kg, about 25 mg/kg, about 30 mg/kg, or higher. The dosage may be a single one or a series of two or more given in the course of one or more days, as is appropriate for the individual subject. In some embodiments, the compounds will be administered for a period of continuous therapy, for example for about a week or more (e.g., one week, two weeks, three weeks, four weeks, five weeks, six weeks, seven weeks, eight weeks, or more), for several weeks, for about a month or more (e.g., one month, two months, three months, four months, five months, six months, seven months, eight months, nine months, ten months, eleven months, twelve months, or more), for about a year or more, or for a plurality of years. In some embodiments, a compound of Formula (I), or a pharmaceutically acceptable salt thereof, can be administered or ingested one time per day, two times per day, three times per day, or more.

As will be understood by those of skill in the art, in certain situations it may be necessary to administer the compounds disclosed herein in amounts that exceed the above-stated, preferred dosage range in order to effectively treat a subject.

Unit dosage forms can also be provided, e.g., individual packages with a premeasured amount of the composition, configured for administration on a predetermined schedule. Unit dosage forms configured for administration one to three times a day are preferred; however, in certain embodiments it may be desirable to configure the unit dosage form for administration more than three times a day, or less than one time per day.

Dosage amount and interval may be adjusted to the individual subject to provide plasma levels of the active moiety which are sufficient to maintain predetermined parameters, indicators, or marker values, or minimal effective concentration (MEC). Dosages necessary to achieve the desired result will depend on individual characteristics and route of administration. However, assays, for example, HPLC assays or bioassays, may be used to determine serum concentrations.

In some embodiments, the compounds and methods provided herein may be used in conjunction with devices and methods of using devices, for example, as provided in U.S. Pat. Nos. 7,651,845; 8,251,904; 8,251,904; 4,985,015; 8,827,957; 4,252,159; 5,318,521; 4,718,430; U.S. 2011/0190702; DE2615061; and in conjunction with diagnostic devices, for example, as provided in U.S. 2012/0072236, the contents of each of which are hereby incorporated by reference in their entireties.

Diagnosis and Monitoring

Provided herein are methods for the diagnosis and monitoring of impaired cognition, movement disorders, chronic pain, depression, decreased appetite, addiction, and related conditions.

In some embodiments, the method of diagnosis or monitoring may comprise the step of measuring percentage of a compound of Formula (I), or a salt or metabolite thereof, or of a naturally occurring fatty acid. In some embodiments, the method of diagnosis or monitoring may comprise the step of measuring a marker of impaired cognition, movement disorders, chronic pain, depression, decreased appetite, addiction, or metabolic syndrome. In some embodiments, a correlation between one marker and another may prove instructive. In some embodiments, metabolic syndrome or a related condition may be diagnosed by reference to a threshold level of a marker of impaired cognition, movement disorders, chronic pain, depression, decreased appetite, or addiction, for example, serum concentration of a compound of Formula (I), or salt or metabolite thereof, serum concentration of a naturally occurring fatty acid, such as, for example, odd chain fatty acid percentage, serum concentration of an odd chain fatty acid, or serum total odd chain fatty acid. For example, the threshold may be determined by reference to a symptom or marker of impaired cognition, movement disorders, chronic pain, depression, decreased appetite, and addiction, or a related condition.

The percentage of a compound of Formula (I), or a salt or metabolite thereof, or a marker of impaired cognition, movement disorders, chronic pain, depression, decreased appetite, or addiction in a subject may be monitored by any means. Samples for analysis may be derived any fluid or tissue of the subject. For example, from serum, plasma, erythrocyte membranes, urine, and feces.

EXAMPLES

Comparative Example 1

Forty C57BL/6J mice were fed a high fat diet (HFD) (D12492, 60% kcals fat) for 8 weeks. Study mice were then divided into the following four groups of ten: vehicle controls, low dose C17:0-treated (5 mg/kg body weight), high-dose C17:0-treated (50 mg/kg body weight), and low-dose C15:0-treated (5 mg/kg body weight). The test articles were in synthetic powder form stable at room temperature and purchased from Sigma-Aldrich (Products W433400 (≥99% C15:0) and H3500 SIGMA (≥98% C17:0). The test articles were provided daily via gastric gavage for 12 weeks (84 days) while continuing ad libitum access to the HFD. Body weight and food intake were measured weekly. Serum insulin, glucose, cholesterol, and IL-6, TNF-α, and MCP-1 levels were measured at Day 84. Data from the treated groups were compared to the control group using Wilcoxon rank sum analyses. Significance was defined as a P value less than or equal to 0.05.

Mice in the treatment groups tolerated the test articles throughout the study. There were no early mortalities among mice in the treated groups; one mouse in the control group had an unscheduled death on Week 7. No changes were found in body weight, percent body weight change, or food intake when comparing the study groups (not shown).

When comparing the treatment groups with the vehicle control group, subjects treated with C15:0 (5 mg/kg) had attenuated metabolic syndrome, including lower glucose, insulin, cholesterol, and proinflammatory cytokines (IL-6, TNF-α, and MCP-1) compared to controls (Table 1). While subjects treated with C17:0 trended toward attenuated metabolic syndrome compared to controls (Table 1), only the high-dose C17:0 (50 mg/kg) had significantly lower proinflammatory cytokines and chemokines (TNF-α and MCP-1) compared to controls (Table 1).

Table 1 provides comparisons of cardiometabolic effects in diet-induced obese mice treated daily with oral pentadecanoic acid (5 mg/kg BW), heptadecanoic acid (5 and 50 mg/kg BW) for 12 weeks compared to vehicle controls. "Results" values are based on 6 h fasted samples.

detection of protein-protein interactions between activated, full length PPAR-α, PPAR-δ, and PPAR-γ proteins and a nuclear fusion protein containing Steroid Receptor Co-activator Peptide (SRCP) domains with one or more canonical LXXLL interaction motifs. PPAR-α, PPAR-δ, and PPAR-γ were tagged with the ProLink component of the EFC assay system, and the SRCP domain was fused to the enzyme acceptor component (EA) expressed in the nucleus. When bound by ligand, PPAR-α, PPAR-δ, or PPAR-γ migrated to the nucleus and recruited the SRCP domain, whereby complementation occurred, generating a unit of active β-Galactosidase (β-Gal) and production of chemiluminescent signal. Benefits associated with this approach included reduced compound incubation times, direct measurements of PPAR-α, PPAR-δ, and PPAR-γ targets, use of full length human PPAR-α, PPAR-δ, and PPAR-γ sequences, and the ability to select novel compound classes based on disruption of protein-protein interactions. PPAR-α, PPAR-δ, and PPAR-γ agonist dose curves were determined at 10 concentrations in duplicate for free fatty acid forms of C14:0, C15:0, C16:0; 2-methyl substituents of C14:0, C15:0, C16:0; 2,2-dimethyl substituents of C14:0, C15:0, C16:0; 1-tetrazole substituents of C14:0 and C15:0; and 3-oxy substituents of C15:0 and C16:0; and 2-methyl-1-tetrazole, 2-ethyl, 2,2-diethyl, and 2-methyl-2-ethyl substituents of

TABLE 1

| Variable | Vehicle control (n = 10) | Heptadecanoic acid 5 mg/kg dose (n = 10) | Heptadecanoic acid 50 mg/kg dose (n = 10) | Pentadecanoic acid 5 mg/kg dose (n = 10) |
|---|---|---|---|---|
| Baseline (Day 1) | | | | |
| Glucose, 6 h fasted (mg/dl) | 211 ± 35 | 200 ± 23 | 196 ± 22 | 189 ± 46 |
| Insulin, non-fasting (ng/ml) | 9.0 ± 8.2 | 5.8 ± 3.1 | 6.1 ± 2.2 | 7.0 ± 4.1 |
| Cholesterol (mg/dl) | 147 ± 22 | 152 ± 23 | 144 ± 20 | 153 ± 20 |
| Results (Day 84) | | | | |
| Glucose (mg/dl) | 307 ± 54 | 296 ± 23 | 282 ± 31 | 245 ± 37* |
| Insulin (ng/ml) | 12.2 ± 10 | 7.4 ± 4.8 | 6.8 ± 3.5 | 4.9 ± 3.8* |
| Cholesterol (mg/dl) | 207 ± 20 | 197 ± 31 | 187 ± 44 | 183 ± 25* |
| LDL-C (mg/dl) | 11 ± 3 | 9 ± 3 | 8 ± 3 | 6 ± 4* |
| IL-6 (pg/ml) | 60 ± 68 | 42 ± 40 | 38 ± 32 | 19 ± 11* |
| MCP-1 (pg/ml) | 83 ± 31 | 86 ± 30 | 53 ± 32* | 52 ± 25* |
| TNF-α (pg/ml) | 3.3 ± 2.1 | 3.7 ± 1.9 | 1.5 ± 1.5* | 1.6 ± 1.0* |

*$P \leq 0.05$

Comparative Example 2

This study compared structure-activity relationships among saturated free fatty acids and substituents to optimize the observed health benefits of odd-chain saturated free fatty acids to treat metabolic syndrome and associated diseases. Since fatty acids are natural ligands for peroxisome proliferator-activated receptors (PPARs), lead optimization began with structure-activity relationships around cell-based PPAR agonist activity. Specifically, this study examined and compared PPAR agonist activity of three free fatty acid forms of saturated fatty acids (C14:0, C15:0 and C16:0) with a variety of saturated fatty acid substituents (2-methyl-, 2,2-dimethyl-, 1-tetrazole-, 3-oxy-, 2-methyl-1-tetrazole-, 2-ethyl-, 2,2-diethyl-, and 2-methyl-2-ethyl-). PPAR-α, PPAR-δ, and PPAR-γ agonist activities were measured using PathHunter Nuclear Hormone Receptor (NHR) Protein Interaction (Pro) assays (DiscoverX, Freemont, California). Briefly, Chinese hamster ovary (CHO) cell lines were used to monitor the activation of PPAR-α, PPAR-δ, and PPAR-γ in a homogenous, non-imaging assay format using Enzyme Fragment Complementation (EFC). The NHR Pro assay was based on C15:0, and positive controls for PPAR-α (GW7647), PPAR-δ (L-165,041), and PPAR-γ (Troglitazone). Data shown was normalized to the maximal and minimal response observed in the presence of control compound and vehicle respectively. Percentage activity was calculated using the following formula: %Activity=100%×(mean RLU of test sample−mean RLU of vehicle control)/(mean MAX control ligand−mean RLU of vehicle control).

Compared to saturated free fatty acid forms, saturated fatty acid substituents demonstrated improved, lower concentrations required to reach the half maximal effective concentrations for PPAR agonist activity (Table 4). Different substituents conferred improvements in different PPAR isotype (PPAR-α, -δ, and -γ) enabling selection among the tested group of constituents to target desired PPAR isotype agonist activity. 2-methyl-substituents for C14:0, C15:0, and C16:0 improved the PPAR-α agonist EC50 by 17%, 48% and 62% compared to their free fatty acid forms, respectively. 2,2-dimethyl-substituents for C14:0, C15:0, and C16:0 improved the PPAR-α agonist EC50 by 13%, 44% and 90% compared to their free fatty acid forms, respectively. 1-tetrazole-C15:0, 3-oxa-C15:0, and 2-methyl-1-tetrazole-C15:0 substituents improved the PPAR-α agonist EC50 by 77%, 54%, and 44%, respectively, compared to C15:0. 2-ethyl-C15:0 and 2,2-diethyl-C15:0 substituents improved the PPAR-α agonist EC50 by 90% and 85%, respectively, compared to C15:0.

1-tetrazole-substituents for C14:0 and C15:0 improved the PPAR-δ agonist EC50 by 63% and 81% compared to their free fatty acid forms, respectively. 3-oxa-substituents for C15:0 and C16:0 improved the PPAR-δ agonist EC50 by 85% and 70% compared to their free fatty acid forms, respectively. 2-methyl-1-tetrazole-C15:0 improved the PPAR-δ agonist EC50 by 59% compared to C15:0. 2-methyl-C16:0 and 2,2-dimethyl-C16:0 improved the PPAR-γ agonist EC50 by 11 and 50%, respectively, compared to C16:0. 2-ethyl-C15:0 improved the PPAR-δ agonist EC50 by 89% compared to C15:0. While none of the unsubstituted saturated free fatty acids had PPAR-γ activity, 2-methyl-C14:0, 2-methyl-C15:0, 2-methyl-C16:0, 2,2-dimethyl-C14:0, 2,2-dimethyl-C15:0, 2-ethyl-C15:0, 2,2-diethyl-C15:0 and 2-methyl-2-ethyl-C15:0 acquired PPAR-γ agonist activity. The strong activity of multiple analogs against cell systems mimicking systems including pulmonary systems, fibrotic systems, dermatitis systems, psoriasis systems, allergy systems, and autoimmune systems, which were completely untouched by the free fatty acid C15:0 form, was surprising. The analogs did not simply improve free fatty acid C15:0 activity, they exhibited changed targeted disease systems.

In summary, saturated fatty acid substituents successfully decreased the concentration of compound needed to demonstrate cell-based PPAR agonist activity compared to their free fatty acid forms. Further, different substituents improved different PPAR isotypes (PPAR-α, -δ, and -γ), enabling one to select specific substituents targeting diseases associated with specific PPARs.

Table 4 provides comparisons of PPAR agonist activity among selected saturated fatty acids using cell-based protein-protein interaction assays.

TABLE 4

| PPAR isoform | Saturated fatty acid (free fatty acid form) | EC50 (μM) | Maximum Response (%) |
|---|---|---|---|
| PPAR-alpha | C14:0 | 8.35 | 74.1 |
| | C15:0 | 11.45 | 65.8 |
| | C16:0 | 27.30 | 56.1 |
| | C17:0 | >100 | 16.7 |
| PPAR-delta | C14:0 | 3.19 | 81.2 |
| | C15:0 | 2.70 | 52.8 |
| | C16:0 | 4.66 | 55.6 |
| | C17:0 | 17.37 | 39.8 |
| PPAR-gamma | C14:0 | >100 | 19.0 |
| | C15:0 | >100 | 7.0 |
| | C16:0 | >100 | 4.7 |
| | C17:0 | >100 | 1.0 |

Table 5 provides comparisons of PPAR-agonist activity among saturated free fatty acid (FFA) forms and saturated fatty acids with substituents, based on half-maximal effective concentrations (EC50).

TABLE 5

| | Cell-Based PPAR Agonist Activity Half Maximal Effective Concentration (EC50) | | | | | |
|---|---|---|---|---|---|---|
| | PPAR-α | | PPAR-δ | | PPAR-γ | |
| Saturated Fatty Acid | μM | % improvement over FFA form | μM | % improvement over FFA form | μM | % improvement over FFA form |
| C14:0 | | | | | | |
| Free fatty acid | 8.4 | — | 3.2 | — | >100 | — |
| 2-methyl | 7.0 | 17% | 5.5 | — | 11.5 | >89% |
| 2,2-dimethyl | 7.3 | 13% | 6.0 | — | 10.4 | >90% |
| 1-tetrazole | 18.7 | — | 1.2 | 63% | — | — |
| C15:0 | | | | | | |
| Free fatty acid | 11.5 | — | 2.7 | — | >100 | — |
| 2-methyl | 6.0 | 48% | 2.7 | — | 11.5 | >89% |
| 2,2-dimethyl | 6.4 | 44% | 4.9 | — | >20 | 20% |
| 1-tetrazole | 2.6 | 77% | 0.5 | 81% | >100 | — |
| 3-oxa | 5.3 | 54% | 0.4 | 85% | >100 | — |
| 2-methyl-1-tetrazole | 6.4 | 44% | 1.1 | 59% | — | — |
| 2-ethyl | 1.2 | 90% | 0.3 | 89% | 51 | >49% |
| 2,2-diethyl | 1.7 | 85% | 5.1 | — | 47.6 | >52% |
| 2-methyl-2-ethyl | >100 | — | >100 | — | 19.6 | >80% |
| C16:0 | | | | | | |
| Free fatty acid | 27.3 | — | 4.6 | — | >100 | — |
| 2-methyl | 10.4 | 62% | 4.1 | 11% | 24.2 | >76% |
| 2,2-dimethyl | 2.6 | 90% | 2.3 | 50% | >100 | — |
| 3-oxa | >100 | — | 1.4 | 70% | >100 | — |

Example 3

This study compared structure-activity relationships among a selected saturated free fatty acid and its substituents to assess potential differences among these compounds with regard to additional pharmacologic targets. Specifically, this study examined and compared agonist and antagonist activities of C15:0, 2-methyl-C15:0, 2-ethyl-C15:0, and 1-tetrazole-C15:0 across 78 assays using SAFETYscan E/IC50 ELECT (DiscoverX/Eurofins, Fremont, California). Briefly, a variety of standardized and optimized functional assays were used to assess and compare the selected compounds' pharmacologic targets, including G protein-coupled receptors (ADORA2A, ADRA1A, ADRA2A, ADRB1, ADRB2, CB1, CB2, CCK1, D1, D2S, ETA, H1, H2, M1 M2, M3, OPRD1, OPRK1, OPRM1, 5HTR1A, 5HTR1B, 5HTR2A, 5HTR2B, AVPR1A), kinases (LCK, INSR, VEGFR2, ROCK1), transporters (DAT, NET, SERT), ion channels (GABAA, 5-HT3, CA1.2, HERG, KVLQT1/MINK, NA1.5, NMDAR1/2B, NACHR), nuclear receptors (AR, GR), and non-kinase enzymes (COX1, COX2, ACHE, MAO-A, PDE3A, PDE4D2). Ten-point concentration curves for both agonist (EC50) and antagonist (IC50) activity were established for each target for each compound. Maximum activity (%) was also determined based on comparisons with internal positive controls, which were assigned 100% activity. The positive control for CB1 receptor agonist activity was CP 55940 (EC50=0.06 nm), and the positive control for OPRM1 antagonist activity was naloxone (IC50=5 nm).

Figure 2:
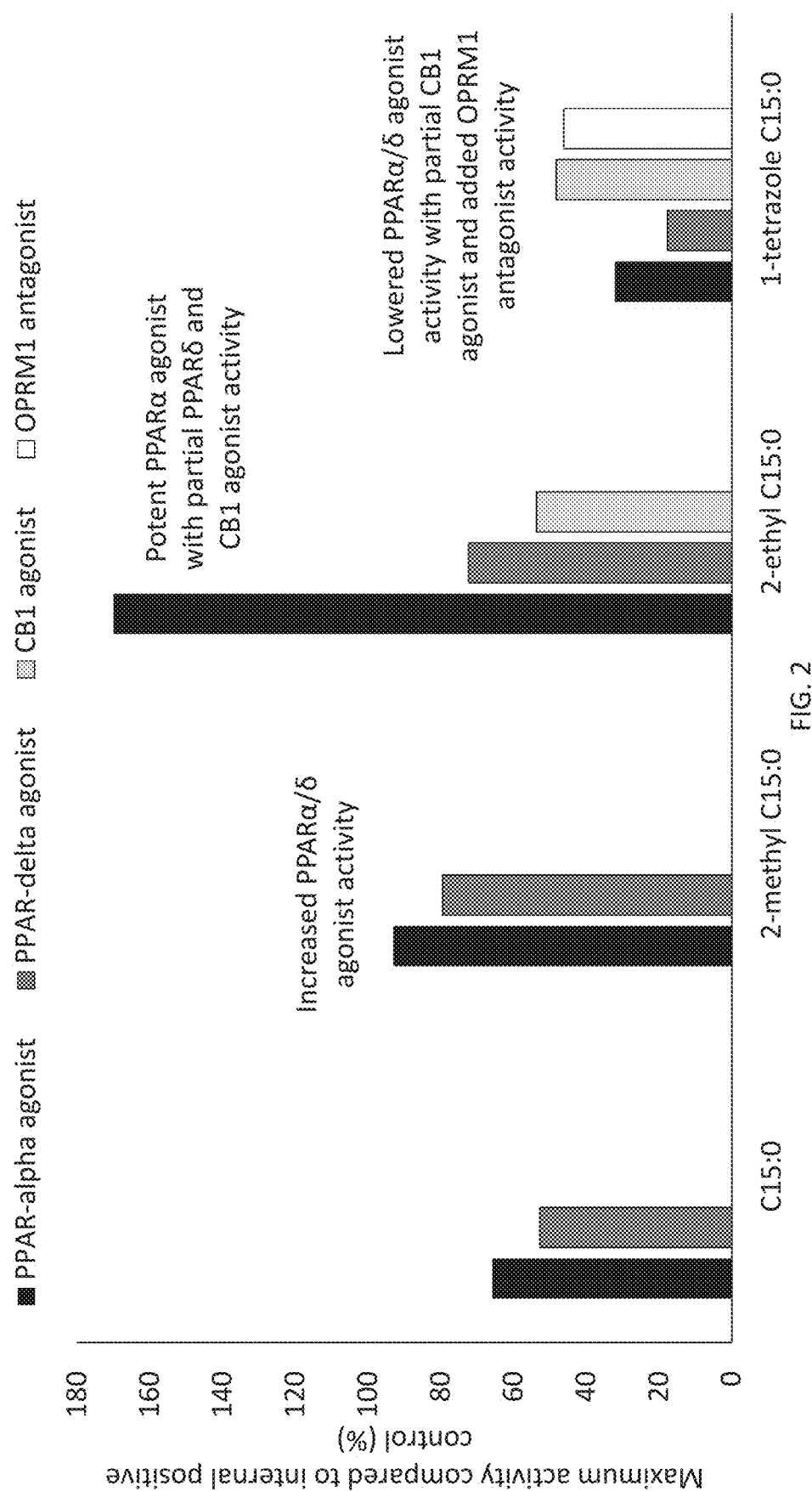
FIG. 2 provides a summary of maximum activity (%) for PPAR-alpha, PPAR-delta, and CB1 receptor agonist activity and inhibitory concentrations (IC50) for OPRM1 antagonist activity for saturated fatty acid substituents (2-methyl-C15:0, 2-ethyl-C15:0, and 1-tetrazole-C15:0) compared to assays treated with saturated free fatty acids (C15:0) and positive controls.

Across 78 assays, no additional activity was detected for C15:0 and 2-methyl-C15:0. Surprisingly, in addition to acquiring potent PPAR-α agonist activity at lower concentrations (170% maximum activity, EC50=1.2 µM) and sustained PPAR-δ agonist activity at substantially lower concentrations (72.4% maximum activity, EC50=28 nm) compared to C15:0, 2-ethyl-C15:0 also added novel partial CB1-agonist activity at nanomolar concentrations (53.7% maximum activity, EC50=27 nm). As an added surprise, 1-tetrazole-C15:0 added both partial CB1-agonist activity (48.3% maximum activity, IC50=1.3 µm) and partial OPRM1 antagonist activity (46.2% maximum activity, IC50=3.9 µm), while lowering PPAR-α and PPAR-δ maximum activities compared to C15:0 (32% for PPAR-α and 18% for PPAR-δ). FIG. 1 and FIG. 2 compare targeted agonist and antagonist activity of the studied compounds, including EC/IC50 (FIG. 1) and maximum activity (FIG. 2).

This study supports that saturated fatty acid analogs can be used to alter 1) targeting of PPAR-α and PPAR-δ agonist activity, 2) introduce novel targeting of CB1 agonists, and 3) introduce novel targeting of OPRM1 antagonists. Further, based on these activities, specific saturated fatty acid analogs can be selected to prevent, manage and treat impaired cognition, movement disorders, chronic pain, depression, decreased appetite, or addiction. As an example, 2-ethyl-C15:0 may be selected to treat impaired cognition, movement disorders, chronic pain, depression, and anorexia. As another example, 1-tetrazole-C15:0 may be selected to treat opioid addition.

Example 4

This study assessed cannabinoid receptor 1 agonist activities of 3-oxa-C15:0, 2-methyl-C15:0-tetrazole, and diethyl-C15:0. Each of the three compounds exhibited stron cannabinoid receptor 1 agonist when compared to a positive control (CP55940, a synthetic compound that mimics THC).

TABLE 6

| Compound | EC50 | % maximum activity compared to positive control (CP55940) |
|---|---|---|
| 3-oxa-C15:0 | 0.57 uM | 83% |
| 2-methyl-C15:0-tetrazole | 6.4 uM | 110% |
| diethyl-C15:0 | 3.3 uM | 93% |

Exemplary Compositions, Methods and Uses

Method 1: A method of treatment or prophylaxis of a condition selected from the group consisting of impaired cognition, movement disorders, chronic pain, depression, decreased appetite, convulsion, seizure, and addiction, comprising: administering to a patient in need thereof, a pharmaceutical composition comprising an effective amount of a compound of Formula (I), or a pharmaceutically acceptable salt thereof, wherein the compound of Formula (I) has a structure:

Formula (I)

wherein: G is selected from the group consisting of an unsubstituted or a substituted $C_{10}$-$C_{18}$ alkyl, an unsubstituted or a substituted $C_{10}$-$C_{18}$ alkenyl, an unsubstituted or substituted $C_{10}$-$C_{18}$ alkyl having one, two, or three oxa- or thia-substituents, and a substituted $C_{10}$-$C_{18}$ alkenyl having one, two, or three oxa- or thia-substituents; X is selected from the group consisting of O and $CR^1R^2$, wherein $R^1$ and $R^2$ are each independently selected from the group consisting of H and an unsubstituted or a substituted $C_1$-$C_6$ alkyl; $Y^1$ and $Y^2$ are each independently selected from the group consisting of H, an unsubstituted or a substituted $C_1$-$C_6$ alkoxy, and an unsubstituted or a substituted $C_1$-$C_6$ alkyl, or $Y^1$ and $Y^2$ may be taken together to form an unsubstituted or a substituted $C_3$-$C_8$ cycloalkyl, $C_3$-$C_8$ cycloalkenyl, $C_6$-$C_{10}$ aryl, $C_1$-$C_{10}$ heteroaryl, and $C_1$-$C_{10}$ heterocyclyl; and Z is selected from the group consisting of a carboxylic acid, —C(=O)—OH, a $C_1$-$C_6$ alkyl ester, an unsubstituted or a substituted amide, an unsubstituted or a substituted five- or six-membered heterocyclyl, and an unsubstituted or a substituted five- or six-membered heteroaryl; wherein a substituted group is substituted with one or more substituents, wherein each substituent is independently selected from the group consisting of $C_1$-$C_6$ alkyl, $C_1$-$C_6$ alkenyl, $C_1$-$C_6$ alkynyl, $C_1$-$C_7$ cycloalkyl, $C_1$-$C_7$ cycloalkenyl, acyl($C_1$-$C_6$ alkyl), $C_1$-$C_6$ alkoxy($C_1$-$C_6$ alkyl), amino($C_1$-$C_6$ alkyl), amino acid, $C_6$-$C_{10}$ aryl, $C_1$-$C_{10}$ heteroaryl, $C_1$-$C_{10}$ heterocyclyl, $C_6$-$C_{10}$ aryl($C_1$-$C_6$ alkyl), $C_1$-$C_{10}$ heteroaryl($C_1$-$C_6$ alkyl), $C_1$-$C_{10}$ heterocyclyl($C_1$-$C_6$ alkyl), hydroxyl($C_1$-$C_6$ alkyl), acyl, cyano, halogen, thiocarbonyl, O-carbamyl, N-carbamyl, O-thiocarbamyl, N-thiocarbamyl, C-amido, N-amido, S-sulfonamido, N-sulfonamido, C-carboxy, O-carboxy, isocyanato, thiocyanato, isothiocyanato, azido, nitro, silyl, sulfenyl, sulfinyl, sulfonyl, halo($C_1$-$C_6$ alkyl), $C_1$-$C_6$ haloalkoxy, trihalomethanesulfonyl, trihalomethane-sulfonamido, and amino.

Method 2: Method 1, wherein G is an unsubstituted C10-C18 alkyl.
Method 3: Method 1, wherein G is unsubstituted undecyl.
Method 4: Method 1, wherein G is unsubstituted dodecyl.
Method 5: Method 1, wherein G is unsubstituted tridecyl.
Method 6: Method 1, wherein G is unsubstituted tetradecyl.
Method 7: Method 1, wherein G is unsubstituted pentadecyl.
Method 8: Method 1, wherein G is unsubstituted hexadecyl.
Method 9: Method 1, wherein G is unsubstituted heptadecyl.
Method 10: Method 1, wherein G is unsubstituted octadecyl.
Method 11: Any one of Methods 1-10, wherein X is $CR_1R_2$, and wherein $R_1$ and $R_2$ are each H.

Method 12: Any one of Methods 1-10, wherein X is O.

Method 13: Any one of Methods 1-12, wherein $Y^1$ is H, and wherein $Y^2$ is hydrogen.

Method 14: Any one of Methods 1-12, wherein $Y^1$ is selected from the group consisting of H and an unsubstituted $C_1$-$C_6$ alkyl, and wherein $Y^2$ is an unsubstituted $C_1$-$C_6$ alkyl.

Method 15: Any one of Methods 1-12, wherein $Y^1$ is selected from the group consisting of H, an unsubstituted methyl, and an unsubstituted ethyl, and wherein $Y^2$ is an unsubstituted methyl or ethyl.

Method 16: Any one of Methods 1-12, wherein $Y^1$ is selected from the group consisting of H and an unsubstituted ethyl, and wherein $Y^2$ is an unsubstituted ethyl.

Method 17: Any one of Methods 1-12, wherein $Y^1$ is H, and wherein $Y^2$ is an unsubstituted ethyl.

Method 18: Any one of Methods 1-12, wherein $Y^1$ is an unsubstituted ethyl, and wherein $Y^2$ is an unsubstituted ethyl.

Method 19: Any one of Methods 1-12, wherein $Y^1$ is H, and wherein $Y^2$ is an unsubstituted methyl.

Method 20: Any one of Methods 1-19, wherein Z is —C(=O)—OH.

Method 21: Any one of Methods 1-19, wherein Z is

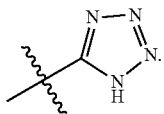

Method 22: Any one of Methods 1-19, wherein Z is

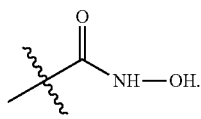 [SMILES: *C(=O)NO]

Method 23: Any one of Methods 1-19, wherein Z is selected from the group consisting of:

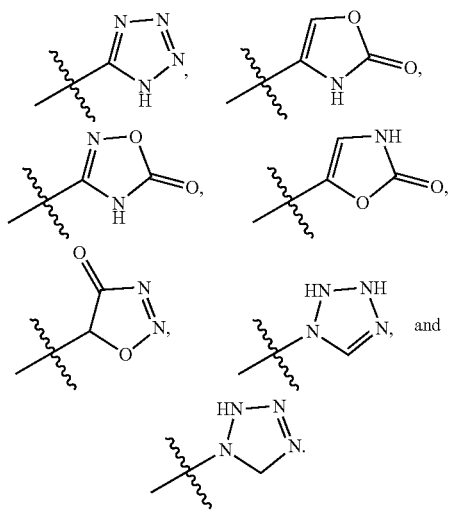

Method 24: Method 1, wherein G is an unsubstituted C10-C18 alkyl, wherein X is CR1R2, wherein R1 and R2 are each H, wherein Y1 is selected from the group consisting of H and an unsubstituted $C_1$-$C_6$ alkyl, and wherein Y2 is an unsubstituted $C_1$-$C_6$ alkyl.

Method 25: Method 1, wherein the compound of Formula (I) is selected from the group consisting of: 2-methyl-stearic acid, 2,2-dimethyl-stearic acid, 2 ethyloctadecanoic acid, 2-ethyl-2-methyloctadecanoic acid, 2,2-diethyloctadecanoic acid, 3-oxa-stearic acid, 2-(pentadecyloxy)propanoic acid, 2,2-dimethyl-3-oxa-stearic acid, 2-(pentadecyloxy)butanoic acid, 2-methyl-2-(pentadecyloxy)butanoic acid, 2-ethyl-2-(pentadecyloxy)butanoic acid, 1-oxtadecyl-1H-tetrazole, 1-(nonadecan-2-yl)-1H-tetrazole, 1-(2-methylnonadecan-2-yl)-1H-tetrazole, 1-(icosan-3-yl)-1H-tetrazole, 1-(3-methylicosan-3-yl)-1H-tetrazole, 1-(3-ethylicosan-3-yl)-1H-tetrazole, 5-octadecyl-1H-tetrazole, 5-(nonadecan-2-yl)-1H-tetrazole, 5-(2-methylnonadecan-2-yl)-1H-tetrazole, 5-(icosan-3-yl)-1H-tetrazole, 5-(3-methylicosan-3-yl)-1H-tetrazole, 5-(3-ethylicosan-3-yl)-1H-tetrazole, 4-octadecyloxazol-2(3H)-one, 4-(nonadecan-2-yl)oxazol-2(3H)-one, 4-(2-methylnonadecan-2-yl)oxazol-2(3H)-one, 4-(3-methylicosan-3-yl)oxazol-2(3H)-one, 4-(icosan-3-yl)oxazol-2(3H)-one, 4-(3-ethylicosan-3-yl)oxazol-2(3H)-one, 3-octadecyl-1,2,4-oxadiazol-5(4H)-one, 3-(nonadecan-2-yl-1,2,4-oxadiazol-5(4H)-one, 3-(2-methylnonadecan-2-yl)-1,2,4-oxadiazol-5(4H)-one, 3-(3-methylicosan-3-yl)-1,2,4-oxadiazol-5(4H)-one, 3-(icosan-3-yl)-1,2,4-oxadiazol-5(4H)-one, 3-(3-ethylicosan-3-yl)-1,2,4-oxadiazol-5(4H)-one, 5-octadecyloxazol-2(3H)-one, 5-(nonadecan-2-yl)oxazol-2(3H)-one, 5-(2-methylnonadecan-2-yl)oxazol-2(3H)-one, 5-(icosan-3-yl)oxazol-2(3H)-one, 5-(3-methylicosan-3-yl)oxazol-2(3H)-one, 5-(3-ethylicosan-3-yl)oxazol-2(3H)-one, 5-octadecyl-1,2,3-oxadiazol-4(5H)-one, 5-(nonadecan-2-yl)-1,2,3-oxadiazol-4(5H)-one, 5-(2-methylnonadecan-2-yl)-1,2,3-oxadiazol-4(5H)-one, 5-(icosan-3-yl)-1,2,3-oxadiazol-4(5H)-one, 5-(3-methylicosan-3-yl)-1,2,3-oxadiazol-4(5H)-one, 5-(3-ethylicosan-3-yl)-1,2,3-oxadiazol-4(5H)-one, N-hydroxystearamide, N-hydroxy-2-methyloctadecanamide, N-hydroxy-2,2-dimethyloctadecanamide, 2-ethyl-N-hydroxyoctadecanamide, 2-ethyl-N-hydroxy-2-methyloctadecanamide, 2,2-diethyl-N-hydroxyoctadecanamide, 1-octadecyl-2,3-dihydro-1H-tetrazole, 1-(nonadecan-2-yl)-2,3-dihydro-1H-tetrazole, 1-(2-methylnonadecan-2-yl)-2,3-dihydro-1H-tetrazole, 1-(icosan-3-yl)-2,3-dihydro-1H-tetrazole, 1-(3-methylicosan-3-yl)-2,3-dihydro-1H-tetrazole, 1-(3-ethylicosan-3-yl)-2,3-dihydro-1H-tetrazole, 1-octadecyl-2,5-dihydro-1H-tetrazole, 1-(nonadecan-2-yl)-2,5-dihydro-1H-tetrazole, 1-(2-methylnonadecan-2-yl)-2,5-dihydro-1H-tetrazole, 1-(icosan-3-yl)-2,5-dihydro-1H-tetrazole, 1-(3-methylicosan-3-yl)-2,5-dihydro-1H-tetrazole, 1-(3-ethylicosan-3-yl)-2,5-dihydro-1H-tetrazole, 2-methylheptadecanoic acid, 2,2-dimethylheptadecanoic acid, 2-ethylheptadecanoic acid, 2-ethyl-2-methylheptadecanoic acid, 2,2-diethylheptadecanoic acid, 2-(tetradecyloxy)acetic acid, 2-(tetradecyloxy)propanoic acid, 2-methyl-2-(tetradecyloxy)propanoic acid, 2-(tetradecyloxy)butanoic acid, 2-methyl-2-(tetradecyloxy)butanoic acid, 2-ethyl-2-(tetradecyloxy)butanoic acid, 1-heptadecyl-1H-tetrazole, 1-(octadecan-2-yl)-1H-tetrazole, 1-(2-methyloctadecan-2-yl)-1H-tetrazole, 1-(nonadecan-3-yl)-1H-tetrazole, 1-(3-methylnonadecan-3-yl)-1H-tetrazole, 1-(3-ethylnonadecan-3-yl)-1H-tetrazole, 5-heptadecyl-1H-tetrazole, 5-(octadecan-2-yl)-1H-tetrazole, 5-(2-methyloctadecan-2-yl)-1H-tetrazole, 5-(nonadecan-3-yl)-1H-tetrazole, 5-(3-methylnonadecan-3-yl)-1H-tetrazole, 5-(3-ethylnonadecan-3-yl)-1H-tetrazole, 4-heptadecyloxazol-2(3H)-one, 4-(octadecan-2-yl)oxazol-2(3H)-one, 4-(2-methyloctadecan-2-yl)oxazol-2(3H)-one, 4-(nonadecan-3-yl)oxazol-2

(3H)-one, 4-(3-methylnonadecan-3-yl)oxazol-2(3H)-one, 4-(3-ethylnonadecan-3-yl)oxazol-2(3H)-one, 3-heptadecyl-1,2,4-oxadiazol-5(4H)-one, 3-(octadecan-2-yl)-1,2,4-oxadiazol-5(4H)-one, 3-(2-methyloctadecan-2-yl)-1,2,4-oxadiazol-5(4H)-one, 3-(3-methylnonadecan-3-yl)-1,2,4-oxadiazol-5(4H)-one, 3-(nonadecan-3-yl)-1,2,4-oxadiazol-5(4H)-one, 3-(3-ethylnonadecan-3-yl)-1,2,4-oxadiazol-5(4H)-one, 5-heptadecyloxazol-2(3H)-one, 5-(octadecan-2-yl)oxazol-2(3H)-one, 5-(2-methyloctadecan-2-yl)oxazol-2(3H)-one, 5-(nonadecan-3-yl)oxazol-2(3H)-one, 5-(3-methylnonadecan-3-yl)oxazol-2(3H)-one, 5-(3-ethylnonadecan-3-yl)oxazol-2(3H)-one, 5-heptadecyl-1,2,3-oxadiazol-4(5H)-one, 5-(octadecan-2-yl)-1,2,3-oxadiazol-4(5H)-one, 5-(2-methyloctadecan-2-yl)-1,2,3-oxadiazol-4(5H)-one, 5-(nonadecan-3-yl)-1,2,3-oxadiazol-4(5H)-one, 5-(3-methylnonadecan-3-yl)-1,2,3-oxadiazol-4(5H)-one, 5-(3-ethylnonadecan-3-yl)-1,2,3-oxadiazol-4(5H)-one, N-hydroxyheptadecanamide, N-hydroxy-2-methylheptadecanamide, N-hydroxy-2,2-dimethylheptadecanamide, 2-ethyl-N-hydroxyheptadecanamide, 2-ethyl-N-hydroxy-2-methylheptadecanamide, 2,2-diethyl-N-hydroxyheptadecanamide, 1-heptadecyl-2,3-dihydro-1H-tetrazole, 1-(octadecan-2-yl)-2,3-dihydro-1H-tetrazole, 1-(2-methyloctadecan-2-yl)-2,3-dihydro-1H-tetrazole, 1-(nonadecan-3-yl)-2,3-dihydro-1H-tetrazole, 1-(3-methylnonadecan-3-yl)-2,3-dihydro-1H-tetrazole, 1-(3-ethylnonadecan-3-yl)-2,3-dihydro-1H-tetrazole, 1-heptadecyl-2,5-dihydro-1H-tetrazole, 1-(octadecan-2-yl)-2,5-dihydro-1H-tetrazole, 1-(2-methyloctadecan-2-yl)-2,5-dihydro-1H-tetrazole, 1-(nonadecan-3-yl)-2,5-dihydro-1H-tetrazole, 1-(3-methylnonadecan-3-yl)-2,5-dihydro-1H-tetrazole, 1-(3-ethylnonadecan-3-yl)-2,5-dihydro-1H-tetrazole, 2-methylhexadecanoic acid, 2,2-dimethylhexadecanoic acid, 2-ethylhexadecanoic acid, 2-ethyl-2-methylhexadecanoic acid, 2,2-diethylhexadecanoic acid, 2-(tridecyloxy)acetic acid, 2-(tridecyloxy)propanoic acid, 2-methyl-2-(tridecyloxy)propanoic acid, 2-(tridecyloxy)butanoic acid, 2-methyl-2-(tridecyloxy)butanoic acid, 2-ethyl-2-(tridecyloxy)butanoic acid, 1-hexadecyl-1H-tetrazole, 1-(heptadecan-2-yl)-1H-tetrazole, 1-(2-methylheptadecan-2-yl)-1H-tetrazole, 1-(octadecan-3-yl)-1H-tetrazole, 1-(3-methyloctadecan-3-yl)-1H-tetrazole, 1-(3-ethyloctadecan-3-yl)-1H-tetrazole, 5-hexadecyl-1H-tetrazole, 5-(heptadecan-2-yl)-1H-tetrazole, 5-(2-methylheptadecan-2-yl)-1H-tetrazole, 5-(octadecan-3-yl)-1H-tetrazole, 5-(3-methyloctadecan-3-yl)-1H-tetrazole, 5-(3-ethyloctadecan-3-yl)-1H-tetrazole, 4-hexadecyloxazol-2(3H)-one, 4-(heptadecan-2-yl)oxazol-2(3H)-one, 4-(2-methylheptadecan-2-yl)oxazol-2(3H)-one, 4-(octadecan-3-yl)oxazol-2(3H)-one, 4-(3-methyloctadecan-3-yl)oxazol-2(3H)-one, 4-(3-ethyloctadecan-3-yl)oxazol-2(3H)-one, 3-hexadecyl-1,2,4-oxadiazol-5(4H)-one, 3-(heptadecan-2-yl)-1,2,4-oxadiazol-5(4H)-one, 3-(2-methylheptadecan-2-yl)-1,2,4-oxadiazol-5(4H)-one, 3-(3-methyloctadecan-3-yl)-1,2,4-oxadiazol-5(4H)-one, 3-(octadecan-3-yl)-1,2,4-5(4H)-one, 3-(3-ethyloctadecan-3-yl)-1,2,4-oxadiazol-5(4H)-one, 5-hexadecyloxazol-2(3H)-one, 5-(heptadecan-2-yl)oxazol-2(3H)-one, 5-(2-methylheptadecan-2-yl)oxazol-2(3H)-one, 5-(octadecan-3-yl)oxazol-2(3H)-one, 5-(3-methyloctadecan-3-yl)oxazol-2(3H)-one, 5-(3-ethyloctadecan-3-yl)oxazol-2(3H)-one, 5-hexadecyl-1,2,3-oxadiazol-4(5H)-one, 5-(heptadecan-2-yl)-1,2,3-oxadiazol-4(5H)-one, 5-(2-methylheptadecan-2-yl)-1,2,3-oxadiazol-4(5H)-one, 5-(octadecan-3-yl)-1,2,3-oxadiazol-4(5H)-one, 5-(3-methyloctadecan-3-yl)-1,2,3-oxadiazol-4(5H)-one, 5-(3-ethyloctadecan-3-yl)-1,2,3-oxadiazol-4(5H)-one, N-hydroxypalmitamide, N-hydroxy-2-methylhexadecanamide, N-hydroxy-2,2-dimethylhexadecanamide, 2-ethyl-N-hydroxyhexadecanamide, 2-ethyl-N-hydroxy-2-methylhexadecanamide, 2,2-diethyl-N-hydroxyhexadecanamide, 1-hexadecyl-2,3-dihydro-1H-tetrazole, 1-(heptadecan-2-yl)-2,3-dihydro-1H-tetrazole, 1-(2-methylheptadecan-2-yl)-2,3-dihydro-1H-tetrazole, 1-(octadecan-3-yl)-2,3-dihydro-1H-tetrazole, 1-(3-methyloctadecan-3-yl)-2,3-dihydro-1H-tetrazole, 1-(3-ethyloctadecan-3-yl)-2,3-dihydro-1H-tetrazole, 1-hexadecyl-2,5-dihydro-1H-tetrazole, 1-(heptadecan-2-yl)-2,5-dihydro-1H-tetrazole, 1-(2-methylheptadecan-2-yl)-2,5-dihydro-1H-tetrazole, 1-(octadecan-3-yl)-2,5-dihydro-1H-tetrazole, 1-(3-methyloctadecan-3-yl)-2,5-dihydro-1H-tetrazole, 1-(3-ethyloctadecan-3-yl)-2,5-dihydro-1H-tetrazole, 2-methylpentadecanoic acid, 2,2-dimethylpentadecanoic acid, 2-ethylpentadecanoic acid, 2-ethyl-2-methylpentadecanoic acid, 2,2-diethylpentadecanoic acid, 2-(dodecyloxy)acetic acid, 2-(dodecyloxy)propanoic acid, 2-(dodecyloxy)-2-methylpropanoic acid, 2-(dodecyloxy)butanoic acid, 2-(dodecyloxy)-2-methylbutanoic acid, 2-(dodecyloxy)-2-ethylbutanoic acid, 1-pentadecyl-1H-tetrazole, 1-(hexadecan-2-yl)-1H-tetrazole, 1-(2-methylhexadecan-2-yl)-1H-tetrazole, 1-(heptadecan-3-yl)-1H-tetrazole, 1-(3-methylheptadecan-3-yl)-1H-tetrazole, 1-(3-ethylheptadecan-3-yl)-1H-tetrazole, 5-pentadecyl-1H-tetrazole, 5-(hexadecan-2-yl)-1H-tetrazole, 5-(2-methylhexadecan-2-yl)-1H-tetrazole, 5-(heptadecan-3-yl)-1H-tetrazole, 5-(3-methylheptadecan-3-yl)-1H-tetrazole, 5-(3-ethylheptadecan-3-yl)-1H-tetrazole, 4-pentadecyloxazol-2(3H)-one, 4-(hexadecan-2-yl)oxazol-2(3H)-one, 4-(2-methylhexadecan-2-yl)oxazol-2(3H)-one, 4-(heptadecan-3-yl)oxazol-2(3H)-one, 4-(3-methylheptadecan-3-yl)oxazol-2(3H)-one, 4-(3-ethylheptadecan-3-yl)oxazol-2(3H)-one, 5-pentadecyloxazol-2(3H)-one, 5-(hexadecan-2-yl)oxazol-2(3H)-one, 5-(2-methylhexadecan-2-yl)oxazol-2(3H)-one, 5-(heptadecan-3-yl)oxazol-2(3H)-one, 5-(3-methylheptadecan-3-yl)oxazol-2(3H)-one, 5-(3-ethylheptadecan-3-yl)oxazol-2(3H)-one, 3-pentadecyl-1,2,4-oxadiazol-5(4H)-one, 3-(hexadecan-2-yl)-1,2,4-oxadiazol-5(4H)-one, 3-(2-methylhexadecan-2-yl)-1,2,4-oxadiazol-5(4H)-one, 3-(3-methylheptadecan-3-yl)-1,2,4-oxadiazol-5(4H)-one, 3-(heptadecan-3-yl)-1,2,4-oxadiazol-5(4H)-one, 3-(3-ethylheptadecan-3-yl)-1,2,4-oxadiazol-5(4H)-one, 5-pentadecyl-1,2,3-oxadiazol-4(5H)-one, 5-(hexadecan-2-yl)-1,2,3-oxadiazol-4(5H)-one, 5-(2-methylhexadecan-2-yl)-1,2,3-oxadiazol-4(5H)-one, 5-(heptadecan-3-yl)-1,2,3-oxadiazol-4(5H)-one, 5-(3-methylheptadecan-3-yl)-1,2,3-oxadiazol-4(5H)-one, 5-(3-ethylheptadecan-3-yl)-1,2,3-oxadiazol-4(5H)-one, N-hydroxypentadecanamide, N-hydroxy-2-methylpentadecanamide, N-hydroxy-2,2-dimethylpentadecanamide, 2-ethyl-N-hydroxypentadecanamide, 2-ethyl-N-hydroxy-2-methylpentadecanamide, 2,2-diethyl-N-hydroxypentadecanamide, 1-pentadecyl-2,3-dihydro-1H-tetrazole, 1-(hexadecan-2-yl)-2,3-dihydro-1H-tetrazole, 1-(2-methylhexadecan-2-yl)-2,3-dihydro-1H-tetrazole, 1-(heptadecan-3-yl)-2,3-dihydro-1H-tetrazole, 1-(3-methylheptadecan-3-yl)-2,3-dihydro-1H-tetrazole, 1-(3-ethylheptadecan-3-yl)-2,3-dihydro-1H-tetrazole, 1-pentadecyl-2,5-dihydro-1H-tetrazole, 1-(hexadecan-2-yl)-2,5-dihydro-1H-tetrazole, 1-(2-methylhexadecan-2-yl)-2,5-dihydro-1H-tetrazole, 1-(heptadecan-3-yl)-2,5-dihydro-1H-tetrazole, 1-(3-methylheptadecan-3-yl)-2,5-dihydro-1H-tetrazole, 1-(3-ethylheptadecan-3-yl)-2,5-dihydro-1H-tetrazole, 2-methyltetradecanoic acid, 2,2-dimethyltetradecanoic acid, 2-ethyltetradecanoic acid, 2-ethyl-2-methyltetradecanoic acid, 2,2-diethyltetradecanoic acid, 2-(undecyloxy)acetic acid, 2-(undecyloxy)propanoic acid, 2-methyl-2-(undecyloxy)propanoic acid, 2-(undecyloxy)butanoic acid, 2-methyl-2-(undecyloxy)butanoic acid, 2-ethyl-2-(undecyloxy)butanoic acid, 1-tetradecyl-1H-tetrazole, 1-(pentadecan-2-yl)-1H-tetrazole, 1-(2-methylpentadecan-2-yl)-1H-tetrazole, 1-(hexadecan-3-yl)-1H-tetrazole, 1-(3-methylhexadecan-3-yl)-1H-tetrazole, 1-(3-ethylhexadecan-3-yl)-1H-tetrazole, 5-tetradecyl-1H-tetrazole, 5-(pentadecan-2-yl)-1H-tetrazole, 5-(2-methylpentadecan-2-yl)-1H-tetrazole, 5-(hexadecan-3-yl)-1H-tetrazole, 5-(3-methylhexadecan-3-yl)-1H-tetrazole, 5-(3-ethylhexadecan-3-yl)-1H-tetrazole, 4-tetradecyloxazol-2(3H)-one, 4-(pentadecan-2-yl)oxazol-2(3H)-one, 4-(2-methylpentadecan-2-yl)oxazol-2(3H)-one, 4-(hexadecan-3-yl)oxazol-2(3H)-one, 4-(3-methylhexadecan-3-yl)oxazol-2(3H)-one, 4-(3-ethylhexadecan-3-yl)oxazol-2(3H)-one, 3-tetradecyl-1,2,4-oxadiazol-5(4H)-one, 3-(pentadecan-2-yl)-1,2,4-oxadiazol-5(4H)-one, 3-(2-methylpentadecan-2-yl)-1,2,4-oxadiazol-5(4H)-one, 3-(3-methylhexadecan-3-yl)-1,2,4-oxadiazol-5(4H)-one, 3-(hexadecan-3-yl)-1,2,4-oxadiazol-5(4H)-one, 3-(3-ethylhexadecan-3-yl)-1,2,4-oxadiazol-5(4H)-one, 5-tetradecyloxazol-2(3H)-one, 5-(pentadecan-2-yl)oxazol-2(3H)-one, 5-(2-methylpentadecan-2-yl)oxazol-2(3H)-one, 5-(heptadecan-3-yl)oxazol-2(3H)-one, 5-(3-methylheptadecan-3-yl)oxazol-2(3H)-one, 5-(3-ethylheptadecan-3-yl)oxazol-2(3H)-one, 5-tetradecyl-1,2,3-oxadiazol-4(5H)-one, 5-(pentadecan-2-yl)-1,2,3-oxadiazol-4(5H)-one, 5-(2-methylpentadecan-2-yl)-1,2,3-oxadiazol-4(5H)-one, 5-(hexadecan-3-yl)-1,2,3-oxadiazol-4(5H)-one, 5-(3-methylhexadecan-3-yl)-1,2,3-oxadiazol-4(5H)-one, 5-(3-ethylhexadecan-3-yl)-1,2,3-oxadiazol-4(5H)-one, N-hydroxytetradecanamide, N-hydroxy-2-methyltetradecanamide, N-hydroxy-2,2-dimethyltetradecanamide, 2-ethyl-N-hydroxytetradecanamide, 2-ethyl-N-hydroxy-2-methyltetradecanamide, 2,2-diethyl-N-hydroxytetradecanamide, 1-tetradecyl-2,3-dihydro-1H-tetrazole, 1-(pentadecan-2-yl)-2,3-dihydro-1H-tetrazole, 1-(2-methylpentadecan-2-yl)-2,3-dihydro-1H-tetrazole, 1-(hexadecan-3-yl)-2,3-dihydro-1H-tetrazole, 1-(3-methylhexadecan-3-yl)-2,3-dihydro-1H-tetrazole, 1-(3-ethylhexadecan-3-yl)-2,3-dihydro-1H-tetrazole, 1-tetradecyl-2,5-dihydro-1H-tetrazole, 1-(pentadecan-2-yl)-2,5-dihydro-1H-tetrazole, 1-(2-methylpentadecan-2-yl)-2,5-dihydro-1H-tetrazole, 1-(hexadecan-3-yl)-2,5-dihydro-1H-tetrazole, 1-(3-methylhexadecan-3-yl)-2,5-dihydro-1H-tetrazole, 1-(3-ethylhexadecan-3-yl)-2,5-dihydro-1H-tetrazole, 2-methyltridecanoic acid, 2,2-dimethyltridecanoic acid, 2-ethyltridecanoic acid, 2-ethyl-2-methyltridecanoic acid, 2,2-diethyltridecanoic acid, 2-(decyloxy)acetic acid, 2-(decyloxy)propanoic acid, 2-(decyloxy)-2-methylpropanoic acid, 2-(decyloxy)-2-methylbutanoic acid, 2-(decyloxy)butanoic acid, 2-(decyloxy)-2-ethylbutanoic acid, 1-tridecyl-1H-tetrazole, 1-(tetradecan-2-yl)-1H-tetrazole, 1-(2-methyltetradecan-2-yl)-1H-tetrazole, 1-(pentadecan-3-yl)-1H-tetrazole, 1-(3-methylpentadecan-3-yl)-1H-tetrazole, 1-(3-ethylpentadecan-3-yl)-1H-tetrazole, 5-tridecyl-1H-tetrazole, 5-(tetradecan-2-yl)-1H-tetrazole, 5-(2-methyltetradecan-2-yl)-1H-tetrazole, 5-(pentadecan-3-yl)-1H-tetrazole, 5-(3-methylpentadecan-3-yl)-1H-tetrazole, 5-(3-ethylpentadecan-3-yl)-1H-tetrazole, 4-tridecyloxazol-2(3H)-one, 4-(tetradecan-2-yl)oxazol-2(3H)-one, 4-(2-methyltetradecan-2-yl)oxazol-2(3H)-one, 4-(pentadecan-3-yl)oxazol-2(3H)-one, 4-(3-methylpentadecan-3-yl)oxazol-2(3H)-one, 4-(3-ethylpentadecan-3-yl)oxazol-2(3H)-one, 3-tridecyl-1,2,4-oxadiazol-5(4H)-one, 3-(tetradecan-2-yl)-1,2,4-oxadiazol-5(4H)-one, 3-(2-methyltetradecan-2-yl)-1,2,4-oxadiazol-5(4H)-one, 3-(3-methylpentadecan-3-yl)-1,2,4-oxadiazol-5(4H)-one, 3-(pentadecan-3-yl)-1,2,4-oxadiazol-5(4H)-one, 3-(3-ethylpentadecan-3-yl)-1,2,4-oxadiazol-5(4H)-one, 5-tridecyloxazol-2(3H)-one, 5-(tetradecan-2-yl)oxazol-2(3H)-one, 5-(2-methyltetradecan-2-yl)oxazol-2(3H)-one, 5-(pentadecan-3-yl)oxazol-2(3H)-one, 5-(3-methylpentadecan-3-yl)oxazol-2(3H)-one, 5-(3-ethylpentadecan-3-yl)oxazol-2(3H)-one, 5-tridecyl-1,2,3-oxadiazol-4(5H)-one, 5-(tetradecan-2-yl)-1,2,3-oxadiazol-4(5H)-one, 5-(2-methyltetradecan-2-yl)-1,2,3-oxadiazol-4(5H)-one, 5-(pentadecan-3-yl)-1,2,3-oxadiazol-4(5H)-one, 5-(3-methylpentadecan-3-yl)-1,2,3-oxadiazol-4(5H)-one, 5-(3-ethylpentadecan-3-yl)-1,2,3-oxadiazol-4(5H)-one, N-hydroxytridecanamide, N-hydroxy-2-methyltridecanamide, N-hydroxy-2,2-dimethyltridecanamide, 2-ethyl-N-hydroxytridecanamide, 2-ethyl-N-hydroxy-2-methyltridecanamide, 2,2-diethyl-N-hydroxytridecanamide, 1-tridecyl-2,3-dihydro-1H-tetrazole, 1-(tetradecan-2-yl)-2,3-dihydro-1H-tetrazole, 1-(2-methyltetradecan-2-yl)-2,3-dihydro-1H-tetrazole, 1-(pentadecan-3-yl)-2,3-dihydro-1H-tetrazole, 1-(3-methylpentadecan-3-yl)-2,3-dihydro-1H-tetrazole, 1-(3-ethylpentadecan-3-yl)-2,3-dihydro-1H-tetrazole, 1-tridecyl-2,5-dihydro-1H-tetrazole, 1-(tetradecan-2-yl)-2,5-dihydro-1H-tetrazole, 1-(2-methyltetradecan-2-yl)-2,5-dihydro-1H-tetrazole, 1-(pentadecan-3-yl)-2,5-dihydro-1H-tetrazole, 1-(3-methylpentadecan-3-yl)-2,5-dihydro-1H-tetrazole, and 1-(3-ethylpentadecan-3-yl)-2,5-dihydro-1H-tetrazole.

Method 26: Method 1, wherein the pharmaceutical composition is in a unit dosage form.

Method 27: Method 1, comprising from 0.01 mg to 10000 mg of the compound of Formula (I), or pharmaceutically acceptable salt thereof.

Method 28: Method 1, for the treatment or prophylaxis of cognitive impairment.

Method 29: Method 28, wherein the cognitive impairment is Alzheimer's disease.

Method 30: Method 1, for treatment or prophylaxis of a movement disorder.

Method 31: Method 30, wherein the movement disorder is selected from the group consisting of multiple sclerosis or Parkinson's disease.

Method 32: Method 1, for treatment or prophylaxis of addiction.

Method 33: Method 32, wherein the addiction is opioid addiction.

Method 34: Method 1, for treatment or prophylaxis of anorexia or cachexia.

Method 35: Method 34, wherein the condition with anorexia or cachexia is selected from the group consisting of cancer, AIDS, or advanced age.

Method 36: Method 1, wherein the condition is chronic pain.

Method 37: Method 1, wherein the condition is depression.

Method 38: Method 1, wherein the compound of Formula (I) is:

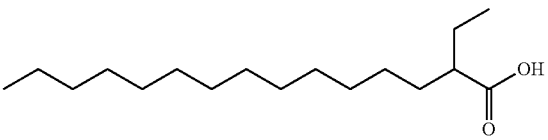

2-ethylpentadecanoic acid

Method 39: Method 38, for the treatment of chronic pain.
Method 40: Method 38, for the treatment of depression.

Method 41: Method 38, for the treatment or prophylaxis of cognitive impairment.

Method 42: Method 41, wherein the cognitive impairment is Alzheimer's disease.

Method 43: Method 38, for treatment or prophylaxis of a movement disorder.

Method 44: Method 43, wherein the movement disorder is selected from the group consisting of multiple sclerosis or Parkinson's disease.

Method 45: Method 38, for treatment or prophylaxis of addiction.

Method 46: Method 45, wherein the addiction is opioid addiction.

Method 47: Method 38, for treatment or prophylaxis of anorexia or cachexia.

Method 48: Method 47, wherein the condition with anorexia or cachexia is selected from the group consisting of cancer, AIDS, or advanced age.

Method 49: Method 1, wherein the compound of Formula (I) is:

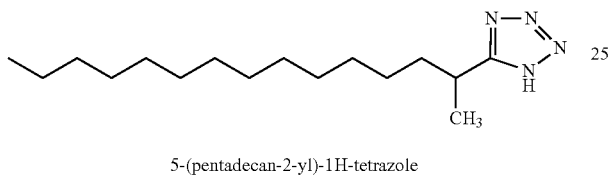

5-(pentadecan-2-yl)-1H-tetrazole

Method 50: Method 49, for the treatment of chronic pain.

Method 51: Method 49, for the treatment of depression.

Method 52: Method 49, for the treatment or prophylaxis of cognitive impairment.

Method 53: Method 52, wherein the cognitive impairment is Alzheimer's disease.

Method 54: Method 49, for treatment or prophylaxis of a movement disorder.

Method 55: Method 54, wherein the movement disorder is selected from the group consisting of multiple sclerosis or Parkinson's disease.

Method 56: Method 49, for treatment or prophylaxis of addiction.

Method 57: Method 56, wherein the addiction is opioid addiction.

Method 58: Method 49, for treatment or prophylaxis of anorexia or cachexia.

Method 59: Method 58, wherein the condition with anorexia or cachexia is selected from the group consisting of cancer, AIDS, or advanced age.

Method 60: Method 1, wherein the compound of Formula (I) is:

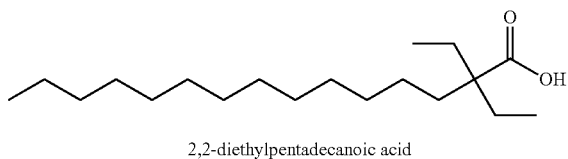 [SMILES: CCCCCCCCCCCCCC(CC)(CC)C(=O)O]

2,2-diethylpentadecanoic acid

Method 61: Method 60, for the treatment or prophylaxis of cognitive impairment.

Method 62: Method 60, wherein the cognitive impairment is Alzheimer's disease.

Method 63: Method 60, for treatment or prophylaxis of a movement disorder.

Method 64: Method 63, wherein the movement disorder is selected from the group consisting of multiple sclerosis or Parkinson's disease.

Method 65: Method 60, for treatment or prophylaxis of addiction.

Method 66: Method 65, wherein the addiction is opioid addiction.

Method 67: Method 60, for treatment or prophylaxis of anorexia or cachexia.

Method 68: Method 67, wherein the condition with anorexia or cachexia is selected from the group consisting of cancer, AIDS, or advanced age.

Method 69: Method 60, for the treatment of chronic pain.

Method 70: Method 60, for the treatment of depression.

Method 71: Method 1, wherein the compound of Formula (I) is:

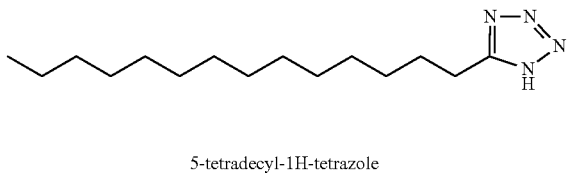 [SMILES: CCCCCCCCCCCCCCc1nnn[nH]1]

5-tetradecyl-1H-tetrazole

Method 72: Method 71, for the treatment or prophylaxis of cognitive impairment.

Method 73: Method 72, wherein the cognitive impairment is Alzheimer's disease.

Method 74: Method 71, for treatment or prophylaxis of a movement disorder.

Method 75: Method 74, wherein the movement disorder is selected from the group consisting of multiple sclerosis or Parkinson's disease.

Method 76: Method 71, for treatment or prophylaxis of addiction.

Method 77: Method 76, wherein the addiction is opioid addiction.

Method 78: Method 71, for treatment or prophylaxis of anorexia or cachexia.

Method 79: Method 77, wherein the condition with anorexia or cachexia is selected from the group consisting of cancer, AIDS, or advanced age.

Method 80: Method 71, for the treatment of chronic pain.

Method 81: Method 71, for the treatment of depression.

Method 82: Method 1, wherein the compound of Formula (I) is:

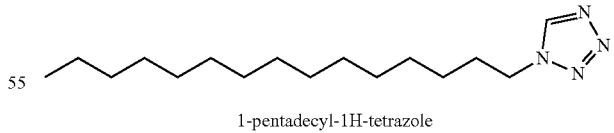

1-pentadecyl-1H-tetrazole

Method 83: Method 82, for the treatment or prophylaxis of cognitive impairment.

Method 84: Method 83, wherein the cognitive impairment is Alzheimer's disease.

Method 85: Method 82, for treatment or prophylaxis of a movement disorder.

Method 86: Method 85, wherein the movement disorder is selected from the group consisting of multiple sclerosis or Parkinson's disease.

Method 87: Method 82, for treatment or prophylaxis of addiction.

Method 88: Method 87, wherein the addiction is opioid addiction.

Method 89: Method 82, for treatment or prophylaxis of anorexia or cachexia.

Method 90: Method 89, wherein the condition with anorexia or cachexia is selected from the group consisting of cancer, AIDS, or advanced age.

Method 91: Method 82, for the treatment of chronic pain.

Method 92: Method 82, for the treatment of depression.

Method 93: Method 1, wherein the compound of Formula (I) is:

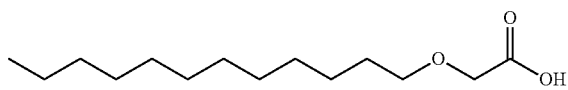 [SMILES: CCCCCCCCCCCCOCC(=O)O]

Method 94: Method 93, for the treatment or prophylaxis of cognitive impairment.

Method 95: Method 94, wherein the cognitive impairment is Alzheimer's disease.

Method 96: Method 93, for treatment or prophylaxis of a movement disorder.

Method 97: Method 96, wherein the movement disorder is selected from the group consisting of multiple sclerosis or Parkinson's disease.

Method 98: Method 93, for treatment or prophylaxis of addiction.

Method 99: Method 97, wherein the addiction is opioid addiction.

Method 100: Method 93, for treatment or prophylaxis of anorexia or cachexia.

Method 101: Method 100, wherein the condition with anorexia or cachexia is selected from the group consisting of cancer, AIDS, or advanced age.

Method 102: Method 93, for the treatment of chronic pain.

Method 103: Method 93, for the treatment of depression.

Any of the features the above referenced pharmaceutical compositions, uses, and methods is applicable to any other pharmaceutical composition, use, or method identified herein. Moreover, any of the features of the above referenced pharmaceutical compositions, uses, and methods is independently combinable, partly or wholly, with other embodiments of the pharmaceutical compositions, uses, and methods described herein in any way, e.g., one, two, or three or more features may be combinable in whole or in part. Further, any of the features of the pharmaceutical compositions, uses, and methods described above may be made optional to other pharmaceutical compositions, uses, and methods described herein. Any aspect or embodiment of a method or use described herein can be performed using a composition, e.g., a pharmaceutical composition and/or a compound of Formula (I) as described herein or any compound having a structure described herein, and any aspect or embodiment of a composition, e.g., a pharmaceutical composition and/or a compound of Formula (I) or any compound having a structure described herein, can be used or adapted to perform a method or use as described herein.

The above description presents the best mode contemplated for carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above that are fully equivalent. Consequently, this invention is not limited to the particular embodiments disclosed. On the contrary, this invention covers all modifications and alternate constructions coming within the spirit and scope of the invention as generally expressed by the following claims, which particularly point out and distinctly claim the subject matter of the invention. While the disclosure has been illustrated and described in detail in the drawings and foregoing description, such illustration and description are to be considered illustrative or exemplary and not restrictive.

All references cited herein are incorporated herein by reference in their entirety. To the extent publications and patents or patent applications incorporated by reference contradict the disclosure contained in the specification, the specification is intended to supersede and/or take precedence over any such contradictory material.

Unless otherwise defined, all terms (including technical and scientific terms) are to be given their ordinary and customary meaning to a person of ordinary skill in the art, and are not to be limited to a special or customized meaning unless expressly so defined herein. It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term 'including' should be read to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes but is not limited to;' the term 'example' is used to provide exemplary instances of the item in discussion, not an exhaustive or limiting list thereof; adjectives such as 'known', 'normal', 'standard', and terms of similar meaning should not be construed as limiting the item described to a given time period or to an item available as of a given time, but instead should be read to encompass known, normal, or standard technologies that may be available or known now or at any time in the future; and use of terms like 'preferably,' 'preferred,' 'desired,' or 'desirable,' and words of similar meaning should not be understood as implying that certain features are critical, essential, or even important to the structure or function of the invention, but instead as merely intended to highlight alternative or additional features that may or may not be utilized in a particular embodiment of the invention. Likewise, a group of items linked with the conjunction 'and' should not be read as requiring that each and every one of those items be present in the grouping, but rather should be read as 'and/or' unless expressly stated otherwise. Similarly, a group of items linked with the conjunction 'or' should not be read as requiring mutual exclusivity among that group, but rather should be read as 'and/or' unless expressly stated otherwise.

Where a range of values is provided, it is understood that the upper and lower limit, and each intervening value between the upper and lower limit of the range is encompassed within the embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. The indefinite article 'a' or 'an' does not exclude a plurality. A single processor or other unit may fulfill the functions of several items recited in the claims. The mere fact that certain measures are recited in mutually different dependent claims does not indicate that a combination of these measures cannot be used to advantage. Any reference signs in the claims should not be construed as limiting the scope.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases 'at least one' and "one or more' to introduce claim recitations. However, the use of such phrases should not be construed to imply that the introduction of a claim recitation by the indefinite articles 'a' or 'an' limits any particular claim containing such introduced claim recitation to embodiments containing only one such recitation, even when the same claim includes the introductory phrases 'one or more' or 'at least one' and indefinite articles such as 'a' or 'an' (e.g., 'a' and/or 'an' should typically be interpreted to mean 'at least one' or 'one or more'); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of 'two recitations,' without other modifiers, typically means at least two recitations, or two or more recitations). Furthermore, in those instances where a convention analogous to 'at least one of A, B, and C, etc.' is used, in general such a construction is intended in the sense one having skill in the art would understand the convention (e.g., 'a system having at least one of A, B, and C' would include but not be limited to systems that have A alone, B alone, C alone, A and B together, A and C together, B and C together, and/or A, B, and C together, etc.). In those instances where a convention analogous to 'at least one of A, B, or C, etc.' is used, in general such a construction is intended in the sense one having skill in the art would understand the convention (e.g., 'a system having at least one of A, B, or C' would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase 'A or B' will be understood to include the possibilities of 'A' or 'B' or 'A and B.'

All numbers expressing quantities of ingredients, reaction conditions, and so forth used in the specification are to be understood as being modified in all instances by the term 'about.' Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

Furthermore, although the foregoing has been described in some detail by way of illustrations and examples for purposes of clarity and understanding, it is apparent to those skilled in the art that certain changes and modifications may be practiced. Therefore, the description and examples should not be construed as limiting the scope of the invention to the specific embodiments and examples described herein, but rather to also cover all modification and alternatives coming with the true scope and spirit of the invention.

What is claimed is:

1. A method of treatment of a condition selected from the group consisting of impaired cognition, movement disorders, chronic pain, depression, decreased appetite, convulsion, seizure, anorexia, cachexia, and addiction, comprising:
   administering to a patient in need thereof, a pharmaceutical composition comprising an effective amount of a compound having a structure selected from the group consisting of:

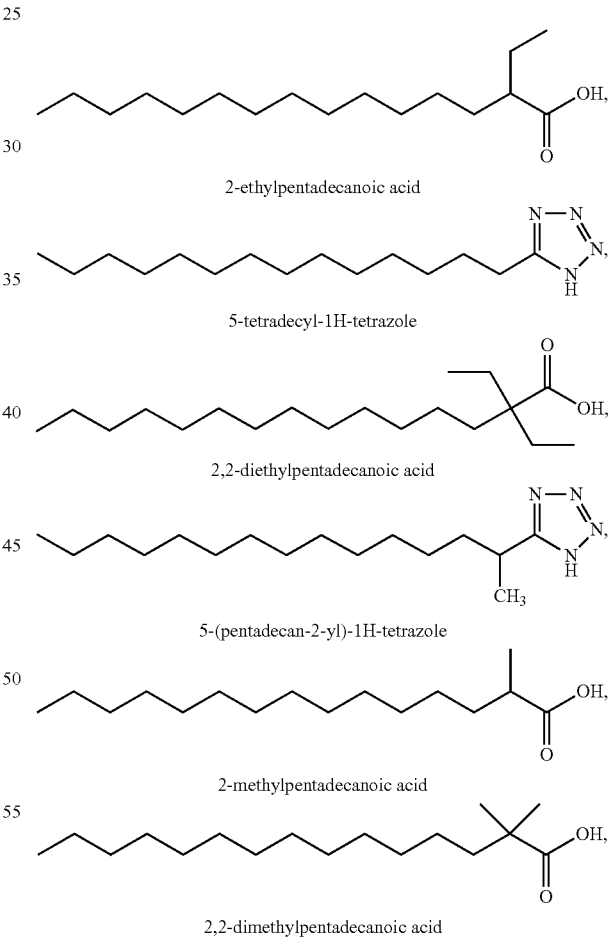

and pharmaceutically acceptable salts thereof.

2. The method of claim 1, wherein the pharmaceutical composition is in a unit dosage form.

3. The method of claim 1, comprising from 0.01 mg to 10000 mg of the compound of Formula (I), or pharmaceutically acceptable salt thereof.

4. The method of claim 1, for the treatment of cognitive impairment.

5. The method of claim 4, wherein the cognitive impairment is Alzheimer's disease.

6. The method of claim 1, for treatment of a movement disorder.

7. The method of claim 6, wherein the movement disorder is multiple sclerosis or Parkinson's disease.

8. The method of claim 1, for treatment of addiction.

9. The method of claim 8, wherein the addiction is opioid addiction.

10. The method of claim 1, for treatment of anorexia or cachexia.

11. The method of claim 10, wherein the condition with anorexia or cachexia is selected from the group consisting of cancer, AIDS, and advanced age.

12. The method of claim 1, wherein the condition is chronic pain.

13. The method of claim 1, wherein the condition is depression.

14. The method of claim 1, wherein the compound of Formula (I) is:

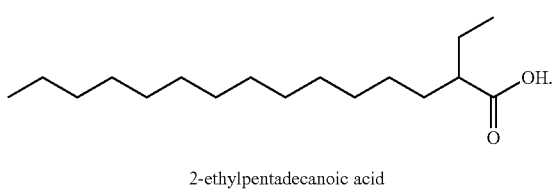 [SMILES: CCCCCCCCCCCCCC(CC)C(=O)O]

2-ethylpentadecanoic acid

15. The method of claim 14, for the treatment of chronic pain.

16. The method of claim 14, for the treatment of depression.

17. The method of claim 1, wherein the compound of Formula (I) is:

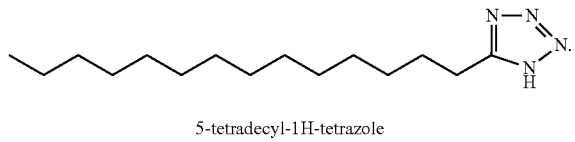 [SMILES: CCCCCCCCCCCCCCc1nnn[nH]1]

5-tetradecyl-1H-tetrazole

18. The method of claim 17, for treatment of addiction.

19. The method of claim 1, wherein the compound of Formula (I) is:

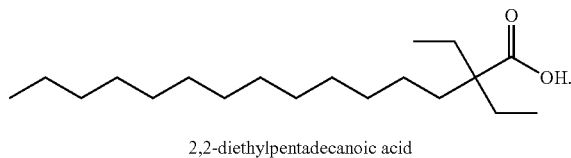 [SMILES: CCCCCCCCCCCCCC(CC)(CC)C(=O)O]

2,2-diethylpentadecanoic acid

20. The method of claim 19, for the treatment of depression.

21. The method of claim 1, wherein the compound of Formula (I) is:

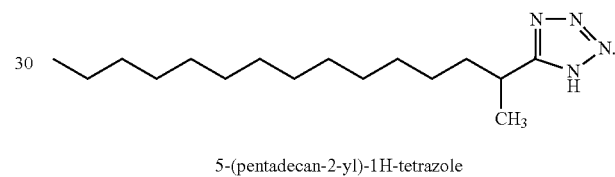

5-(pentadecan-2-yl)-1H-tetrazole

22. The method of claim 21, for treatment of depression.

* * * * *